US010623451B2

(12) United States Patent
Rathod

(10) Patent No.: US 10,623,451 B2
(45) Date of Patent: Apr. 14, 2020

(54) INITIATE CALL TO PRESENT ONE OR MORE TYPES OF APPLICATIONS AND MEDIA UP-TO END OF CALL

(71) Applicant: Yogesh Chunilal Rathod, Mumbai (IN)

(72) Inventor: Yogesh Chunilal Rathod, Mumbai (IN)

( * ) Notice: Subject to any disclaimer, the term of this patent is extended or adjusted under 35 U.S.C. 154(b) by 222 days.

(21) Appl. No.: 15/814,454

(22) Filed: Nov. 16, 2017

(65) Prior Publication Data

US 2018/0309801 A1 Oct. 25, 2018

Related U.S. Application Data

(63) Continuation of application No. PCT/IB2015/053808, filed on May 23, 2015.

(51) Int. Cl.
*H04L 29/06* (2006.01)
*H04L 12/58* (2006.01)
*H04L 29/08* (2006.01)

(52) U.S. Cl.
CPC .......... *H04L 65/1069* (2013.01); *H04L 51/04* (2013.01); *H04L 65/1076* (2013.01); *H04L 65/4061* (2013.01); *H04L 67/141* (2013.01); *H04L 63/20* (2013.01)

(58) Field of Classification Search
CPC . H04L 65/1069; H04L 65/1076; H04L 51/04; H04L 67/141; H04L 63/20; H04L 65/4061
USPC .......................................................... 709/204
See application file for complete search history.

(56) References Cited

U.S. PATENT DOCUMENTS

| | | | | |
|---|---|---|---|---|
| 7,912,448 | B2 * | 3/2011 | Hinrikus | H04W 8/18 455/404.2 |
| 8,078,677 | B2 * | 12/2011 | Mendiola | H04L 63/104 707/781 |
| 9,454,735 | B2 * | 9/2016 | Banga | G06Q 10/00 |
| 9,584,563 | B2 * | 2/2017 | Partaker | H04L 65/1096 |
| 2008/0016453 | A1 * | 1/2008 | Quillen | H04L 67/36 715/763 |

* cited by examiner

*Primary Examiner* — Tu T Nguyen

(57) ABSTRACT

A computer-implemented communication channel, server, methods, systems, device, apparatus, platform, application & service are disclosed for receiving by a server from a first user, a selection of a second user from a contact list, a request for initiating a call and a selection of one or more types of one or more applications, interfaces and media. In the event the second user accepts an initiated call within pre-set duration, start communication session and presenting said selected one or more applications, interfaces, media to first user and/or second user. Enabling the first user and/or the second user in real-time to access said presented application or interface or media and receiving by the server, a termination indication from the first user or the second user, the termination indication indicating the ending of the call and based on the termination indication, terminate the call or terminate said communication session.

20 Claims, 50 Drawing Sheets

| | | |
|---|---|---|
| Remove call related contents after end of call/ e.g. chat call session 725 | Call/Chat Call Routing/ Forwarding 740 | Profile 766 |
| Save call related data e.g. chat call session related conversation 726 | Blocked 741 | Account 767 |
| | Call/Chat Call Transfer 742 | Delete all Conversations 769 |
| Add / Allow call e.g. chat call associate data / shared contents to add to story 727 | Call/Chat Call Waiting 743 | Clear all Conversations 774 |
| | Call Handling Rules 745 | Backup Conversations 768 |
| Add / Allow call e.g. chat call associate data/shared content add to collaborative story 728 | Call Schedules 746 | Restore Conversations 770 |
| | Do Not Disturb 748 | Archive Conversations 771 |
| Enable Real-time Text / Typing / Network Status (1 or group) 731 | Respond with Text 750 | Email conversations 772 |
| | Show my caller ID 751 | Network Status 773 |
| Allow anyone to call / chat call me (Preferences) 732 | Reminders 753 | System Status 775 |
| Only allow people in my contact list to call/chat call me 733 | Tell Friends/Invite 755 | Chat Interface Settings (Font, Size (Small, Medium, Large), Color, Wallpaper, Ring Tones, Notifications etc.) 777 |
| | Call Notification 757 | Multi Users Settings (Manage Extensions, Interactive Options, Queues) 778 |
| Allow to show profile / status / Last Seen / Location 735 | Chat Call Recording 760 | |
| | Notification Settings 761 | Chat Call Logs (Recents/ Incoming/Outgoing/Cancelled/ Missed - Date/Time/Duration) Search and Access 780 |
| Show that I installed App or only to whom I started call / e.g. chat call 736 | Terms & Privacy 765 | |
| Media Auto Download (If allow to save) 737 | Support | Help, About, FAQ, System Status, Contact us (describe problem, add screenshot) | Add Contact (search directory, import, invite, save a chat call number) 795 |
| | Logout | | |
| | Change Number | | Call e.g. Chat Call Settings 788 |
| Following others or ChatCall Me - Settings (From - To, Total Duration, No. of Times, Max. No. of Current Calls etc.), Preferences to follow or ChatCall: (1) Search / (2) Match or Suggested / (3) Directory & follow - (4) Follow preferences e.g. follow lists, categories, keywords, entities, locations, brands, customers etc.) | Delete My Account | | |
| Show My No. to My Following Users | In Group Calling when I start calling then when I end then end all chat calling users | | 701 |
| Show My No. to My Followers | | | |
| Points Management (Statistics) 707 | In Group Calling when I start calling - end chat call when one of the last user end chat call | | |
| | Do not Show My No. & contact details to other than contacts 702 | | |
| (Default) Use Data Network for Call/ChatCall and related interface | Custom ChatCall Start Msg / End Msg 708 | | |
| Use Cellular Network for Call/ChatCall and Use SMS / MMS Interface | Show photo of group members in group chat conversation 703 | | |
| Auto Select Network for Call/ChatCall | | | |
| Allow anyone to (1) ChatCall Me (2) Following me (other than contacts) 704 | Auto Accept Call/ChatCalls or Auto accept as per schedule, settings & rules 705 | | |
| Free Profile Listing in Categories Directory, so others can Follow or ChatCall via button 706 | | | |

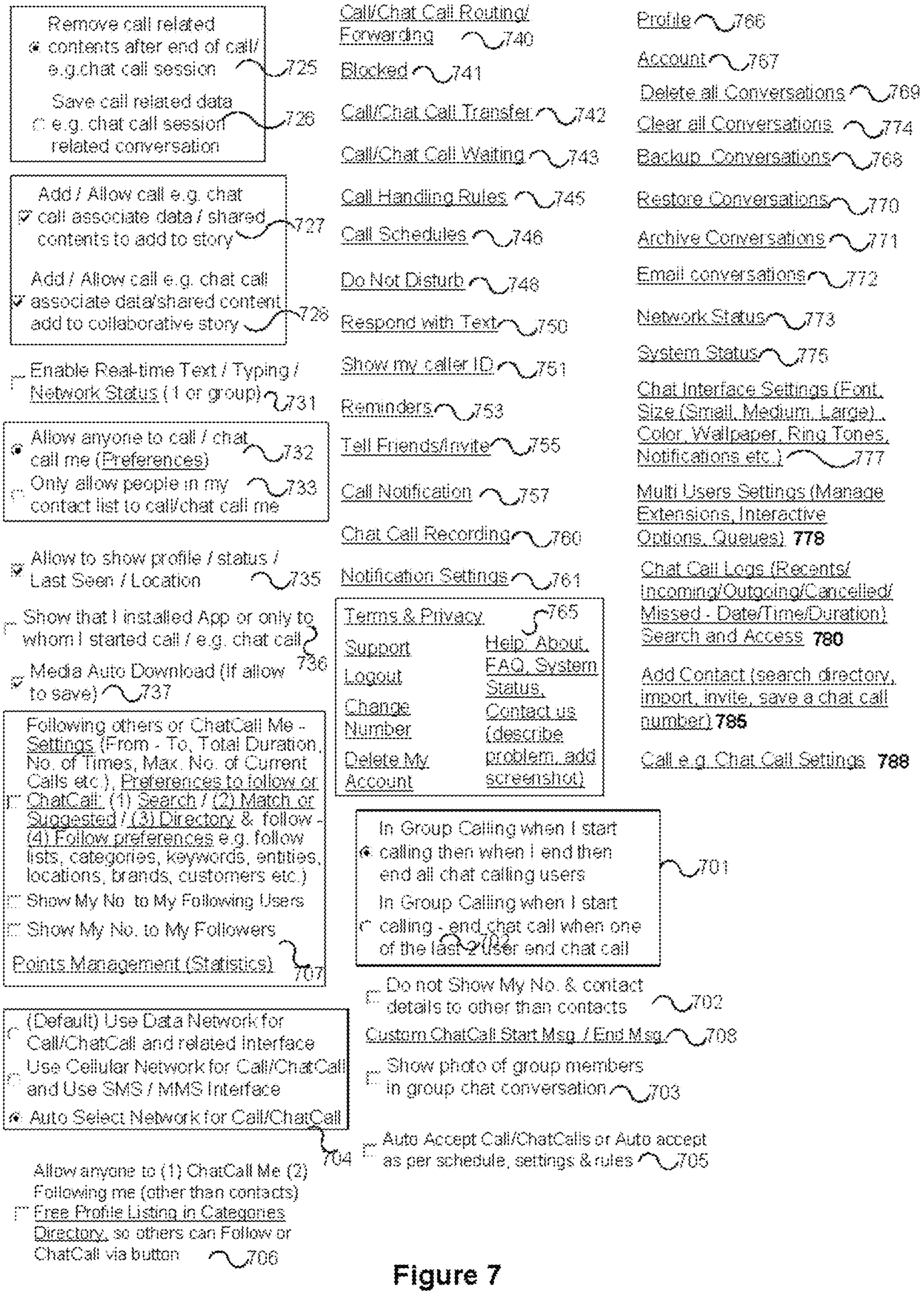

Figure 7

- ⦿ Auto Show Camera Display
- ○ Manual Show Camera Display via icon
- ○ Show Camera Display (as Default Home) 2110

- ⦿ Manual Capture (via Photo/Video/Stream/Audio icons)
- ○ Auto Capture (based on sensor(s)) (Photo/Video or Stream/Audio)
- ○ Auto Capture (Photo/Video or Stream/Audio) for <Set period of duration to capture> | <Set start time to capture> | <Time interval to capture next photo> | <Set Temp save period> meanwhile allow to save/share 2115

- ⦿ Auto Preview (View, Cancel meanwhile) (Timer Based <Set No. of Seconds>
- ○ Manual Preview & Cancel
- ○ No Preview (With Delay sending- meanwhile user can view, cancel, update destinations, apply actions etc.)
- ○ No Preview 2120

- ○ Manual Show Group Photo/Video/Audio Preview (slideshow while device near body) - enable selection for group sending
- ⦿ Auto Show Group Photo/Video/Audio Preview (timer based slideshow while device near body) enable selection for group sending 2122

- ○ Show menu with/on camera display (transparent menu middle, right, left etc.)
- ⦿ Show menu with/on camera display after camera is stable and after set no. of seconds (transparent menu middle, right, left etc.)
- ○ Show menu with/on preview (manual or timer based) (transparent menu middle, right, left etc.) 2125

- ○ Manual Select (Contact(s)/Group(s)/Destination(s)/ Action(s) after capture and/or preview
- ⦿ Auto send when tap on (individual contact/ group/destination menu item)
- ⦿ Enable Delay Sending  ○ Disable Delay Sending 2128
- ○ Select destination(s) via voice command

- ☑ One Tap or Long Press & Release
  - ○ One Tap (SnapCall)
  - ⦿ One Tap (Snap ChatCall)
  - ○ One Tap (Send) 2130
  - ☐ One Tap (iNewsFeed)
  - ☑ One Tap (Save Local)
  - ☐ One Tap (Followers)
  - ☐ One Tap (Publish)

- ○ Manually Enable Edit Mode via icon
- ⦿ Auto Enable Edit Mode (Order, Remove, Create Group & Add/Update Group Members etc. 2132

- ○ Manually Present (Send / Received Contents (Photos/Videos/Audio/Text etc.) via icon(s)
- ⦿ Auto Present (Send / Received Contents (Photos/Videos/Audio/Text etc.) when device is near body 2135

- ○ Show Send / Received each Photo/Video Icons on Top
- ⦿ Show Senders / Receivers Icons on Top (View 1 or more shared photos/videos)
- ○ Do not show Send / Received Photo/Video Icons & Senders / Receivers Icons on Top (View via previous next icons) 2140

- ○ Manually Present Chat via icon
- ⦿ Auto Present Chat on Photo/Video/Contents 2145

- ⦿ Enable Real-time sharing (e.g. SnapCall)
- ○ Disable Real-time Sharing 2148

- ○ Enable Allow to Save/Re-Share
- ⦿ Disable Allow to Save/Re-Share 2150

- ☑ Show last (<No. of>/<Duration>) captured photos/videos/audio) for later sharing / multi sharing / re-sharing 2152

- ○ Show All Contacts (Installed, Frequent Used, Recent, Invite-able)
- ⦿ Show only contacts who installed app 2155

- ⦿ Auto Order Contacts / Groups/ Destinations
- ○ Manual Order Contacts / Groups/ Destinations 2158

- ⦿ Enable Ephemeral Sharing
- ○ Disable Ephemeral Sharing 2160

- ☑ Allow chat only to/with selected receivers 2162

- ☑ Enable chatting on 1 or more photos/videos/ contents with same set of users 2164

- ⦿ Allow Anybody to Share
- ○ Allow only contacts to share 2165

- ⦿ Auto Show/Present Interface in Device when new contents or updated contents (Photos/Videos/Audio/ Text etc.) received and auto present in auto slideshow mode (e.g. show each received content item up-to set no. of seconds and auto show next - user can skip (based on settings remove or save locally) 2170

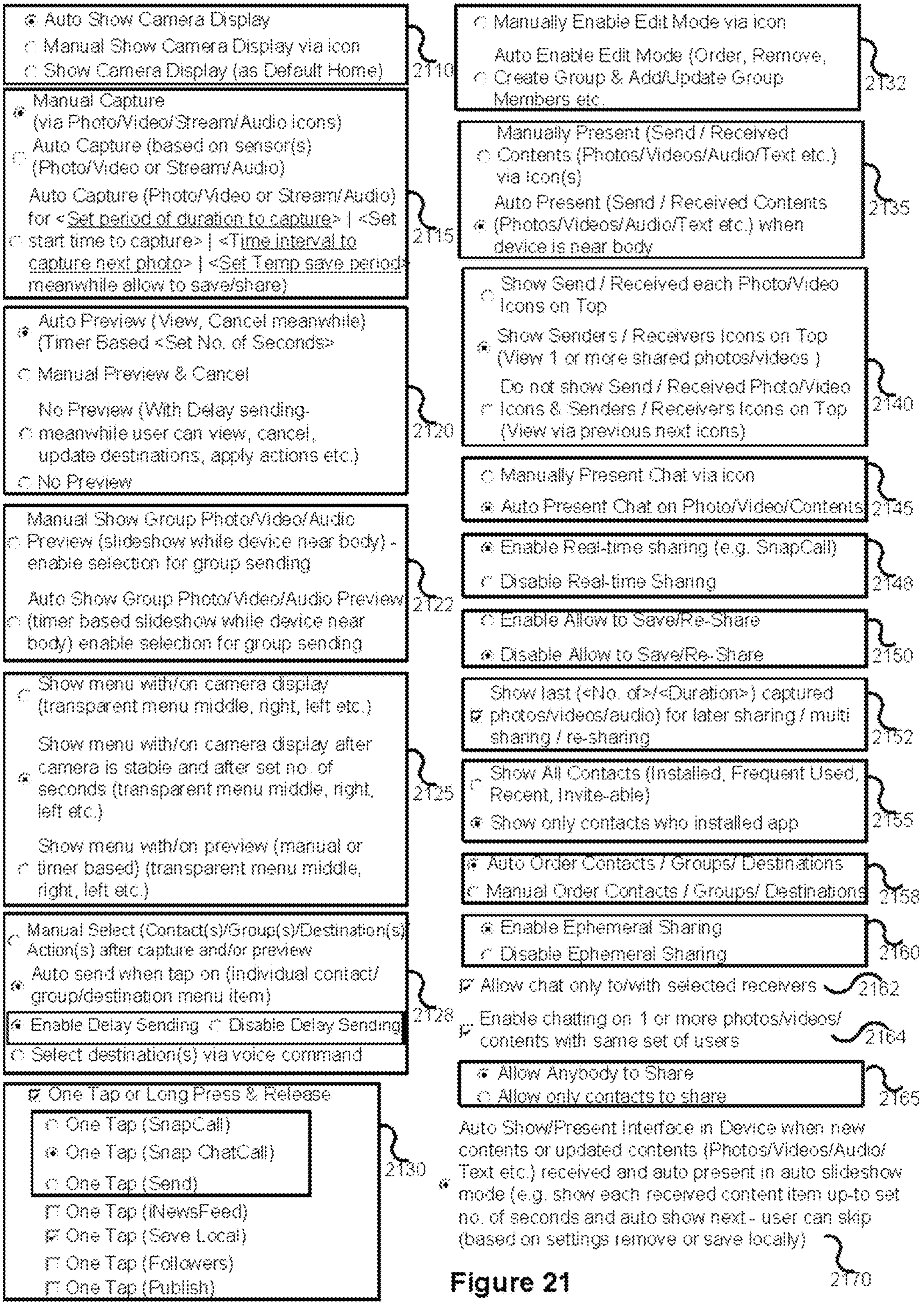

Figure 21

Privacy Settings:

☑ Request specific snaps — 2710

☑ Users of Network (Anonymous-Don't Disclose ID) — 2715
☐ Contacts Only — 2720

☑ Allow to share my auto identified current location
e.g. Goa Vincy Beach — 2735

☑ Live or Real-time Only — 2725
☐ Anytime (Date wise order) or <u>Date Range specific</u> — 2730

*Check-In Place or Select your exact current location:*
[Goa Vincy Beach Resort ▼] — 2740
*Status/Structured Status:*
[Swimming (Add/Update/Select) ▼] — 2745

<u>Auto send requests to contacts</u>
☑ <u>(Preferences & Settings)</u> — 2750
Request:
[I want to view vincy beach resort] — 2755
☑ Call (Real-time)  Send  Send To
          2766        2760  2765

Name: [Y-Birthday ▼] — 2701
○ [A] Public ○ [B] Private ⦿ [C] All/selected contacts — 2702
[<Description>] — 2703
Category: [General ▼] — 2704
☑ [A] & [C] Allow to add photo/video/contents — 2705
[C] All/Selected Contact(s)/
Group(s)/Facebook Friends etc.: [ALL ▼] — 2706
☐ [A] Show Nick Name (if Public) — 2707

— 2799

(+/-) (Allow/Not Allow To) [Allow To (+) ▼] — 2770
Max. No. of Times Call Me: [Unlimited ▼] — 2772
All/Selected Contact(s)/Group(s)/
Facebook Friends etc.: [ALL ▼] ☑ — 2775
*Show No. of Times <contact/group> set for user*
Date/Date Range: [Calendar ▼] — 2777
Time/Time Range: [7:00 A.M. ▼]
*Any Time (Default)* To [11:00 P.M. ▼] — 2780
Daily My Min. No. of Sharing (Alert): [5-10 Times ▼] — 2784
Total No. of Times Call Me: [Unlimited ▼] — 2785
[E.g.Daily Once ▼] [Daily ▼] — 2788
☑ Only when I set Status "Allow call to me" or "Online" or "Available" — 2789
☑ Show me away when I inactive for [5 Minutes ▼] — 2790
☑ Auto accept & merge all calls/e.g. snap call or chat calls when open the application (when user notify that something new) — 2791
☑ Captured new photo/video/content (UGC) only — 2793
☑ Mute (No. of Hours, Days etc.) — 2795
☑ Consolidate & save incoming shared media (from <u>all or selective contacts</u> and/or <u>following users</u> and call to user and in the event of acceptance of call present said aggregated or shared media to user at <u>scheduled duration</u> and/or <u>no. of times</u> — 2797

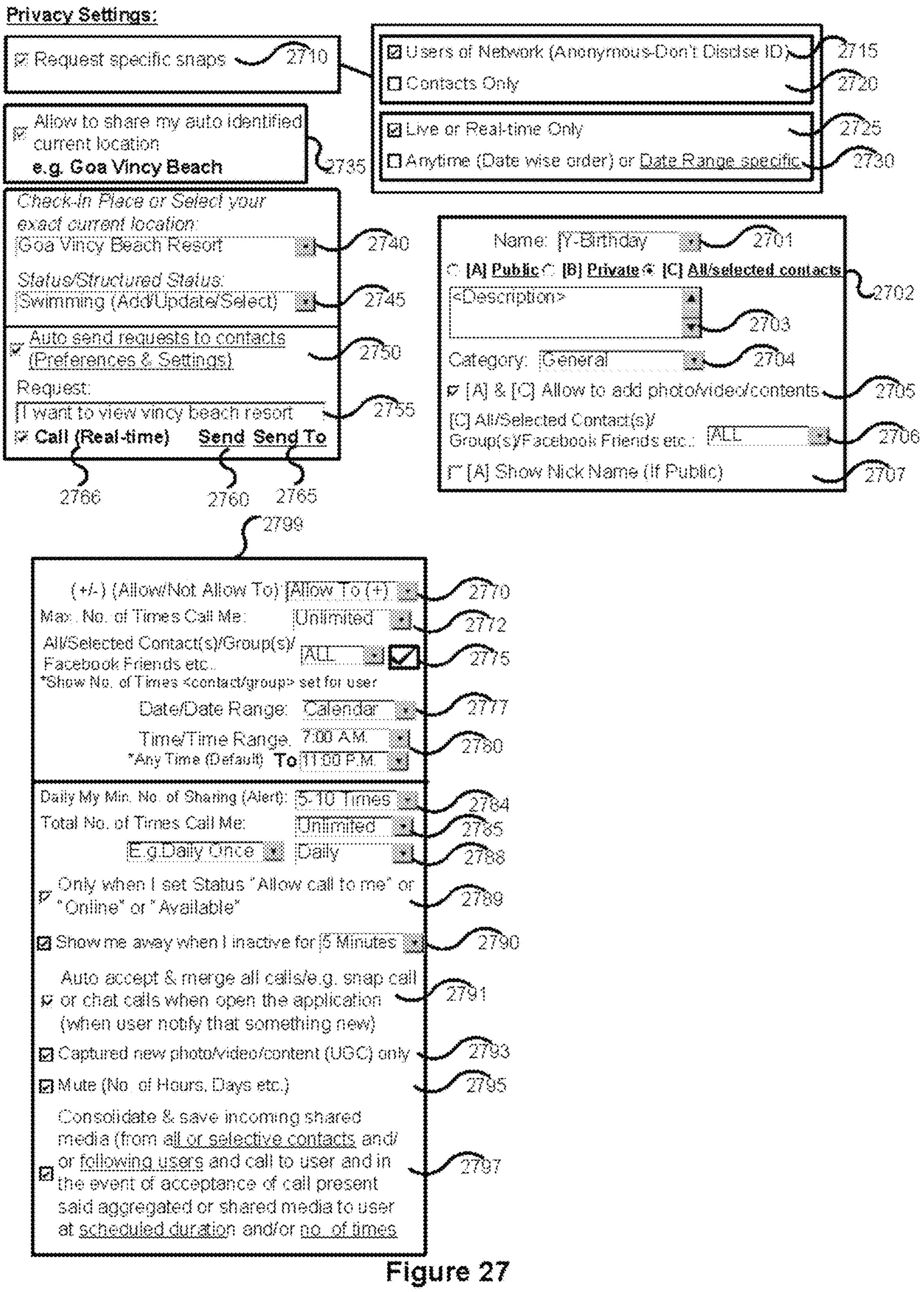

Figure 27

Manage Call Numbers e.g. ChatCall Numbers ~2905    2908 ~ [Add]

| Name / Nick Name | Number | Destination(s) | Schedule | Settings | |
|---|---|---|---|---|---|
| 2910 | 2912 | 2915 | 2918 | 2920 | |
| 1234567890 | 1234567890 | Goto Menu - My Business Menu | Working Hours | Edit | Delete |
| 2921 | 2923 | 2925 | 2927 | 2930 | 2932 |
| U.S. Number | 9876543210 | Forward Call - 5566778899 | Always | Edit | Delete |
| 2940 | 2942 | | | | |
| 2233445500 | 2233445500 | Multiple Rules set | Working Hours | Edit | Delete |

Edit Number ~2960

1234567890 ~2961

Nickname: [1234567890] ~2965

Number Action: [Goto Menu - My Business Menu] [Edit] ~2968
~2969

Call Blocking:
☐ Block Anonymous Calls ~2970
☐ Block All Incoming Calls ~2972

Caller ID Name: ☑ Publish this Number in the Caller ID Name Database ~2975
Name to Display: [My Business] #15 Characters Maximum ~2977
Use: ● Business ○ Personal ~2978

[Cancel] [Save] ~2980

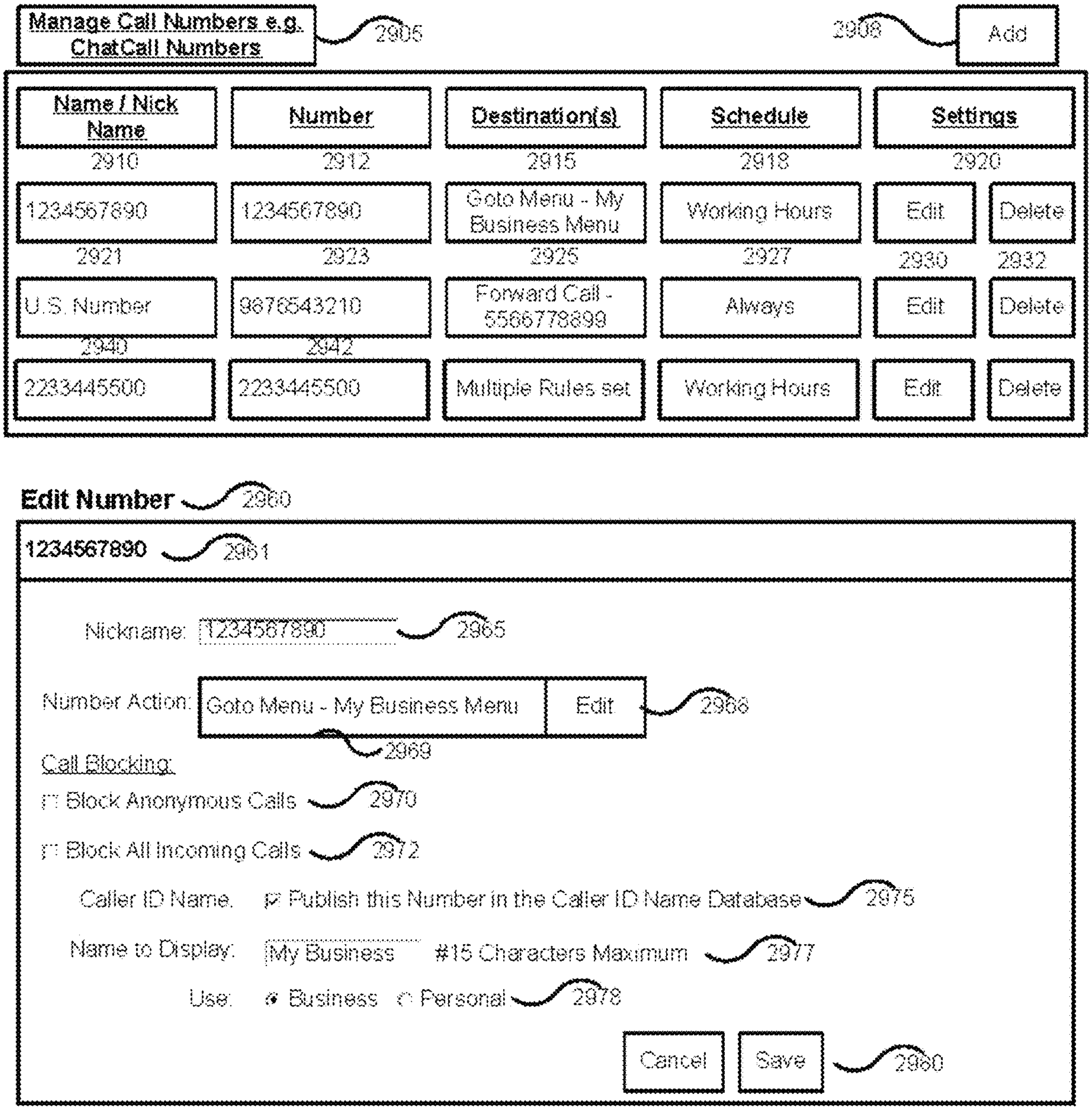

Figure 29

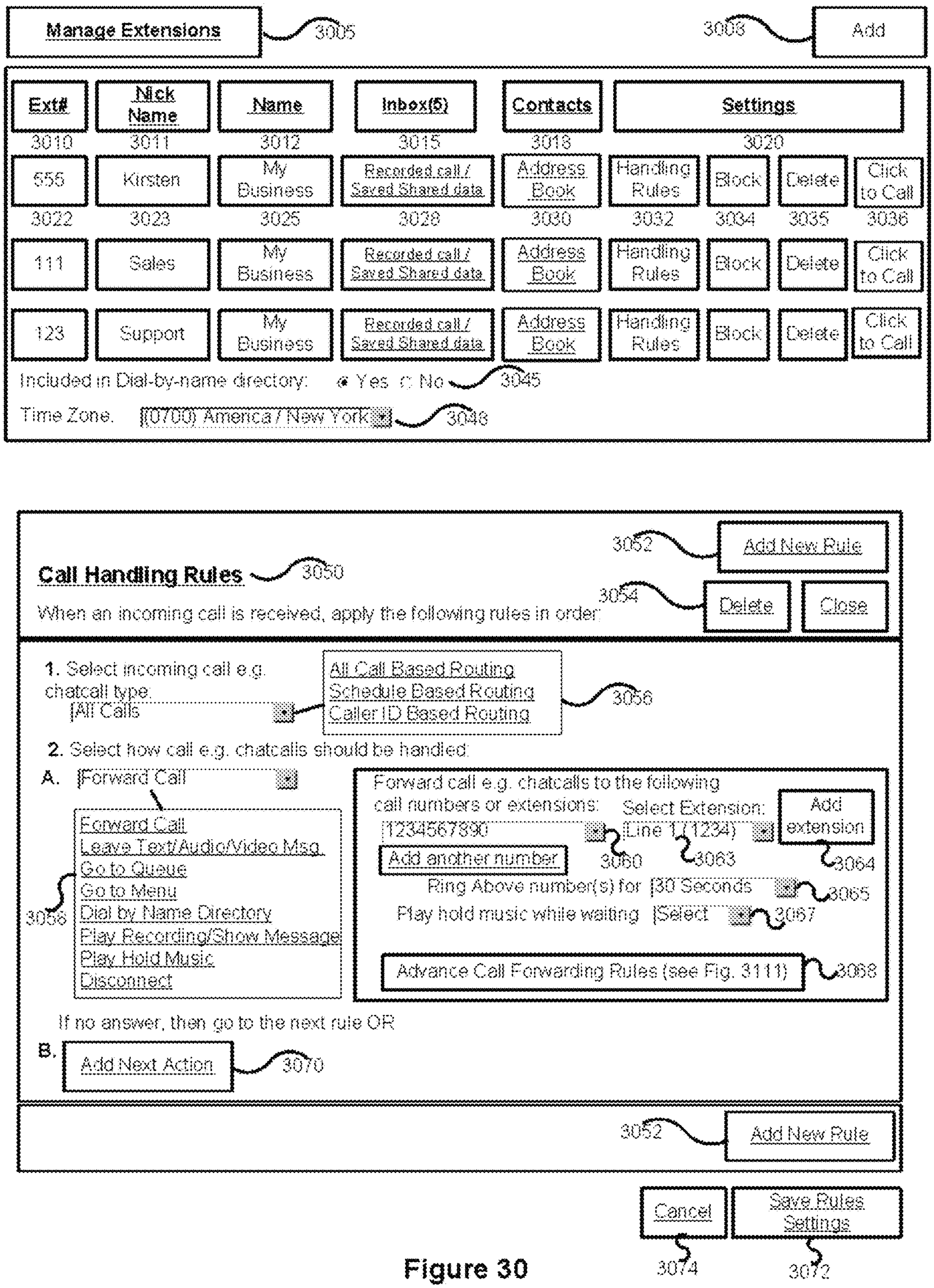

Figure 30

| Manage Extensions | 3005 | | | | | 3008 | | Add |
|---|---|---|---|---|---|---|---|---|
| Ext# | Nick Name | Name | Inbox(5) | Contacts | Settings | | | |
| 3010 | 3011 | 3012 | 3015 | 3018 | 3020 | | | |
| 555 | Kirsten | My Business | Recorded call / Saved Shared data | Address Book | Handling Rules | Block | Delete | Click to Call |
| 3022 | 3023 | 3025 | 3028 | 3030 | 3032 | 3034 | 3035 | 3036 |
| 111 | Sales | My Business | Recorded call / Saved Shared data | Address Book | Handling Rules | Block | Delete | Click to Call |
| 123 | Support | My Business | Recorded call / Saved Shared data | Address Book | Handling Rules | Block | Delete | Click to Call |

Included in Dial-by-name directory: ● Yes ○ No — 3045
Time Zone: [(0700) America / New York ▼] — 3048

---

Call Handling Rules — 3050    3052 — Add New Rule

When an incoming call is received, apply the following rules in order:   3054 — Delete  Close 1. Select incoming call e.g. chatcall type.
   [All Calls ▼]    [All Call Based Routing / Schedule Based Routing / Caller ID Based Routing] — 3056

2. Select how call e.g. chatcalls should be handled:

A. [Forward Call ▼]    Forward call e.g. chatcalls to the following call numbers or extensions:   Select Extension:   Add extension Forward Call
   Leave Text/Audio/Video Msg.
   Go to Queue
   Go to Menu
   Dial by Name Directory
   Play Recording/Show Message
   Play Hold Music
   Disconnect 1234567890    [Line 1 (1234) ▼]
   [Add another number]  3060  3063  3064
   Ring Above number(s) for [30 Seconds ▼] 3065
   Play hold music while waiting [Select ▼] 3067

[Advance Call Forwarding Rules (see Fig. 3111)] 3068

3058

If no answer, then go to the next rule OR

B. [Add Next Action] — 3070

3052 — Add New Rule

Cancel   Save Rules Settings
3074    3072

Call or Extension Record or Save Messages Settings — 3450

Status: ⦿ On ○ Off — 3451

Greeting: ⦿ Standard ○ Alternate ○ Name — 3453
Standard Greeting: [My Recorded or Stored Message ▾] — 3456
Alternate Greeting: [None ▾] — 3458
"Leave a Message" Prompt: [Show this message after my Greeting ▾] — 3460
  Please leave your message after the tone. When finished "end" call e.g. chatcall Password to check recorded messages: [12345] [Reset Password] — 3465
                                          └─3462

When I received new recorded call (email, SMS etc):
  ☑ Send an e-mail notification to — 3468
     rathodyogeshc@gmail.com, a@chatcall.net
  ☑ Send a text message SMS notification — 3470
     to 9821898140

---

Call Logs — 3405

3406
Billing Date: [Current Activity ▾]   Current Date Range >> — 3407

Show Results for:
  [Call Type ▾] — 3446
  ☐ Only Queue Calls  [My Queue ▾] — 3441
  ☐ Only to/from number  [(+91) 9821898140 ▾] — 3442
  ☐ Only to/from extension [Receptionist ▾] — 3443

[List Calls] — 3444    Call Blocking Settings — 3445

Search Results — 3448                                    3449 — Download

| Type | Caller | Callee | Queue | Date/Time | Minutes | Cost |
|------|--------|--------|-------|-----------|---------|------|
| 3408 | 3410 | 3411 | 3412 | 3415 | 3418 | 3420 |
| In | Sales | 123456789 | - | 13/04/2015 5:30 PM | 5 | - |
| 3423 | 3420 | 3421 | 3422 | 3425 | 3428 | 3430 |
| Out | 9821898140 | 987654321 | - | 13/04/2015 7:00 PM | 7 | - |
| 3433 | 3430 | 3431 | 3432 | 3435 | 3438 | 3440 |

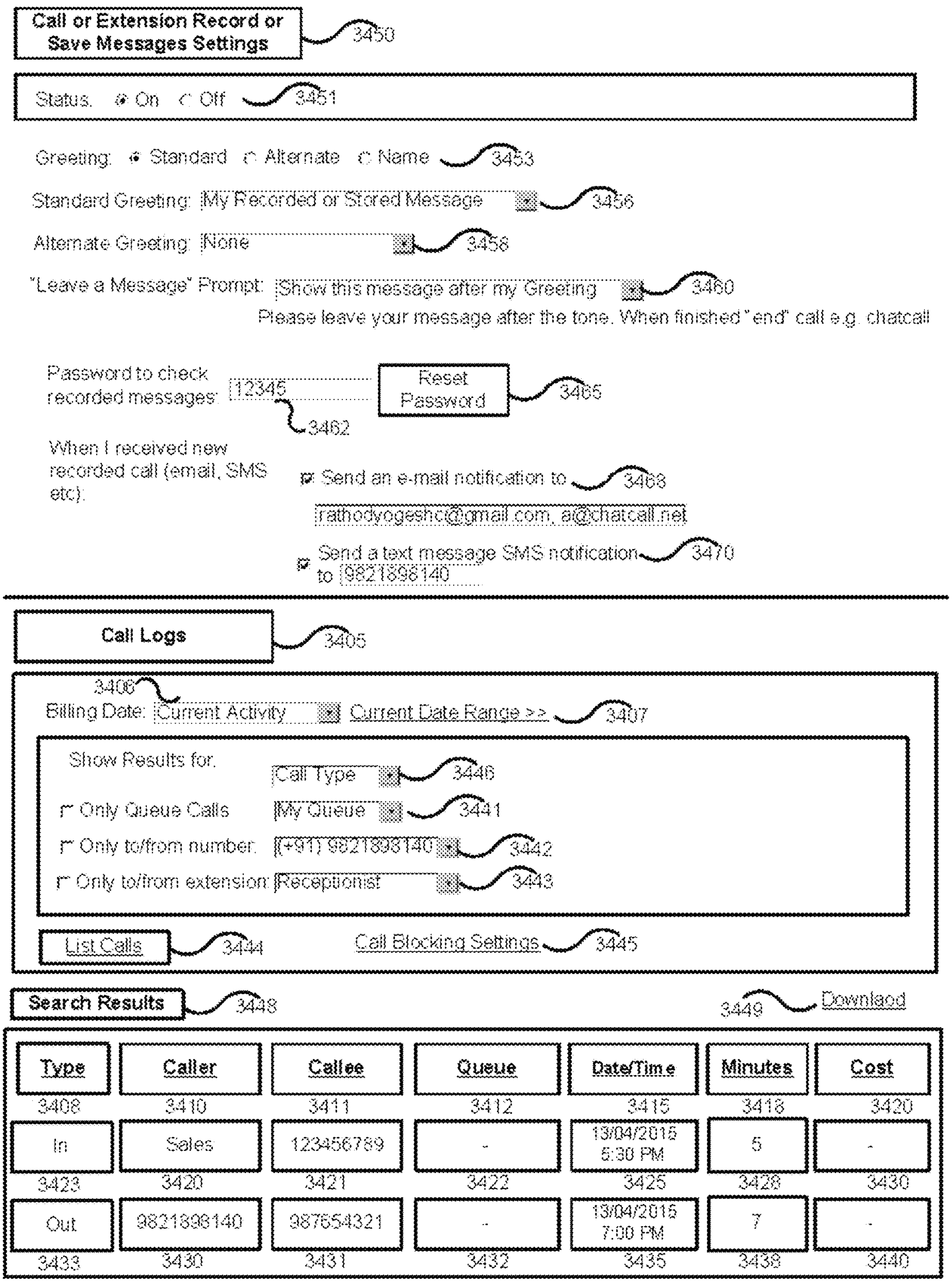

Figure 34

| Number/Ext./Menu etc. (3601) | Manage Call Types and Call Type specific Applications etc. (3602) | Call Type(s) (3603) | Privacy Policies, Rules, Actions, Contacts & Settings (3604) |
|---|---|---|---|
| Number: 123456789 (3605) | Chat (3606) | ChatCall, Multi ChatCall (3607) | Chat Call Rules & Privacy Policies (3608) |
| Number: 9821898140 (3609) | Share Media by Calling (default) (3610) | Sharing Call (3611) | - (3612) |
| Menu: Feedback (3613) | Structured Survey (3614) | Survey/Review Call (3615) | Survey/Review Call Rights & Policies (3616) |
| Number: 987654321 (3617) | Insta Job (3618) | Job Call (3619) | Job Call Privacy Settings & Access Rights (3620) |
| Menu(s): Order, Book, Appointment (3621) | Www.RealtimeEcom.com (3622) | E-commerce Call (3623) | Privacy Policies, Rules, Actions & Settings (3624) |
| Extension: 123 (3625) | Matchmaker (3626) | Matrimonial/Dating Call (3627) | Privacy Policies, Rules, Actions, Contacts & Settings (3628) |
| Outbound Number: 111222333 (3629) | Win Free (3630) | Lottery / Free Gift or samples Call (3631) | Rights, Roles & Policies (3632) |
| Number: 9821898140 (3633) | QnA.com, Realtime Review (3634) | User to User Services Call (3635) | Privacy Settings & Preferences (3636) |
| Number: 9821898140 (3637) | Link Pro (3638) | Link Call (3639) | Privacy Settings & Preferences (3640) |
| Number: 9821898140 (3641) | New Trade, Sap Sidi (3642) | Games (3643) | Privacy Settings & Preferences (3644) |
| Inbound Number: 444555666 (3641) | eBay, Colgate, Titan, HDFC (3642) | Presentation (3643) | Privacy Policies, Rules, Actions, Contacts & Settings (3644) |
| Menu: Support (3645) | CRM (3646) | Inbound (e.g. Support etc.) (3647) | Rights, Roles & Policies (3648) |
| Menu: Marketing (3649) | CRM (3650) | Outbound (e.g. Marketing etc.) (3651) | Rights, Roles & Policies (3652) |
| Outbound Number: 100200300 (3653) | Quick AdNet (3654) | Advertisement (3655) | Privacy Settings & Preferences (3656) |
| Number: 9821898140 (3657) | InstaPayU (3658) | Payment Transfer (3659) | Privacy Settings & Preferences (3660) |
| Menu: Select Service (3661) | On-demand Service (3662) | On-demand Service (3663) | Privacy Policies, Rules, Actions, Contacts & Settings (3664) |

3565 More...

Figure 36

Manage Queues 3710

| | | 3705 Add A Queue |
|---|---|---|
| Name 3712 | Memebrs 3715 | Settings 3716 |
| My Queue 3722 | 1 3725 | Edit 3718 / Delete 3720 |

Add/Edit Queue 3750

Name: [My Queue] 3752

Announcement Message: [Select message] 3753 [none] 3754 Preview: ⏸ ▶ 3755

Hold Music: [Select Hold Music] 3756 [Select Hold Message] 3757 Preview: ⏸ ▶ 3758

Maximum Hold Time: [1] Min(s) then Send to recorder of message for: [Personal Assistant] 3760
3759

Caller ID to Show Members: [Caller's ID] 3762

Members/Agents of this Queue:

[123123123] [Delete] 3765
3761
[456456456] [Delete] 3768
3762
[789789789] [Delete] 3770
3763

[Add another number] 3773

Ring theses Queue members in order for [5] seconds each until the ChatCall is answered 3775

[Cancel] 3778  [Save Changes] 3780

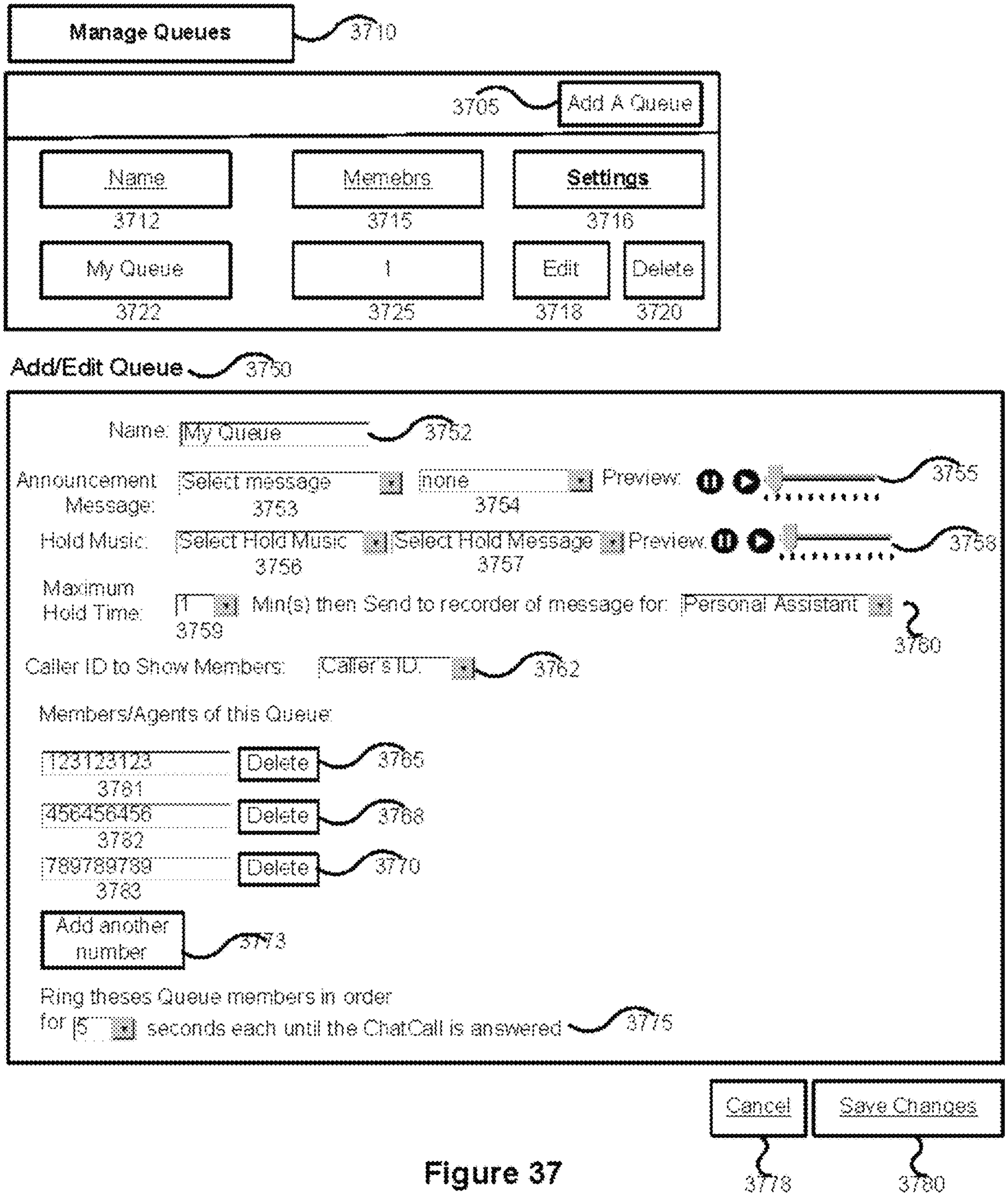

Figure 37

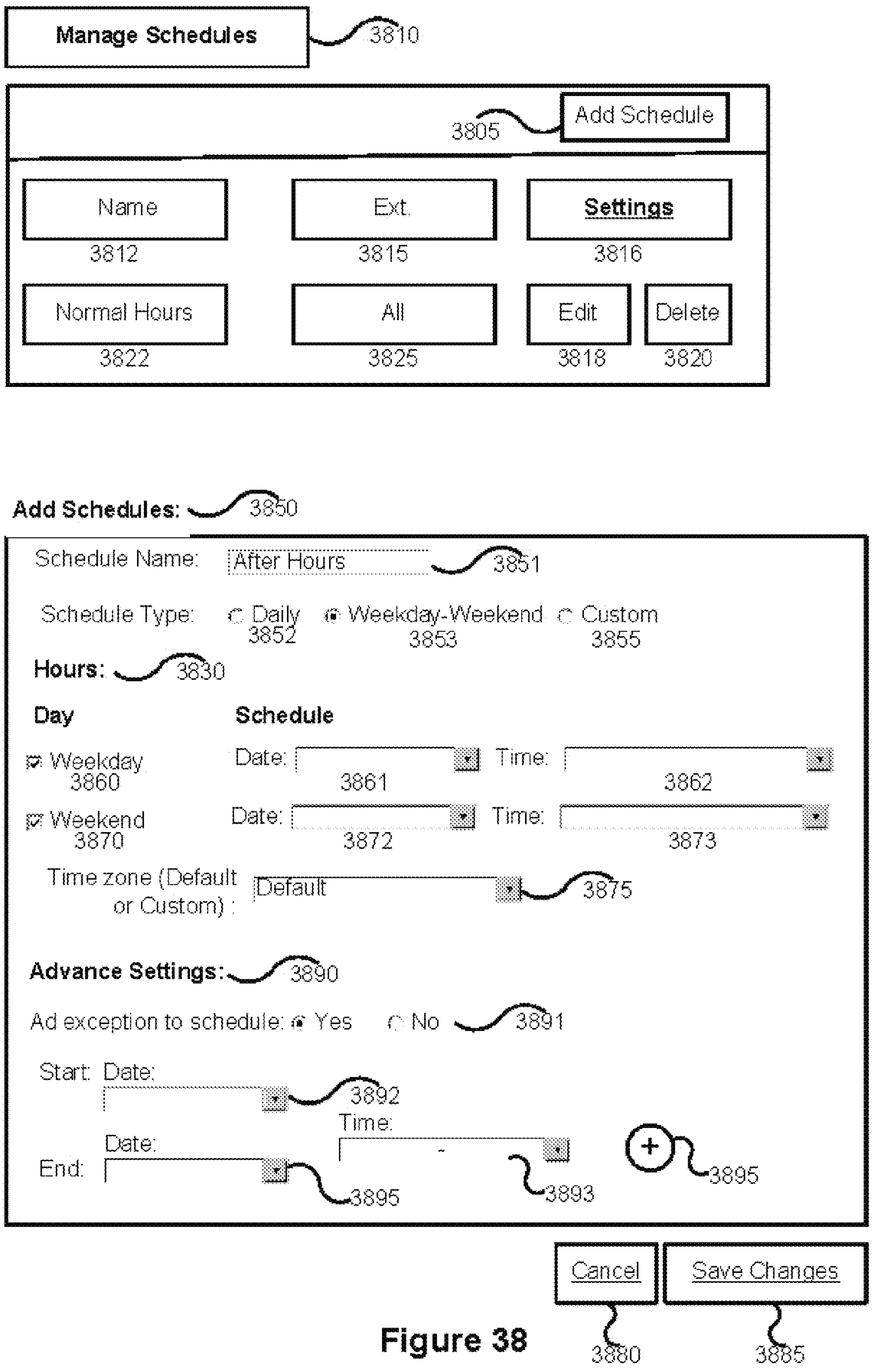

Figure 38

Manage Schedules  —∫ 3810

3805   Add Schedule

| Name | Ext. | Settings |
| --- | --- | --- |
| 3812 | 3815 | 3816 |
| Normal Hours | All | Edit | Delete |
| 3822 | 3825 | 3818 | 3820 |

Add Schedules: —∫ 3850

Schedule Name: After Hours —∫ 3851

Schedule Type: ○ Daily ⦿ Weekday-Weekend ○ Custom
                3852       3853       3855

Hours: —∫ 3830

Day          Schedule

☑ Weekday    Date: [   ]    Time: [   ]
    3860            3861           3862

☑ Weekend    Date: [   ]    Time: [   ]
    3870            3872           3873

Time zone (Default or Custom): [Default] —∫ 3875

Advance Settings: —∫ 3890

Ad exception to schedule: ⦿ Yes ○ No —∫ 3891

Start: Date: [   ] —∫ 3892
             Time: [   ] —∫ 3893
End: Date: [   ] —∫ 3895
           ⊕ —∫ 3895

Cancel    Save Changes

Call Center/Department: <Department>
4301
Role: <Role>
4302

4308 — Dashboard  Reports  Settings  Help
4206 — Supervisor Name: PQR
4204 — IM Presence: Online  Logged In Logout
4209

Agents Panel/Monitoring/Team/ Call Console (view & manage logged-in supervisor's current calls) — 4305

| Name | Call State | Call Time | ACD State | ACD Time | Caller ID |
|---|---|---|---|---|---|
| 4311 | 4312 | 4313 | 4314 | 4315 | 4325 |
| User 1 | Call / Busy | 00:30 | Available | 12:30 | 0004 |
| 4303 | 4317 | 4318 | 4319 | 4320 | 4337 |
| User 5 | Available | - | Unavailable | 11:40 | - |
| 4307 | 4322 | 4323 | 4324 | 4325 | 4328 |
| User 7 | Available | - | Signed-out | 10:20 | - |
| 4330 | 4331 | 4332 | 4333 | 4334 | 4335 |

4336 — Silent Monitor    4337 — Force Agent AC State

Queued Calls Panel / Call Centers — 4340

| Call Center | Number | VM | Status | Calls inQueue |
|---|---|---|---|---|
| 4341 | 4343 | 4344 | 4345 | 4346 |
| Premium 1 | 1234567890 | | Night Service | 5/10 |
| 4347 | 4348 | 4349 | 4350 | 4351 |

4342 [+]

| Position | Call To | Call From | Priority | Wait in Queue |
|---|---|---|---|---|
| 4352 | 4353 | 4354 | 4355 | 4356 |
| 1 | Sales | User 1 | 1 | 00:15 |
| 4357 | 4358 | 4359 | 4360 | 4361 |
| 2 | Support | User 5 | 1 | 00:05 |
| 4362 | 4363 | 4364 | 4365 | 4366 |

4363

ACD / Control Panel — 4270

| Pick Up / Answer/ / Reject Agent Call | Monitor / Silent Monitor | Barge In | Conference |
|---|---|---|---|
| 4371 | 4373 | 4374 | 4375 |
| Change ACD State | Transfer | Promote | Retrive |
| 4376 | 4378 | 4379 | 4380 |
| Reorder | Park | Record / Save | Listen / Listen & Whisper |
| 4381 | 4383 | 4384 | 4385 |

Promote Call in Queue
4386
Reorder (Position Call in Queue)
4388
Retrieve Call from Queue
4369
Queue Transfer
4390

Contacts Panel — 4391

Contact Directory  Search  Group  Common  Personal  Supervisors  Queues  Agents  Directories  Speed Dial  LDAP

| Display Name | Phone | Extension | Mobile | Department |
|---|---|---|---|---|
| 4266 | 4267 | 4268 | 4269 | 4270 |
| User One | 5302123456 | 5001 | - | - |
| 4271 | 4272 | 4273 | 4274 | 4275 |
| User Two | 1302654321 | - | - | - |

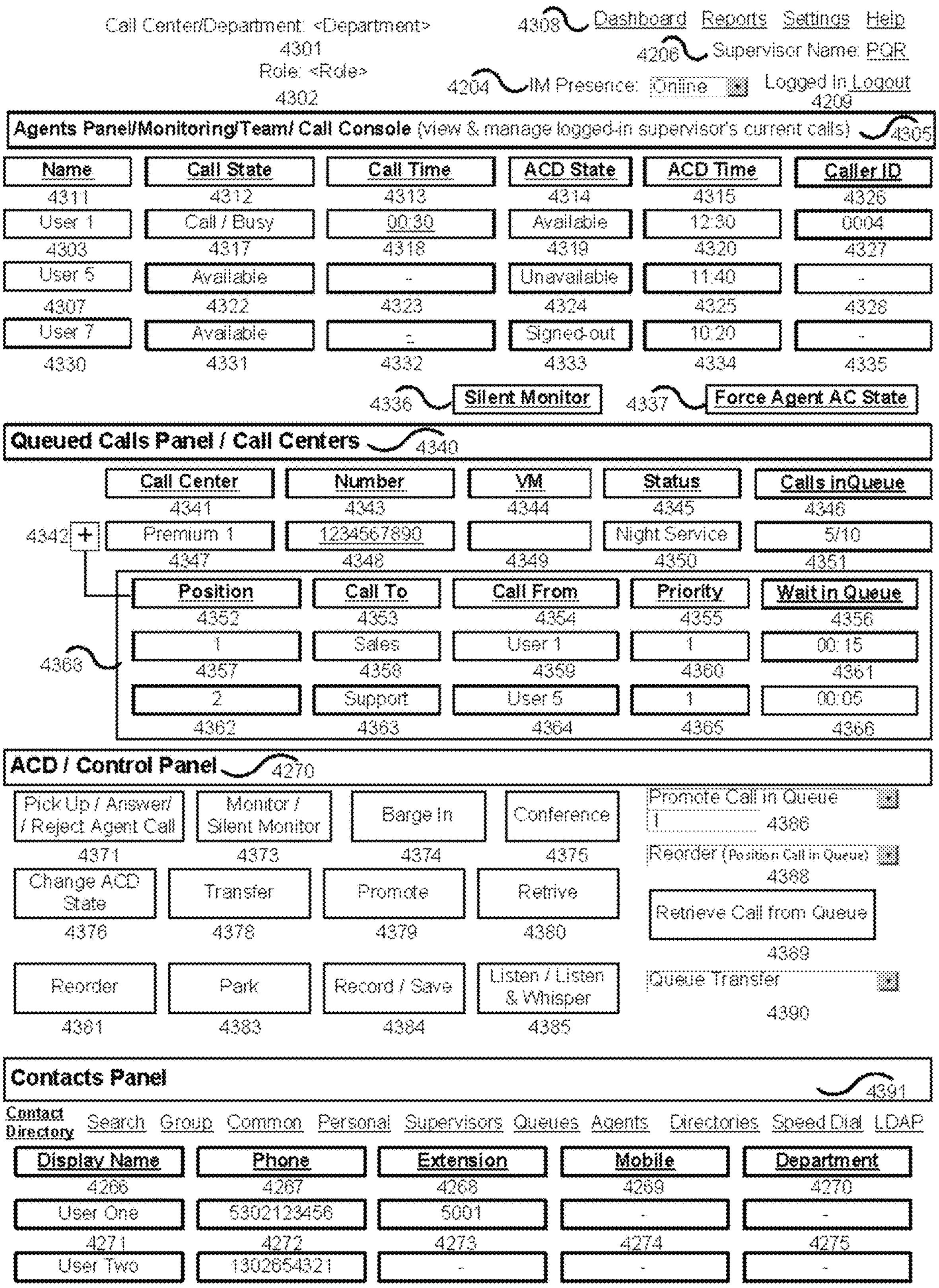

Figure 43

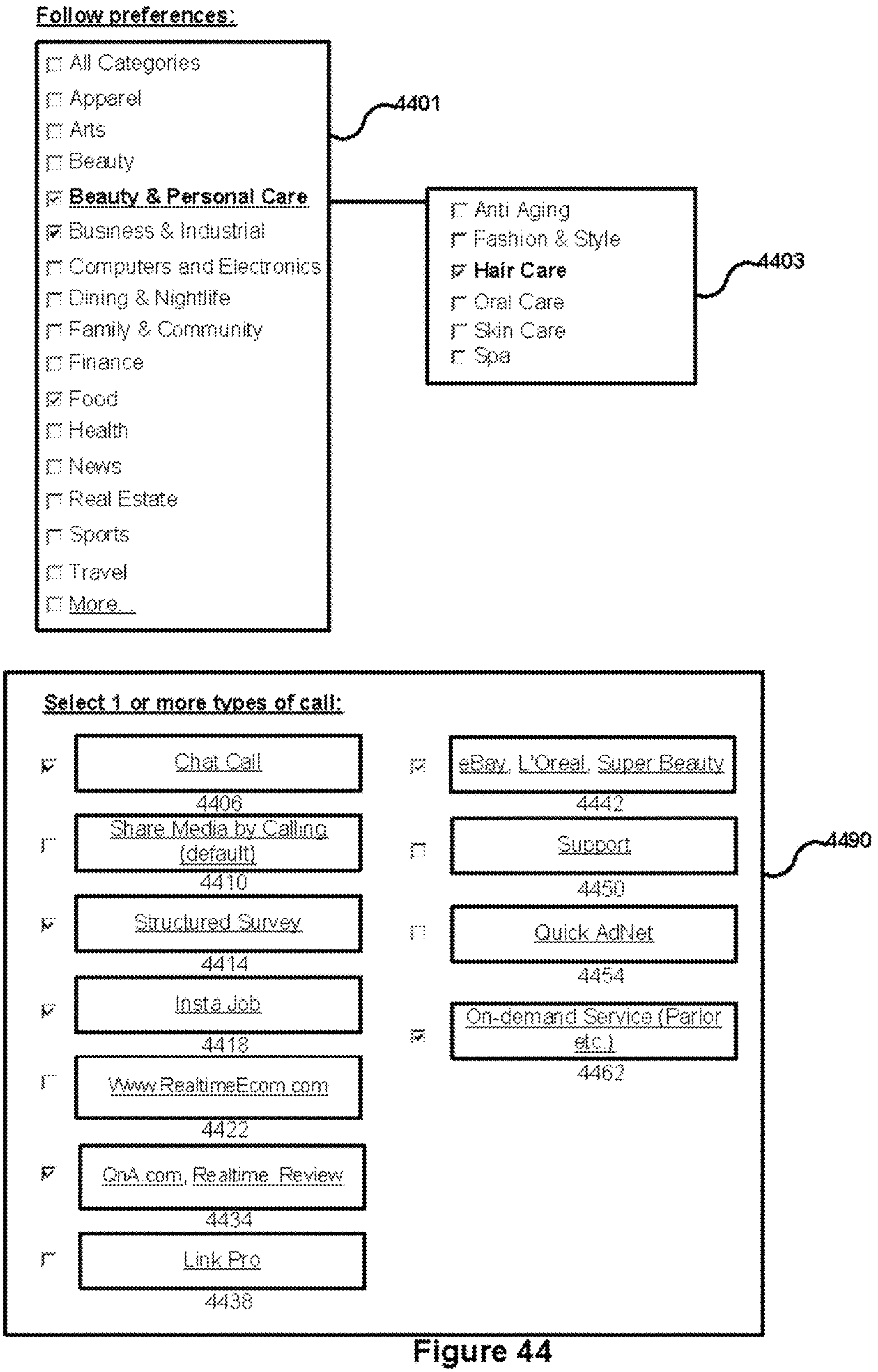

Figure 44

Follow preferences:

```
☐ All Categories
☐ Apparel
☐ Arts
☐ Beauty
☑ Beauty & Personal Care
☑ Business & Industrial
☐ Computers and Electronics
☐ Dining & Nightlife
☐ Family & Community
☐ Finance
☑ Food
☐ Health
☐ News
☐ Real Estate
☐ Sports
☐ Travel
☐ More...
```
— 4401

```
☐ Anti Aging
☐ Fashion & Style
☑ Hair Care
☐ Oral Care
☐ Skin Care
☐ Spa
```
— 4403

Select 1 or more types of call:

| | | | |
|---|---|---|---|
| ☑ | Chat Call<br>4406 | ☑ | eBay, L'Oreal, Super Beauty<br>4442 |
| ☐ | Share Media by Calling (default)<br>4410 | ☐ | Support<br>4450 |
| ☑ | Structured Survey<br>4414 | ☐ | Quick AdNet<br>4454 |
| ☑ | Insta Job<br>4418 | ☑ | On-demand Service (Parlor etc.)<br>4462 |
| ☐ | Www.RealtimeEcom.com<br>4422 | | |
| ☑ | QnA.com, Realtime_Review<br>4434 | | |
| ☐ | Link Pro<br>4438 | | |

— 4490

INITIATE CALL TO PRESENT ONE OR MORE TYPES OF APPLICATIONS AND MEDIA UP-TO END OF CALL

This is a continuation of International Application PCT/IB2015/053808, with filing date of 23 May 2015, having title: Calling to user(s) for real-time sharing, participation, e-commerce, workflow, communication & collaboration in the event of acceptance of call by called user(s)

FIELD OF INVENTION

The present invention relates generally to enabling caller or calling party or inviter user(s) to send real-time invitation (s) or call or chat call to one or more callee or called party or invitee user(s) to real-time chat or share with calling party or inviter user(s) and within same session wait for acceptance of invitation(s) or chat call from said called party or invitee user(s) by said calling party or inviter user(s); enabling invitation(s) receiving or callee or called user(s) or invitee user(s) to accept call or sharing call or chat call or invitation(s) or decline or not accept call or sharing call or chat call or invitation(s) in real-time or within particular specific period of time or within same session or ignore chat call or invitation(s) within specified period of time or within same session; and in the event of acceptance of chat call or invitation(s) by callee or called party or invitee user(s), present one or more types of contents or interfaces or applications or chat call interface to caller or calling party or inviter user(s) and/or callee or called party or invitee user(s), wherein enabling callee or called party or invitation(s) accepted user(s) in real-time or within same session to access presented one or more types of contents or interfaces or applications or chat interface and participate in chat session with said calling party or invitation sender user(s) or inviter user(s) in real-time or within same session. In other embodiment calling is conduct based on contacts selections, followers, rules, user actions, events, locations, settings, schedules, preferences, privacy settings and any combination thereof. In other embodiment acceptance of call by called user is conducted based on one or more types of call forward rules, queues, schedules, associate extensions, menu selections, and user actions. In other embodiment presentation of one or more types of contents or interfaces or applications is/are based on rules, schedules, selections, auto matchmaking preferences, user preferences, user data & settings. In other embodiment present one or more types of contents or interfaces or applications to both calling and/or called user(s) or only to calling users or only to called user(s) to real-time communicating, sharing, pull, push & merge data synchronization, messaging, collaborating, participating, advertising, presenting, surveying, conducting one or more types of actions, activities, interactions, events, transactions and workflow with each other in the event of acceptance of call by called user(s).

BACKGROUND OF THE INVENTION

At present user or calling party can make phone call to called party and called party decline or ignore or answer or accept phone call within same session. The called party is a person who (or device that) answers a telephone call and calling party and called party started to talk with each other. Online chat may refer to any kind of communication over the Internet that offers a real-time transmission of text messages from sender to receiver. Chat messages are generally short in order to enable other participants to respond quickly. Thereby, a feeling similar to a spoken conversation is created, which distinguishes chatting from other text-based online communication forms such as Internet forums and email. Online chat may address point-to-point communications as well as multicast communications from one sender to many receivers and voice and video chat, or may be a feature of a web conferencing service.

Currently Skype enables user to make Skype voice or video call and in combination sent instant messages to called user or selected Skype user, but called user does not need to accept call for viewing instant messages or participate in chat during calling session. Present invention started chat call session when called party accept chat within particular period of time or during ringing of mobile particular period of time and end or terminates chat call when calling and/or called party ends or terminates chat call and during or between starting and ending of this chat session calling and called user converse or send or receive or share messages or contents with each other via chat interface. At the time of termination of particular chat call, system hides or closes chat interface from device or application of calling and called party and in one embodiment removing of contents or messages shared during said chat session from device or application or database of or related to calling and/or called party and/or server(s) and/or database(s) of server(s). Chat interface presented to calling and called party & chat session started only when called party accept chat call and chat interface presented to said calling and called party up-to end or termination of chat call by calling party or called party or both.

In voice call or phone call user have to talk with other users in real time and in real time or live chat user connect with other users and started chatting with each other. Present invention provides new type of communication channel, method, system, device, apparatus, platform, application & service enabling caller or calling party or inviter user(s) to send real-time invitation(s) or chat call to one or more callee or called party or invitee user(s) to real-time chat with calling party or inviter user(s) and within same session wait for acceptance of invitation(s) or chat call from said called party or invitee user(s) by said calling party or inviter user(s); enabling invitation(s) receiving or callee or called user(s) or invitee user(s) to accept chat call or invitation(s) or decline or not accept chat call or invitation(s) in real-time or within particular specific period of time or within same session or ignore chat call or invitation(s) within specified period of time or within same session; and in the event of acceptance of chat call or invitation(s) by callee or called party or invitee user(s), present chat call interface to caller or calling party or inviter user(s) and callee or called party or invitee user(s), wherein enabling callee or called party or invitation(s) accepted user(s) in real-time or within same session to access presented chat interface and participate in chat session with said calling party or invitation sender user(s) or inviter user(s) in real-time or within same session. So calling user can immediate connected with other preferred users who accept chat call invitation(s) within particular time or within duration of ringing of chat call and started chatting with each other up-to end of chat call by initiator or both the chat calling and/or chat called party. At present mobile phone enable user to make phone call and called party talk with calling party, whereas in one embodiment present invention enables user to make chat call similar fashion as making of phone call.

Present invention enables one or more types of customized real-time communication, sharing, pull, push & merge data synchronization, messaging, collaboration, participation, advertising, presenting, surveying, conducting one or more types of actions, activities, interactions, events, transactions and workflow within starting and ending call session between or among calling and called users in the event of acceptance of call of calling user(s) by called user(s).

Therefore, it is with respect to these considerations and others that the present invention has been made.

OBJECT OF THE INVENTION

The principal object of the present invention is to enabling caller or calling party or inviter user(s) to send real-time invitation(s) or chat call to one or more callee or called party or invitee user(s) to real-time chat with calling party or inviter user(s) and within same session wait for acceptance of invitation(s) or chat call from said called party or invitee user(s) by said calling party or inviter user(s); enabling invitation(s) receiving or callee or called user(s) or invitee user(s) to accept chat call or invitation(s) or decline or not accept chat call or invitation(s) in real-time or within particular specific period of time or within same session or ignore chat call or invitation(s) within specified period of time or within same session; and in the event of acceptance of chat call or invitation(s) by callee or called party or invitee user(s), present chat call interface to caller or calling party or inviter user(s) and callee or called party or invitee user(s), wherein enabling callee or called party or invitation(s) accepted user(s) in real-time or within same session to access presented chat interface and participate in chat session with said calling party or invitation sender user(s) or inviter user(s) in real-time or within same session.

The main object of the present invention is to enabling calling party to send or share or present one or more types of media including text, video, audio, photo, image, voice, file, documents, application, interface, wizards, widgets, form, web page, link, web site, data, user controls like menus, user actions, functions while chat calling or with chat call or acceptance of chat call or while establishment of or during chat call session to one or more or group(s) of contacts or called users. For example calling user can send, share, publish, upload, synchronize, provide & present one or more types of digital contents for one or more types of purposes, requirements, sales, purchases, activities, actions, events, transactions, workflow & tasks including present or share or send advertisements, deals, make order, book tickets, listen music, accept invitations, appointments, reminder, voting, make enquiry, provide presentation, provide feedbacks or suggestions, ask product or service details, ask for support, notifications, alerts, applications, one or more types of media, news, blogs, questions, search queries while chat calling or with chat call or acceptance of chat call or while establishment of or during chat call session to one or more or group(s) of contacts or called users or followers or following users or auto matched or preference base matched users of network(s), wherein called users accepts or ignore or decline chat calls from one or more calling users and accepted chat call users can view or read said presented preference based real-time advertisements, deals, notifications, alerts, news, blogs, & full or partial shared profile of calling user, access or view or download application(s) or participate with calling user (e.g. game applications), view or re-share one or more types of media & provide ratings, likes, dislikes & comments, real-time or near real-time view or read question(s) and provide answer(s), provide search query specific search result(s), real-time or on demand make payments, real-time fill survey forms, real-time fill questionnaires, user profile, job profile, matrimonial profile, feedback forms, suggestion forms, complaint forms, requirement details & one or more types of forms, access user actions with or without one or more types of shared contents(s) including Like & Dislike buttons, Provide Ratings, Provide Comments, Accept Invitations, Provide status or updates or presence information, Provide response, Provide answers, Register for particular applications or services or web sites options, buttons, combo box, list box, interactive controls, widgets, web page, check boxes, radio buttons, tabs, features, menus, buttons, functions, interfaces, objects and like.

The other object of the present invention is to auto chat calling to one or more contacts and/or users of network(s), wherein in one embodiment said auto chat calling are based on one or more types of activities, actions, interactions, events, transactions, senses, locations, check-in place(s), schedule, behavior, logs, status, updates, presence information, tasks, workflow, past chat calls, past chat call associate data, user profile, user data & metadata, shared contents, user contacts or connections.

The other object of the present invention is to real-time sharing contents with call accepted user(s). User can compose, select, input, capture, record one or more types of contents including one or more photos, videos, audio, emoticons, text messages, location information, contacts and call to one or more selected users or contacts for real-time sharing with them. When called user(s) accepts call(s) then he/she/they is/are presented with said shared contents of said calling user.

The other object of the present invention is to enable enterprise wide and call center wide chat calling functionalities including multi companies, clients, customers, departments, domains, call centers, multi inbound and outbound campaigns, leads projects, cases & projects by utilizing or employing enterprise level chat call features including chat-call verified numbers, extensions, menus, queues, schedules, rule base forwarding chat calls to one or more agents, supervisors, menus, queues and like.

DETAIL DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "receiving" chat call(s), requests, updated status, responses, communications and any types of multimedia contents from a device or component includes receiving the chat call(s), requests, updated status, responses, communications, and any types of multimedia contents indirectly, such as when forwarded by one or more other devices or components. Similarly, "sending" chat call(s), requests, updated status, responses, communications, and any types of multimedia contents to a device or component includes sending the chat call(s), requests, updated status, responses, communications, and any types of multimedia contents indirectly, such as when forwarded by one or more other devices or components.

As used herein, the term "client application" refers to an application that runs on a client computing device. A client application may be written in one or more of a variety of languages, such as 'C', 'C++', 'C#', 'J2ME', Java, ASP.Net, VB.Net and the like. Browsers, email clients, text messaging clients, calendars, and games are examples of client applications. A mobile client application refers to a client application that runs on a mobile device.

As used herein, the term "network application" refers to a computer-based application that communicates, directly or indirectly, with at least one other component across a network. Web sites, email servers, messaging servers, and game servers are examples of network applications.

Briefly stated, the present invention is directed towards a computer-implemented method for enabling real-time calling and in the event of acceptance of call presenting selective interface(s) to calling and/or called user(s) up-to ending of call by calling or called user(s), comprising executing on a processor the steps of: enabling to call one or more user(s) or group(s); while calling present outgoing calling interface with end button, wherein end button enables calling user to end said call; storing calling and called user(s) identities; pushing data to called user(s) application or device including initiate push notification from calling user to called user(s) or forward received data from calling user to called user(s) by server(s) or server database(s), wherein pushing data comprises at least identity information of calling and called user(s) and unique identification data of device; In the event of successful pushing data present incoming call interface to called user(s) application(s) or device(s) for enabling to accept or reject or decline or miss call; In the event of non-reaching of call to at least one called user end or terminate said call and close or hide outgoing call interface of calling user; In the event of declining or rejection or missing of call by all called user or end call by calling or called user end or terminate said call and close or hide outgoing call interface of calling user and incoming call interface of called user(s); In the event of acceptance of call present one or more types of selected, auto matched, set, predefined, preselected, preloaded, preconfigured, customized one or more interface(s) with "end call" feature or button to calling and/or called user(s); In the event of acceptance of call initiating or establishing communication session or connections between or among calling and called user(s); and In the event of ending call by calling or all called user(s) or unexpected termination of connection from calling or all called user(s) close or hide said presented interface(s) of calling and/or called user(s) and/or end said established communication session or connections between or among calling and called user(s) and/or store or remove communication session associate data.

In another embodiment register user including verify mobile or cellular or phone number of application user.

In another embodiment generate unique call number and enable user to request and select one or more said unique call numbers.

In another embodiment synchronize, import, save, bookmark and update contacts from device including phone book contacts, contacts stored in phone memory, and select from directories, categories lists & search results.

In another embodiment enable user to select one or more contacts and/or group(s) of contacts for calling.

In another embodiment enable to select, select during calling, auto match, set, pre-select, pre-configure, customized one or more types of one or more interfaces, applications including chat application, messenger application, sharing application & surveying application, web services, set of controls, objects, web site, web page, database, contents or multimedia including text, image or photo, video, audio, link, file, object for presenting to calling or called user(s) or both calling and called user(s) in the event of acceptance of call by called user(s).

In another embodiment enable to list, post with description including mode of payment including free, paid, sponsored, price, access rights, features & help, verify or certify, upload, export, search, match, select, provide payment details, make payment, import, download, subscribe, install, un-install, un-subscribe said one or more types of interfaces, applications, web services, set of controls, objects, web site, web page, database, contents or multimedia including text, image or photo, video, audio, link, file, object from one or more providers.

In another embodiment enable to pre-set or select one or more type(s) of call including chat call, sharing call, presentation call, survey or review call, job call, dating or matrimonial call, e-commerce call, deals call, lottery call, user to user service(s) call, connection or linking call, games call, inbound call, outbound call, blended call, advertisement call, payment call, on-demand service(s) call, communication call e.g. e-mail call.

In another embodiment auto suggesting, auto matching, auto presenting or auto selecting one or more types of one or more interfaces, applications, web services, set of controls, objects, web site, web page, database, contents or multimedia including text, image or photo, video, audio, link, file, object based on user profile, user data, user location(s) or checked-in place(s), user connections or contacts, activities, actions, status, interactions, presence information, events, transactions.

In another embodiment calling, waiting for acceptance of call, ringing or presenting incoming call interface at called user's device, accepting call by called user, maximum or minimum duration or length of call, presenting one or more types of one or more interfaces, applications, web services, set of controls, objects, web site, web page, database, contents or multimedia including text, image or photo, video, audio, link, file, object is/are based on one or more or sequence of rules, duration including date, time & ranges, schedules or calendar, authorization or access rights & privileges, privacy settings & policies, preferences, call profile, user profile, user data, user location(s) or checked-in place(s), user connections or contacts, activities, actions, senses or user device sensor data, status, interactions, presence information, events, transactions.

In another embodiment enable to auto selection of one or more contacts or groups or one or more types of users, auto calling, auto acceptance or auto rejection, after accepting call auto presenting one or more types of one or more user device sensor data and auto responding, answering, sending, sharing & publishing of one or more types of contents or multi-media including text, image or photo, video, audio, link, file, object, auto communicating, collaborating, participating, conversing & auto conducting of one or more activities, actions, senses, events & transactions, auto ending of call based on one or more or sequence of rules, duration including date, time & ranges, schedules or calendar, authorization or access rights & privileges, privacy settings & policies, preferences, call profile, user device sensor data, user profile, user data, user location(s) or checked-in place(s), user connections or contacts, activities, actions, status, interactions, presence information, events, transactions.

In another embodiment monitor, track, record or save log of call including length of call session, name and identity of calling and called user(s) or group, activities, actions, events, transaction information and publishing, presenting, messaging, sharing & communication data related to said call.

In another embodiment enabling calling user to allow or deny saving said call associate log or data to called user(s) and/or server(s) and/or database(s) of server(s) of network(s).

In another embodiment enabling user to create publishable group, manage group as admin, assign admin rights to one or more members and add or remove one or more contacts as group members, wherein said group is publish to group members and enable group members to exit from group.

In another embodiment enabling user to make call to group of contacts.

In another embodiment enabling user to search, match, select and follow one or more users.

In another embodiment enabling user to make call to followers with or without disclosing identity and/or profile. In another embodiment restrict followers of user to call user.

In another embodiment enabling user to receive call from following users without disclosing user's identity or disclose user's identity and/or profile.

In another embodiment enabling user to listing and make listing item searchable for other users of network comprising list products, services, company, people and one or more types of entities, wherein listing includes associate categories, sub-categories, provide name, details or descriptions, price, offers, address, or availability & one or more types of details with call number and associate one or more types of one or more interfaces, applications, web services, set of controls, objects, web site & web page including buy, book, order, participate to group deal, schedule, appointment options or features, database or contents or multimedia including data, text, image or photo, video, audio, link, file, object with said provided or published call number.

In another embodiment enabling user to call said one or more searched, matched & bookmarked or selected call number(s) from list and in the event of acceptance of call by said called user access presented call number associate one or more types of one or more interfaces, applications, web services, set of controls, objects, web site & web page including buy, book, order, participate to group deal, schedule, appointment options or features, database or contents or multimedia including data, text, image or photo, video, audio, link, file, object.

In another embodiment enabling user to select one or more call numbers and individually call said one or more call numbers.

In another embodiment enabling user to select one or more call numbers and call in group said one or more call numbers.

In another embodiment enabling user to concurrently, sequentially, incrementally conduct and manage multiple outgoing calling including call one or more contacts, groups, followers, bookmarked or selected call numbers, accepting, adding to one or more current calls, hold, transferring, switching, rejecting, ending or miss multiple incoming call from contacts, group members, following users, other users of network.

In another embodiment enabling user to hold, pause or restart one or more current call(s).

In another embodiment enabling user to create, update and manage one or more inbound or incoming campaigns.

In another embodiment enabling admin user to create, update & remove one or more call centers, departments, domains, client or customers, request, select, configure & manage call number(s), associate inbound, outbound, blended campaigns and create, update & remove associate menus, extensions, schedules, queues, forms, scripts, database, phone numbers list, contact lists, and associate agents, supervisors, skills of agents & supervisors, groups, users, admins, assign user access permissions, rights, privileges, privacy settings & policies & preferences and call numbers, menus & extension associate forward rules, manage accounts and integrate 3rd parties applications, web services, databases.

In another embodiment wherein enabling user to associate or select one or more menu items, list of contacts, queues, schedules and extension numbers with one or more inbound or incoming call number(s) to assign or forward call(s) to related or assigned agent(s) or user(s) and/or supervisor(s).

In another embodiment enabling user to create, update and manage one or more outbound or outgoing campaigns and/or associate list(s).

In another embodiment enabling to manually or automatically dial or call one or more lists associate with one or more outbound or outgoing campaigns.

In another embodiment enabling user to associate or select one or more menu items, list of phone numbers, queues, schedules and extension numbers with one or more outbound or outgoing call number(s) to assign or forward call(s) to related or assigned agent(s) or user(s) and/or supervisor(s).

In another embodiment enabling agent(s) or prospective contextual call accepting user(s) to view & manage current calls of all related inbound and/or outbound and/or blended campaigns, supervisors, call numbers, logs, queues, menus, extensions, assigned inbound campaigns related contacts, assigned outbound campaigns related phone numbers, one or more types of contact directories and view supervisor's status and access current call(s) associate actions or select one or more current calls and take one or more related actions including log-in, log-out, start or end session, take break, manage & update ACD status including available, unavailable, wrap-up including select or assign disposition code & release, and presence information, dial, pick up, answer, end, hold, un-hole, pause, restart, record or save, transfer, start, hold, un-hold, drop or end or reject or decline, leave, invite & join conference(s), escalate, make call emergency, call waiting, trace, auto or manual answer, schedule, mute, un-mute, transfer to other agent(s) or supervisor(s), transfer to other queue(s) and view reports & statistics of selected one or more related calls.

In another embodiment enabling user(s) to calling to prospective & contextual call accepting user(s) for particular purpose based on selection of type of requirements or purpose and match making of calling and potential callable users related data and selecting prospective callable users from said search results derived from said matchmaking including calling contextual actual customers or users or clients or viewers or patients or guests or travelers or employees or students and/or sellers for prospective customers or users or clients or viewers or patients or guests or travelers or job seekers or students for particular brand, categories, subcategories, location, company, college, school, movie or entity name & based on requirement specifications, past customer data & profile, calling contextual employers or companies for job seekers based on matching job profile with job requirement postings, calling contextual prospective brides for groom and vice versa based on profile matchmaking of brides & grooms, calling contextual buyers with sellers and vice versa based on search, selections and requirement specifications of buyers and listing details of sellers, calling contextual prospective professionals with calling professional user based on user profiles matchmaking and calling similar types of or like-minded users with calling user based on user profiles matchmaking.

In another embodiment enabling supervisor to view & manage current calls of all related inbound and/or outbound and/or blended campaigns, agents, call numbers, logs, queues, menus, extensions, inbound campaigns related contacts, outbound campaigns related phone numbers, one or more types of contact directories, view agents' status and access agents' calls associate actions or select one or more current calls of one or more selected & related agents and take one or more related actions including pick up, monitor, silently monitor, view reports & statistics, change agent's status, barge in, answer, promote, retrieve, reorder, end, record, listen, listen & whisper, start, hold, un-hold, drop or end or reject or decline, leave, invite & join conference(s), transfer to other agent, transfer to other queue(s) selected one or more calls of selected & related one or more agent(s).

In another embodiment enabling calling user to take one or more actions from outgoing call interface including compose contents including draft message(s), select or capture photo, select or record video and/or audio, select attachments, files, objects, applications, links, contacts, locations & emoticons, add call to one or more current selected calls, allow to save to called user(s), call other one or more selected contacts and/or one or more types of group(s), dial extension, select call number associate menu item(s) or option(s), end call and change action other than calling while calling but before acceptance of call including send chat message or instant message, send SMS, make phone call or VOIP call, send email, view profile, status, presence information & logs, compose and sharing call.

In another embodiment enabling called user to accept, reject, miss, remind incoming call and decline call with send status message to calling user.

In another embodiment enabling user to apply settings including remove, save & allow called user(s) to save call(s) session related data, enabling real-time text typing, In another embodiment enabling calling and/or called user to merge one or more current calls or separate one or more current calls or currently merged calls, communicate with one or more selective participants or members of current group call, enable or allow anyone to call or allow to call only people who are in user's contacts, allow to view user's current location, checked-in place, profile, selective profile or data, presence information, status and last seen status, enable to apply do not disturb policies, enable to bookmark, favorite, rank, categories, sort, rank, rename, mark as spam, report, allow to save or re-share, add to contact, ad to existing contact, add to group, block one or more contacts, view permitted profile, status, current location or checked-in place, call logs and communication logs related to one or more contacts, enable to backup, restore, archive, remove, synchronize data related to one or more calls of one or more contacts, select & set one or more types of ringtones, vibration type, wallpapers, font size & type to one or more selected contacts, enable to set mute or un-mute or schedule to call for one or more selected contacts.

In another embodiment enabling calling and/or called user to select ringtone, vibration pattern, notification settings, do not disturb settings, respond with text, reminder settings, sharing of identity, photo, status, location, presence information & selective profile data, photo or image or text or video or emoticon, wallpaper for all or one or more or group of contact(s) for incoming and/or outgoing all or particular call(s).

In another embodiment enabling user(s) to real-time call or auto call to one or more selected, inputted, auto matched or auto determined or suggested purpose, task, workflow, requirement, entities, feature, preference, rules, schedule, privacy settings, activities, actions, events, transactions, status, location & any combination thereof specific selected, searched, matched, auto matched users, comprising executing on a processor the steps of: enabling user to select, provide, instruct to provide, set, update or auto determine for user one or more type of option(s) for calling to matched users; storing user data; matching said calling user data including data related to said selections with data of other users of network for determining matched prospective callable users; enabling to call selected or auto call said one or more matched contextual prospective callable user(s) or group(s); while calling present outgoing calling interface with end button, wherein end button enables calling user to end said call; storing calling and called user(s) identities; pushing data to called user(s) application or device including initiate push notification from calling user to called user(s) or forward received data from calling user to called user(s) by server(s) or server database(s), wherein pushing data comprises at least identity information of calling and called user(s) and unique identification data of device; In the event of successful pushing data present incoming call interface to called user(s) application(s) or device(s) for enabling to accept or reject or decline or miss call; In the event of non-reaching of call end or terminate said call and close or hide outgoing call interface of calling user; In the event of declining or rejection or missing of call or end call by calling user end or terminate said call and close or hide outgoing call interface of calling user and incoming call interface of called user(s); In the event of acceptance of call present one or more types of selected, auto matched or based on settings auto selected, set, predefined, preselected, preconfigured, customized one or more types of one or more interface(s) with "end call" feature or button to calling and/or called user(s); In the event of acceptance of call initiating or establishing communication session or connections between or among calling and called user(s); and In the event of ending of call by calling or called user or unexpected termination of connection from calling or called user close or hide said presented interface(s) of calling and/or called user(s) and/or end said established communication session or connections between or among calling and called user(s) and/or store or remove communication session associate data.

In another embodiment enabling user to select, provide, set, update or auto determine for user one or more type of option(s) or selections from list including features, purpose, needs, tasks, workflow, emergency, requirements specification.

In another embodiment auto selection of one or more type of option(s) or selections from list based on one or more preferences, provided or inputted or selected categories, taxonomies & keywords, rules, schedule, privacy settings, user's activities, actions, events, senses, transactions, status, location or check-in place(s), interactions with other users, entities, devices & applications & any combination thereof.

In another embodiment in the event of acceptance of call present one or more types of selected, auto matched, set, predefined, preselected, preconfigured, customized one or more interface(s) including present said one or more type of option(s) or selections from list specific interface(s), application(s), data, set of control(s), object(s), web site, web page, feature(s).

In another embodiment said option comprises job, matrimonial, sellers, buyers & one or more types of match making including calling to bookmarked or selected prospective buyers or sellers or calling to prospective buyers or sellers from list of matched prospective buyers or sellers, calling to actual customers or sellers by prospective customers for conversation, calling actual or prospective customers by sellers for marketing, advertising & selling, calling to selected (from matched list) or auto matched brides or grooms for profile sharing or conversation, calling matched professional for knowledge sharing and creating or updating use's professional or social network, calling matched consumer of user provided or shared contents, calling matched domain specific experts for user's said domain specific consulting need, answer(s) for queries, conversation.

In another embodiment enable user to provide or access or auto select user related contextual data for said one or more type of selection of option(s) or auto selection or selections from list including information, details, requirement specifications, one or more types of user data including user profile, job profile, matrimonial profile, seller profile, buyer profile, product or service profile.

In another embodiment creating subject, domain, expertise, keyword, category, location, activities, actions, tasks, workflow, events, transactions, location specific queues and dynamically add, update or remove contextual users including users, contacts of user, agents, sellers, buyers, experts, customers, subscribers, student, brides, grooms, employees, employers, professionals for said one or more queues and/or enable to user(s) to add them to queue in exchange of set number of points for handling incoming and/or outgoing calls based on user data, user profile, user contacts, activities, actions, senses, events, transactions, status & location or check-in place, scheduling, availability, number of likes, number of dislikes, number of reports as spam received, add to set number of maximum queues settings, date & time, preferences, privacy settings, set number of maximum inbound or outbound calls at a time accept by user or agent setting, set number of maximum current calls handle by user or agent setting, set number of daily maximum or total duration of calls session setting and any combination thereof.

In another embodiment forwarding or assigning or transferring calls to one or more available queue or available queue where user(s) or agent(s) is/are available for handling or accepting call(s).

In another embodiment deduct points for attending call(s) based on per call, duration of call, type of call, type(s) of user or calling user(s).

In another embodiment enable user to apply do not deduct points settings for receiving calls including any calls, up-to set number of calls, up-to set number of calls for each or particular user(s), In another embodiment present contextual affiliate products and/or services from one or more sources and present comparative affiliate products and/or services from one or more sources based on price In another embodiment enable calling and/or called user(s) to provide domain, subject specific details before calling and/or receiving one or more types of call including calling to one or more brand or category or keyword specific actual customer, accepting call from one or more brand or category or keyword specific prospective customers, give like, dislike, report, bookmark, follow or un-follow, share, rate or rank, give or receive points, use or access past shared contents, In another embodiment enable to calling to selected or bookmarked users from one or more matched lists or accept call from one or more selected users from one or more matched lists, wherein matched lists including list of matched brides or grooms, matched job seekers or employers or companies, matched prospective buyers or sellers based on user selections, preferences, privacy settings, schedules, queuing, user's needs, requirement specifications, activities, actions, events, transactions, senses, status, location(s) or check-in place(s).

In another embodiment enabling real-time calling and in the event of acceptance of call presenting selective interface(s) to calling and/or called user(s) and presenting shared contents of caller to called user(s), comprising executing on a processor the steps of: enabling user to draft, edit, update, save, save for later use, input, search, match, filter, import, process, format, apply filter(s), auto capture or record or select, capture, record, select one or more types of contents or media or multi-media including text, data, captured or selected photo, recorded or selected video and/or audio, emoticons, files, objects, location(s), contact(s), notes, user data and any combination thereof, enabling user to select or auto select one or more contacts and/or group(s) and/or destination(s); enabling user to call or auto call to said selected one or more contacts and/or group(s) and/or destination(s); while calling present outgoing calling interface with end button, wherein end button enables calling user to end said call; storing calling and called user(s) identities; pushing data to called user(s) device or application including initiate push notification from calling user to called user(s) or forward received data from calling user to called user(s) by server or server(s) database(s), wherein pushing data comprises at least identity information of calling and called user(s) and unique identification data of device(s); In the event of successful pushing data present incoming call interface to called user(s) application(s) or device(s) for enabling to accept or reject or decline or miss call; In the event of non-reaching of call end or terminate said call and close or hide outgoing call interface of calling user(s); In the event of declining or rejection of call or miss or end call by calling user end or terminate said call and close or hide outgoing call interface of calling user and incoming call interface of called user(s); In the event of acceptance of call present said shared contents of/by said calling user to called user(s) and/or notify calling user about acceptance of call by one or more called user(s).

In another embodiment in the event of acceptance of call present said shared contents of/by said calling user to called user(s) including present contents in slideshow mode or auto switching content item(s) within particular or set duration or period of time or enable user to manually select, swipe, tap, search, browse, navigate including first, last, previous, next, jump to particular selected or particular number of content item, view multi or group of content item(s) and view said shared contents and/or save or re-share, access, process & reply or converse on/for said shared contents.

In another embodiment in the event of acceptance of call present said shared contents of/by said calling user to called user(s) with "end call" button, wherein said "end call" button or option enables call acceptance user to end said call or end said active call session or in the event of ending call by calling or called user or unexpected termination of connection from calling or called user close or hide said presented interface(s) of calling and/or called user(s) and/or end said established communication session or connections between or among calling and called user(s) and/or remove communication session associate data.

In another embodiment enable user to apply settings & preferences for auto selection of one or more contacts and/or group(s) and/or destination(s) for calling;

In another embodiment enabling calling user to select "Do not Reply" option while/with calling, wherein after said selection of said option restrict called user(s) to do not reply to calling user for/during said call or active call session.

In another embodiment enabling calling user to select "Allow to Reply" option while/with calling, wherein after said selection of said option enable called user(s) to reply to calling user for/during said call or active call session or in the event of acceptance of call initiating or establishing communication session or connections between or among calling and called user(s).

In another embodiment enabling calling user to select "Allow to Save for Recipient(s)" option while/with calling, wherein after said selection of said option enables called user to save conversed or shared contents related to said call or active call session.

In another embodiment enabling calling user to apply and set duration (e.g. set number of seconds) for shared contents while acceptance of call by called user, where said setting enables call acceptance user to view said shared contents for/up-to said set duration period only and in the event of expiration of said set duration remove said shared contents from called user(s) and/or calling user(s) and/or server device(s).

In another embodiment a computer-implemented method for establishing or joining conference call, comprising executing on a processor the steps of: generate and store unique identity associate with call number or mobile number as conference bridge number; enable to generate and store one or more conference identities and/or personal identification(s) or PIN number(s); enable to input, select, update, store & provide date & time and details of conference with said conference identity; enable to send said generated bridge number, one or more conference identities and/or PIN number(s) and/or conference date & time and details to one or more selected contacts or users or connections; present said bridge number, one or more conference identities and/or PIN number(s) and/or conference date & time and details to said to one or more selected contacts or users or connections; enable said receiving user(s) to select, enter, input or dial said one or more bridge number, conference identity and/or PIN number for initiating or establishing conference call or participating in established or initiated conference call; present one or more types of selected, pre-selected, auto matched, set, predefined, preselected, preconfigured, customized one or more interface(s) with "end call" and/or "leave" feature or button to calling and/or called user(s); In the event of starting or participating in established or initiated conference call initiating or establishing communication session or connections between or among conference call participants or members; and In the event of ending call by admin user close or hide said presented interface(s) of conference call participants or members and/or end said established communication session or connections between or among conference call participants or members and/or store or remove communication session associate data.

In another embodiment present names of each updated or joined participants of conference call to each other participants of conference call.

In another embodiment present successfully entered PIN number user to "end conference call", "hold" & "un-hold", "add users or contacts", "pause" & "start" button(s).

In another embodiment a computer-implemented method for establishing conference call, comprising executing on a processor the steps of: enable user to create or update conference call including providing conference call name or identity, date & time & details of conference call and add selected contacts as conference participants or members; present said created conference call details including conference call name or identity and/or date & time & details of conference call and names & identity of participant members to said conference participants or members device or application or interface; enable each conference participants or members to automatically join with said conference call at associate scheduled date & time or to manually join with said conference call via selecting said conference call name; present one or more types of selected, auto matched, set, predefined, preselected, preconfigured, customized one or more interface(s) with "end call" and/or "leave" feature or button to calling and/or called user(s); In the event of starting or participating in established or initiated conference call initiating or establishing communication session or connections between or among conference call participants or members; and In the event of ending call by admin user close or hide said presented interface(s) of conference call participants or members and/or end said established communication session or connections between or among conference call participants or members and/or store or remove communication session associate data.

In another embodiment present names of each updated or joined participants of conference call to each other participants of conference call.

In another embodiment present successfully entered PIN number user to "end conference call", "hold" & "un-hold", "add users or contacts", "pause" & "start" button(s).

In another embodiment enabling real-time calling and in the event of acceptance of call presenting selective interface(s) to calling and/or called user(s) up-to ending of call by calling or called user(s), comprising executing on a processor the steps of: enabling to call one or more user(s) or group(s); while calling present outgoing calling interface with end button, wherein end button enables calling user to end said call; storing calling and called user(s) identities; send SMS to called user(s), wherein SMS includes calling user id, device id, application id, one or more called users id(s), groups id(s), date & time and related data or metadata; In the event of successful receiving of SMS parse, process and analyze said received SMS to retrieve, format, store & access said received SMS associate data at receiving user's device or application; present incoming call interface to called user(s) application(s) or device(s) for enabling to accept or reject or decline or miss call; In the event of non-reaching of SMS end or terminate said call and close or hide outgoing call interface of calling user; In the event of declining or rejection of call by called user(s) auto send SMS to calling user and all other call participants, wherein said SMS includes call status including "accept" or "reject" and call accepted user's or call rejected user's identity; In the event of declining or rejection or missing of call by all called user or end call by calling user end or terminate said call and close or hide outgoing call interface of calling user and incoming call interface of called user(s); In the event of acceptance of call present one or more types of selected, auto matched, set, predefined, preselected, preconfigured, customized one or more interface(s) with "end call" feature or button to calling and/or called user(s); In the event of acceptance of call initiating or establishing communication session or connections between or among calling and called user(s) and enable to exchange SMS between or among call participants; and In the event of ending call by calling or called user auto send SMS to all call participant, wherein said SMS includes call status including "end call" and call ending user's identity; In the event of ending call by calling or all called user close or hide said presented interface(s) of calling and/or called user(s) and/or end said established communication session or connections between or among calling and called user(s) and/or store or remove communication session associate data.

In another embodiment enable user to select data network or cellular network.

In another embodiment auto detecting and auto selecting data network or cellular network based on determination of availability or signal strength.

In another embodiment enabling to convert SMS message to digital message or vice versa based on selection or auto selection or switching of data network or cellular network.

In another embodiment a computer-implemented method and telecommunication standard for enabling real-time calling and in the event of acceptance of call presenting selective interface(s) to calling and/or called user(s) up-to ending of call by calling or called user(s), comprising executing on a processor the steps of: enable to initiation of call; when making a call, searches for the Receiver's Base Station by Caller's Base Station which transfers the request to the appropriate Receiver's device (Mobile); when the receiver accepts the call, enable the computers in the Base Station's opens up a communication channel; present one or more type(s) of interface(s); converting text into equivalent binary digital signal and transmitted; sent Digital Signal across to the Receiver's Base Station using Microwaves; and sends the digital signal to the appropriate Receiver's device including Mobile by Receiver's Base Station through microwaves.

In another embodiment enable to initiation of call compresses user can select phone number from phone book or phone contacts and by using current or latest telecommunication standard or mobile or cellular network standard for dialing standard phone call dialer, wherein said dialer can also use for calling standard phone call or mobile call.

In another embodiment monitoring, tracking and storing numbers of SMS and/or MMS with details.

In another embodiment present one or more type(s) of interface(s), application(s), web service interface(s), one or more types of control(s), object(s), web site, web page & data or one or more types of multimedia at both calling or called or either calling or called user's device.

In another embodiment present one or more type(s) of selected, auto matched, set, predefined, preselected, preloaded, preconfigured, customized interface(s), application(s), web service interface(s), one or more types of control(s), object(s), web site, web page & data or one or more types of multimedia based on settings, selections & preferences including chat application, messaging application and/or SMS application and/or MMS application for sharing photo, video & voice and/or enable telephony voice and any combination thereof.

In another embodiment a computer-implemented method and telecommunication standard for enabling real-time voice conversation and/or text conversation choice option and/or enable to auto switch to voice or text conversation up-to ending of call by calling or called user(s), comprising executing on a processor the steps of: enable to initiation of call; when making a call, searches for the Receiver's Base Station by Caller's Base Station which transfers the request to the appropriate Receiver's device (Mobile); when the receiver accepts the call, enable the computers in the Base Station's opens up a communication channel; manually or auto determining user's intention to voice conversation or text conversation; In the event of selection or auto detection of user's intention to voice conversation: when the caller or called user(s) speaks, the voice is converted to analogue signal; converting the Analogue signal to Digital Signal by device; sent the Digital Signal across to the Receiver's Base Station using Microwaves; sending the digital signal to the appropriate Receiver's device (Mobile) by the Receiver's Base Station through microwaves; converting the Digital signal to the Analogue Signal by/at the Receiver's Device, so the Receiver can hears the voice; In the event of selection or auto detection of user's intention to text conversation: present one or more type(s) of interface(s); converting text into equivalent binary digital signal and transmitted; sent Digital Signal across to the Receiver's Base Station using Microwaves; and sending the digital signal to the appropriate Receiver's device including Mobile by the Receiver's Base Station through microwaves.

In another embodiment auto detection of user's intention to voice conversation based on identify user's voice based on voice detection or voice comparison method or identify user's device near to user's ear by using one or more types of sensors including proximity sensor.

In another embodiment auto detection of user's intention to text conversation based on identify user's device far to user's ear or near to user's body or not at user's ear by using one or more types of sensors including proximity sensor. In another embodiment monitoring, tracking and storing numbers of phone calls with details In another embodiment enabling calling party to send or share or present one or more types of media including text, video, audio, photo, image, voice, application, interface, form, web page, link, web site, user controls like menus, user actions, functions while chat calling or with chat call or acceptance of chat call or while establishment of or during chat call session to one or more or group(s) of contacts or called users. For example calling user can send, share, publish, upload, synchronize, provide & present one or more types of digital contents for one or more types of purposes, activities, actions, events, transactions, workflow & tasks including present or share or send advertisements, deals, notifications, alerts, applications, one or more types of media, news, blogs, questions, search queries with chat call to one or more or group(s) of contacts or called users or followers or following users or auto matched or preference base matched users of network(s), wherein called users accepts or ignore or decline chat calls from one or more calling users and accepted chat call users can view or read said presented preference based real-time advertisements, deals, notifications, alerts, news, blogs, & full or partial shared profile of calling user, access or view or download application(s) or participate with calling user (e.g. game applications), view or re-share one or more types of media & provide ratings, likes, dislikes & comments, real-time or near real-time view or read question(s) and provide answer(s), provide search query specific search result(s), real-time or on demand make payments, real-time fill survey forms, real-time fill questionnaires, user profile, job profile, matrimonial profile, feedback forms, suggestion forms, complaint forms, requirement details & one or more types of forms, access user actions with or without one or more types of shared contents(s) including Like & Dislike buttons, Provide Ratings, Provide Comments, Accept Invitations, Provide status or updates or presence information, Provide response, Provide answers, Register for particular applications or services or web sites options, buttons, combo box, list box, interactive controls, widgets, web page, check boxes, radio buttons, tabs, features, menus, buttons, functions, interfaces, objects and like.

In another embodiment in the event of acceptance of invitation or chat call by one or more called parties, opening of chat interface and starting of chat session at device or application of calling and called party and enabling them to communicate, send or receive messages, voice messages & shared contents with each other(s) or establish communication among them.

In another embodiment chat calling or inviting, waiting for acceptance of chat call by called party, accepting or declining of chat call or invitation(s) by called party, chatting with invitations accepted called party or users & termination or ending of chat call by calling party or called party take place in real-time or within duration of chat call initiating, acceptance, chat conversations & ending of chat call or chat call session.

In another embodiment enabling calling party or invitation(s) sender user(s) or called party or inviter user(s) to ending of chat call before acceptance of invitation by invitee user(s).

In another embodiment enabling invitation(s) sender user(s) or inviter user(s) or calling party and/or invitation(s) receiving user(s) or invitee user(s) or called party to ending of chat call after acceptance of invitation and after starting or initiating of chat session or communications or during chat session.

In another embodiment ending of chat call when calling and/or called party declines or ends chat call or decline chat call or ignore chat call within period of time of ringing of phone or smart device.

In another embodiment ending of chat call including ending of chat session or closing of chat interface or ending of established communication between/among chat caller or calling party and chat callee or called party.

In another embodiment real-time invitation(s) lasts for specified period of time. In another embodiment specified period of time including particular time of ringing or vibrating of phone or notifying to phone.

In another embodiment notifying user(s) or maintaining chat call logs about recent chat calls, past chat calls, missed chat calls, duration of chat calls.

In another embodiment auto chat calling to one or more contacts and/or users of network(s), wherein in one embodiment said auto chat calling are based on one or more types of activities, actions, interactions, events, transactions, senses, locations, check-in place(s), behavior, logs, status, updates, presence information, tasks, workflow, past chat calls, past chat call associate data, user profile, user data & metadata, shared contents, user contacts or connections.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

In one embodiment FIG. 7 illustrates exemplary presented graphical user interface (GUI) for enabling user to select, input, apply, set & update privacy settings and preferences related to one or more call types;

In one embodiment FIG. 20-27 illustrates exemplary presented graphical user interface (GUI) for enabling user to real-time call based sharing of contents with one or more users. In one embodiment enabling sharing call, where user draft, prepared, update, add, attach one or more types of media including text, photo, video, audio, emoticons, files, objects & like and select one or more contacts or group(s) of contacts and can call them and in the event of acceptance of call by said selected one or more users share with them with option of "do not reply" or enable to reply and/or save share contents or view said shared contents for set period of time or duration;

In one embodiment FIG. 28-43 illustrates exemplary presented graphical user interface (GUI) for enabling one or more type of calling management for enterprise users including one or more types of inbound or outbound campaigns of one or more clients or departments, call numbers, extensions, menus, queues, schedules, accounts, rules based forwarding, manage agents, supervisors, groups, administrators, users;

In one embodiment FIG. 44 illustrates exemplary presented graphical user interface (GUI) for enabling user to search, match, select one or more followers and/or select one or more categories, taxonomies & keywords to follow said categories, taxonomies & keywords related users;

In one embodiment

In one embodiment

Figure 1:
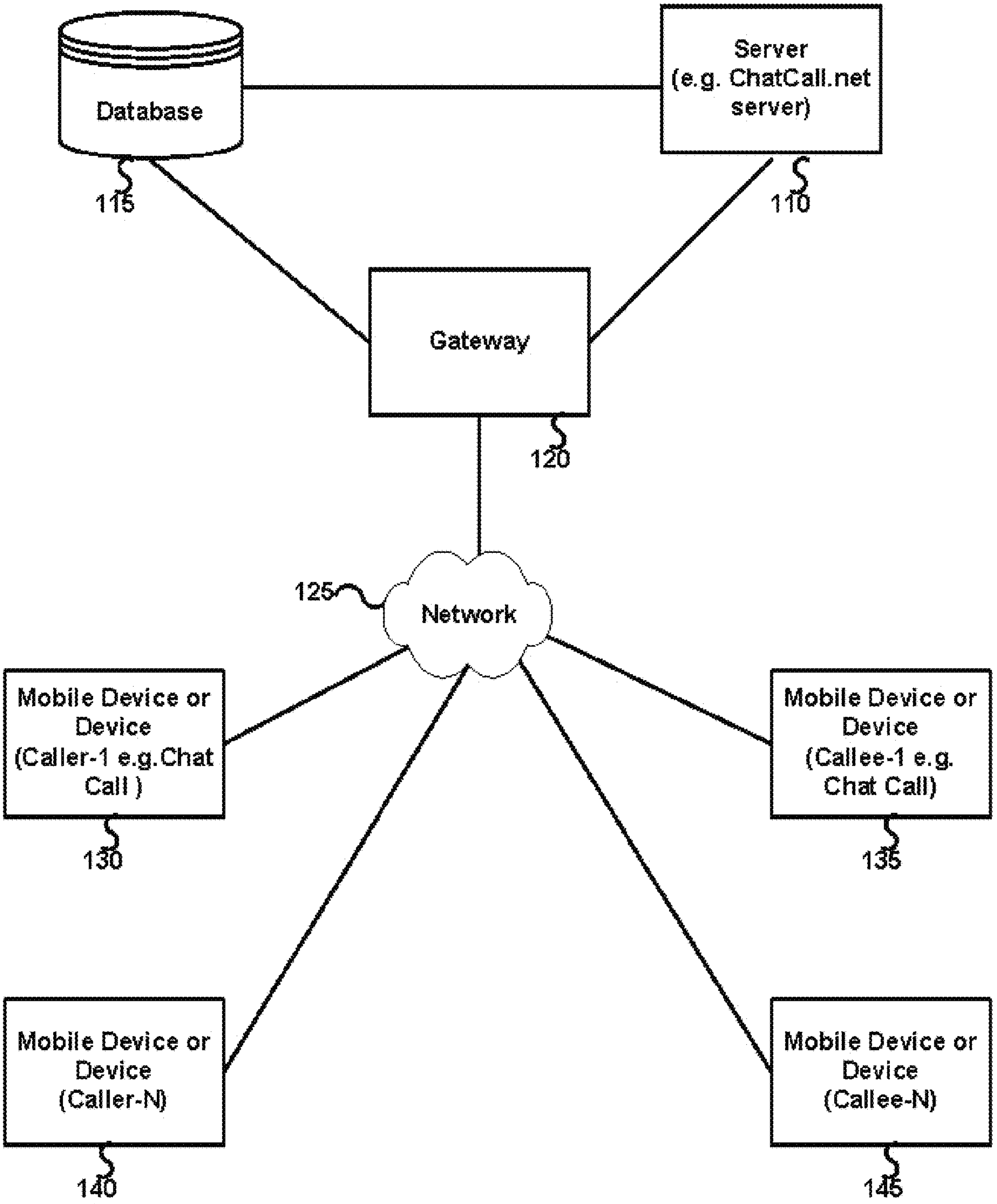
FIG. 1 illustrates a block diagram of a call based real-time services system configured to implement the call based real-time communication, collaboration, workflow, e-commerce, advertising, marketing, promotion, presentation, buying, selling, group deals, game, sharing, task, messaging, collecting information, surveying, participating in one or more activities, actions, events & transactions and in the event of acceptance of call dynamically presenting one or more types of one or more interfaces, applications, web services, contents, data, objects, controls, web page, web site & any combination thereof to both calling & called user(s) or only to calling or called user(s) according to some embodiments. In other embodiment based on user data server presents domain, subject, filed, task, location, feature, option, activities specific matched list of prospective contextual callable users to user, so user can bookmark, select and call them or in other embodiment auto connect or auto call them. In other embodiment enable user to initiate call and enable other invitee users to join or participant in call and in the event of acceptance of call by participants present one or more types of one or more interfaces, applications, web services, contents, data, objects, controls, web page, web site & any combination thereof to both calling & called user(s) or only to calling or called user(s) according to some embodiments. In other embodiment enable other users to follow user and enable user to call to followers without disclosing identity or enable user to follow other users of network and enable them to call to user and restrict followers to call back to following user(s). In other embodiment enabling sharing call, where user draft, prepared, update, add, attach one or more types of media including text, photo, video, audio, emoticons, files, objects & like and select one or more contacts or group(s) of contacts and can call them and in the event of acceptance of call by said selected one or more users share with them with option of "do not reply" or enable to reply and/or save share contents or view said shared contents for set period of time or duration. In other embodiments enable to select one or more contacts or group(s) of contacts and initiate multiple individual calling with them, so system individually call each said selected user and in the acceptance of call from one or more said selected users, present one or more types of set, selected, auto matched, customized, pre-configured one or more interfaces, applications, web services, contents, data, objects, controls, web page, web site & any combination thereof to both calling & called user(s) or only to calling or called user(s) according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (e.g., meaning having the potential to), rather than the mandatory sense (e.g., meaning must). Similarly, the words "include", "including", and "includes" mean including, but not limited to.

DETAILED DESCRIPTION OF THE DRAWINGS

Various embodiments of a system and method for request based real-time or near real-time or live broadcasting, sharing and providing user services are described. In the following description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

A system and methods for real-time one or more types of calling based system where calling user called to one or more selected users or contacts for establishing calling type specific communication, collaboration, workflow, data collection or surveying, participating for one or more activities, actions, events & transactions with them e.g. chat chatting is described herein. In one embodiment the calling party (also called caller, call originator) is a person who (or device that) initiates a call over the network e.g. chat call, usually by selecting one or more contact(s) and/or group(s) of contacts or users or dialing a call number e.g. chat call number. The called party is a person who (or device that) answers a call e.g. chat call. The person who (or device that) initiates a call e.g. chat call is the calling party. A call e.g. chat call is a connection over a network between the calling party and the called party. When called party or parties or device(s) or application(s) accept call e.g. chat call or accept call e.g. chat call within particular period of time or accept call e.g. chat call during ringing of device or application then calling and called party or user is presented with one or more types of one or more interfaces, applications, web services, contents, data, objects, controls, web page, web site & any combination thereof to both calling & called user(s) or only to calling or called user(s) e.g. chat interface for enabling them to communicate, collaborate, share, send & receive messages & media including photo, video, audio, image, voice, file, emoticons, location information, user profile, web page, widget, contacts, links, application, data, forms and one or more types of digital contents. After establishing of connection between or among calling or called party or parties, they can terminate or hung up call e.g. chatcall like phone call. Called party or parties also enabled to decline or reject or ignore or miss call e.g. chat call and calling later via missed call alerts or notifications or logs.

The various mobile devices of the users may be connected to each other and to a central server via a wireless network. The mobile device users can chat calling one or more other users for chatting, communicating, collaborating, participating & sharing with them.

The system for real time one or more type of call e.g. chat call based chatting may be referred to herein, for simplicity, as the "real time calling based system e.g. chat call". FIG. 1 illustrates a block diagram of a real time call e.g. chat call based system configured to implement the real time calling e.g. chat calling to one or more called parties for chatting, sharing, communicating, sharing & collaborating with called parties up-to termination of call e.g. chat call by calling and/or called parties. While FIG. 1 illustrates a gateway 120, a database 115 and a server 110 as separate entities, the illustration is provided for example purposes only and is not meant to limit the configuration of the real time call based system e.g. chat call. In some embodiments, gateway 120, database 115 and server 110 may be implemented in the real time call based system e.g. chat call as separate systems, a single system, or any combination of systems.

As illustrated in FIG. 1, the real time call based system e.g. chat call may include a caller(s) e.g. chat caller(s) or calling party e.g. chat calling party mobile device(s) 130/140, callee e.g. chat callee or called party e.g. chat called party mobile device(s) 135/145. Mobile devices 130/140/135/145 may be particular set number of or an arbitrary number of mobile devices which may be capable of calling one or more selected users or contacts or group(s) of contacts for real-time establishing connections, communications, collaboration, sharing & chatting to/with called parties device(s) or application(s). Each mobile device in the set of caller(s) e.g. chat caller(s) 130/140 and callee e.g. chat callee mobile device(s) 135/145 may be configured to communicate, via a wireless connection, with each one of the other mobile devices 130/140/135/145. Each one of the mobile devices 130/140/135/145 may also be configured to communicate, via a wireless connection, to a network 125, as illustrated in FIG. 1. The wireless connections of mobile devices 130/140/135/145 may be implemented within a wireless network such as a Bluetooth network or a wireless LAN.

As illustrated in FIG. 1, the real time call based system e.g. chat call may include gateway 120. Gateway 120 may be a web gateway which may be configured to communicate with other entities of the real time call based system e.g. ChatCall via wired and/or wireless network connections. As illustrated in FIG. 1, gateway 120 may communicate with mobile devices 130/140/135/145 via network 125. In various embodiments, gateway 120 may be connected to network 125 via a wired and/or wireless network connection. As illustrated in FIG. 1, gateway 120 may be connected to database 115 and server 110 of the real time call based system e.g. chat call. In various embodiments, gateway 120 may be connected to database 115 and/or server 110 via a wired or a wireless network connection.

Gateway 120 may be configured to send and receive data (e.g., chat call requests and shared contents or media including text, message, links, videos, photos, audio, images, voice, and sound to/from mobile devices 130/140/135/145. For example, gateway 120 may be configured to receive e.g. call request(s) chat call request(s) and/or a shared contents or media including text, message, links, videos, photos, audio, images, voice, and sound from a mobile device and may send the call request(s) e.g. chat call request(s) and/or a shared contents or media including text, message, links, videos, photos, audio, images, voice, and sound to database 115 for storage. As another example, gateway 120 may be configured to send call request(s) e.g. chatcall request(s) and/or a shared contents or media including text, message, links, videos, photos, audio, images, voice, and sound stored in database 115 to mobile devices 130/140/135/145. Gateway 120 may be configured to receive call request(s) e.g. chat call request(s) from mobile devices 130/140/135/145.

For example, gateway 120 may receive a call request(s) e.g. chat call request(s) from a mobile device(s) or calling party or parties and notify via ringing or any other method & present to target receiver(s) or called party or parties for enabling called party to accept or answer call e.g. chat call for communicating, collaborating, participating, transacting, sharing & chatting with calling party or reject or ignore call(s) e.g. chat call(s). Gateway 120 may be configured to inform server 110 of updated data. For example, gateway 120 may be configured to notify server 110 when a new shared or published or presented messages, videos, audio, photos, images & voice has been received from a mobile device and stored on database 115.

As illustrated in FIG. 1, the real time call based system e.g. chat call may include a database, such as database 115. Database 115 may be connected to gateway 120 and server 110 via wired and/or wireless connections. Database 115 may be configured to store a database of real-time or near real time broadcasted or streamed or shared or send messages, videos, audio, photos, images & voice received from mobile devices 130/140/135/145 via network 125 and gateway 120. The database of media or content stored in database 115 may include messages, text, links, videos, audio, photos, images, files, objects, applications, web pages & voice data, associate metadata including description, sender or receiver name & identity & system data including date & time.

Database 115 may also be configured to receive and service call requests e.g. chatcall requests from gateway 120. For example, database 115 may receive, via gateway 120, a call request e.g. chat call request from a mobile device and may service the call e.g. chat call request by notifying called party or parties regarding call e.g. chat call via ringing or other methods of notification or alerts and establishing connection with calling party for chatting, communicating, collaborating, sharing, participating & transacting with them. Database 115 may be configured to communicate with server 110.

As illustrated in FIG. 1, the real time call based system e.g. chat call may include a server, such as server 110. Server may be connected to database 115 and gateway 120 via wired and/or wireless connections. As described above, server 110 may be notified, by gateway 120, of new messages, shared contents including media, videos, audio, photos, images & voice that have been added to the real-time call e.g. chat call request specific messages & shared contents including videos, audio, photos, images & voice image stored in database 115. Server 110 may be configured to send updated metadata for each new messages & shared contents including videos, audio, photos, images & voice to database 115 such that the metadata identifies the messages & shared contents including videos, audio, photos, images & voice as a new messages & shared contents including videos, audio, photos, images & voice in database 115.

Figure 2:
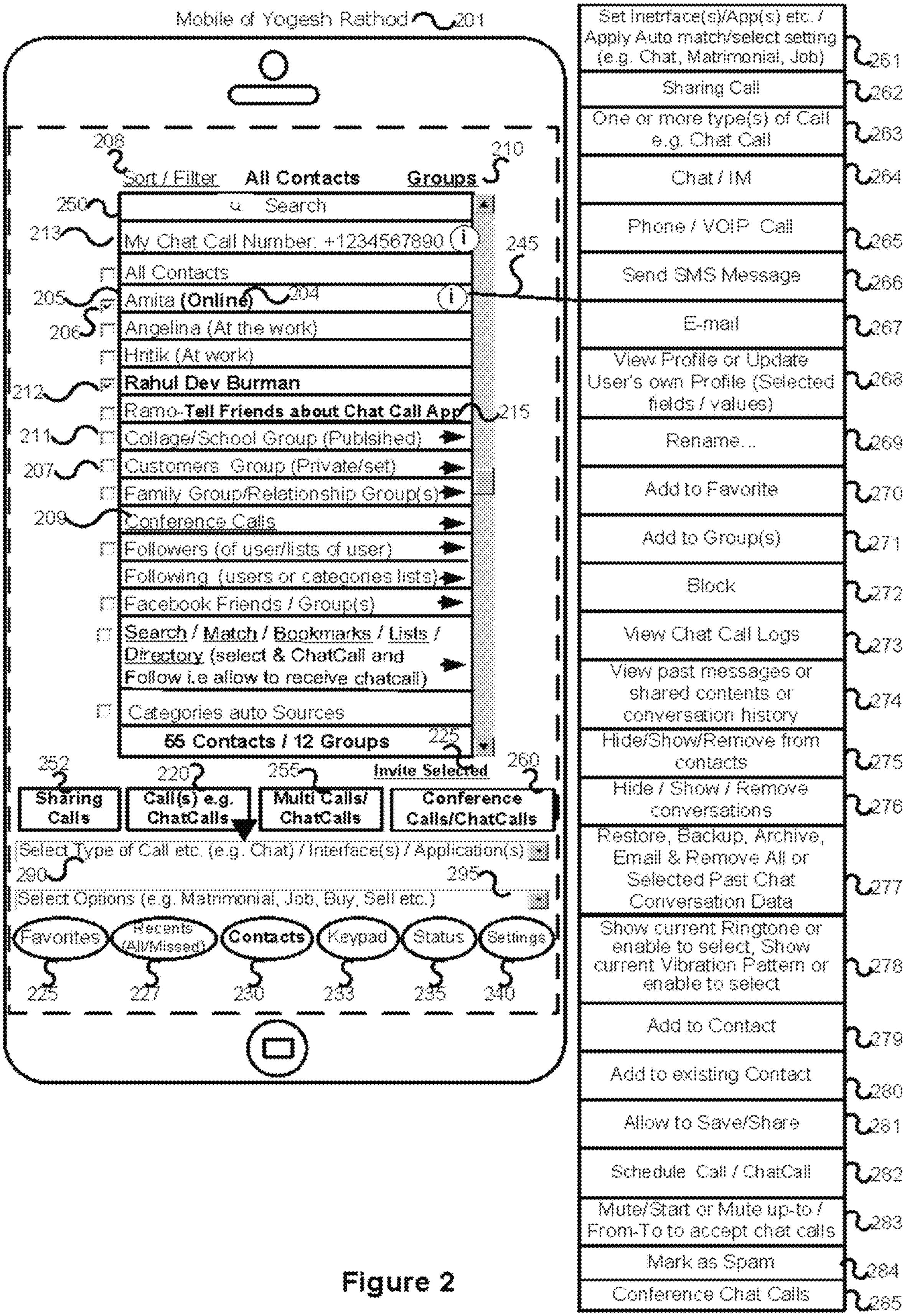
FIG. 2 illustrates exemplary graphical user interface (GUI) for enabling chat calling users to make chat call to called user(s) and chatting with chat call accepted user within specified period of time.
Figure 4:
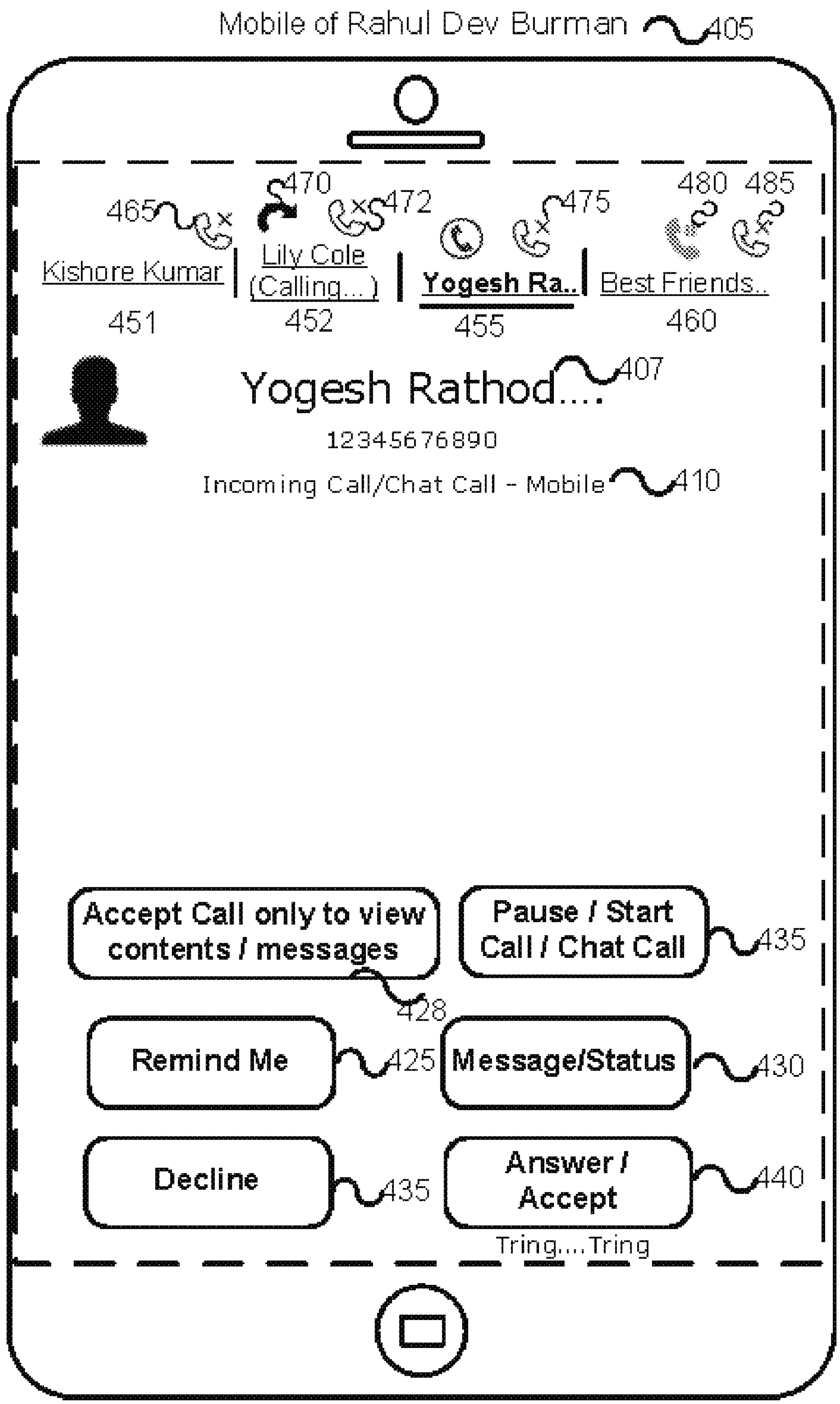
FIG. 4 illustrates exemplary presented graphical user interface (GUI) for called user while chat calling by other user to called party.
Figure 5:
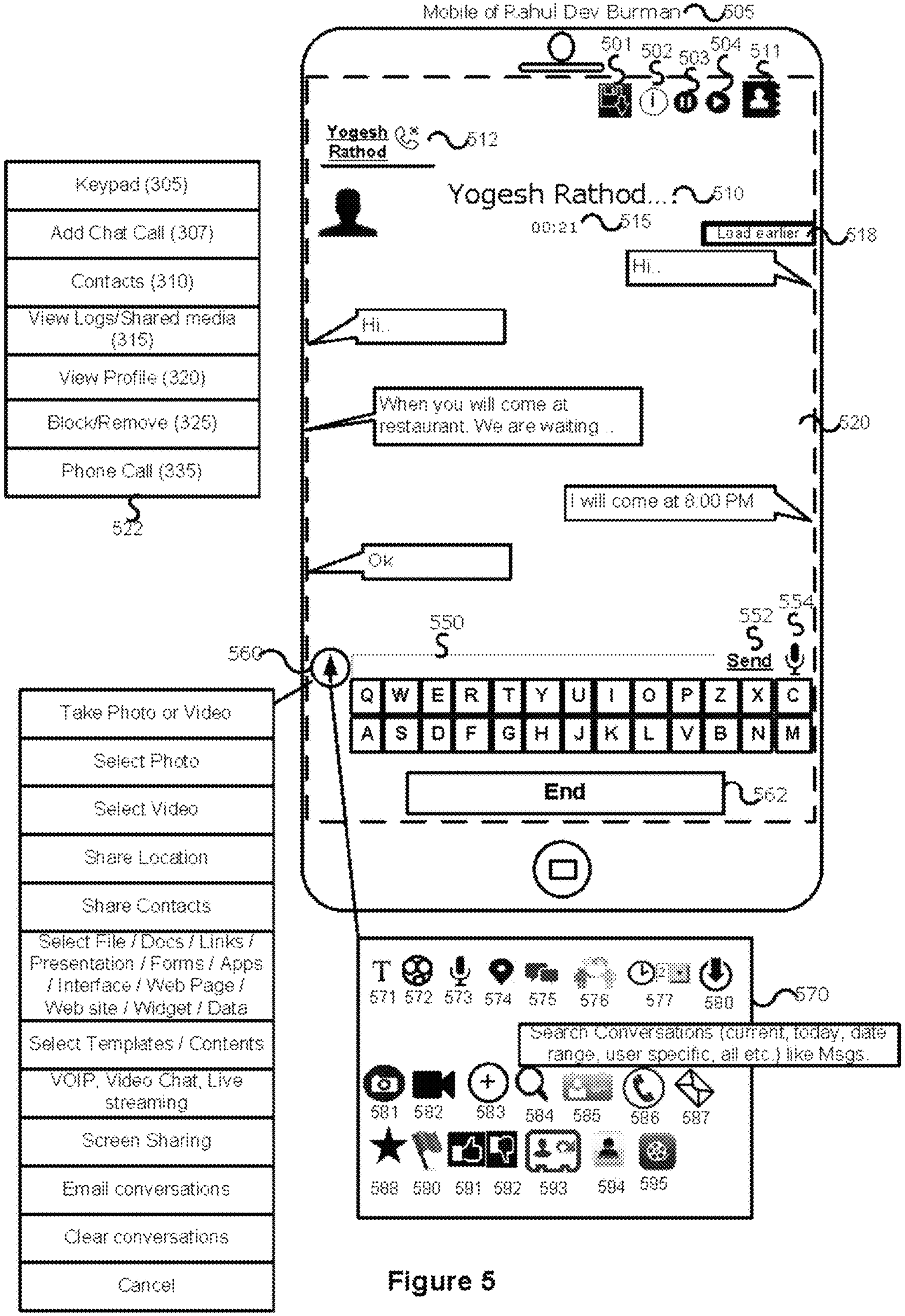
FIG. 5 & FIG. 6 illustrates exemplary presented chat graphical user interface (GUI) for calling and called user at the time of acceptance of chat call by called user.

In one embodiment enabling caller or calling party or inviter user(s) 130 and/or 140 to send real-time invitation(s) or call e.g. chat call (e.g. FIG. 2 (220) to one or more callee or called party or invitee user(s) 135 and/or 145 to real-time chat, messaging, communicating, collaborating, participating, work flowing, transacting & sharing with calling party or inviter user(s) 130 and/or 140 and within same session wait for acceptance of invitation(s) or call e.g. chat call from said called party or invitee user(s) 135 and/or 145 by said calling party or inviter user(s) 130 and/or 140; enabling invitation(s) receiving or callee or called user(s) or invitee user(s) 135 and/or 145 to accept call e.g. chat call or invitation(s) (e.g. FIGS. 4 (440) or 10 (1050) or 11 (1150)) or decline or not accept call e.g. chat call or invitation(s) (e.g. FIGS. 4 (435) or 10 (1045) or 11 (1145)) in real-time or within particular specific period of time or within same session or ignore call e.g. chat call or invitation(s) within specified period of time or within same session; and in the event of acceptance of call e.g. chat call or invitation(s) by callee or called party or invitee user(s) 135 and/or 145, present call type specific one or more interfaces, applications, web services, data, web pages, web sites, controls, objects & any combination thereof e.g. chat call interface (e.g. see FIGS. 5 (520) or 6 (620) or 12 (1220) or 13 (1320) or 14 (1420) or 15 (1520)) to caller or calling party or inviter user(s) 130 and/or 140 and callee or called party or invitee user(s) 135 and/or 145, wherein enabling callee or called party or invitation(s) accepted user(s) 135 and/or 145 in real-time or within same session to access presented said call type specific one or more interfaces, applications, web services, data, web pages, web sites, controls, objects & any combination e.g. chat interface (e.g. see FIGS. 5 (520) or 6 (620) or 12 (1220) or 13 (1320) or 14 (1420) or 15 (1520)) and participate in session e.g. chat session with said calling party or invitation sender user(s) or inviter user(s) 130 and/or 140 in real-time or within same session.

Figure 3:
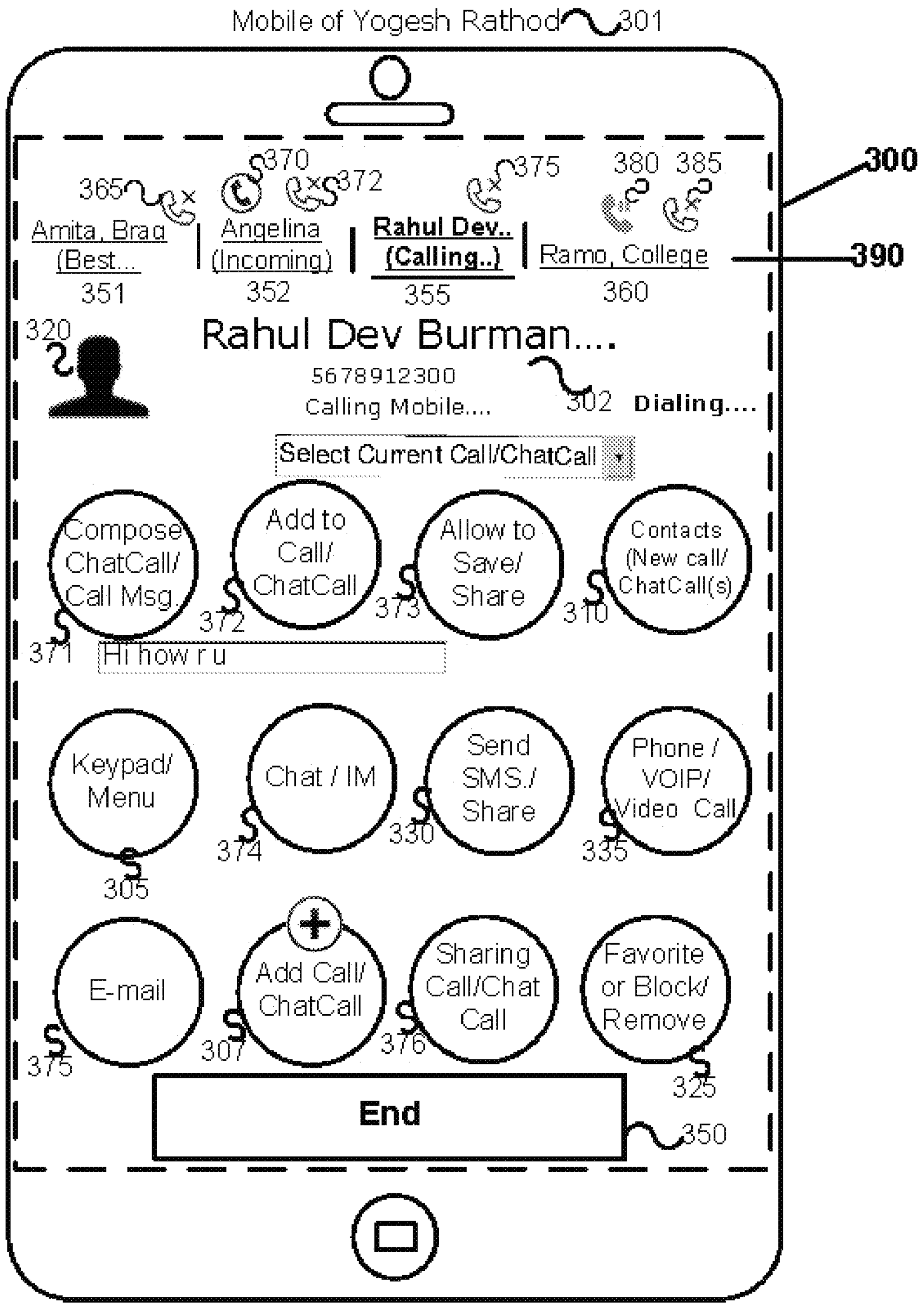
FIG. 3 illustrates exemplary presented graphical user interface (GUI) when chat calling user makes chat call to one or more called users and wait for answer or acceptance of invitation from called user(s)

In another embodiment enabling calling party (e.g. 130/140/201) to send or share or present one or more types of media including text, video, audio, photo, image, voice, application, interface, form, web page, link, web site, user controls like menus, user actions, functions 245 while chat calling 220 or FIG. 3 (300) or with chat call 220 or FIG. 3 (300) or acceptance of chat call (440 or FIG. 5) or while establishment of or during chat call session (FIG. 5) to one or more or group(s) of contacts or called users (e.g. FIGS. 5 (505), 10 (1010), 11 (1110), 12 (1205), 13 (1305), 14 (1405) & 15 (1505)). For example calling user (e.g. 130/140/201) can send, share, publish, upload, synchronize, provide & present one or more types of digital contents (245) for one or more types of purposes, activities, actions, events, transactions, workflow & tasks including present or share or send advertisements, deals, notifications, alerts, applications, one or more types of media, news, blogs, questions, search queries with chat call to one or more or group(s) of contacts or called users or followers or following users or auto matched or preference base matched users of network(s) (205 or 805), wherein called users (e.g. FIGS. 5 (505), 10 (1010), 11 (1110), 12 (1205), 13 (1305), 14 (1405) & 15 (1505)) accepts (440) or ignore or decline (435) call e.g. chat calls from one or more calling users (e.g. 130/140/201) and accepted call e.g. chat call users (e.g. FIGS. 5 (505), 10 (1010), 11 (1110), 12 (1205), 13 (1305), 14 (1405) & 15 (1505)) can view or read said presented preference based real-time advertisements, deals, notifications, alerts, news, blogs, & full or partial shared profile of calling user, access or view or download application(s) or participate with calling user (e.g. game applications), view or re-share one or more types of media & provide ratings, likes, dislikes & comments, real-time or near real-time view or read question(s) and provide answer(s), provide search query specific search result(s), real-time or on demand make payments, real-time fill survey forms, real-time fill questionnaires, user profile, job profile, matrimonial profile, feedback forms, suggestion forms, complaint forms, requirement details & one or more types of forms, access user actions with or without one or more types of shared contents(s) including Like & Dislike buttons, Provide Ratings, Provide Comments, Accept Invitations, Provide status or updates or presence information, Provide response, Provide answers, Register for particular applications or services or web sites options, buttons, combo box, list box, interactive controls, widgets, web page, check boxes, radio buttons, tabs, features, menus, buttons, functions, interfaces, objects and like.

In one embodiment auto calling e.g. chat calling to one or more contacts and/or users of network(s), wherein in one embodiment said auto calling e.g. chat calling are based on one or more types of activities, actions, interactions, events, transactions, senses, locations, check-in place(s), behavior, logs, status, updates, presence information, tasks, workflow, past one or more types of call(s) related calls e.g. chat calls, past one or more types of call(s) related calls e.g. chat calls associate data, user profile, user data & metadata, shared contents, user contacts or connections.

In one embodiment users or individuals may download real time call based system e.g. chat call's application or service from a variety of on-line application stores. In some cases, the application is pre-loaded to an individual's phone by a network carrier or device manufacturer. Once the application has been downloaded to a mobile device 130/140/135/145, an user or individual is required to register with real time call based system e.g. chat call's application or service using his or her mobile device 130/140/135/145. During the registration process, individuals may ask to read and accept real time call based system e.g. chat call's application or service's Terms of Service and Privacy Policy. The Terms of Service and Privacy Policy may provide in a pop-up window at the time of registration and may also available on-line on real time call based system e.g. chat call's application or service's website. Once an individual has read and accepted real time call based system e.g. chat call's application or service's terms of service, he or she may asked to specify the country in which they reside and to provide their mobile phone number. In some cases, the application may also ask a registrant for their preferred notification name (i.e., the name the user wishes to appear in out-going messages). Once an individual has provided his or her country code and mobile telephone number, the application may collects the following information from the registrant's mobile device including device identifier information, mobile subscriber ID, mobile country code, and mobile network code. Using that information, real time call based system e.g. chat call's application or service may sends an account confirmation message to the registrant by way of standard SMS or phone call or e-mail or one or more types of communication interfaces. Using the registrant's reply to that message, real time call based system e.g. chat call's application or service then verifies that the personal information provided by the user during the registration process matches that attached to the mobile device. Once confirmed, a user is registered and his or her account is activated. The user may then begin sending and receiving call requests e.g. chat call requests, accepting or rejecting or ignoring real-time call request(s) e.g. chat call request(s), send, receive, share messages, media, contents with other real time call based system e.g. chat call's application or service users world-wide. In order to facilitate contact between application users, real time call based system e.g. chat call's application or service relies on a user's address book to populate his or her real time call based system e.g. chat call's application or service related "All Contacts" list. Once a user consents to the use of his or her address book, contact information from the user's mobile device is periodically transmitted to real time call based system e.g. chat call's application or service's server(s) 110 connected database(s) 115 to assist in the identification of other real time call based system e.g. chat call's application or service users. In one embodiment, the application is designed to upload a user's mobile address book to real time call based system e.g. chat call's application or service's server(s) 110 up to one or more times daily or periodically, or as initiated by the user during a contact refresh. Personal information collected during the contact discovery process may limit to mobile numbers. Association between contact names and numbers may occur on a user's device only, and not by virtue of any data matching by real time call based system e.g. chat call's application or service. Once a user has consented to the use of his or her contact information for contact discovery, mobile numbers from the user's address book are transferred securely to real time call based system e.g. chat call's application or service's servers using Secure Socket Layer/Transport Layer Security or SSL/TLS encryption. Once uploaded, a contact number is categorized by real time call based system e.g. chat call's application or service's server(s) 110 as being either "in-network" (i.e., registered with real time call based system e.g. chat call's application or service) or "out-of-network". Only numbers listed as in-network can be contacted using the real time call based system e.g. chat call's application or service. An out-of-network number would only become associated with a real time call based system e.g. chat call's application or service user once the application was installed and registered on a device with that number. In-network numbers may store as original values (i.e., in clear text) on real time call based system e.g. chat call's application or service server(s) 110. Out-of-network numbers are stored as one-way, irreversibly hashed values. Real time call based system e.g. chat call's application or service may use a multi-step treatment of the numbers, with the key step being an "MD5" hash function. The phone number and a fixed salt value serve as input to the hash function, and the output is truncated to 53 bits and combined with the country code for the number. The result is a 64-bit value which is stored in data tables on real time call based system e.g. chat call's application or service's server(s) 110. This procedure is designed to render out-of-network numbers (i.e., the mobile numbers of non-users) anonymous.

In one embodiment real time call based system e.g. chat call's application or service's messenger service provides chat calling or calling for requesting chat with called users and an instant messaging system that can be used across mobile devices, whether BlackBerrys, iPhones, Windows-based phones or Androids. BlackBerry users, for example, may message Android users and iPhone users, and vice versa—a feature generally not available on the proprietary messaging systems built into phones by mobile manufacturers. In order to send and receive messages using the application, however, both the sender and recipient of a message must have the real time call based system e.g. chat call's application or service installed or subscribed and registered on his or her device.

In one embodiment real time call based system e.g. chat call's application or service uses a customized version of the open standard Extensible Messaging and Presence Protocol (XMPP). Upon installation, it creates a user account using one's phone number as the username (Jabber ID: [phone number]@s.chatcall.net). Real time call based system e.g. chat call's application or service or software automatically compares all the phone numbers from the device's address book with its central database(s) 115 of real time call based system e.g. chat call's application or service users to automatically add contacts to the user's contact list.

In one embodiment multimedia messages are sent by uploading the image, audio or video to be sent to an HTTP server and then sending a link to the content along with its Base64 encoded thumbnail.

In one embodiment real time call based system e.g. chat call's application or service may require users to upload their mobile phone's entire address book to real time call based system e.g. chat call's application or service server(s) 110 so that real time call based system e.g. chat call's application or service could discover who, among the users' contacts, is available via real time call based system e.g. chat call's application or service. While this is a fast and convenient way to quickly find and connect the user with contacts who are also using real time call based system e.g. chat call's application or service, it means that their address book was then mirrored on the real time call based system e.g. chat call's application or service server(s) 110, including contact information for contacts who are not using real time call based system e.g. chat call's application or service.

In another embodiment real time call based system e.g. chat call or part of real time call based system e.g. chat call may or can integrate, host & access including calling e.g. chat calling, answering or accepting call e.g. chat call, accessing interface e.g. chat interface and session e.g. chat session with/at/via 3rd parties web sites, web pages, user profile, applications, services, networks, servers & devices via application programming interface (API), web service(s) and one or more types of communication interfaces.

In another embodiment real time call based system e.g. chat call or part of real time call based system e.g. chat call are based on clientless platform or browser based or online web site, embedded client, offline or connected client, smart client or mobile application.

In another embodiment real time call based system e.g. chat call available for multi users, multi members, wherein administrator can create one or more accounts, assign one or more features to each member, provides rights, privacy settings & privileges to one or more members or accounts.

FIG. 2 illustrates exemplary graphical user interface (GUI) for enabling exemplary user or calling user 201 via exemplary device 130/140 to in some embodiment access, sort or filter 208 contacts 205 including sort rank or favorite or group(s) or category wise, sort or filter online or available users & sort recent chat calls, create group(s) 210 of contacts 205, search 250 contacts 205, favorite or rank 225 one or more contacts 205, select single contact via tap on contact to make direct call e.g. chat call to that contact 212 e.g. contact user "Rahul Dev Burman" or select one or more contacts 206 & 212 or publishable 211 or private or set of users 207 type of group(s) of contacts or group(s) of users 211 and/or 207 and make group call e.g. group chat call via chat call button 220 for group communication, messaging, participation, collaboration & sharing or user can select or tap on "multi chat calls" button 255 for calling to multiple said selected users and communicate, messaging, participation collaboration & sharing with each of said selected contact(s) or group(s) separately, a separate interface is opened or presented for each of said call e.g. chat call accepted user(s) and calling user can access each interface via tab.

User can view logs & details of recent, all, missed, canceled, paused, re-started, incoming & outgoing calls e.g. chat calls via button or link or option 227 including call e.g. chat call duration, date & time, user name or call e.g. chat call number. User can view all contacts and associate interface via "contact" button or link or option 230. In another embodiment real time call based system e.g. chat call's application or service provides call e.g. chat call number including one or more types of verified number(s) 213 to each or premium or paid or sponsored users, wherein user can dial or use or select or input number via keypad or dialer 233 for connecting or calling said call number e.g. chat call number associate user's device or application for chatting or sharing with said called and call e.g. chat call accepted user. In another embodiment enabling automatically or enabling user to provide, set, select, select from auto identified, share, apply, send & publish user's status, availability or presence information for other users via status button or link or option 235. In another embodiment user is enable to apply, set, select, input and manage one or more types of privacy settings & preferences via settings option 240 which are discuss in detail in FIG. 7.

In another embodiment user can select 290 or can set 261 or apply auto select or auto match settings for presenting one or more types of one or more customized or configured interfaces, applications, web services, contents, data, objects, controls, web page, web site & any combination thereof to both calling & called user(s) or only to calling or called user(s) when call of calling user(s) accepted by called user(s).

In another embodiment list of contact 205 also presents availability status 204, tell friends who not installed real time call based system 215 e.g. chat call's application or service about installing of chat call application and associate metadata, numbers, statistics with each contact item. In another embodiment list of contacts 205 also present contacts, friends of one or more social networks, one or more types of group(s) including publishable group, private group, conference call groups of user's and other related users, followers, following users or contacts, categories directories of users of networks and enabling user to search and match allowed categories lists of users who have similar interest or matched with user provided search keywords and enable to subscribe, bookmark and follow them. In other embodiment based on one or more selected options also present list of matched users based on user profile and user data including based on selection of "Job" show contextual contacts of matched employers or companies to job seeking user based on match making of job profile of user & job requirement postings of employers, show matched profile to brides or grooms based on matrimonial profiles, show buyers based on match making of requirement specifications of buyers and listing of sellers and like.

In other embodiment enabling sharing call 252 or 262 discussed in detail in FIGS. 20-27, where user draft, prepared, update, add, attach one or more types of media including text, photo, video, audio, emoticons, files, objects & like and select one or more contacts or group(s) of contacts and can call 220 them and in the event of acceptance of call by said selected one or more users share with them with option of "do not reply" or enable to reply and/or save share contents or view said shared contents for set period of time or duration. In other embodiments enable to select one or more contacts or group(s) of contacts and initiate multiple individual calling 255 with them, so system individually call each said selected user and in the acceptance of call from one or more said selected users, present one or more types of set, selected, auto matched, customized, pre-configured one or more interfaces, applications, web services, contents, data, objects, controls, web page, web site & any combination thereof to both calling & called user(s) or only to calling or called user(s) according to some embodiments.

In other embodiment enabling user to create, update, publish, access invite, join & manage one or more conference calls 209 e.g. conference chat calls. System generates and stores unique identity associate with call number or mobile number as conference bridge number. User is enable to generate and store one or more conference identities and/or personal identification(s) or PIN number(s) and input, select, update, store & provide date & time and details of conference with said conference identity and enable to send said generated bridge number, one or more conference identities and/or PIN number(s) and/or conference date & time and details to one or more selected contacts or users or connections. Participant member inducing said to one or more selected contacts or users or connections presented with said bridge number, one or more conference identities and/or PIN number(s) and/or conference date & time and details. Receiving user(s) can select, enter, input or dial said one or more bridge number, conference identity and/or PIN number for initiating or establishing conference call or participating in established or initiated conference call. In the event of participating in conference call participant member(s) is/are presented with one or more types of selected, pre-selected, auto matched, set, predefined, preselected, preconfigured, customized one or more interface(s) with "end call" and/or "leave" feature or button to calling and/or called user(s). In the event of starting or participating in established or initiated conference call initiating or establishing communication session or connections between or among conference call participants or members and in the event of ending call by admin user close or hide said presented interface(s) of conference call participants or members and/or end said established communication session or connections between or among conference call participants or members and/or store or remove communication session associate data.

In another embodiment enabling user to access & use one or more options, user actions, functions, menu items, applications, services, features 245 associate or provided with one or more or one or more selected contacts and/or group(s) of contacts 205 including making one or more types of call e.g. chat call(s) 220 or 263, general phone call 265, VOIP or voice or video call 265, send instant messages 264 or share contents or one way chat call messages i.e. enable to make chat call to one or more users and those who not accept chat call, send them message(s) or shared contents, send SMS 266, send or share one or more types of media including contacts, text, video, photo, image, audio, voice, file, documents & links, send e-mail 267, enabling to view user or selected contact's profile(s) 268, rename name of particular contact 269, add one or more contact to favorite contacts 270 or one or more categories list(s) of contacts 271, block 272 or remove or show or hide contact(s) 275, view chat call related logs 273, activities, actions, events, transactions, locations, conversations, history, story 274, enable to hide or show or remove 276 or backup or restore or archive conversations 277, show current Ringtone or enable to select Ringtone, show current Vibration Pattern or enable to select Vibration Pattern 278, Add to Contact 279, Add to existing Contact 280, Allow to Save/Share 281, select one or more contacts Schedule call e.g. ChatCall including select particular date & time or date & time ranges, Schedule to auto call e.g. ChatCall(s), auto scheduled conference call to all participant members 282, Mute/Start or Mute up-to <date & time>/<From-To> to accept call e.g. chat calls 283, Mark as Spam 284, and manage one or more types of one or more Conference Chat Calls 285

FIG. 3 illustrates exemplary presented graphical user interface (GUI) when user makes one or more type of call e.g. chat call to one or more users. For example when user [Yogesh Rathod] 201 selects or tap on contact [Rahul Dev Burman] 212 from list of all contacts 205 or click or touch on chat call label or button or link or option 220 for making call e.g. chat call to said selected or tapped contact [Rahul Dev Burman] 212 then user [Yogesh Rathod]201/301 is presented with screen or interface 300, wherein user is waiting for answer or invitation acceptance or call e.g. chat call acceptance or call e.g. chat call rejection from called party or parties e.g. [Rahul Dev Burman] 212/302. In another embodiment called party is notified with/via ringing and/or vibrating or notification message or any manner alerting called user(s) that user [Yogesh Rathod] 201 is making chat call to user [Rahul Dev Burman] 212/302 and user [Rahul Dev Burman] 212/302 have to reject or ignore or accept/answer said chat call within particular or set period of time (e.g. 30 seconds or 1 minutes). User is provided with status i.e. <one or more type> of calling mobile" e.g. "chat calling mobile" 303. In one embodiment user can end or terminate or hung-up chat call before reply or response or acceptance of chat call by called party or after acceptance of chat call e.g. [Rahul Dev Burman] 212/302 where user is presented with "chat call ending or ended" status. In another embodiment during chat calling, calling user [Yogesh Rathod] 201 can use keypad 305 for input or enter extensions, commands, numbers (e.g. press 1 for sales department or press 2 for support and like or route chat call to multiple destinations including cell phones, home phones and work phones or other features such as Menus, Queues or Recordings. In another embodiment during chat calling, calling user [Yogesh Rathod] 201 can use add chat call option 307 for use conferencing calling.

In another embodiment to use one of the type of conferencing calling on user's device or application, user can do the following: chat call the first person user want to include on the chat call (or have them chat call to user), Once they've answered, user can tap the Add Chat Call 307 button to put them on hold, this brings up user's contacts list. User can browse through it to the person user want to add to the chat call, tap their name, and/or tap their phone number that user want to call. User can also choose the keypad from this screen and dial the next number directly. When the next person user are calling has answered, tap the Merge Chat Calls button to conference all the lines together. If user are already on the chat call and another participant calls user, tap the Hold and Answer button that pops up on the screen and the tap Merge Chat Calls to join the chat calls together into a conference. In another embodiment when user use user's mobile device or application to host a conference call, user can converse to one participant privately, or disconnect people from the call individually. In another embodiment user can also choose to flip or switch between two chat calls without conferencing them together using the Swap Calls button or tabs. If user has got two chat calls coming into user's mobile phone or device, user can simply tap the Swap Calls button or switch tabs to put the current chat call on hold and move to the other. Tap the button again to reverse the process.

In another embodiment while calling or before acceptance of call by called user, use can compose first message 371 so in the event of acceptance of call by called user(s) they immediately present with first message or calling user send drafted message manually e.g. from chat box or textbox of chat interface.

In another embodiment calling user can add current call to one or more selected active call e.g. chatcall 372 e.g. add current call with [Rahul Dev Burman] 355 to [Amita, Brad.] call 351, so user [Yogesh Rathod] 301 can converse with all call participants.

In another embodiment calling user can allow called user(s) to save or re-share call related contents e.g. shared, chatted & conversed contents 373.

In another embodiment calling user can select one or more contacts and/or groups and/or conference calls and call e.g. chat call them.

In another embodiment based on addition of incoming and outgoing calls, system dynamically adds tabs 390 where user can show name of calling or called user(s) and/or group(s), current status of calls including calling or outgoing, incoming, new message arrived, end call and can take one or more actions including change tab order via drag and drop, merge calls, separate calls, end call 365, accept incoming call 370, tap on tab to switch or tap on particular tab to make current tab on hold and converse, communicate & share with called user(s) related to current active call or tap on tab to switch or tap on particular tab to view incoming call interface to accept or reject call or send message or select remind me option or view outgoing call interface to wait for acceptance of call by called user or end call.

In another embodiment during or while one or more types of call e.g. chat calling, calling user [e.g. Yogesh Rathod] 201 can access and dial or chat calling to one or more other contacts via contacts option 310. In the event of calling to other contacts and/or groups, system dynamically add tab 390, so user can tap on that tab and can view current status of that call or take one or more actions including call is ringing, call accepted, end call by called user, call is missed or cancelled, calling user can end call, select one or more options as discussed in FIG. 3 and can access call type specific interface(s) presented to calling user for communication, messaging, chatting, collaboration, sharing, participation & transacting with called user(s).

In another embodiment during or while one or more types of call e.g. chat calling, calling user [e.g. Yogesh Rathod] 201 can view logs and shared media of called user via option 315.

In another embodiment during or while one or more types of call e.g. chat calling, calling user [e.g. Yogesh Rathod] 201 can view profile of called user via option 320.

In another embodiment calling user can select keyboard 305 to dial call number or enter extension or select menu option 305.

In another embodiment enabling calling user to change action i.e. end current call e.g. chat call and instead of call e.g. chat call send message 374 or send SMS 330 or make VOIP call or cellular call or mobile call or video call 335 or send email 375.

In another embodiment during or while one or more types of call e.g. chat calling, calling user [e.g. Yogesh Rathod] 201 can favorite or block or remove called user(s) from contacts via option 325.

In another embodiment during or while one or more types of call e.g. chat calling, calling user [e.g. Yogesh Rathod] 201 is enabled to send or share contents via option 330.

In another embodiment during or while one or more types of call e.g. chat calling, calling user [e.g. Yogesh Rathod] 201 is enabled to make ordinary phone call via option 335.

In another embodiment during or while one or more types of call e.g. chat calling, calling user [e.g. Yogesh Rathod] 201 is enabled to make VOIP or voice or video call via option 335.

In another embodiment enabling calling user to view profile of called user and/or call log e.g. chat call log of called user and/or view logged or past calls e.g. chat calls related saved, shared and conversed contents 320.

In another embodiment during or while one or more types of call e.g. chat calling, calling user [e.g. Yogesh Rathod] 201 is enabled to end or terminate one or more types of call e.g. chat call via button or option 350.

In another embodiment during or while one or more types of call e.g. chat calling, calling user [e.g. Yogesh Rathod] 201 is enabled to end or terminate or hung up one or more types of call e.g. chat call any time after calling to called user including before or after acceptance of one or more types of call e.g. chat call by called party.

Figure 6:
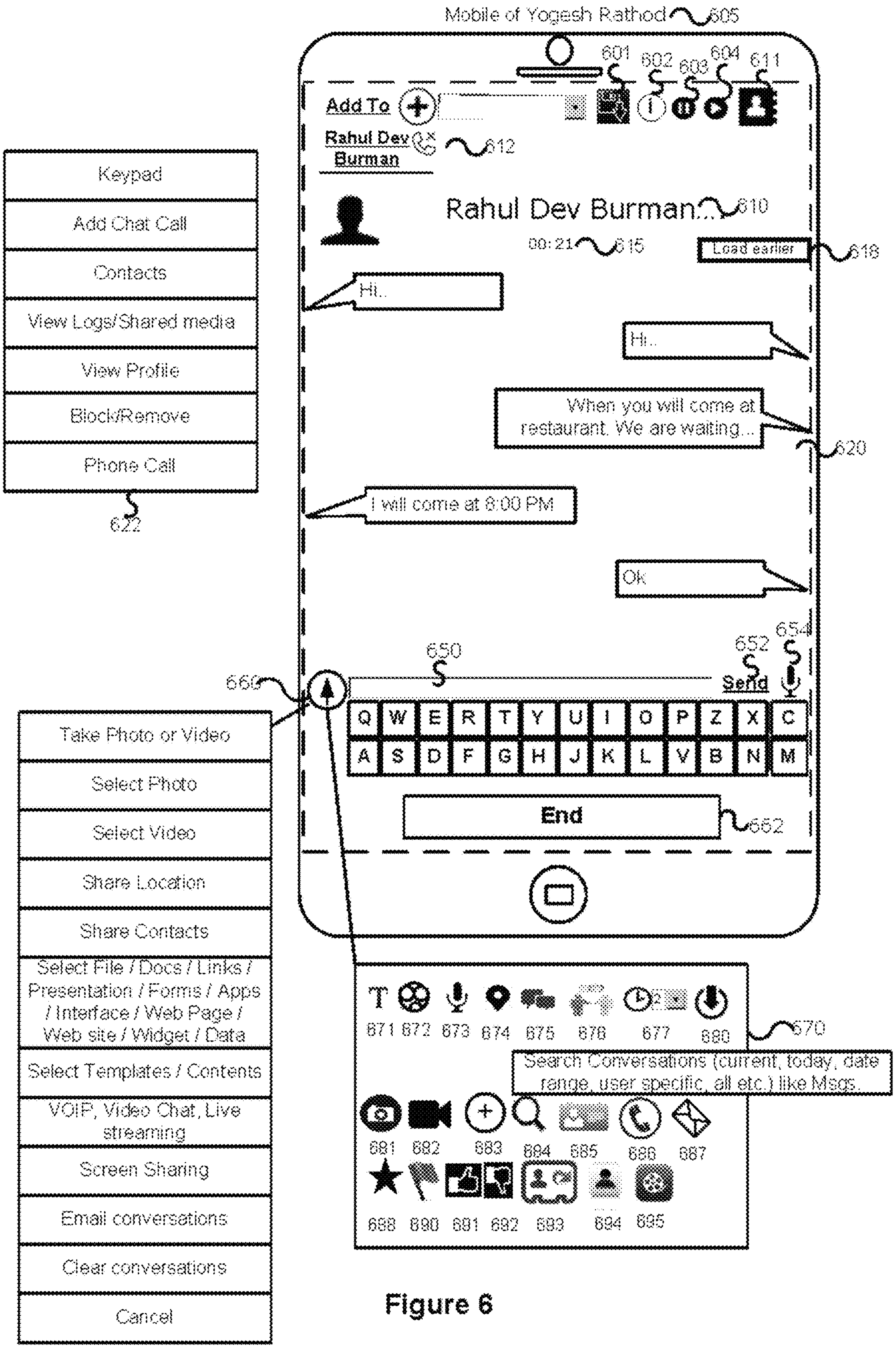
Figure 8:
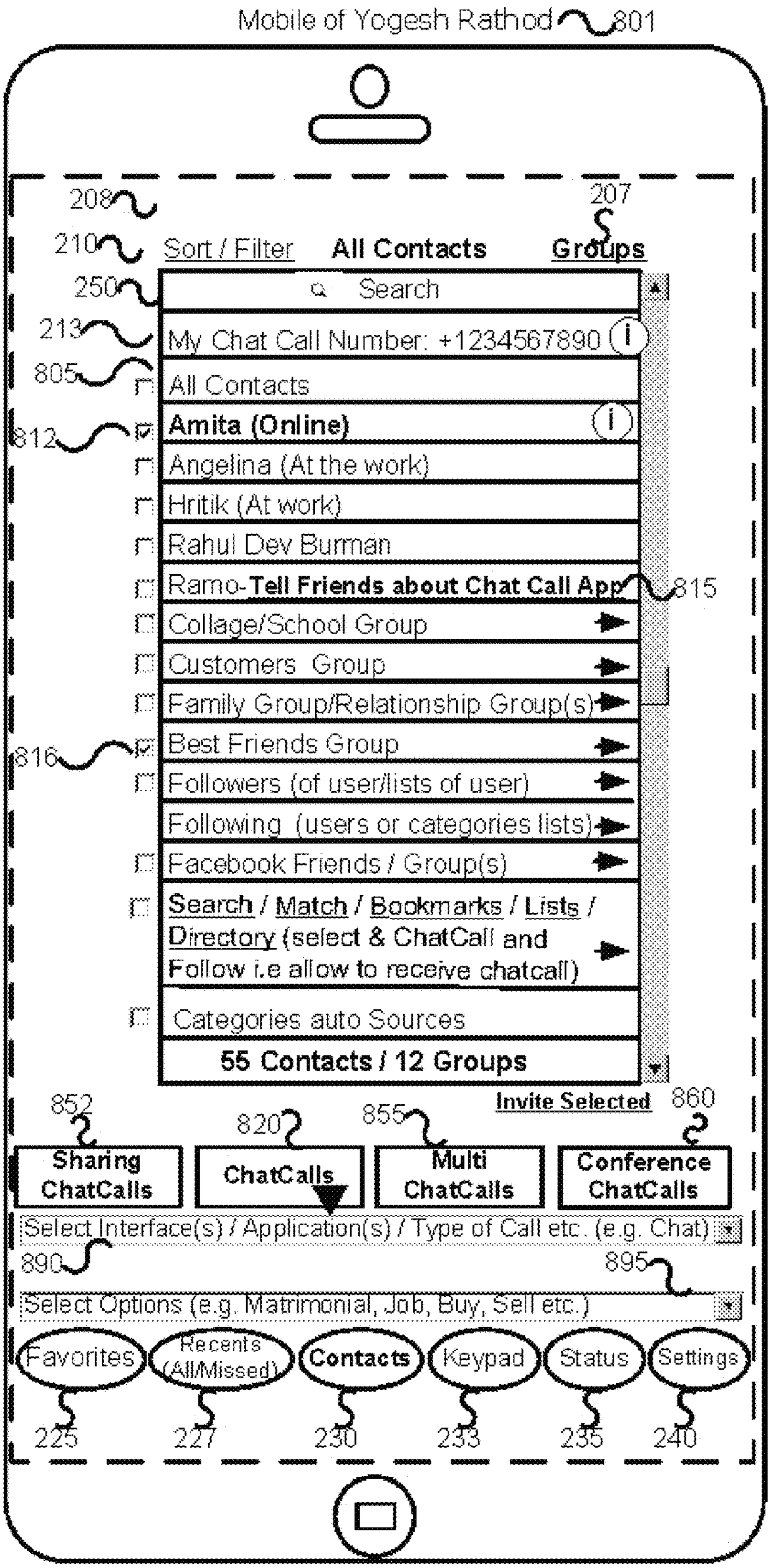
FIGS. 8 to 14 illustrates exemplary graphical user interface (GUI) relates to group chat call by calling user to selected called users.

FIG. 4 illustrates exemplary presented graphical user interface (GUI) or call e.g. chat call incoming interface for called user while one or more types of call e.g. chat calling by other user to called party or chat call receiving user e.g. [Rahul Dev Burman] 405. Called user e.g. [Rahul Dev Burman] 405 based on setting can view chat caller id or name of calling user e.g. [Yogesh Rathod] 407 and chat calling status 410. Called user e.g. [Rahul Dev Burman] 405 is enabled to ignore or decline chat call 435 or send message or status 430 to notify calling user that user will call later or remind user within particular period of time 425 or accept chat call only for receiving shared contents 428, wherein calling user notifies that called user will not reply but real-time accept & view shared one or more types of multi-media or contents and message(s) or answer or accept chat call 440 within particular period of time or ringing of chat calling or as per set rule(s), preferences or settings. Called user e.g. [Rahul Dev Burman] 405 can access, switch and can take one or more actions on other current 460 & 451, incoming 455 and outgoing 452 calls e.g. chat calls including view & access incoming interface, outgoing interface, call type of interface(s), accept or end incoming call, view status of outgoing call, hold, merge or separate call, pause or restart call & like. In another embodiment enable called user to pause incoming call for set allowed period of duration and start again within said allowed duration to take any action on incoming call e.g. chat call including accept or reject or miss or send message or status based on settings including allow pause for set period of duration only FIG. 5 & FIG. 6 illustrates exemplary presented one of the type of call specific e.g. chat call related interface including chat graphical user interface (GUI) for calling and called user at the time of acceptance of chat call by called user. In other type of call one or more type of other type(s) of pre-set by system, pre-select by calling and/or called or group(s) of user(s) or admin(s), auto select or auto matched based on one or more factors, pre-configured or customized interface(s) presented to calling and/or called user(s). When calling user e.g. [Yogesh Rathod] 201 makes chat call 220 via device 130/140 to selected user e.g. [Rahul Dev Burman] 212 and called user e.g. [Rahul Dev Burman] 405 accepts or answers chat call 440 via user device 135 or 145 then called user e.g. [Rahul Dev Burman] 505 and calling user e.g. [Yogesh Rathod] 605 is presented with interface e.g. pre-set interface e.g. chat interface with various types of options including end call e.g. chat call, pause or re-start call e.g. chat call, save call session e.g. chat call session related data including converse & shared contents and user data based on allow to save settings of calling user. In one embodiment called user e.g. [Rahul Dev Burman] 505 and calling user e.g. [Yogesh Rathod] 605 is/are enable to access various options 522 as discuss in detail in FIG. 1 and can send 522 one or more messages 550 or voice messages 554 and can share one or more types of media 560 including captured or recorded or searched or matched or selected photo, video, file, links, documents, images, audio, voice, presentation, forms, applications, user controls or objects, interfaces, screens, web page, web site, widget, databases, data, resources, location information, emoticons, virtual goods, stickers, contacts, status, updates, micro blogging, presence information, full or partial profile data or user contacts or connections, email conversations, clear conversations. Calling user e.g. [Yogesh Rathod] 605 is enabling to add call e.g. chatcall to one or more current calls e.g. chatcall(s).

In another embodiment called user e.g. [Rahul Dev Burman] 505 and/or calling user e.g. [Yogesh Rathod] 605 is/are enable to apply, set, update & select setting for auto removal of chat messages or one or more types of shared messages or media or contents within particular period of time 577 and/or 677 from user's own device and are called user's device and from server's 110 database(s) 115.

In another embodiment called user e.g. [Rahul Dev Burman] 505 and calling user e.g. [Yogesh Rathod] 605 is/are enable to add chat conversation to story 575 or 675 and/or collaborative story 576 or 676 and save 580 or 680 current chat messages or conversations at user's local device or cloud storage or server or any other storage medium.

In another embodiment called user e.g. [Rahul Dev Burman] 505 and calling user e.g. [Yogesh Rathod] 605 is/are enable to provide rank or ratings or comments or reviews 588 or 688 to calling or called or chat participant users and/or one or more messages, report user 590 or 690 including report user as spammers, inappropriate, violate of terms & conditions, like 591 or 691 or dislike user or message or shared content 592 or 692, forward chat call or chat messages or conversations or one or more types of contents to one or more contacts.

In another embodiment real time call based system e.g. chat call's application or service can use push technology to provide real-time text, which transmits messages character by character, as they are composed.

In another embodiment chat user 505 or 605 are presented with duration 515 or 615 of chat conservation or chat session related conversation or sharing related to one or more types of call e.g. particular chat call.

In another embodiment chat user 505 or 605 are enabling to load earlier 518 chat messages or share contents.

In another embodiment called user e.g. [Rahul Dev Burman] 505 and/or calling user e.g. [Yogesh Rathod] 605 is/are enable to terminate or end or hang-up chat call 562 or 662. At the time of termination by called user e.g. [Rahul Dev Burman] 505 and/or calling user e.g. [Yogesh Rathod] 605 real time call based system e.g. chat call's application or service close or hide chat interface and end chat session associate with particular chat call and based on privacy settings auto save or ask user that user want to save or not save or removes chat call associate messages, voice messages, logs, metadata, system data, shared media or contents from calling and/or called user's device(s) and/or server(s) and/or databases(s). In another embodiment before permanently removing of said chat call associate chat messages or chat conversations or shared media or contents, real time call based system e.g. chat call's application or service stores indexes of said chat call related messages, conversations, shared media or contents, logs, metadata & system data including called or calling user's identity, user names, mobile identity, location information, presence information, categories, shared link(s) associate contents, data, monitored, tracked & stored user's activities, actions, events, transactions, senses, location, check-in places, status, updates & behavior, voice to text data, chat call conversation related contextual or matched contents of/from one or more sources including search results from one or more sources, databases & like, date & time, duration of chat call or chat call related conversations, position of keyword(s) at black box index database(s) 115 of server(s) 110 (e.g. identify, mark, map, store & index keywords, dictionaries, key phrases, categories, taxonomies appeared in said chat call related shared contents, logs & messages) and make them available for or use for advertisers or advertisements or advertisement campaigns.

In another embodiment FIG. 7 illustrates exemplary presented graphical user interface (GUI) for enabling user to select, input, apply, set & update privacy settings and preferences related to one or more type of call e.g. chat call including remove call associate contents including conversed contents, shared contents e.g. chat contents after end of chat call session 725, save call related data e.g. chat call or chat call session related conversation 726, add or allow call e.g. chat call associate data or shared contents to add to story 727, add or allow call e.g. chat call associate data or shared contents add to collaborative story 728, enable real-time text i.e. use push technology to provide real-time text, which transmits messages character by character, as they are composed and/or enable real-time network status of call e.g. chat call participant user(s) and/or enable real-time typing or composing status of call e.g. chat call participant user(s) 731, enable user to set privacy settings including allow anyone to one or more type(s) of call e.g. chat call user 732 based on one or more types of preferences, only allow people in my contact list to one or more type(s) of call e.g. chat call me 733, allow to show user's selective profile data and/or status and/or last seen and/or current location or check-in place or selected location(s) or place(s) 735 to contacts or related users, allow to show to contacts or related users that user installed application or allow to show that user installed application only to contacts or related users to whom user call 736, auto save shared media during one or more type(s) of call e.g. chat call or enable or allow call participant users to save user initiated one or more types of call e.g. chat call 737, enable to set settings related to one or more types of calls related various Notification Settings 761 including conversation tones i.e. play sound or vibration or ring tone for incoming and outgoing messages or shared contents, About 765, manage, view, update & share user profile 766.

Chat Call Routing/Forwarding 740 allows user to direct chat calls to single or multiple phone numbers, including user's home, office, mobile or any phone worldwide and allows for forwarding based on Caller ID or the time of day a call is received.

Blocked 741 i.e. Call Blocking allows user to block incoming chat calls from unwanted callers, unknown numbers or area codes. Easily block callers during a call or add them to user's blocking list in user's account.

Chat Call Transfer 742 is an In-Call Feature, allowing user to transfer incoming chat calls from user's phone to another phone number or extension at the press of a button. Call Transfer is activated using hard buttons or soft buttons on any phone.

Chat Call Waiting 743 i.e. switch between two concurrent incoming chat calls, when a second call arrives while users are on an ongoing call, user will hear a beep to indicate a call is waiting. By using the button, the send button, the user will switch between the two calls e.g. chatcalls.

Chat Call Handling Rules 745 are the set of options created by user to route incoming one or more types of call e.g. chatcalls to user's account to user's desired location. Using Call Handling Rules, user can route incoming calls e.g. chat calls to a single destination, or different destinations based on the day and time or the Caller ID of the call e.g. chat call received. With Call Handling Rules, user can send calls e.g. chat calls to database—have user's messages save to database, Custom greetings—create your own audio messages, Menus—make a set of options users can select, user's computer—send and receive on user desktop.

Chat Call Schedules 746 allow user to route incoming chat calls to different numbers, extensions, greetings, menus and more based on the day and time the call is received. A call received during business hours can be set to have user's normal greeting while a call received after business hours can be set to have user's After-Hours Greeting. User can plan ahead for holidays and days off. Each schedule allows user to define exceptions for holidays, vacations and other events. Exceptions allow user to bypass user's regular schedule and perform another action for a defined period of time. User can define as many schedules and exceptions as you need.

Do Not Disturb 748 when activated will cause the phone to automatically ignore any or one or more types of calls e.g. chat calls and send them to the next action in user's designated call handling rules. Do not Disturb including Accept one call e.g. chat call at a time (busy tone to other), allow one or more types of call e.g. chat calls as per Scheduled including date & time or from date/time To date/time for one or more contacts/groups, Allow calls from (Everyone, No one, Favorite, Groups), Allow calls only when status is "online" or "available" to accept call, Silence (Always, only when phone is locked), Auto accept one or more types of call e.g. chat call for all or selected contacts/ groups (because it is text based), auto accept sharing type of call when new contents shared i.e. captured, recorded & typed contents shared including captured photo/recorded video or typed new text only (not allowed selected or pasted or copied contents), allow only from contacts or everyone, notify called user that Can user call e.g. Chat Call particular or selected user(s) and based on their acceptance indicating user that said user(s) are allow calling user to call them, enable user to send message or status to calling users or enable to send schedule date/time when user is available.

Respond with Text 750 enable user to respond with text to calling user when user is not available or busy or enable user to set up or create or update messages for reject call with message.

Show my caller ID 751 enables the phone number of the calling party to be displayed or not displayed on called user's application or device. Using Call Forwarding or Call Blocking, user can send specific callers to different locations (save messages, greeting, disconnect, etc) based on their Caller ID.

Reminders 753 enabling user to remind call e.g. chat call to one or more contacts.

Tell Friends/Invite 755 option enable user to invite non-registered users of real time call based system e.g. chat call's application or service in user's contacts for enabling them to install or subscribe or user or access real time call based system e.g. chat call's application or service and chat calling to each other.

Call e.g. Chat Call Notification 757 option enabling user to setup user's account to send a simple notification via email and/or SMS (text) message for incoming chat calls. Messages contain the Caller ID of the caller, the number or extension they dialed, date, time and duration of the call.

Call e.g. Chat Call Saving or Recording 760 i.e. monitors, reviews, indexes and saves one or more types of call(s) e.g. chatcalls and associate shared messages or contents to user's account.

Manage user account 767 including manage subscriptions, payments, change device or mobile or smart phone number, delete account and view network usage including number of messages send or receive, media or message byte shared, Backup one or more types of call e.g. chat call related date or conversations 768 enabling user to take backup and/or Restore one or more types of call e.g. chat call related date or conversations 770 wherein enabling user to restore one or more types of call e.g. chat call associate data and environment and/or Archive one or more types of call e.g. chat call related date or conversations 771 and/or email one or more types of call e.g. chat call related date or conversations 772 of all or selected calls e.g. chat calls related conversation, sharing, environment, activities, actions, events, transactions & logs, Clear all for one or more types of call e.g. chat call related date or conversations 774, and Delete all for one or more types of call e.g. chat call related date or conversations 769.

Network Status 773 including presenting user with status of internet network is connected or not connected or strength of signal of internet network or data network.

Chat Interface Settings 777 enabling user to set, select & apply Font, Size, Color, Wallpaper, Notifications and Ring Tones including Select Ringtones from List, Create or Add New Ringtones, Volume, Vibrations, Vibrate when ringing, Dialing keypad tone for one or more types of call(s) e.g. chat call.

One or more types of Call Settings e.g. Chat Call Settings 788 including Auto Reject Mode (Off, All Numbers, Auto Reject Numbers), Auto Reject List (Create), Set up call reject messages, voice enabled (answering/ending chat calls), Caller ID (On/Off), Auto Redial, Show Call Photo, Video & Audio.

Multi Users Settings 778 enables administrators to create user accounts, assign rights, privileges, policies, privacy settings and preferences, assign allowed features and access of types of chat calls and like, manage extensions, interactive Options & Queues.

Chat Call Logs 780 enabling user to view & access recent, incoming, outgoing, cancelled, & missed chat call, associate duration, date & time.

Add Contact option 785 enables user to search, match & select users of networks or friends, import contacts, invite contacts, save a chat call number.

In other embodiment enabling user to apply settings for group calling call ending including end group call when calling user ends call or end call when one of the call members of last two active members ends call 701.

In other embodiment enabling user to apply setting 702 for showing user's number to one or more called users and/or group(s) of contacts including user identity, phone number or call type number, user profile including name, photo & contact address for enabling him/her to make him/her completely anonymous.

In other embodiment enabling user to set, select, input & update one or more types of call initiation e.g. after acceptance of ChatCall by at least one called user ChatCall conversation start message and/or end message 708 including text, image, photo, video & emoticons.

In other important embodiment user can select one or more types of network 704 for calling and accept call and conduct one or more type of call specific communications, collaboration, messaging, sharing, participations including use data network or cellular/mobile network or auto select network based on strength of signal or availability of network for communication. In another embodiment in the event of non-availability of Data or Cellular network ask user to select available network or auto switch available network. In another embodiment in the event of non-availability of Data or Cellular network during or within call session auto switch network and associate interface.

In other embodiment enabling user to set auto acceptance of one or more types of call e.g. ChatCall 705. In other embodiment enabling user to set auto acceptance of one or more types of call e.g. ChatCall 705 based on schedule (date & time, date & time ranges, not in particular date & time ranges), one or more rules, settings & preferences.

In other embodiment enabling user to allow anyone to (1) ChatCall User and (2) allow to following to user (other than contacts) and in other embodiment enabling user to list user and user profile in/at particular categories directory, so other users of network can follow user or ChatCall to user via button or link or option or icon 706.

In other important embodiment enabling user to follow preferred users' of network 707 or allow selected users to call user or accept subscribed users' calls e.g. ChatCalls based on settings & preferences including follow for particular categories, keywords, entities, locations(s) specific users, provider of particular services, accept one or more types for call e.g. ChatCall, accept one or more types for call e.g. ChatCall as per schedule date & time and date & time ranges, accept only for particular period of times or duration, accept daily particular maximum number of times of calls. In other important embodiment enabling user to search, match, select, select from directory or suggested lists and follow or subscribe or allow them to call to users and accept or reject or miss their calls.

In other important embodiment enabling user to allow other users of network to follow user or accept user's particular type of call including accept calls of user for particular defined service, purpose, task, activities, actions, events, transactions, categories, keywords, locations, when user at particular checked in place or when particular type of user's presence information including online or available or available for calls.

In an important embodiment enabling user to show or hide user identification details from following users or followers 707.

In other important embodiment providing points to user for allowing other users of network to follow user or for make calls to followers for providing particular type(s) of services, making one or more types of calling to followers, providing one or more types of information via call(s) to followers 707.

In other important embodiment deduct points from user's total point for following other selected user of network for consuming one or more types of services and data via real-time call(s) from them 707.

All these settings as discussed in FIG. 7 are not compulsory. In other embodiments Settings types are based on one or more types of call. Settings need for one type of call cannot necessary for other types of call.

Figure 9:
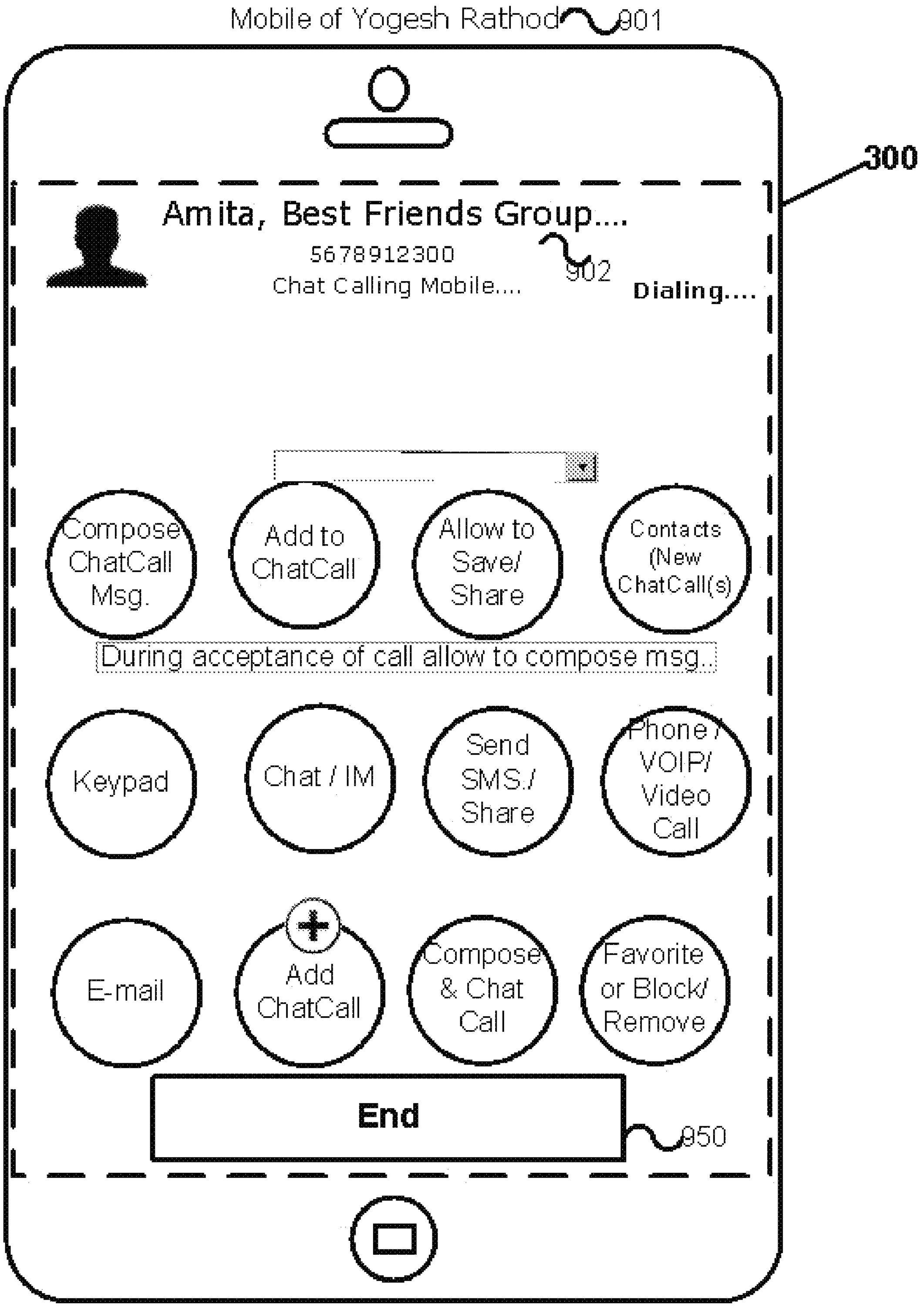
Figure 10:
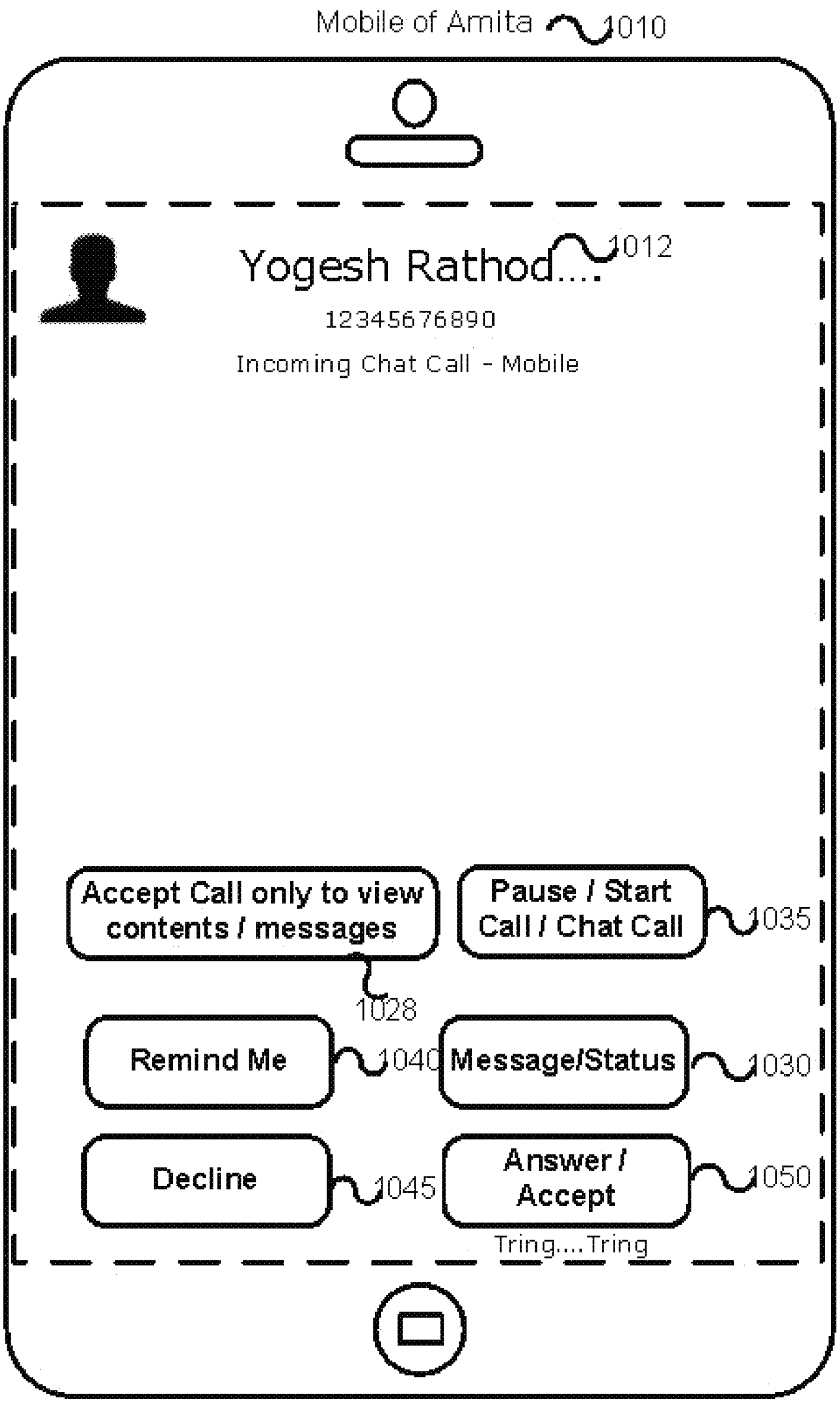
Figure 11:
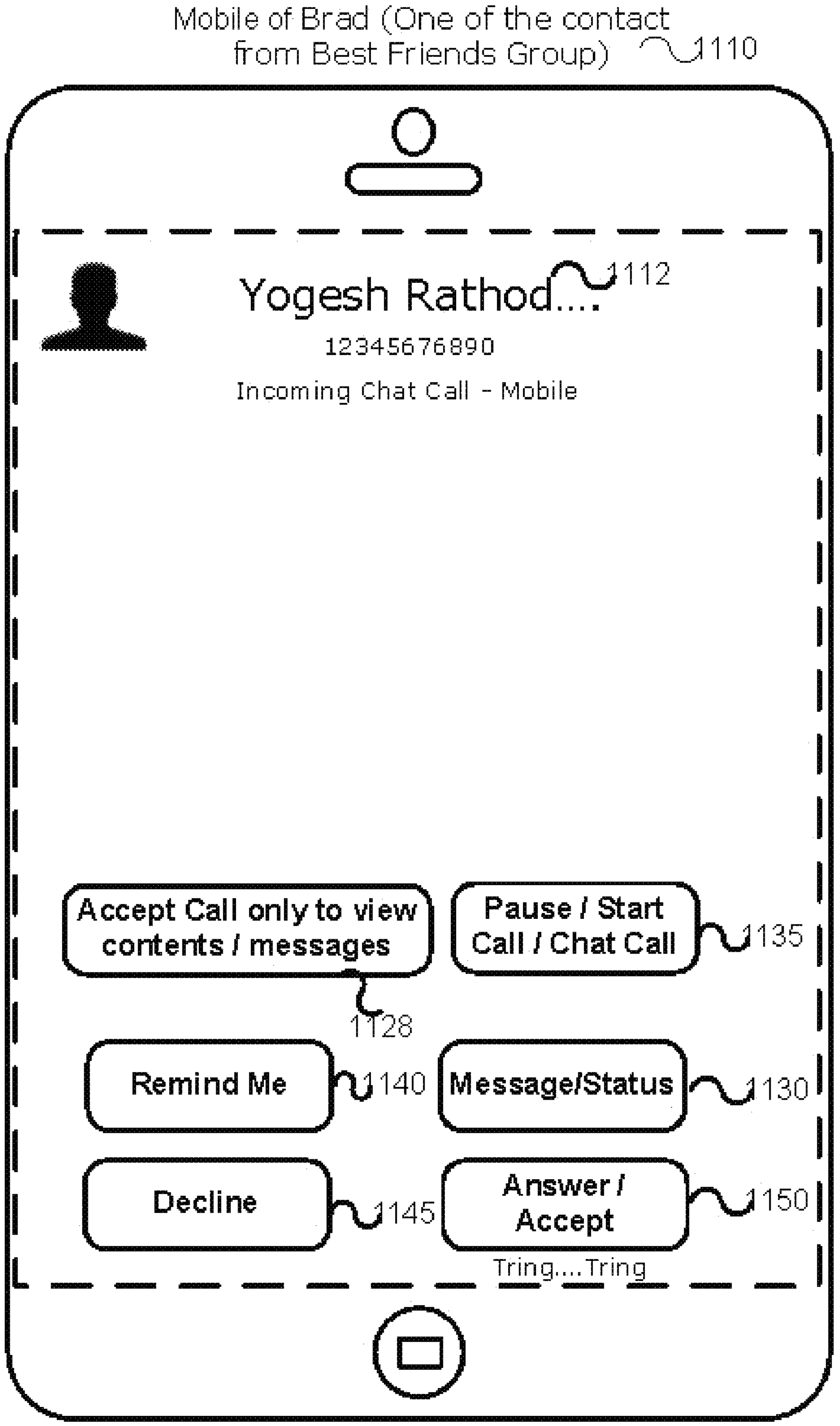
Figure 12:
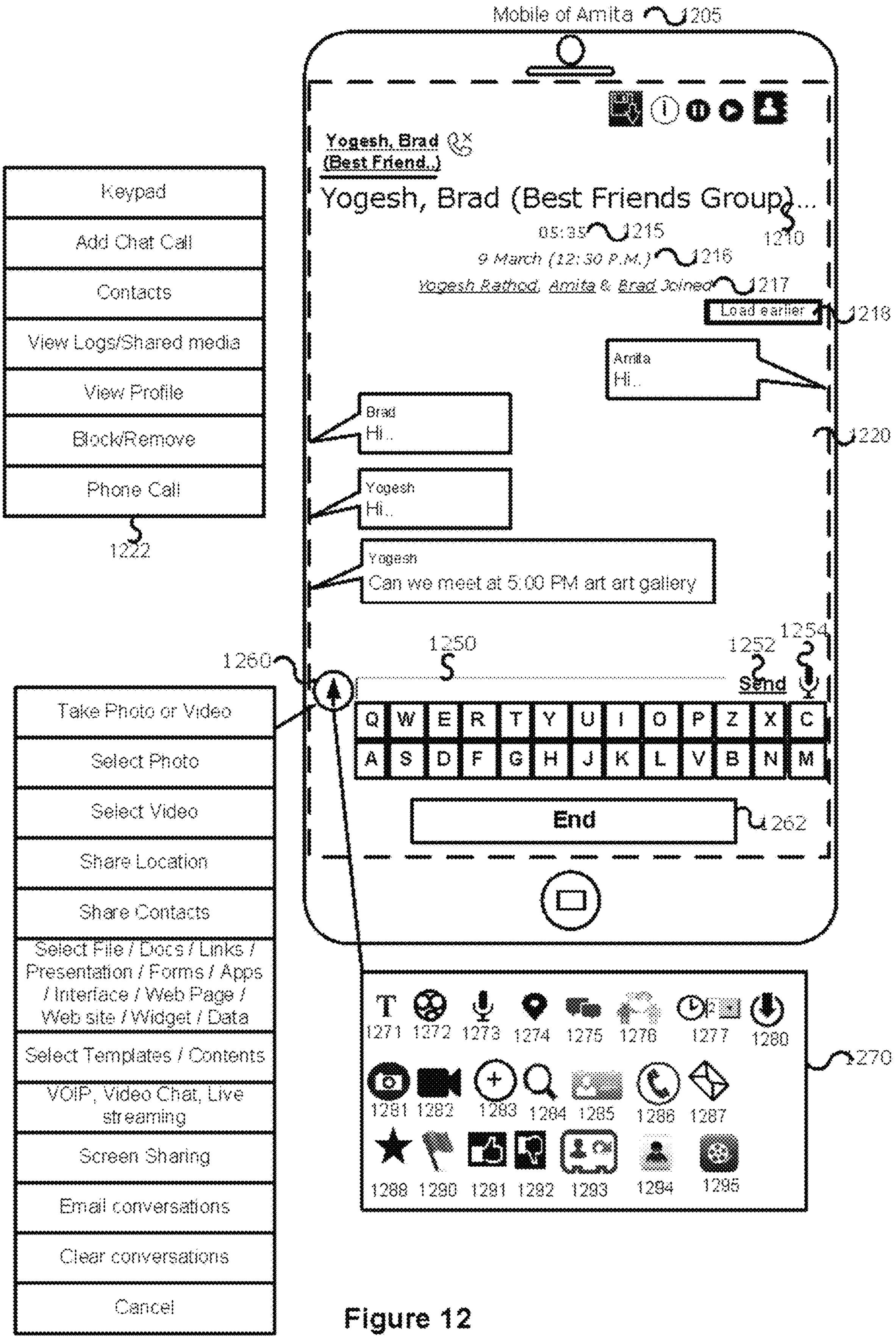
Figure 13:
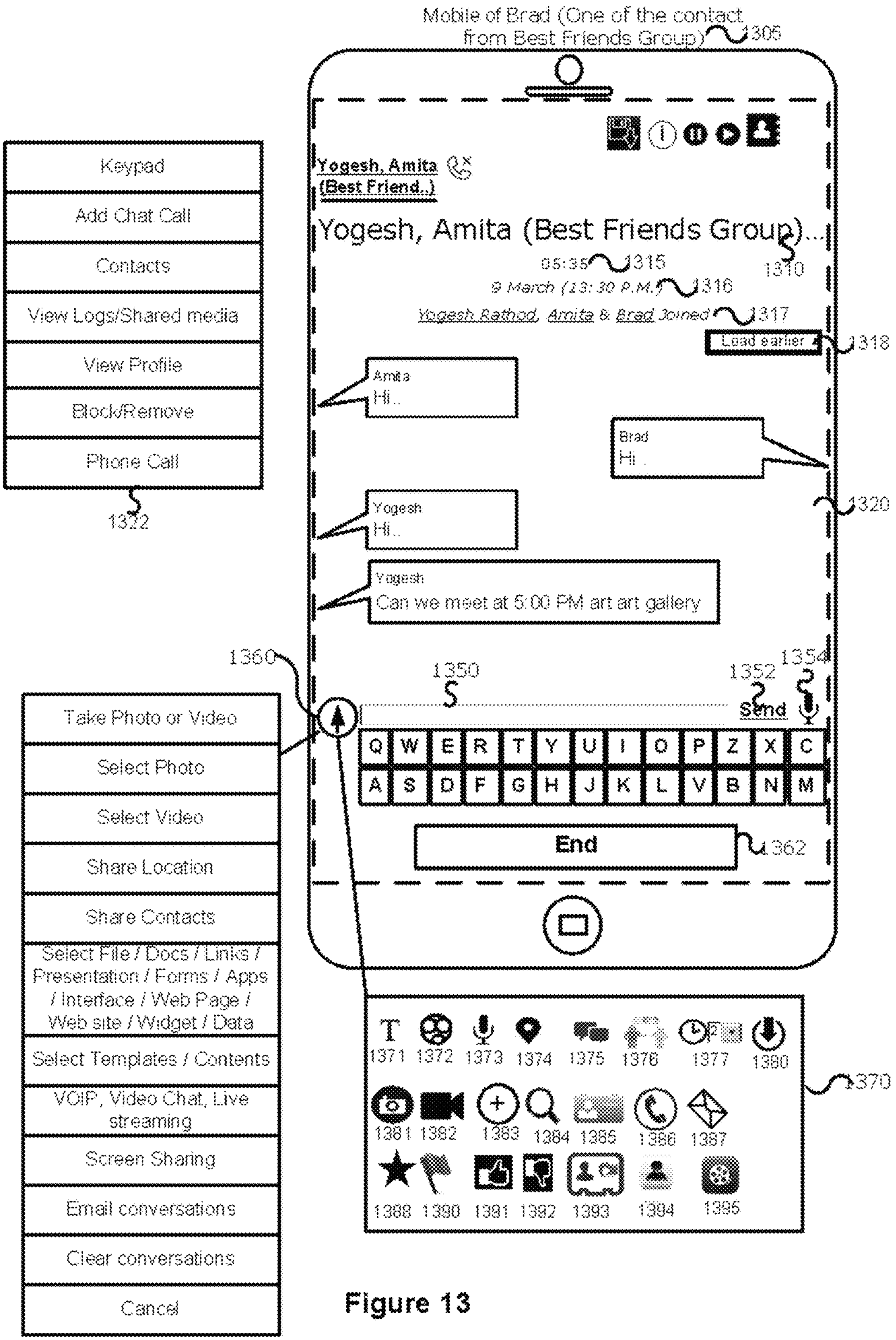
Figure 14:
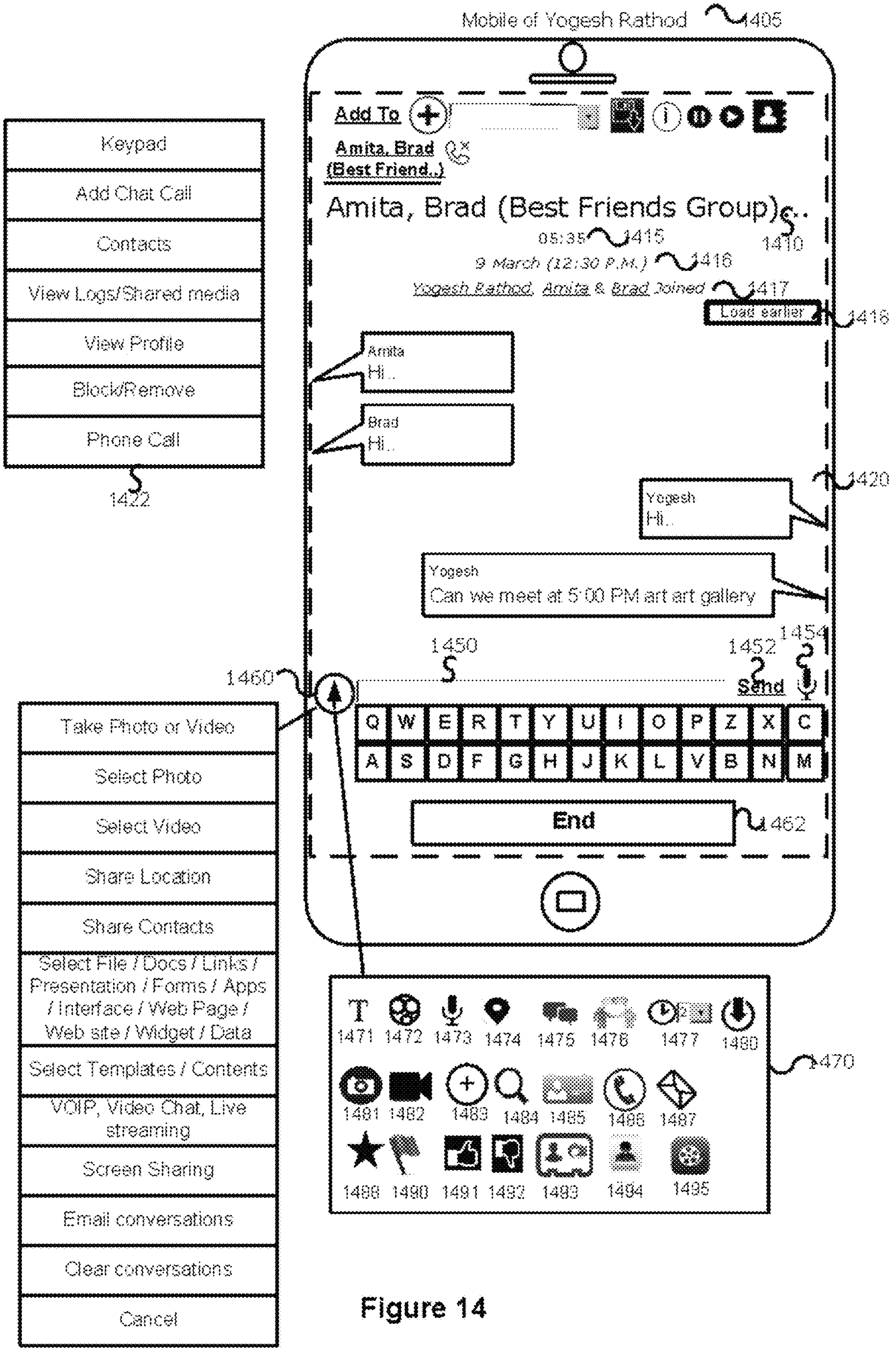

FIGS. 8 to 14 illustrates exemplary graphical user interface (GUI) relates to one type of group call e.g. group chat call by calling user (e.g. user [Yogesh Rathod] 801) by using device 130 to selected called users (e.g. contact user [Amita] 812 and contact group [Best Friends Group] 816) at their device 135 or 145 from contacts 805 via clicking or tapping chat call button 820. FIG. 9 illustrates presented exemplary one type of call e.g. chat call specific graphical user interface (GUI) to calling user 901 at the time of calling to selected contact users 902. Calling user wait for response or answer or acceptance of chat call from one or more called user(s) or user(s) from group(s) 903. Calling user can end or terminate chat call 950 before chat call accepted by called user(s) or after chat call accepted by called user or during establishment of chat call session between calling user(s) and called user(s). In the event of acceptance of chat call from one or more called users via clicking or tapping "Answer/Accept" button 1050/1150 by called user [Amita] 1010 from installed application at user device 135 and one of the member of group [Best Friends Group] user [Brad] 1110 or from installed application at user device 145, real time call based system e.g. chat call's application or service present chat interface to calling user [Yogesh Rathod] 1450 and first and subsequent call accepted users [Amita] 1205 and [Brad] 1305. Calling and called users can communicate, collaborate, participate, share or send or receive messages 1252/1220, 1352/1320 & 1452/1420, voice messages 1254, 1354 & 1454 and one or more types of media via various options or menu 1260/1270, 1360/1370 & 1460/1470 as discuss in detail in FIGS. 5 & 6 (560/570 & 660/670). Each joined user's name and link or profile object 1217, 1317 & 1417 presented to each participated users, wherein viewing user can access or click or tap on said link and can view shared profile, status, availability or presence information, updates, associate user actions including email, call, save conversation, remove conversation after chat call setting, block, forward or route, assign, transfer, clear conversation, email conversation, remove from contact, end chat call with said user, provide ratings & comments, like or dislike, send instant message, share one or more types of media, view current conversation of said users, view media shared by said user, saved history or logs or activities of said link associate user of said users. Based on setting call terminated or ended in the event of calling user end or terminate chat call 1462 or chat call terminated when one of the last two participant ends chat call 1262 or 1362 or any other joined or participants of chat call or chat call terminated up-to the last participant end chat call. Length of duration or period of time of collaborative chat call session or chat call conversation is display to all chat call participants 1215, 1315 & 1415. Each chat call participants can view send or receive messages or shared contents at chat interface 1220, 1320 & 1420. Chat call participants can send or receive or share one or more types of media from/to one or more selected participants of chat call. Chat participant users 1205, 1305 & 1405 can use or access other options or features or user actions or functions 1222, 1322 & 1422 as discussed in FIG. 3.

Figure 15:
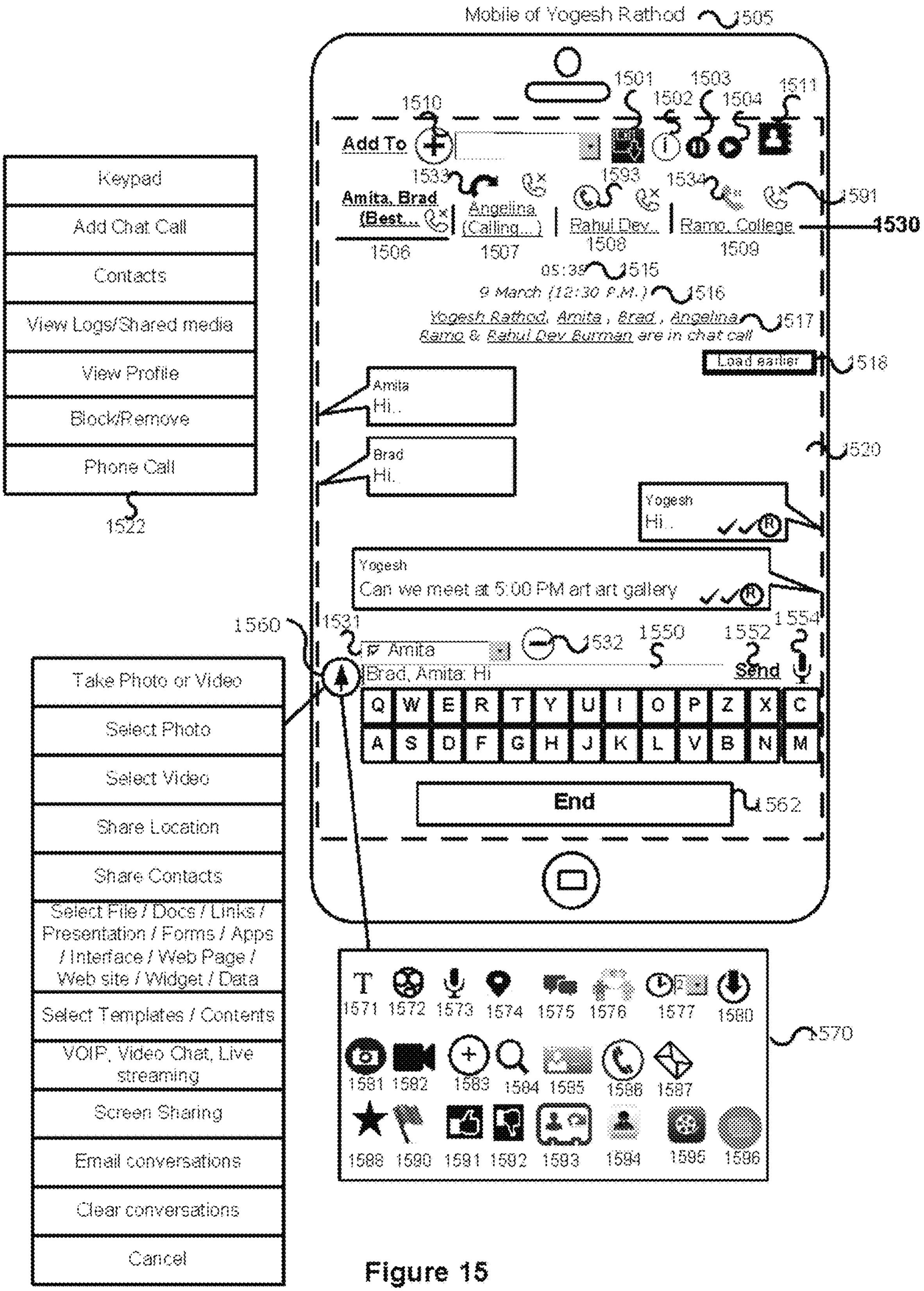
FIG. 15 illustrates exemplary graphical user interface (GUI) for enabling user to manage one or more incoming, outgoing, accepted one or more types of calls and enabling to initiate & manage multiple calls, merge calls, separate calls from current calls, add to current calls, group calls, conference calls, calls to followers, one or more selective types of calls including jobs, matrimonial, buying (calls with matched prospective sellers), selling (calls with matched prospective buyers) e.g. one or more chat calls initiated by calling user to one or more or group(s) of called users, chat call accepted by one or more called users, waiting for acceptance of chat calls, accept or reject or ignore or remove or block chat calls of other calling users, end or terminate existing chat calls, add or merge user to one or more chat calls.

FIG. 15 illustrates exemplary graphical user interface (GUI) for enabling user (e.g. user [Yogesh Rathod] 1505) to manage, view, access one or more types of one or more incoming, outgoing & active or accepted calls e.g. chat calls including chat with existing connected called users 1506/1509 via chat call associate chat interface 1520, initiate new chat call with one or more or group(s) of contacts 1507, incoming call or chat call initiated by calling user to one or more or group(s) of called users 1507, chat call accepted by one or more called users 1506 & 1509, waiting for acceptance of chat calls 1507, accept or reject or ignore or remove or block chat calls of other calling users 1508, end or terminate existing chat calls 1562, 1591, 1592, 1593 & 1594, add one or more chat calls to one or more selected current chat calls or merge user to one or more chat calls 1510. User can switch or flip (1506, 1507, 1508 & 1509) chat call specific chat interface for chatting with particular chat call associate or chat call specific called or participated or active users. User can use various options, menus, features, functions and user actions 1522, 1560 & 1570 describe in details throughout the specification.

In another embodiment based on addition of incoming and outgoing calls, system dynamically adds tabs (1506, 1507, 1508 & 1509) where user can show name of calling or called user(s) and/or group(s), current status of calls including calling or outgoing, incoming, new message arrived, end call and can take one or more actions including change tab order via drag and drop, merge calls, separate calls, end call 365, accept incoming call 370, tap on tab to switch or tap on particular tab to make current tab on hold and converse, communicate & share with called user(s) related to current active call or tap on tab to switch or tap on particular tab to view incoming call interface to accept or reject call or send message or select remind me option or view outgoing call interface to wait for acceptance of call by called user or end call.

In another embodiment during or while one or more types of call e.g. chat calling, calling user [e.g. Yogesh Rathod] 1505 can access and dial or calling e.g. chat calling to one or more other contacts via contacts option 310. In the event of calling to other contacts and/or groups, system dynamically add tab(s) 1530, so user can tap on that tab and can view current status of that call or take one or more actions including call is ringing, call accepted, end call by called user, call is missed or cancelled, calling user can end call, select one or more options as discussed in FIG. 3 and can access call type specific interface(s) presented to calling user for communication, messaging, chatting, collaboration, sharing, participation & transacting with called user(s).

In another embodiment calling user can allow called user(s) to save or re-share call related contents e.g. shared, chatted & conversed contents 1501.

In another embodiment calling user can add current call to one or more selected active call e.g. chatcall 1506 e.g. add current call with [Rahul Dev Burman] 1508 to [Amita, Brad.] call 1506, so user [Yogesh Rathod] 301 can converse with all call participants. In another embodiment user can select active tab e.g. 1506 and select one or more other active calls 1501 to add them to said active call e.g. 1506. In other embodiment user can select tab and can view profile and/or logs and/or past conversations or shared media of one or more called users or participant members 1502. In another embodiment calling user can select tab and can pause 1503 or re-start 1504 one or more call e.g. chatcall. In another embodiment user can select tab and end active call 1591, re-dial missed call 1533, accept incoming call 1593, hold or un-hold call 1534. In other embodiment user can select 1511 for select one or more contacts and can do one or more types of call including individual call, selected individual contacts and/or group(s) of contacts group one or more type(s) of call e.g. chatcall and/or multiple selected individual contacts and/or group(s) of contacts specific individual one or more type(s) of call e.g. chatcall. In other embodiments user can select one or more members 1531 of current call 1506 and can send message 1550 only to said selected users 1531. In another embodiment user can select contacts and/or groups 1531 and separate 1532 them from current call 1506, so communicate them separately. User can view length or duration of call session 1515, view date & time of initiation of call 1516 and can view call participant active called users or members or call accepted users or currently active users and can access their profile, logs, past shared data and other associate options 1517.

Figure 16:
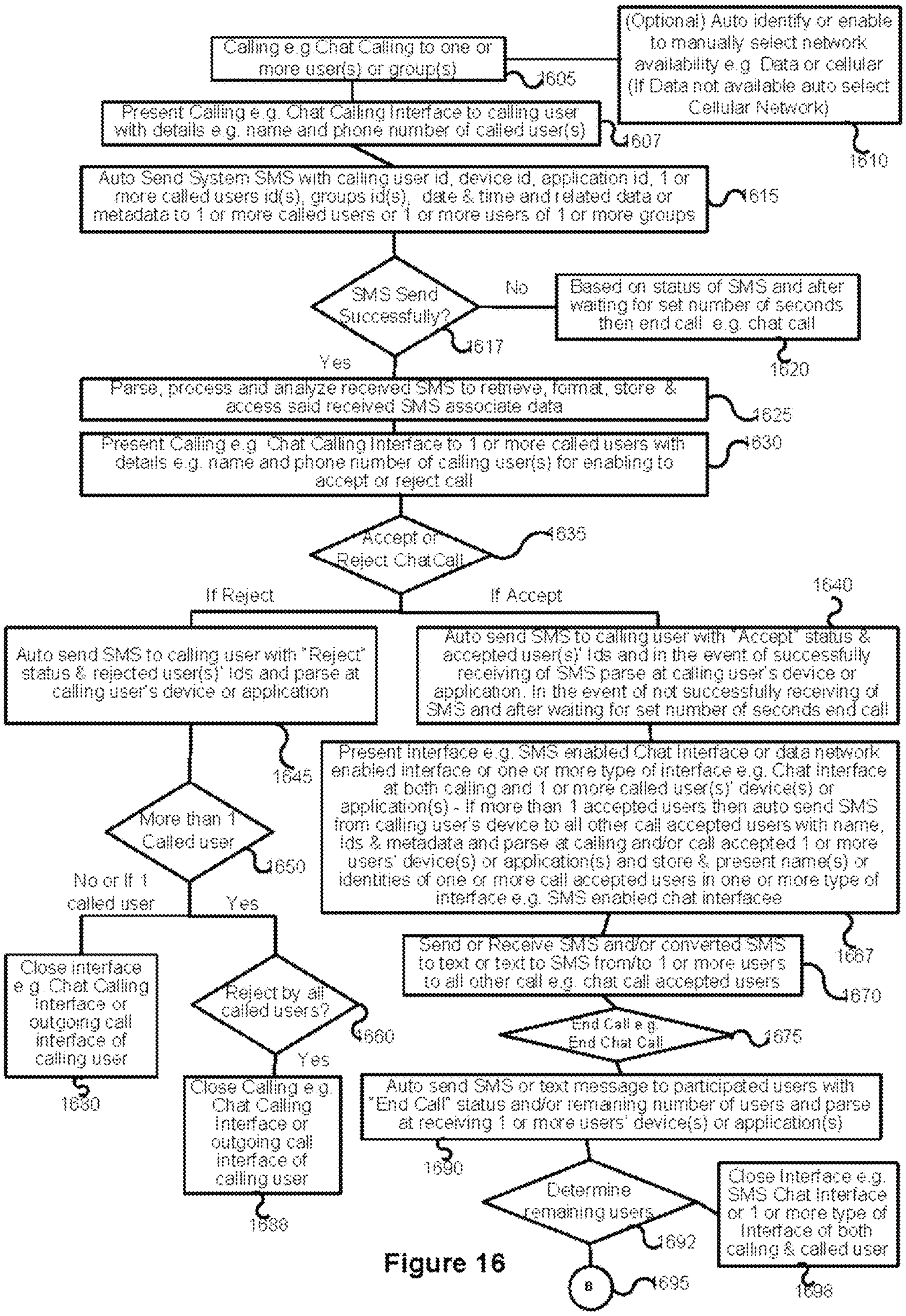
FIGS. 16, 17 & 18 illustrates exemplary flowcharts for enabling cellular network enabled chat calls wherein based on signal strength of data network or cellular network system auto select type of network or enable user to select network type including select data network or cellular or mobile network or auto select available network. For example in the event of select of cellular network user can select one or more contacts and can call to said user(s) and in the event of acceptance of call by at least one user he/she can communicate or messaging or chatting with them based on SMS.
Figure 17:
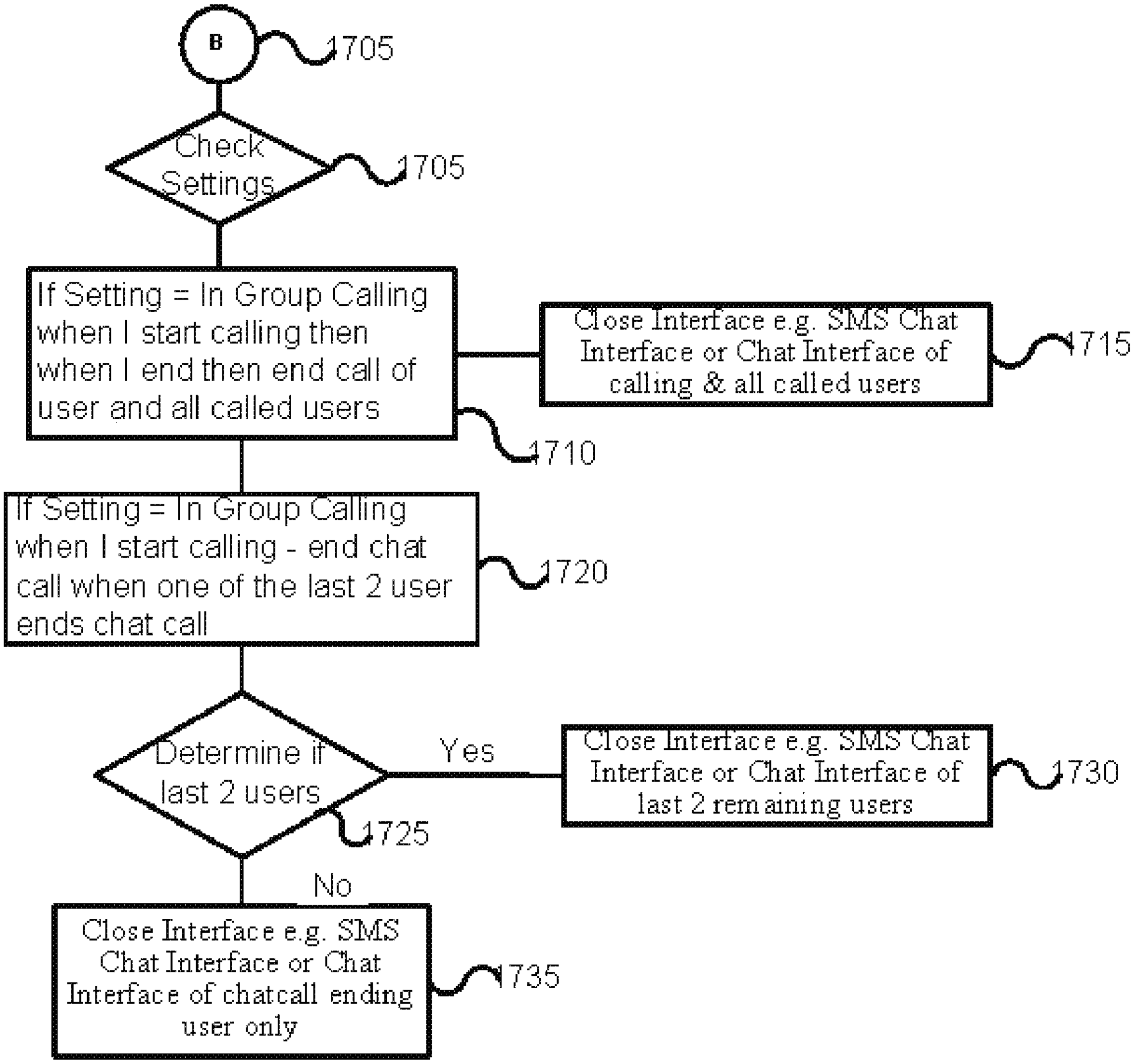
Figure 18:
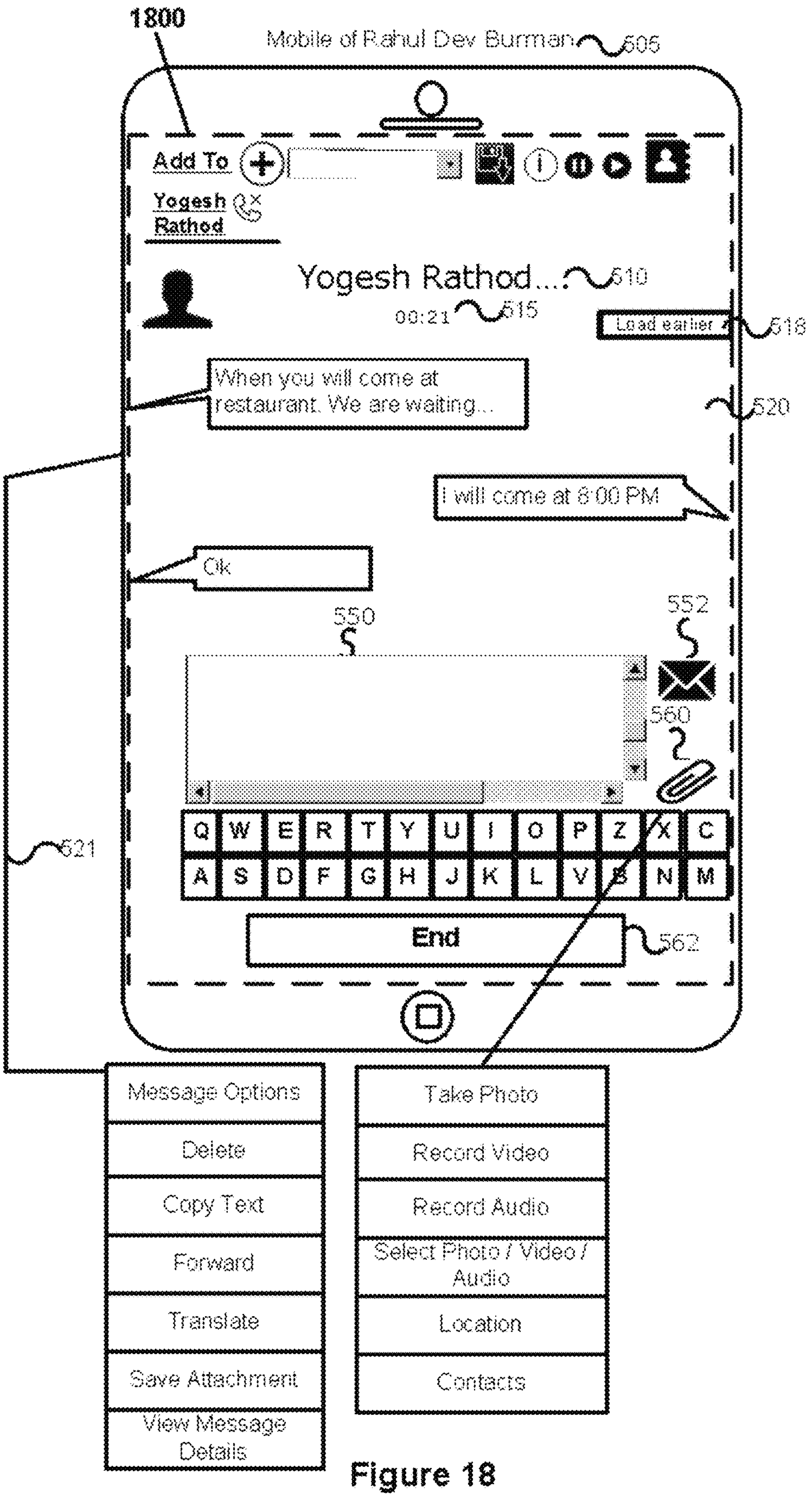

FIGS. 16-18 illustrates exemplary flowchart and exemplary interface screen 1800 for conducting one or more type of calling e.g. ChatCall via cellular network or mobile network. In the absence of data network or selection of cellular network or mobile network by user or auto detection of availability of cellular network or mobile network, user can conduct one or more types of call e.g. ChatCall via cellular network or mobile network 1610. As discuss in FIG. 1 user can select one or more contacts/groups 205 and/or select default or select type of call 290 or 295 or e.g. 220/252/255/260 for calling one or more types of call 1605. After initiating calling via tapping on contact or call button e.g. ChatCall button 220 auto send SMS, wherein SMS includes calling user identity, one or more called users identities, one or more group identities, calling user's application and/or device identity, calling date & time and related data, system data & metadata, to one or more called users 1615 and present outgoing call interface 1607 e.g. ChatCall interface where user can at least view called user's details including name and number and current call status i.e. whether called user accept or reject or miss call or call is canceled due to any other reasons and enable calling user to end current outgoing call. After sending SMS determine whether SMS is received successfully or not 1617 by called users. In the event of not successfully sending or receiving of SMS at called user's or users' device trigger ending of said call 1620 or if calling user not received any indication of receiving of SMS after set period of time e.g. 30 or 60 seconds then triggering of ending of call 1620. After successfully receiving of SMS by called user(s) parse, process and analyze SMS associate data to retrieve, format, store, interpret and associate data 1625 and based on SMS associate data present incoming call interface 1630 to called user(s), wherein incoming call interface enable called user(s) to accept incoming call e.g. ChatCall or reject incoming call e.g. ChatCall or miss incoming call e.g. ChatCall. Determination of call acceptance or rejection of call is conducted 1635. In the event of acceptance of call by called user(s) auto send SMS to calling user with "Accept" status & accepted user(s)' identity and in the event of successfully receiving of SMS parse at calling user's device or application to determining call acceptance status 1640 and present available network including data network or cellular network or call type associate (selected by calling user or default or set) interface e.g. SMS enabled Chat Interface or data network enabled interface or one or more type of interface e.g. Chat Interface at both calling and one or more called user(s)' device(s) or application(s). In other embodiment if more than 1 accepted users then auto send SMS from calling user's device to all other call accepted users with name, identities other data or metadata of call accepted users and parse at calling and/or call accepted one or more users' device(s) or application(s) and store & present name(s) or identities of one or more call accepted users in one or more type of interface e.g. SMS enabled chat interface 1667.

In the event of not successfully receiving of SMS and after waiting for set number of seconds end call and close outgoing call interface of calling user 1640.

Enabling calling and called users to draft 550 send or receive SMS 520/552 and if data network available then enable to send or receive MMS 560 including one or more captured or selected photos, recorded or selected videos and/or audio, location etc. and/or converted SMS (SMS to text or text to SMS) from/to one or more users to all other call e.g. chat call accepted users 1670.

Enabling calling and called users to end current call 1675/562. After ending current call 1675/562 triggering auto sending of SMS or text message to participated users with "End Call" status and/or remaining number of users and parse at receiving one or more users' device(s) or application(s) 1690. Determining remaining number of users conducted 1692 and if last two users remaining in current call then close Interface e.g. SMS Chat Interface or one or more type of Interface of both calling & called user(s) 1698. In another embodiment if more than last two users reaming in current call then check settings 1705 including if setting="In Group Calling when calling user ends call then end call of user as well as all called users or call participants 1710 and close Interface e.g. SMS Chat Interface or Chat Interface of calling & all called users 1715. In other embodiment if Setting="In Group Calling end call e.g. chat call when one of the last two users ends call e.g. chat call 1720 and close Interface e.g. SMS Chat Interface or Chat Interface of last two remaining users 1730 based on determination that last two users 1725 remaining in call or not. If last two users remaining in current call e.g. ChatCall then close Interface e.g. SMS Chat Interface or Chat Interface of ChatCall ending user only 1735.

Figure 19:
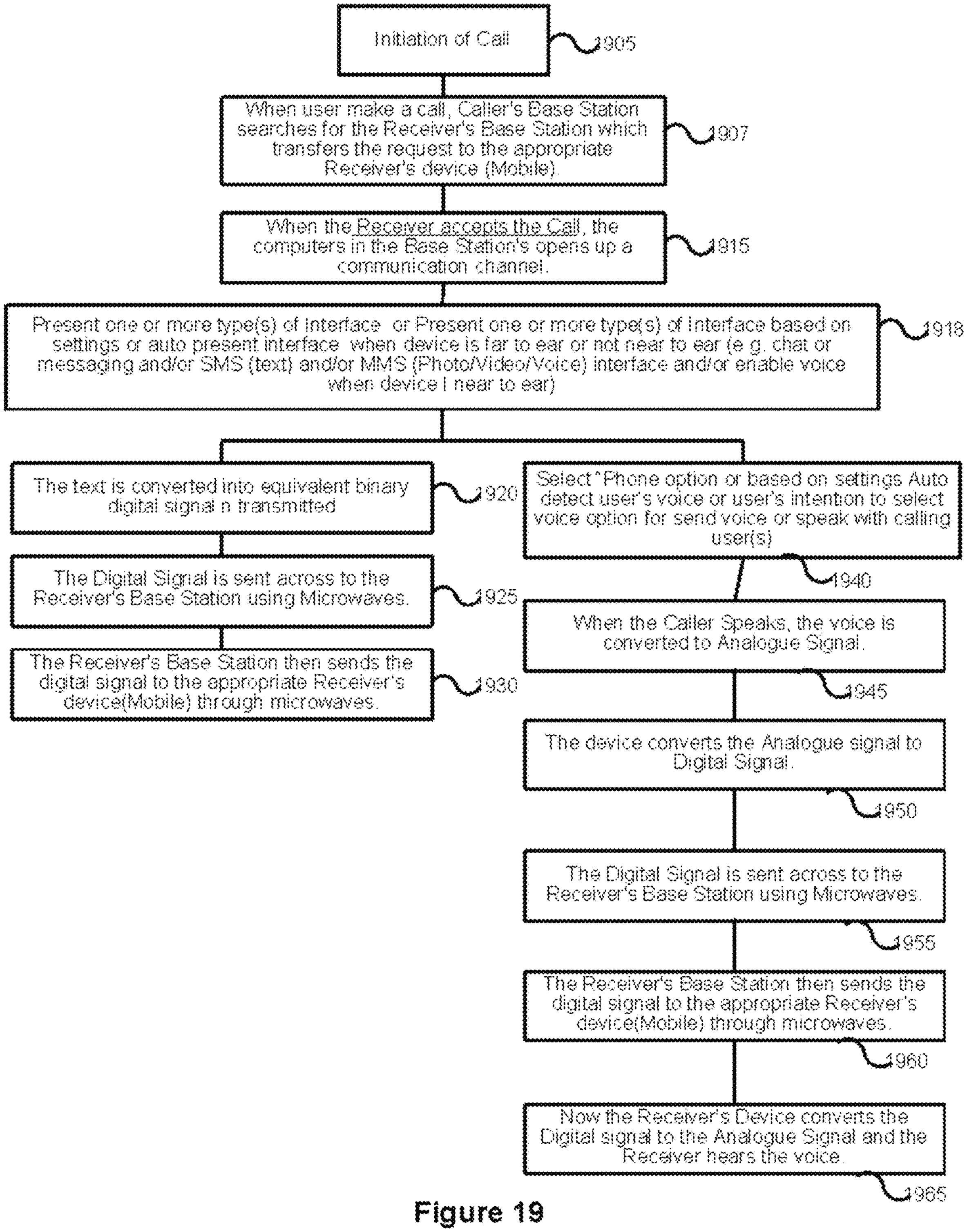
FIG. 19 illustrates exemplary flowcharts for newly proposed telecommunication standard for enabling cellular network based one or more types of calling other than voice calling including in the acceptance of call presenting one or more types of one or more interfaces, applications, web services, contents, data, objects, controls, web page, web site & any combination thereof to both calling & called user(s) or only to calling or called user(s) e.g. chat calling.

FIG. 19 illustrates flowchart of newly proposed telecommunication or cellular or mobile calling standard like phone calling standard in which when you make a call, Caller's Base Station searches for the Receiver's Base Station which transfers the request to the appropriate Receiver's device (Mobile). When the Receiver accepts the Call, the computers in the Base Station's opens up a communication channel. When the Caller Speaks, the voice is converted to Analogue Signal. The device converts the Analogue signal to Digital Signal. The Digital Signal is sent across to the Receiver's Base Station using Microwaves. The Receiver's Base Station then sends the digital signal to the appropriate Receiver's device (Mobile) through microwaves. Now the Receiver's Device converts the Digital signal to the Analogue Signal and the Receiver hears the voice. Newly proposed telecommunication or cellular or mobile calling standard implement within or with current phone calling standard or separately. After Initiation of Call e.g. chatcall 1905, when user make a call, Caller's Base Station searches for the Receiver's Base Station which transfers the request to the appropriate Receiver's device (Mobile) 1907. In next step when the Receiver accepts the Call, the computers in the Base Station's opens up a communication channel 1915 and present one or more type(s) of default or selected by calling user or auto select interface or present one or more type(s) of Interface based on settings or in other embodiment auto present interface when device is far to ear or not near to ear e.g. based on one or more types of sensors including proximity sensor present chat or messaging and/or SMS (text) and/or MMS (Photo/Video/Voice) interface when device is not near to ear or enable voice when device is near to ear 1918. Next step is to convert text and/or image and/or video and/or voice or audio into equivalent binary digital signal and transmit 1920. Next step is to send the Digital Signal across to the Receiver's Base Station using Microwaves. 1925. The Receiver's Base Station then sends the digital signal to the appropriate Receiver's device (Mobile) through microwaves 1930. In other embodiment when user selects or switch or auto switch "Phone" option or based on settings auto detect or auto determine user's voice or user's intention to select voice option for send voice or speak with user(s) and 1940. When the Caller Speaks, the voice is converted to Analogue Signal 1945. The device converts the Analogue signal to Digital Signal 1950. The Digital Signal is sent across to the Receiver's Base Station using Microwaves 1955. The Receiver's Base Station then sends the digital signal to the appropriate Receiver's device (Mobile) through microwaves 1960. The Receiver's Device converts the Digital signal to the Analogue Signal and the Receiver can hear the voice 1965.

FIGS. 20-27 illustrates exemplary graphical user interface (GUI) for enabling plurality types of sharing or real-time call based sharing i.e. calling to user(s) for real-time sharing, participation, workflow, communication & collaboration in the event of acceptance of call by called user(s).

Figure 20:
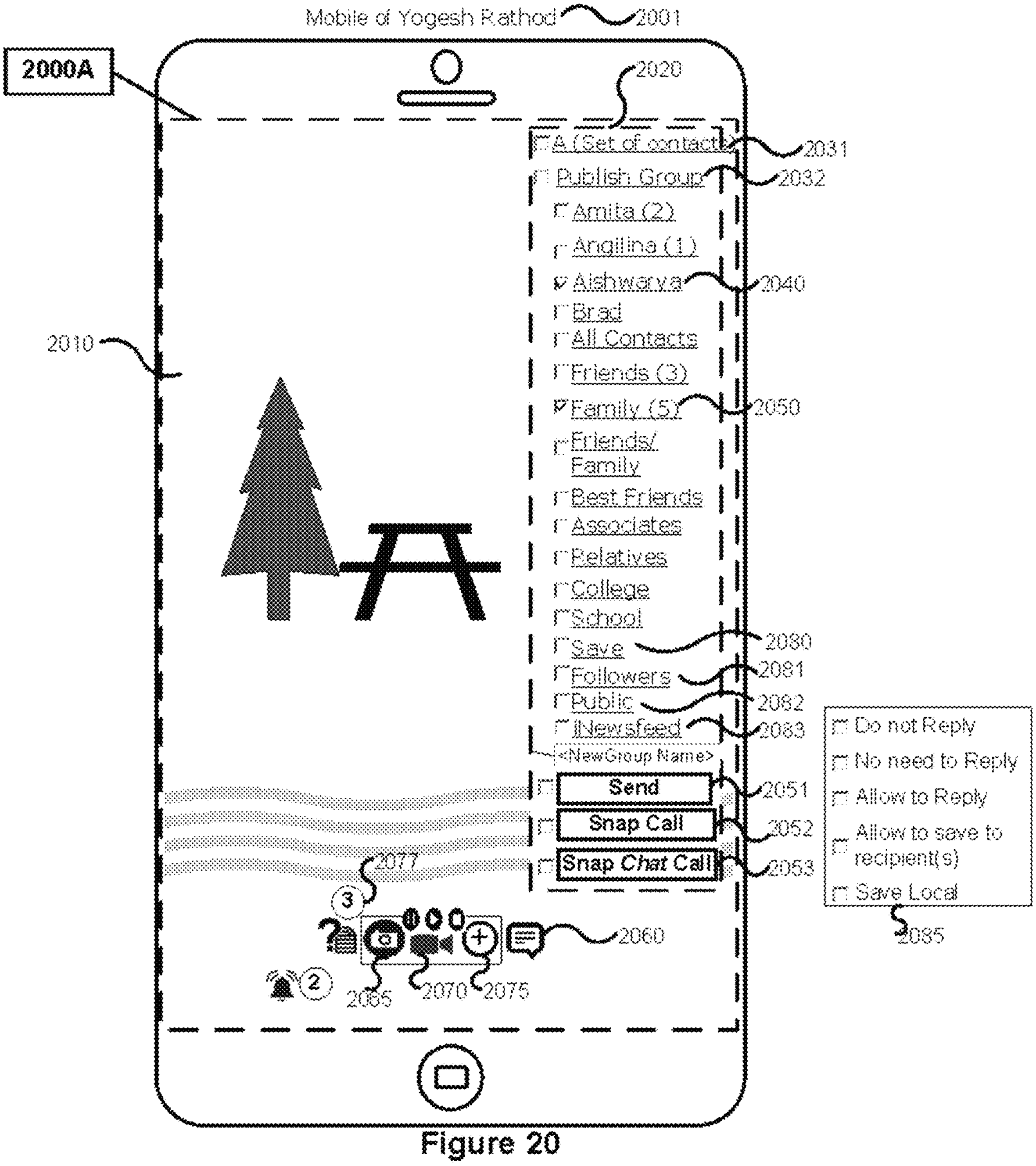

FIG. 20 illustrates exemplary interface describing one type of call i.e. "Sharing Calls" 252/262/852 related one type of interface (plurality types of combinations of customized user interfaces describe in detail in FIG. 21), wherein user can capture photo 2065, record video 2070, select, edit, update, import & process media 2075 including photo, video, audio, emoticons, virtual goods, object, application, links, contacts, locations, messages, updated status, presence information, checked-in place(s), microblog, text, templates, files & like and input, edit, process, update, draft, compose, import, & select text 2060. In other embodiment user can real-time call & present request 2077 prepared by calling user in the event of call acceptance or send request to contextual or matched users of networks and/or contacts and/or groups for requesting provide or broadcast or stream or share or send request or query specific one or more types of contents or media. After selecting, updating, inputting, importing, drafting, preparing, composing, capturing, recording one or more types of media or multimedia or digital contents, user is enabled to send or published 2051 contents to one or more contacts and/or group(s) 2031/2032 and/or follower(s) 2081 and/or auto select or make available all or contextual friends or contacts 2083 and/or make available publicly 2082 of contact(s) from list of contacts & groups 2020 or real-time share or send or present contents to one or more called contacts and/or group(s) 2031/2032 and/or follower(s) 2081 and/or 3rd parties web sites or web pages or applications or cloud or one or more types of storage mediums or databases or servers or services or networks or devices (not shown in drawings) and/or auto select all or contextual friends or contacts 2083 and/or contextual public or users of network 2082 from contact(s) & groups 2020 (e.g. 2040 & 2050) via calling to them 2052 and/or 2053 and in the event of acceptance of call receiving user's or called user's is/are enabled to download, view and access said shared one or more types of media or contents and/or chat on shared media. In other embodiment user can also select do not reply, no need to reply, allow to reply, allow to save to recipients or call accepted users options with send 2051, "snap call" i.e. calling to selected one or more contacts or groups for sharing in the event of acceptance of call, "snap chat call" 2053 i.e. calling to selected one or more contacts or groups for sharing in the event of acceptance of call and chat on shared media with calling user.

Based on one or more types of or combinations of settings as discussed in FIG. 21 user can customized real-time sharing including invoking camera display, capturing or recording or selecting photo, video & audio, previewing photo, video & audio, presenting or showing or filtering or selecting contacts or groups or one or more type of destinations including 3rd parties web sites or web pages or applications or cloud or one or more types of storage mediums or databases or servers or services or networks or devices (not shown in drawings), sending or sharing or calling to said one or more contacts or groups or one or more type of destinations, selecting sharing or sending or calling for sharing based options, presenting shared contents, customizing display options including ordering, arranging, filtering, grouping, updating, removing, blocking, importing contacts, creating or updating or publishing groups and one or more types of destinations, customizing user interface, commenting or communicating on shared contents.

In an embodiment enabling user to provide camera settings including Auto Show Camera Display, Manual Show Camera Display, Show Camera Display (as Default) 2110

In an embodiment enabling user to provide photo, video & audio capturing or recording settings including Manual Capture (via Photo/Video/Stream/Audio icons), Auto Capture or Record (Photo/Video or Stream/Audio) (based on sensor(s)), Auto Capture (Photo/Video or Stream/Audio), wherein start to capture or record photo or video as per <set start time to capture> after manually or auto detecting (based on sensors) identifying users intention to take photo or video and after starting continuously capture or record photo or video as per <Set duration or period of time to capture e.g. 5 minutes>, <Time interval to capture next photo e.g. 5 seconds> and <Set temporary saving of said auto captured or recorded period e.g. 25 hours> meanwhile allow user to select and save or share selected photo, video & audio) 2115. In other embodiment when user device is in horizontal then auto capture photo and user's device is vertical then auto record video and vice versa or enable user to manually select photo or video mode of camera display.

In an embodiment enabling user to provide auto photo, video & audio preview settings including set as Auto Preview for <set period of time e.g. 5 seconds> and enable meanwhile to View & Cancel to send or remove photo or video or audio, Manual Preview & Cancel, No Preview or No Preview with Delay sending for <set period of time e.g. 30 seconds>,—meanwhile user can view, cancel to send or remove, update destinations or selected contacts to share, apply actions etc.) 2120

In an embodiment enabling user to manually show Group Photos/Videos/Audios Preview via slideshow while device near body and enable selection for group sending 2122.

In an embodiment auto show Group Photos/Videos/Audios Preview via timer based slideshow while device near body and enable selection for group sending 2122

In an embodiment enabling user to provide settings for how contacts menu display on camera display including Show menu with/on camera display (show transparent menu middle, right, left, or anywhere drag and drop on camera display etc.), Show menu with/on camera display only after camera is stable (determine stability of camera based on sensors) and after <set no. of seconds> (show transparent menu middle, right, left etc.), Show menu with/on preview (manual or timer based preview as discuss in 2120) (transparent menu middle, right, left etc.) 2125, wherein user can one tap capture on preferred contact or group menu item and can capture photo, select menu item associate contact or group and share to said menu item associate contact or group In an embodiment enabling user to provide settings for how to select one or more contact(s) and/or group(s) for sending said captured or recorded photo and/or video and/or audio including Manually Select one or more Contact(s), Group(s), Destination(s) & Action(s) after capture and/or preview of photo and/or video and/or audio, Auto send photo and/or video and/or audio when user tap on proffered individual contact or group or destination including cloud storage, web page(s) web site(s), application(s) menu item, also apply settings with Auto send photo and/or video and/or audio including Enable Delay Sending for <set period of time> meanwhile user can view and cancel or remove photo and/or video and/or audio or update sending contacts or groups or destinations or set Disable Delay Sending option, and Select destination(s) or contact(s) or group(s) via voice command(s) 2128

In an embodiment enabling user to provide settings for provide what happened when user One Tap (for photo capturing) or Long Press & Release (for starting video recording) on menu item(s) 2020 including "SnapCall" describe in details in 2052 and/or "Snap ChatCall" describe in details in 2053 and/or "Send" describe in details in 2051 and/or iNewsFeed describe in details in 2083 and/or Save Local describe in details in 2080 and/or Followers describe in details in 2081 and/or Publish describe in details in 2082, when user tap on menu item e.g. 2040 for capturing photo and sending to menu item associate contact or 2031 for capturing photo and sending to menu item associate pre-created or pre-configured group or pre-selected set of users or 2032 for capturing photo and sending to menu item associate published group, wherein published group is a group created by user and add or updates associate members and created group published to each member's application or device 2130

In an embodiment enabling user to Manually Enable Edit Mode via icon on display or enable to set Auto Enable Edit Mode for ordering, removing menu items, creating Group & Add or Update Group Members etc. 2132

In an embodiment enabling user to provide send or received or shared media including Photos/Videos/Audio/Text presentation settings including Manually Present (Send/Received Contents (Photos/Videos/Audio/Text etc.) via Icon(s) or Auto Present (Send/Received Contents (Photos/Videos/Audio/Text etc.) when device is near body 2135

In an embodiment enabling user to set that whether user want to Show Send/Received each Photo/Video Icons on Top or Show Senders/Receivers Icons on Top (for view one or more related shared photos/videos) or Do not show Send/Received Photo/Video Icons & Senders/Receivers Icons on Top (user can view shared contents via previous or next icons) 2140

Enabling user to set how chat interface presents including Manually Present Chat via icon or Auto Present Chat on Photo/Video/Contents 2145

In an embodiment enabling user to set or Enable Real-time sharing (e.g. SnapCall 2052 or Snap ChatCall 2053) or Disable Real-time Sharing (e.g. "Send" 2052) 2148

In an embodiment enabling user to set or Enable Allow to Save/Re-Share shared contents or Dis-Allow to Save/Re-Share shared contents 2150

In an embodiment enabling user to set that Show last (<set No. of captured or recorded or drafted media>) and/or show last <captured or recorded or drafted media within set particular period of time or duration>) including captured photos/videos/audio) for later sharing/multi sharing/re-sharing 2152.

In an embodiment enabling user to Show All Contacts (Installed, Frequent Used, Recent, Invite-able) or Show only contacts who installed app 2155

In an embodiment enabling user to set Auto Order Contacts/Groups/Destinations option or set Manual Order Contacts/Groups/Destinations option 2158.

In an embodiment enabling user to Enable Ephemeral Sharing or Disable Ephemeral Sharing 2160.

In an embodiment enabling user to Allow chat only to/with selected receivers 2162.

In an embodiment enabling user to set or Enable chatting on 1 or more photos/videos/contents with same set of users 2164.

In an embodiment enabling user to Allow Anybody to Share with user or Allow only contacts to share 2165.

In an embodiment enabling user to Auto Show/Present Interface in Device when new contents or updated contents (Photos/Videos/Audio/Text etc.) received and auto present in auto slideshow mode (e.g. show each received content item up-to <set no. of seconds> and auto show next—user can skip (based on settings remove or save locally) 2170

Figure 22:
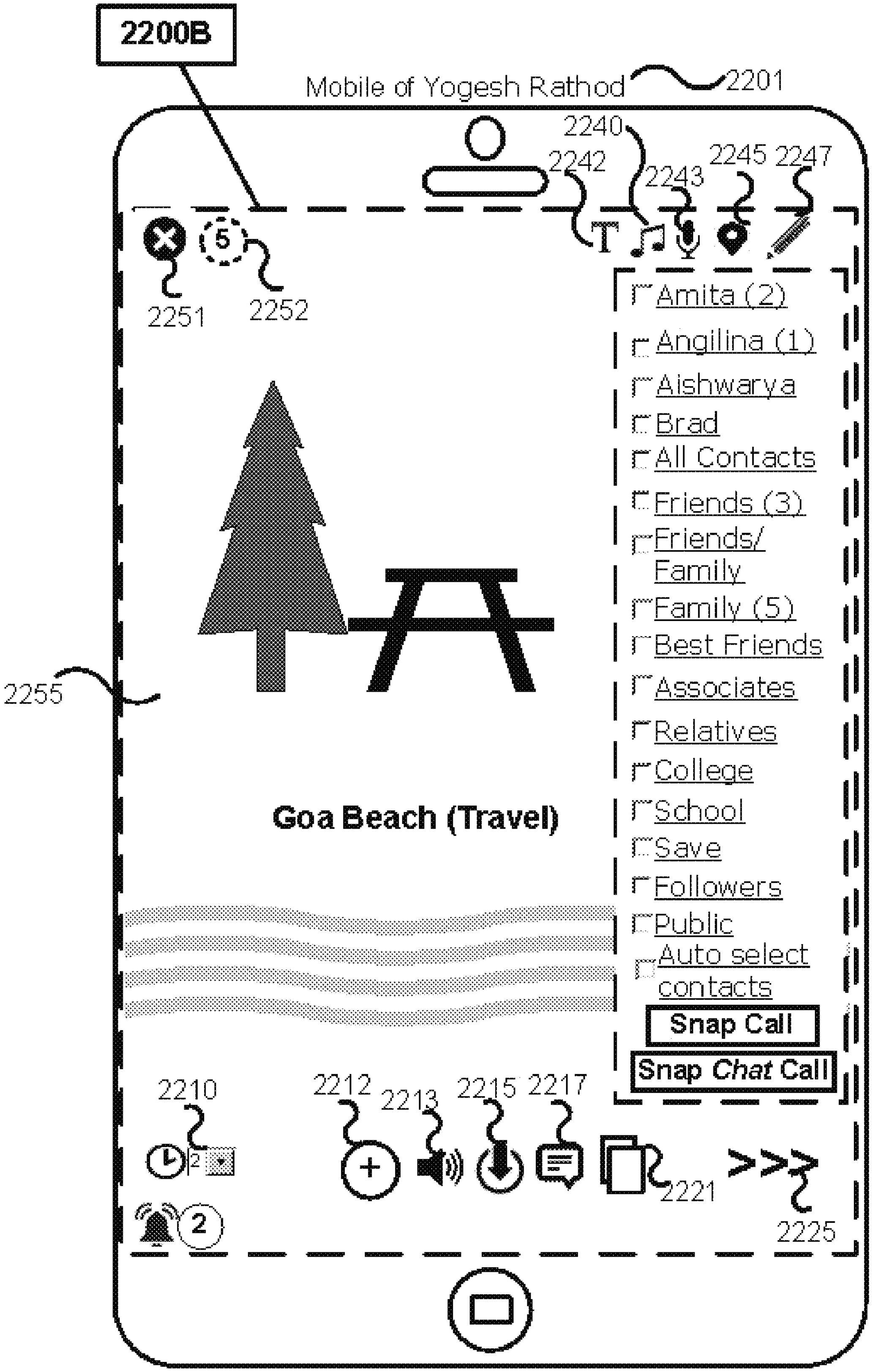

FIG. 22 illustrates exemplary user interface based on customized settings applied by user as discuss in FIG. 21 for enabling user to preview captured photo 2255 or recorded video 2255 or view, add & edit or update drafted text or one or more types of media 2217. In other embodiment user can discard or cancel or remove captured photo(s) and/or video(s) and/or one or more types of drafted or composed or prepared media 2251. In other embodiment user can view photo or video for particular set period of time 2252 and then based on settings as discussed in FIG. 21 user can auto or manual send shared contents or call & share or present shared contents in the event of acceptance of call by called user(s). In other embodiment user is presented with contacts and/or groups and/or one or more types of destinations and/or auto select contacts including contextual contacts based on analyzing contents of photo or video or audio, location of captured photo or user's location, contents associate with photo or video & like and/or followers and/or auto select options on preview screen for enabling user to select one or more destinations, contacts & groups and select send or one or more type of call including "Snap Call" or "sharing call" or "ChatCall" or "Snap ChatCall" options.

In other embodiment user is enable to add or select or attach or associate voice 2243 & music (play up-to set No. of seconds) 2240, exact location 2245 and Text (Font, Size, Multi line, add selected categories/keywords etc.) 2242 with one or more types of media including captured photo 2255 or recorded video and/or audio 2255 and/or text 2217.

In other embodiment user is enable to add and/or save captured or recorded or sharable one or more types of media or multi-media or contents to one or more created or selected one or more named story, folders, labels & album(s) 2701 pre-created by user, contact(s) of user and other user(s) of network(s) 2221 and make it as private 2702, or make available for selected or all contacts/group(s) & public 2702. E.g. user creates label [Yogesh]+["Goa Tour" ] (Private label) 2701 and can add or save 1 or more photos/videos To <Label or Album> (share groups of contents) and can tap or click "Send To" 2330 or "Call to" 2320/2325 for sending to manually selected contacts/groups (in an embodiment user can set settings for making available said shared contents for particular number of duration e.g. particular seconds or View Within 24 hours or as per privacy settings for each label). In another example user can add said contents to "My Story" label or folder 2342 for making them available for all or selected contacts—as per privacy settings 2706) via call 2320/2325 OR e.g. user can create User created label or folder (select & update pre-created templates) e.g. "Y-Birthday" label or folder 2342 which is admin by User (or selected contacts. User can associate metadata with label or folder including Date & Time, Category and present label(s) e.g. "Y-Birthday" 2701 etc. in combo box of & enable to allow or not allow selected/all contacts 2706 to add (or view only) 2705 and enable to auto receive or view user's or each other's posts via auto call when new content or set of contents added or updated or contents added or updated within or after particular or range of duration (No need to use "Send To" or Call To). In other example user can Follow <particular User>/User created e.g. "Ganesh Murthy Collections" label (<category, metadata, details>–public–admin by user) Allow contacts+any users of network to select e.g. "Yog123"+"Ganesh Murthy Collections" of particular user (nick name) and allow or not allow to add (or view only) and/or enable users of network to search, select from directories & follow. In another embodiment enable user to select one or more Request(s) and share request specific contents via call. In other embodiment user can save or add & Broadcast to selected pre-created Phrase/Categories/Taxonomy (e.g. Travel label specific contents). User can receive broadcasted or matched public contents based on selected (or subscribed Keyword(s)/Phrase/Categories/Taxonomy or Preferences specific or user can search & follow users or contents.

In the event of acceptance of call and after presenting of shared contents user is enable to re-share, like, dislike, view no. of views (acceptance of call), comments within call session only i.e. real-time sharing (1 or more types of 1 or more contents) and real-time 1 or more actions on it.

Figure 23:
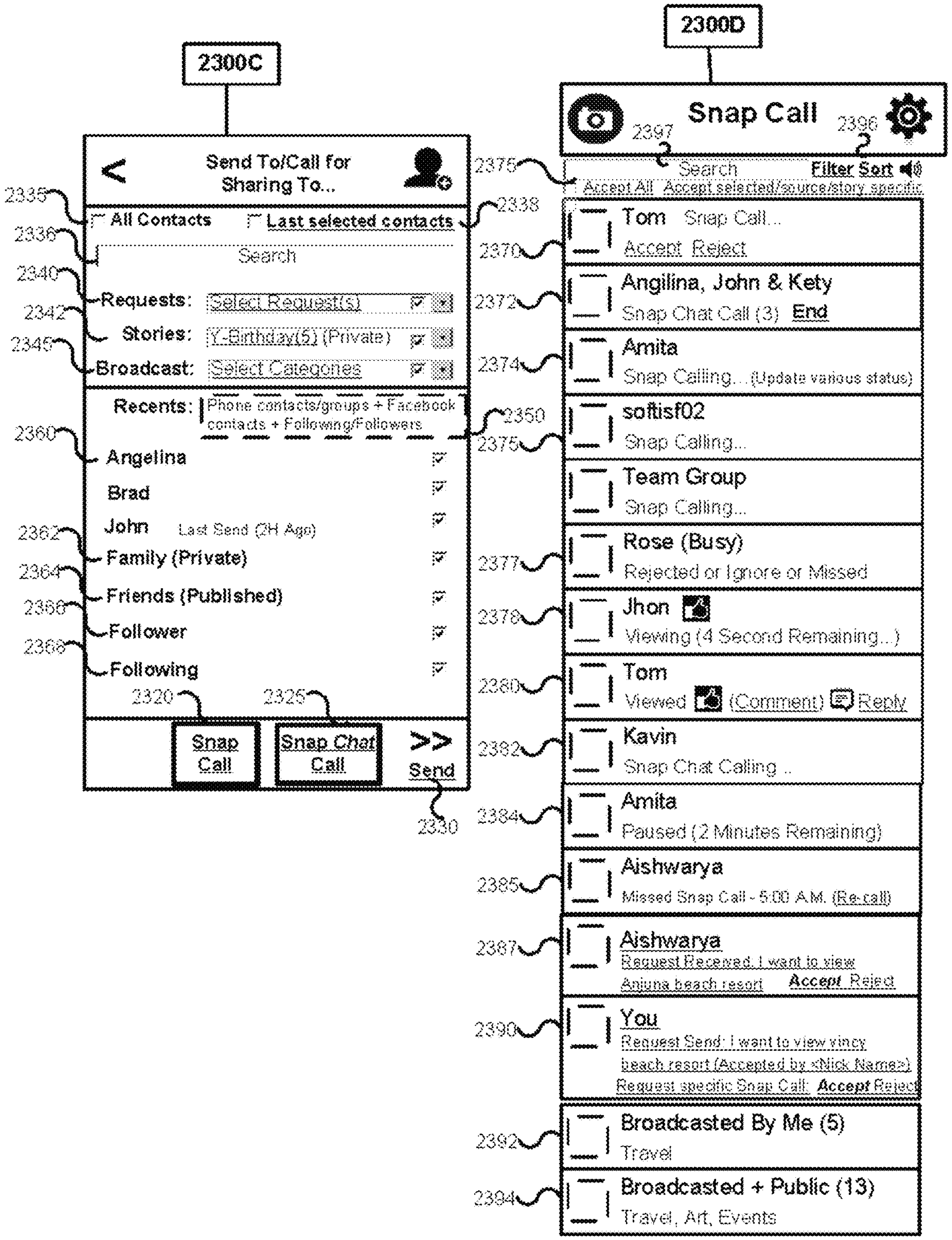

After preparing, drafting, updating, previewing or selecting sharable media as discussed in FIGS. 20 & 22, user can tap or click on 2225 then user is presented with exemplary user interface describe or illustrates in FIG. 23, wherein user can select one or more contacts e.g. 2360, one or more types of one or more groups including public, all contacts 2335, set of users 2362, published groups 2364, followers 2366 & following users 2368 and destinations including one or more features e.g. broadcast 2345 (i.e. send or call to all contacts or list(s) of contacts or one or more categories or keyword(s) specific users based on profile), Newsfeed (i.e. send to contextual or auto selected users based on relationships, interactions, user's connections, locations, activities, actions, events, transactions, status & user profile & user data, stories (i.e. add to use's today's stories or user's connected users stories), recent (i.e. send or call to recently connected or related contextual contacts or followers or users), last selected users, add to request and 3$^{rd}$ parties one or more web sites, web pages, applications, services, cloud, storage mediums, databases, servers, networks, & devices for sending 2330 or sharing 2330 or calling 2320 or 2325 to them for real-time sharing with them in the event of acceptance of call by them. After sending 2330 or sharing 2330 or calling 2320 or 2325 user can view status and actions of send or shard contents and/or incoming or outgoing calls, wherein status including send, received, viewed 2380, viewing 2378, not viewed or pending, removed (after set period of time), waiting to acceptance of call by called user or calling 2374, accept incoming call to view, save & access shared contents shared by calling user or reject incoming call 2370, end current call 2372, rejected or missed call 2377, paused or re-started call 2384, recall missed call 2385, request send or received and accept or reject request 2387, wherein request include request to broadcast or provide contents or media including request specific video, audio, photo and contents, accept or reject response of request specific calls 2390, wherein response of request include receive call from users who accept request and call to user for providing request specific contents including video, audio, photo and contents in the event of acceptance of call by user or requestor, broadcasted contents viewed by number of users 2392 & 2394. In other embodiment user can set settings to auto accept all incoming one or more types of call 2375 or auto accept one or more types of call from one or more sources, groups, categories etc. In other embodiment user is enable to search 2397 from list and can view status or take one or more provided or contextual actions on preferred or selected list item(s).

Figure 24:
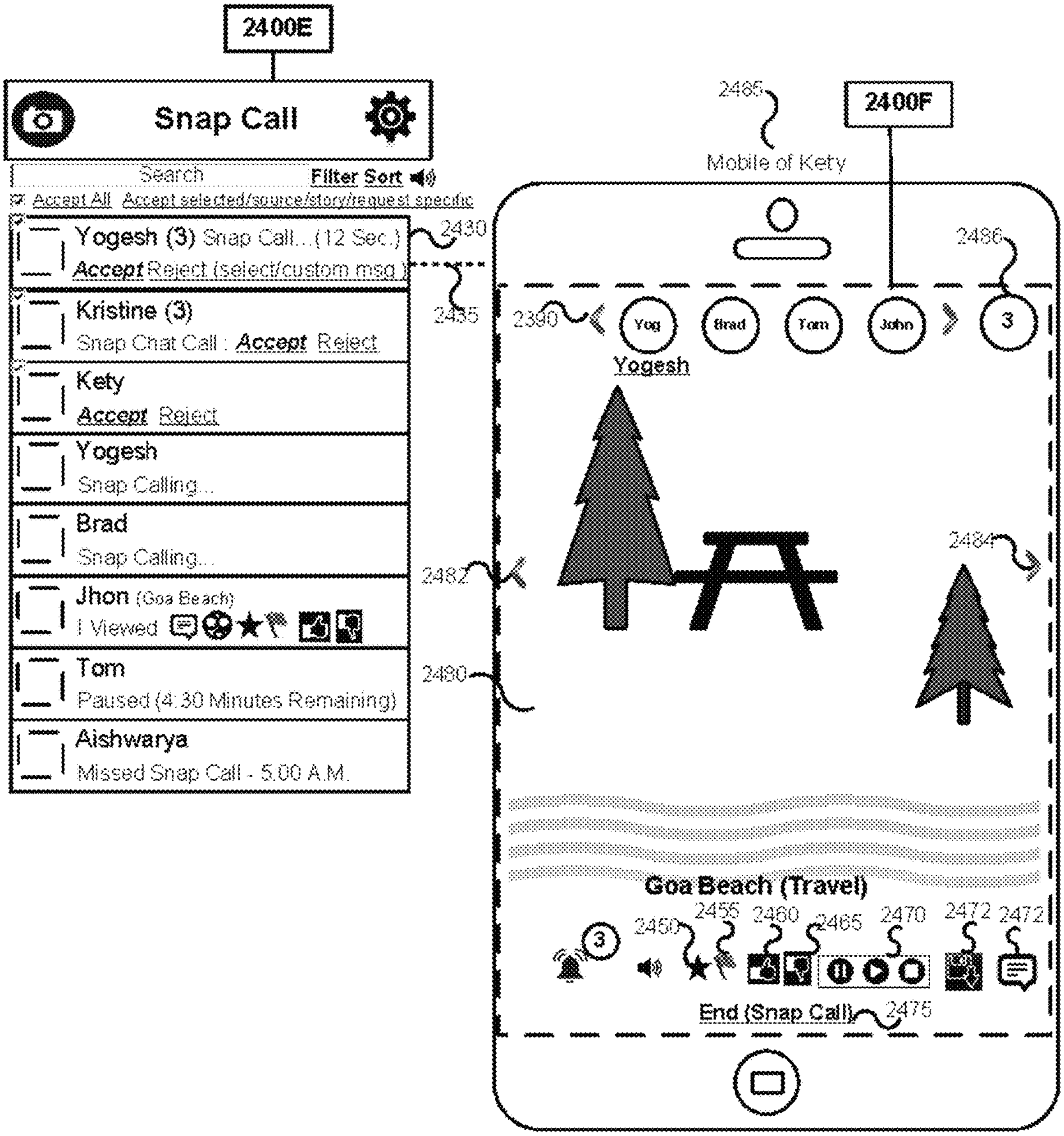

FIG. 24 illustrates exemplary interface of called user [Kety] 2485, wherein e.g. when user [Kety] 2485 accepts call 2430 of user [Yogesh] 2001 or 2201, then in the event of acceptance of call 2435, user [Kety] 2485 is presented with interface 2400F with shared or broadcasted or podcasted or real-time streamed resources or contents send or shared by calling user [Yogesh] 2001 or 2201 up-to ending 2475/2372 of call by calling or called or call accepted user. In other embodiment enable calling user to send new or updated shared contents to call accepted user in real-time or within call session or up-to ending of current active call. In other embodiment based on privacy settings merge all or selected calls and present shared contents in slide show manner based on first send first present order. In other embodiments enabling user to provide ratings 2450, report including report as spam or improper 2455, like 2460 or dis-like 2465, provide comments 2472, pause or stop or end or restart paused call or presentation of shared or received media 2470. In other embodiments based on privacy settings as discussed in details in FIG. 21 remove shared contents after set period of time 2486 by set calling user or enable to save 2472 shared contents to called user or call accepted user by calling user. In other embodiment user is presented with multiple dynamically added tabs 2490 based on incoming and outgoing calls, so user can tap on tab and can accept or reject including call, view status of outgoing call including call accepted or rejected or missed by called user(s), view shared contents or incrementally shared or streamed or broadcasted or podcasted shared contents in the event of call accepted by user and can provide like, dislike, comments, ratings, report, save locally if calling user allow user to save, pause or restart call if calling user allow to do so, skip received shared contents 2484, view previous if calling user allowed to save shared contents.

Figure 25:
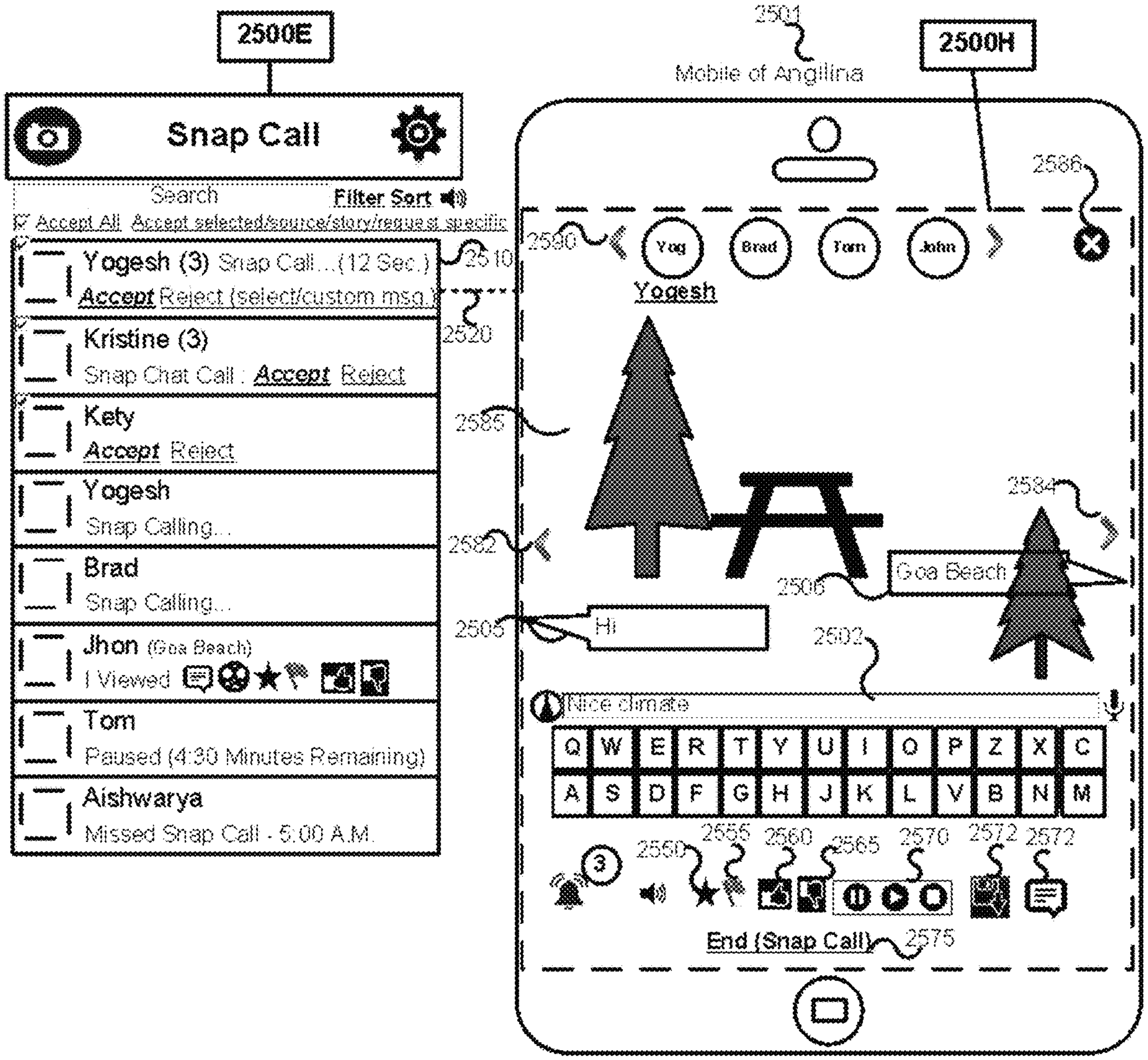

FIG. 25 illustrates exemplary interface of called user [Angelina] 2501, wherein e.g. when user [Angelina] 2501 accepts call 2510 of user [Yogesh] 2001 or 2201, then in the event of acceptance of call 2520, user [Angelina] 2501 is presented with interface 2500H with shared or broadcasted or podcasted or real-time streamed resources or contents send or shared by calling user [Yogesh] 2001 or 2201 up-to ending 2575/2372 of call by calling or called or call accepted user. In other embodiment enable calling user to send new or updated shared contents to call accepted user in real-time or within call session or up-to ending of current active call. In other embodiment based on privacy settings merge all or selected calls and present shared contents in slide show manner based on first send first present order. In other embodiments enabling user to provide ratings 2550, report including report as spam or improper 2555, like 2560 or dis-like 2565, provide comments 2572, pause or stop or end or restart paused call or presentation of shared or received media 2570. In other embodiments based on privacy settings as discussed in details in FIG. 21 remove shared contents after set period of time 2586 by set calling user or enable to save 2572 shared contents to called user or call accepted user by calling user. In other embodiment user is presented with multiple dynamically added tabs 2590 based on incoming and outgoing calls, so user can tap on tab and can accept or reject including call, view status of outgoing call including call accepted or rejected or missed by called user(s), view shared contents or incrementally shared or streamed or broadcasted or podcasted shared contents in the event of call accepted by user and can provide like, dislike, comments, ratings, report, save locally if calling user allow user to save, pause or restart call if calling user allow to do so, skip received shared contents 2584, view previous if calling user allowed to save shared contents. In other embodiment call acceptance user(s) is/are enabled to chat 2502 on shared or received media 2585 with calling user(s) or other called or chat participant user(s), wherein chat contents or messages 2505 & 2506 can present on presented shared media 2585.

Figure 26:
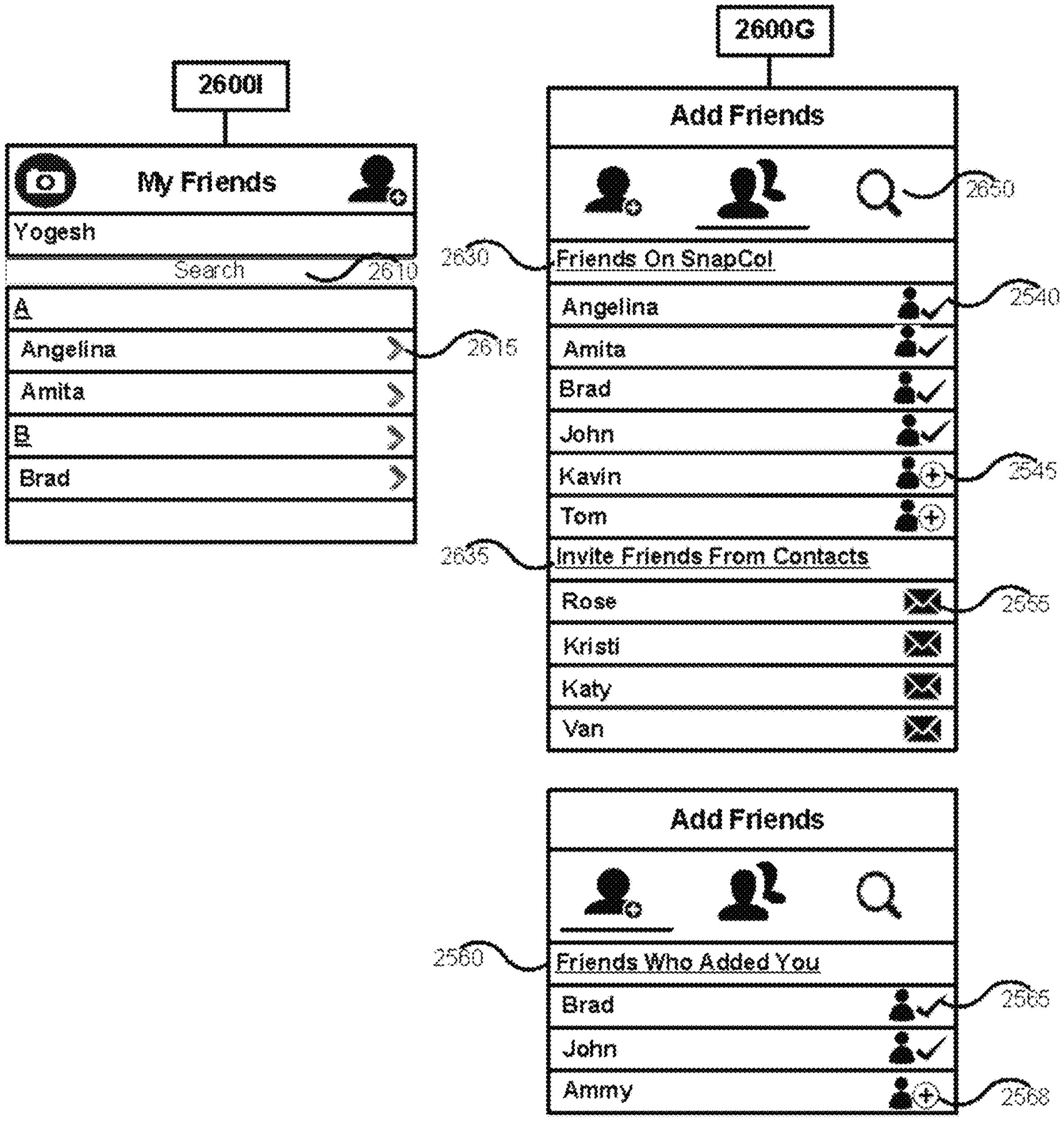

In one embodiment FIG. 26 illustrates example Graphical User Interface (GUI) for enabling user to view and find friends who install application 2630 and enable to remove or block them 2540 or add them 2545 for establishing two way permission i.e. caller as well as interested Callee both are connectable or both can call each other based on both user's permission. In other embodiment user can invite 2555 friends or contacts 2635 that does not have application or does not install application. In other embodiment user can view contacts 2560 or users of network 2560 who added user and can remove or block them by tapping on 2565 or can add them again via tapping on icon 2568. In other embodiment user can view list of contacts or friends 26001 who added by user or they to user and enable user to search contacts 2610 and can view contact associate details, data, profile, logs and actions 2615.

FIG. 27 illustrates example user interface for providing one or more types of privacy settings including allow or enable or allow to receive request or query specific one or more types of contextual media or contents 2710 including live or selected contextual photo, video, audio or voice, text, link & like. In other embodiment user is enable to allow request specific live or selected one or more types of media from contextual or matched or auto matched user(s) of network(s) 2715 or In other embodiment allow request specific live or selected one or more types of media from contacts only 2720. In other embodiment allow to receive request specific one or more types of live media or contents only 2725 or in other embodiment allow to receive request specific one or more types of live as well as selected media or contents or selected contents created or modified or captured or recorded from particular date & time ranges only 2730. In other embodiment user is enable to allow to provide or disclose user's current auto identified location 2735 and/or select location(s) or place(s) 2740. User is also enable to provide, select, input, update, import and share one or more types of user data including user's profile, user's activities, actions, events & transactions and user's status 2745. In an embodiment user is enable to auto send request to user's all or auto matched or selected one or more contacts or groups of contacts 2750. User is also enable to set settings including auto send request only when updates in status or location or check in place or selected place(s) of one or more contacts, time interval between two or last auto send request, schedule, date & time ranges to auto send request or auto call to send or present request in the event of acceptance of call to one or more pre-configured contacts etc. and add or update requests e.g. "What r u doing", "where r u", "what-sup", "what r u viewing or watching", "what r u eating", "what r u cooking", "what r u shopping or purchased", "what r u playing", "what r u celebrating" or user can manually input, select, update and send one or more requests 2755 or "Request Call" or call to send or present request(s) in the event of acceptance of call 2766 to contextual or preference based matched or auto matched users of networks 2760 based on matching exact location/places/status of users of networks with request(s) of requestor(s) and/or followers and/or following (enabling user to search & follow categories, keywords, status or location or places specific live stream providers) users and/or one or more selected contacts or group(s) of contacts 2765. In other embodiment limit user in sending and/or receiving requests within particular set period of time e.g. at a time, daily or within 24 hours. In other embodiment deduct points from user's total points in the event of sending of per request and request accept by at least one user from set of matched users & provide at least one contents or media to requestor or dislike request or report requestor as spam and add points in the event of each request accept by user and provide at least one request specific media or content to per requestor(s) and add points in the event of per content or per like or rating or comment on content by response receiving requestor(s). Also add points as per content item share or send or broadcast by request acceptor user.

In an embodiment user can apply or set or update or select one or more types of privacy settings for one or more types of call e.g. "snap call", "snap chat call", "sharing call" & "request call" including allow one or more or selected contacts or groups 2775 to call to user one or more or set number of times or maximum times 2772 during particular period of time including date & time 2777 or date & time ranges 2780. In other embodiment enable user to set daily minimum number of call 2784 (alerting user to call to others to share), set total number of times of call 2785 within particular set period of time e.g. 24 hours 2788, call user only when user's status is "online" or "available" 2789, call user when user opens application and show user's status "away" when user is inactive for set period of time or close application 2790, Auto accept & merge one or more types of call e.g. one or more or all snap calls/snap chat calls etc. when user open the application (when user notify that something new), call user only when calling user send or call for sending captured or recorded new contents only including photo or video or audio 2793, enable user to mute to accept call as per schedule, date & time etc. 2795 and apply one or more or combinations of privacy settings and presences as describe in detail in FIG. 7 including enable user to apply "do not disturb policy". In an embodiment user can select or set or apply privacy settings 2797 to consolidate & save incoming shared media from all or selective contacts and/or following users and call user at scheduled duration and/or number of times and/or number of times at particular duration or date or time ranges and in the event of acceptance of call, present said consolidated or aggregated shared media contents from source to said call acceptance user.

Figure 28:
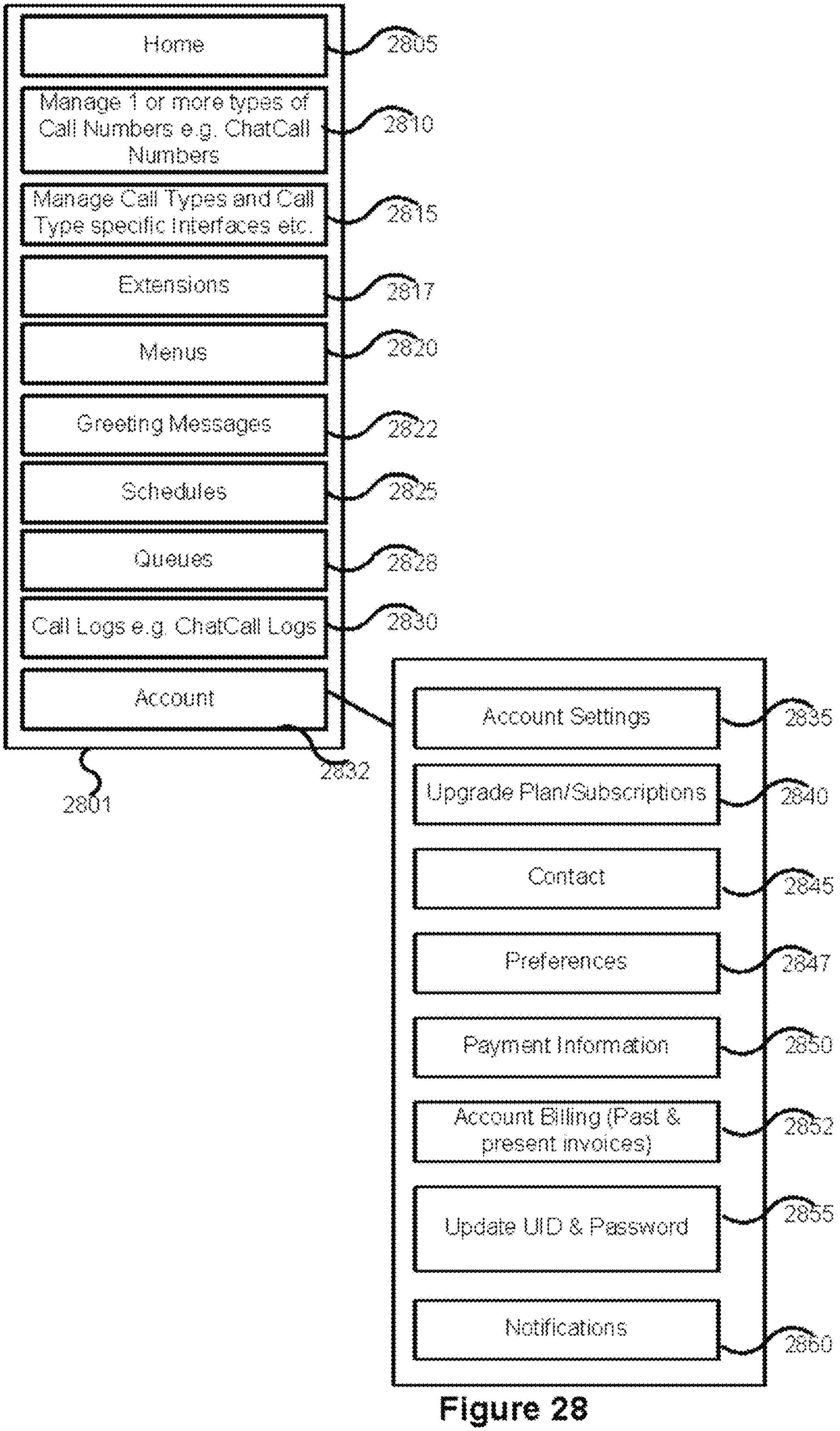

FIG. 28 illustrates example enterprise system for one or more types of calls. Administrator user can access system, create users, provide access rights, privileges, apply privacy policies & settings and preferences, manage one or more call numbers of one or more types of call and associate call handling rules 2810 (discuss in details in FIG. 29), manage one or more extensions of one or more call numbers of one or more types of call and associate call handling rules 2817 (discuss in details in FIG. 30), manage one or more menus of one or more call numbers of one or more types of call and associate call handling rules (discuss in details in FIG. 35), manage one or more queues 2828 (discuss in details in FIG. 37), manage one or more call numbers or extensions or menu(s) of call(s) of one or more call types of call associate one more applications, web services, web sites, web pages, interfaces, objects, set of controls, databases, contents, one or more types of media 2815 (discuss in details in FIG. 36), manage logs of one or more types of call 2830, manage account 2832 including applying or updating account settings 2835, update system access plan 2840, update contacts, profile, preferences 2847, payment information 2850, view account billings & invoices 2852, update user identity and password 2855, request new call numbers for one or more types of call, subscribe new services, call types, call type associate applications, services, web sites, objects, interfaces & data, call type associate other services & update one or more types of subscriptions or plan via one or more types of payment modes 2840, view notifications 2860.

FIG. 29 illustrates exemplary graphical user interface (GUI) for managing one or more call numbers 2905 including requesting, applying, purchasing, selecting, subscribing, adding 2908, & accessing new call numbers or one or more verified call numbers or one or more types of call specific call numbers and adding 2908, removing 2932 updating or editing 2930/2960 call number 2923/2961 and editing, adding & removing call number 2923/2961 associate information including nickname 2965, applying one or more types of rules, actions, privacy settings & preferences 2968 (discuss in detail in 3050 & more particularly in 3058, apply whether block anonymous call 2970 and block all incoming calls 2972, publish number and caller ID name 2925/2975 (discuss in detail in FIGS. 29-31 & 33), name to display 2977 and use of call including for business or personal purpose 2978. User can save or cancel 2980 said updates in settings & rules related to said selected 2923 call number 2965.

Manage Phone Number Options including manage Name or Caller ID 2977—When user place calls from ChatCall.Net number to anybody, user can choose the name that will display on the receiving party's phone or device, Nickname 2910, wherein user can enter a nickname 2940 for number 2942. The internal nickname is not displayed anywhere other than user's account to help user identify user's number, Number 2912, wherein the number displaying is the number associated with user's ChatCall.Net account 2832, Destination 2915 e.g. 2925/2968, wherein the destination displays where calls will be routed when calls arrive to user's ChatCall.Net number, Schedule 2918 e.g. 2927, wherein if user's number currently is routing to a destination using a Schedule, it will display in this section, Edit 2930/2960, wherein user can select on the Edit icon located next to the number e.g. 2923 to edit user's number 2960, settings wherein user can delete via select on the Delete icon 2932 located next to the number 2923 user wish to remove and user will be prompted for confirmation before the number is deleted. Call Handling Rules can be added within the Numbers section 2912, Extensions section, or Menu's section of user's account 2832, wherein for Number Call Handling Rules, user can select the Numbers option from the navigation bar 2810, Select the Edit button 2930 to the right of number and Select the Edit button 2968 located next to Number Action to display the Call Handling Rules.

FIG. 30 illustrates exemplary graphical user interface (GUI) for managing one or more extensions 3005 including Adding a new extension 3008, Modifying Extension Settings 3020 e.g. select, update & remove applied associated handling rules 3032/3050, block 3034 and Deleting an Extension 3035. The Manage Extensions 2817/3005 page allows access to many of the important extension selections including Ext #3010 is the extension number of this extension e.g. 3022, as selected from within the Extension Settings, Nickname 3011 is the internal name 3023 given to this extension that helps identify this extension e.g. 3022, Device is the extension type, Inbox 3015 gives access to the recorded or saved conversations, logs & data 3028 within the Inbox for this extension e.g. 3022, Contacts 3018 give access to the address book 3033 for this extension, Settings give access to all of the important extension settings, including extension number, nickname, recording, etc., Greetings give access to the recordings created by this extension, Delete 3035 allows you to permanently remove this extension. Extension 3022 is the customized extension number for this person e.g. 3023. The name 3012 e.g. 3025 in this field will be included in the Dial-by-Name Directory. The time zone setting is used to set the time zone 3048 for this extension e.g. 3022 only. User can include in Dial-by-Name Directory 3045 by Selecting Yes for this option will include this extension in the Dial-by-Name Directory option. The Click to Call Button 3036 allows visitors to user's website, blog, auction or any online document to place a call directly to user without having to dial user's number. In one embodiment user can embed "Click to Call Button" into website, into email as a clickable image, and into email as a link.

Each extension e.g. 3022 is given the option to have specific Call Handling Rules 3032/3050. User can begin modifying extension's Call Handling Rules via visiting the Extensions section of admin user's online account by selecting "Extensions" 2817 from the navigation bar and Select the Settings icon 3020 to the right of the extension 3010 user will be working with e.g. 3022.

Selecting Call handling Rules from the settings 3032, the Call Handling Rules 3050 for this extension e.g. 3022 will be displayed.

Call Handling Rules gives advanced scheduling options to route calls. Using Call Handling Rules admin user can direct all incoming calls or calls received during user's schedule to single or multiple destinations including forward incoming calls to multiple numbers or extensions. Admin user can use Advanced Call Forwarding options to customize the call system to user's needs. For example user can select particular extension 3010 and select call handling rules option 3032 from settings 3020 for selecting, updating, removing, ordering, applying one or more rules via exemplary call handling interface 3050 e.g. user select "All Call Based Routing" 3056 and select how call should be handled e.g. select "Forward Call" option from menu 3058 then user can add, enter or select the number or extension number to which user will forward call 3060 or user can select extension 3036 or add new extension 3064 and can save rule settings 3072. The Ring Time 3065 determines how long ChatCall.net will connect (in seconds) to user's outside number or extension. This may or may not be the amount of time the phone actually rings. This does not determine the amount of rings but rather the amount of seconds it takes ChtaCall.Net to connect to user's outside destination.

User is enabling to add or select or update one or more actions or next operations 3070 and rules or rule settings 3052. User is also enabled to remove rules 3054.

User's ChatCall.Net Address Book allows storage of all contacts in one organized location.

When user's contacts are kept on file, user can assign rules to specific callers and route them to personalized menus, queues, saving or recording system, extensions, and like. Each extension is provided with their own Address Book 3018 e.g. 3030. User can access user's Address Book from within Extension Settings. User is enabled to add, edit and remove one or more groups. Groups allow user to keep your contacts organized; create separate groups for anything, such as user's family, friends, clients, and even prospective clients. User is also enabling to add, import, export contacts or move to groups, import from mobile contact book, add opt-in customers or prospective customers or other users contacts.

Creating an Extension Schedule includes Create a schedule with user's available hours. This schedule will now be available to apply when defining user's number, extension and menu item destinations and Routes calls received during user's available hours to one destination and calls received outside of available hours to a different destination (e.g., send callers to recording or message saving system).

Call blocking 3034 allows user to block incoming calls from specific phone numbers to numbers to user's ChatCall.net number(s) or number provided by our server or server admin or authorized person or phone numbers. User can Select "Extensions" from the navigation bar or menu 2817 and from the "Manage Extensions" page, can select the "Settings" option to the right of the Extension user will be working with and from the side navigation bar or option selections, select the option for "Call Blocking" 3034. User is enabling to add a number to the Spam Callers List via click or tap on "Add a Number to Block" or select a recent call or a frequent caller from the spam caller list. The Spam Callers List shows the phone numbers our Internet call system will block from reaching user's number and user can delete one or more said spam numbers. Callers will hear a busy signal or see system message upon attempting to reach user. User can also add a Note to keep track of why user are blocking a particular number.

Figure 31:
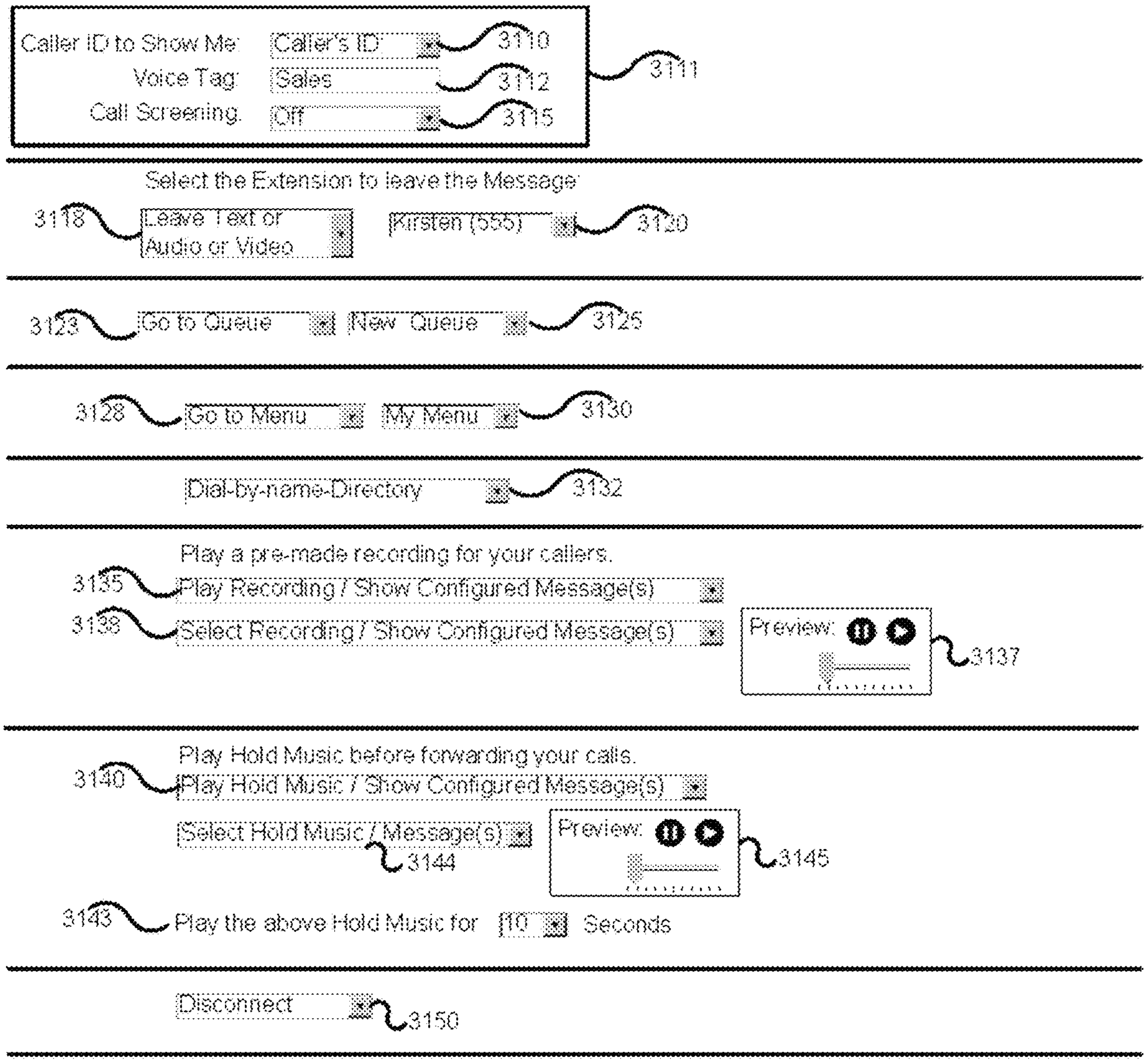

FIG. 31 illustrates exemplary graphical user interface (GUI) for applying, selecting, updating & removing advanced call forwarding features or options including Caller ID to Show Me option 3110 which enables user to select the Caller ID that will display on the phone when our server is forwarding user's number to an outside number including user can select "Called Number" i.e. the number the party originally dialed to reach you (i.e. your our server's number or ChatCall.net number) and "Caller's ID" i.e. the caller ID of the party that dialed to user's number. The Voice Tag 3112 allows user to "tag" or "label" user's incoming calls with a unique word or phrase that will help user identify the incoming call. For example, to identify the call is for user's Sales Department, user can type "Sales" into the Voice Tag field. Call Screening provides the option to preview who is calling before accepting the call. After hearing the initial operator stating, "You have a call from . . . " the option to then click or tap "accept" to accept the call or "decline or reject" to reject is available.

Selecting "Leave Text or Audio or Video" option via select operation and select "Leave Text or Audio or Video" option 3058/3118 enables user to direct incoming calls straight to the auto recording or saving system for the extension and after said selection user can save Rule Settings 3072.

User is enabling to select "Go to Queue" operation or option or feature from 3058/3123 for selecting or creating or updating defined or configured Queue 3125 and after said selection of queue user can save Rule Settings 3072. Queues route incoming calls to a specific group of phones & extensions within user's system (discussed in details in FIG. 37).

User is enabling to select "Go to Menu" operation or option or feature from 3058/3128 for selecting menu name or creating menu or updating defined or configured Menu 3130 and after said selection of menu user can save Rule Settings 3072. A menu presents or provides callers list of possible options. (e.g. "(1) Customer Service, (2) Sales . . . "). A menu is generally the first thing incoming callers will show when they dial your number. User's system will show user's custom list telling callers which option to select e.g. tap or click on ("(1) Customer Service and/or (2) Sales." option from presented menu) (discussed in details in FIG. 35).

User is enabling to select operation and select "Dial by Name Directory" from 3058/3132 and can save Rule Settings 3072.

For Playing a pre-made recording for user's callers or to showing pre-created message(s) for user's callers, user is enabling to select operation and select "Play Recording/Show Configured Message(s)" from 3058/3135/3138 and can save Rule Settings 3072.

For Playing Hold Music before forwarding user's calls or showing pre-created message(s) before forwarding user's calls, user is enabling to select operation and select "Play Hold Music/Show Configured Message(s)" from 3058/3140 and can save Rule Settings 3072.

User can add or select next action or operation via 3070 for adding next one or more rules.

User is enabling to select operation and select "Disconnect" from 3058/3132 for direct incoming calls to disconnect and then user can save Rule Settings 3072.

Figure 32:
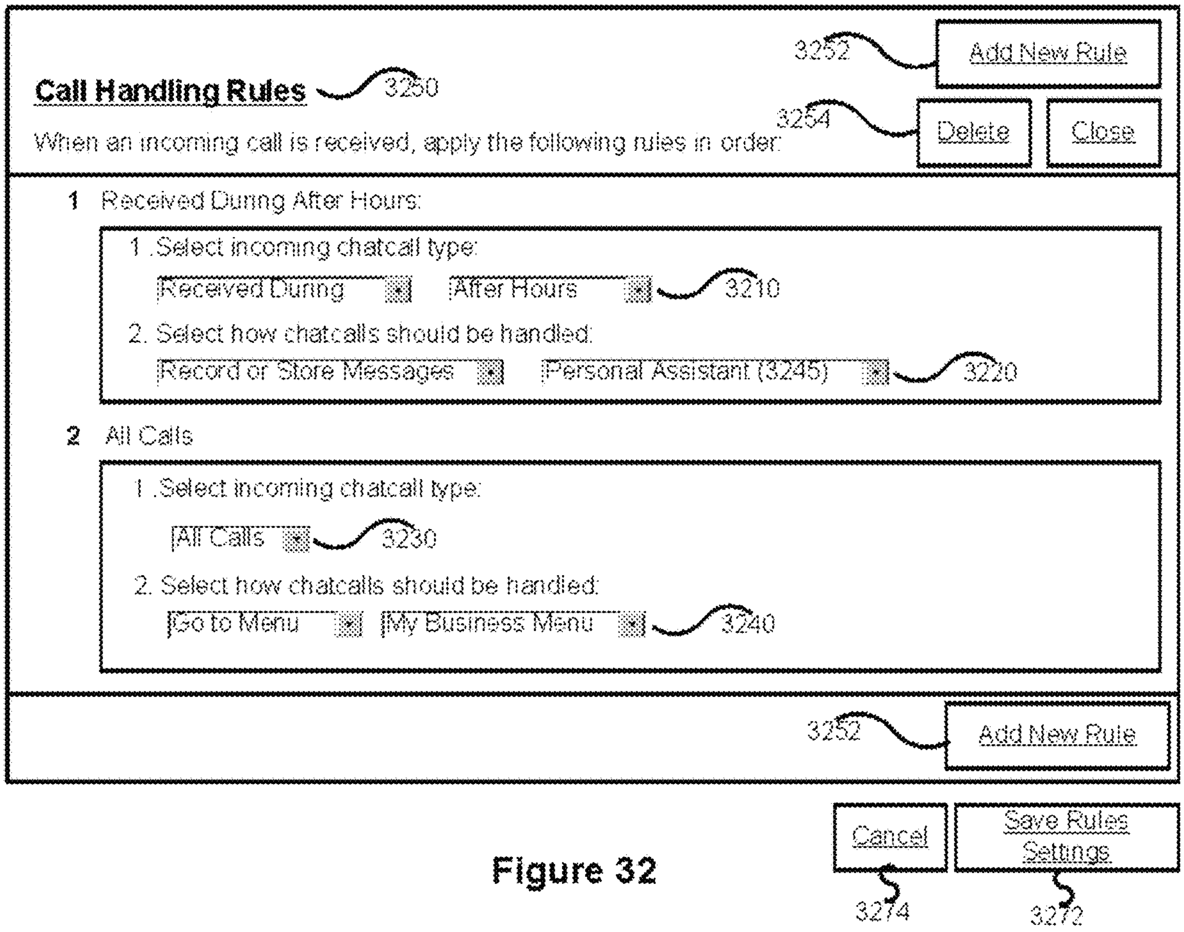

FIG. 32 illustrates exemplary graphical user interface (GUI) for describing one of the example Schedule Based Routing 3056. If user selects the option to route incoming calls received during user's schedule, user will have to first set up schedule. If user already has a schedule created, when it is selected for use with incoming calls, it will route calls made to user's ChatCall.net 110 number to the specified destinations based on the hours selected in user's schedule. For Example using Schedule Based Routing 3056/3250 your business is open 5 days a week from 9 am to 5 pm; any calls made after 5 pm but before 9 am are routed using the After Hours schedule. Incoming calls made during your working hours will be routed to your Business Menu 3240. Calls made during After Hours will be routed to a recording 3220 and then user can save Rule Settings 3072 or 3272.

In an embodiment in Caller ID Based Routing 3056, if user selects the option to route incoming calls received from a contact stored in user's Address Book or stored Address Book at server to a specific destination, user will first need to ensure that the contact exists within user's account. If the contact has already been added to user's Address Book, user can then configure user's system to recognize that contact therefore when that individual calls user's number (may provide by server admin or server or authorized person or system or request by user and provide after verification and payment), they will have their own special rule set up to route them to a destination of user's choice.

Figure 33:
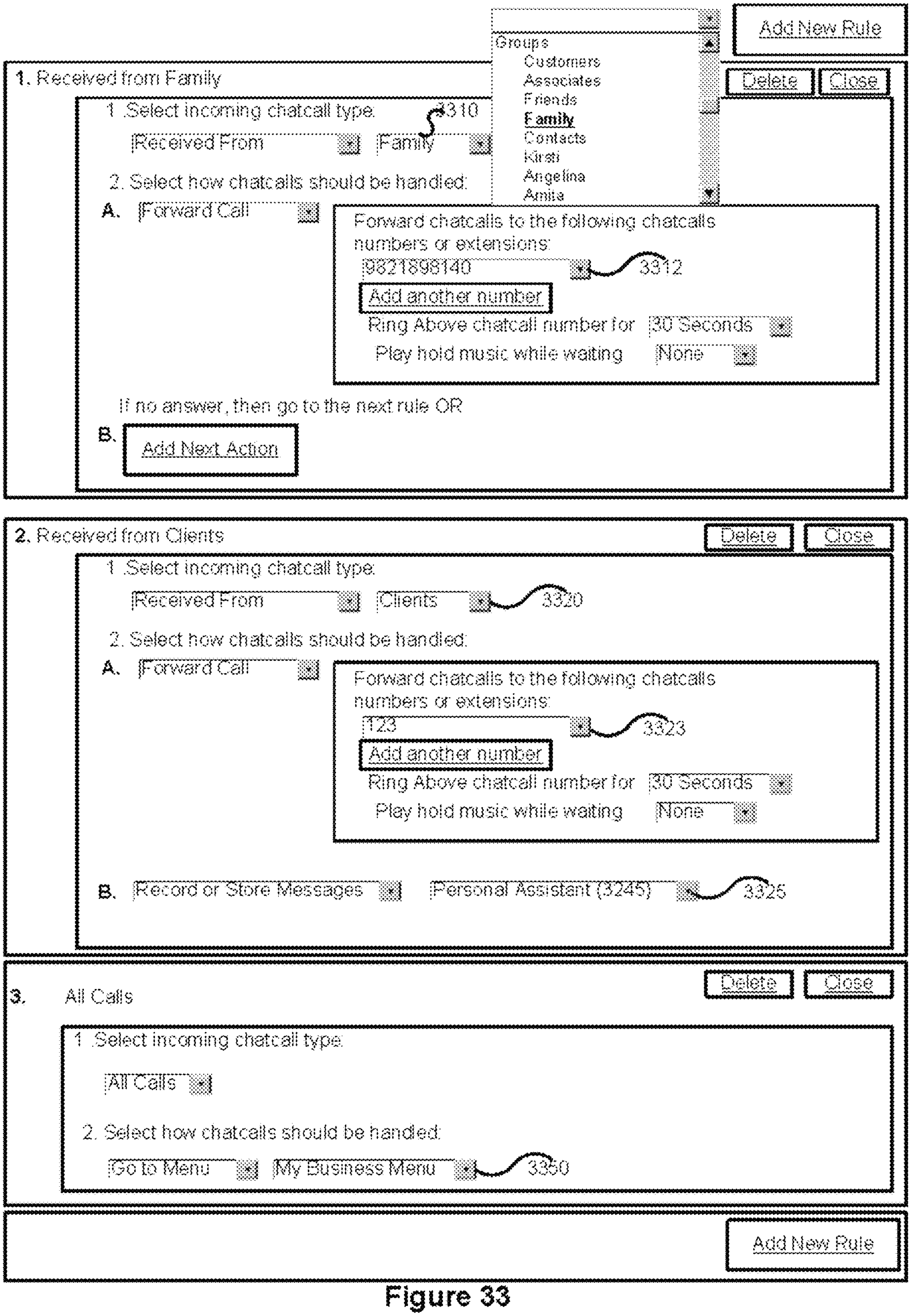

If user select the option to route incoming calls received from a contact stored in user's ChatCall.net 110 Address Book 115 to a specific destination, user will first need to ensure that the contact exists within user's account. If the contact has already been added to user's Address Book, user can then configure user's system to recognize that contact therefore when that individual calls user's ChatCall.net 110 number, they will have their own special rule set up to route them to a destination of user's choice. FIG. 33 illustrates exemplary graphical user interface (GUI) for describing one of the example using Caller ID Based Routing, for example user have two mobile phones or devices including PC or tablet—user's home based PC and user's personal cell phone. User only wants to provide others with one general number. When non-clients call user's line, they are routed to user's Menu 3350. When user's actual clients 3320 dial user's ChatCall.net 110 number, a rule directs them to user's business line 3223 or if user cannot answer, to user's business message recording system 3225. When user's family 3310 call from their cell phones, their numbers are recognized through the system and their calls are routed to user's personal cell phone 3312. FIG. 33 describe how the Call Handling Rules will appear when user done.

User is enabled to Select the Call Logs option from the navigation bar or menu 2830. FIG. 34 illustrates exemplary graphical user interface (GUI) for displaying Call Logs 3405 to show all Current Activity. User is enabling to find user's Call Logs, Search Call Logs 3448, Search by Billing Date 3406, Search by Custom Date Range 3407, Search by Call type e.g. ChatCall 3446, Search Only Queue Calls 3441, Search To/From Number 3442, Search To/From Extension 3443, Show Search Results 3448 and Downloading user's Call Logs 3449. With Call Logs, user can view all incoming, outgoing, blocked and missed calls 3408 with the Caller 3410, Callee 3411, Queue, 3412, date & time 3415, minutes 3418 and any applicable charges 3420 from within user's account, wherein the Caller column 3410 will display the Caller ID of the individual party dialing in. If it is an outbound call from an extension, it will display the Extension Name. The Callee 3411 is the number the party dialed to reach you. When a call arrives at user's Queue 3412, the name of the queue will display in this column. This is helpful to determine which Queue is being utilized. The Date column 3415 will display the calls within the specified time range. Time duration of user's individual calls will be displays in the Mins column 3418 in minutes. If a charge for user's call is applied, it will display in the Cost column 3420. Only calls charged on an invoice will be displayed in this column. If user's invoice has not been generated at the time of viewing, such as in Current Activity, it will display as a "Pending" charge. The total calls will display the numeric total amount of incoming and outgoing calls to user's numbers.

Call Recording or Extension Recording or Auto Saving of Communications, sharing, collaboration & Chat Messages or visual screen recording Settings 3450 displays the settings for this specific extension. User is enable to select "on" to enable the Call Recording or Extension Recording or Auto Saving of Messages service for the extension and can select "off" to disable the Call Recording or Extension Recording or Auto Saving of Messages service for the extension 3451.

User can select one or more types of greetings 3453, greeting is the message callers hear when accessing user's Auto Call Recording box including user can select Standard Greeting 3456: when selected, this is the main greeting callers will hear when they are transferred to user's Auto Call Recording system or service, user can select Alternate Greeting 3458: when selected, this is user's alternate greeting to switch to in the event user are away on vacation, in a meeting, etc. By having the alternate greeting pre-recorded, user can update user's Auto Call Recording quickly to alert user's callers and user can select when selected, only the recording of user's name will be played. User can also select one of custom audio files from the dropdown list to be used as Auto Call Recording greeting.

If user prefers to play the operator instructional message after user's Auto Call Recording system or service Greeting has played to user's callers, check the corresponding box and save changes. The operator instructional message will say, "Please leave your message after the tone. When finished, hang up". If user prefers to not play the operator instructional message after user's Auto Call Recording system or service Greeting has played to user's callers, simply uncheck the corresponding box and save changes 3460.

The password lets user check recorded call from user's device e.g. mobile phone, tablet or PC. When accessing a Reordered Call box 3015 from a device e.g. mobile phone, tablet or PC, user will be prompted to enter the password 3462. User can reset password via tapping or Clicking the Reset Password button 3465.

User can choose preferred method of notification for recorded call or saved messages including receiving notification via email and/or mobile phone. User can check the notification method user prefer and enter the corresponding destination email address 3468 and/or mobile number 3470 to receive the notification.

Figure 35:
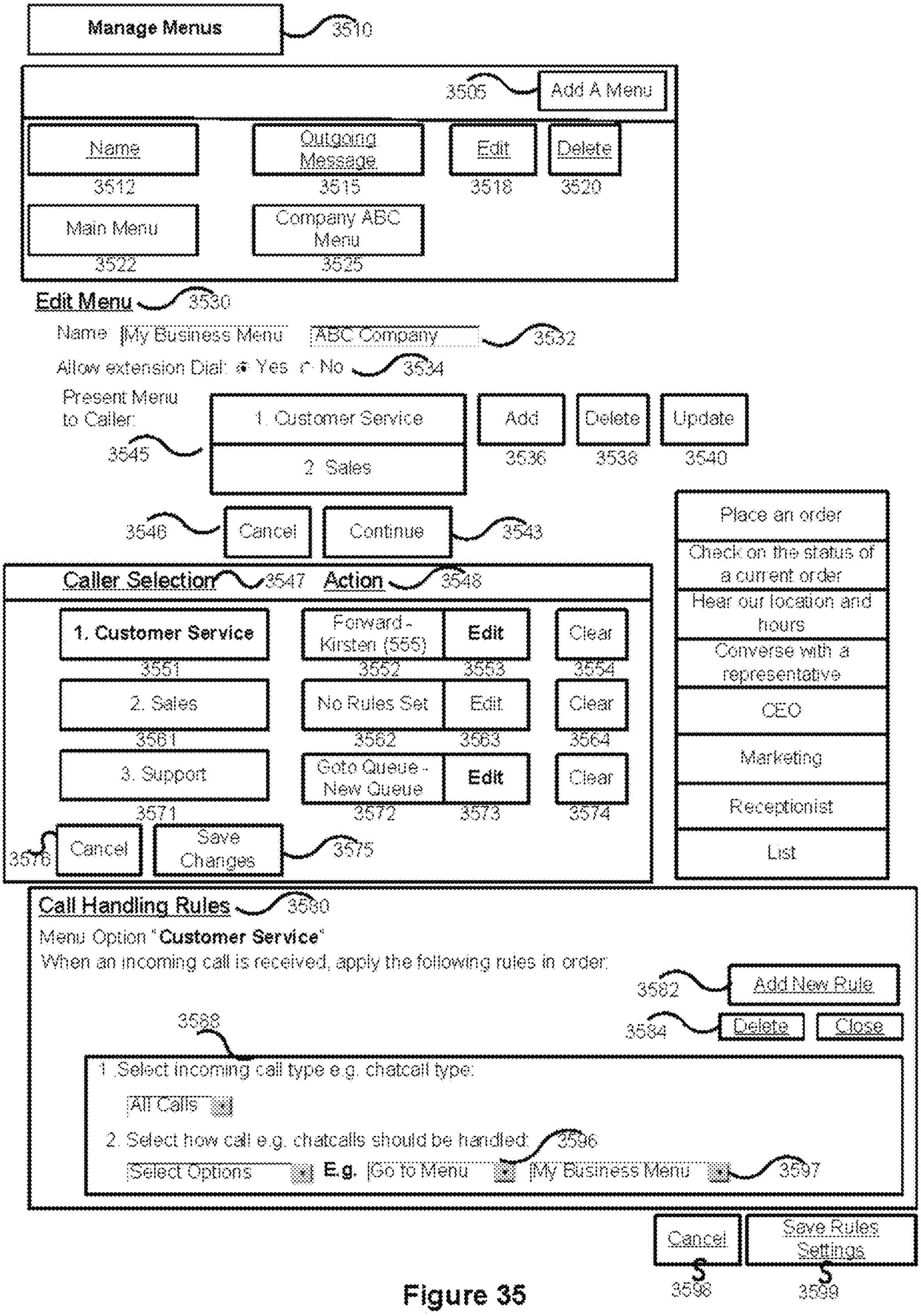

FIG. 35 illustrates exemplary graphical user interface (GUI) for managing menus including adding, updating, removing menu and apply, associate, attach, add, update & remove one or more call handling rules. User is enabled to select the Menus 2820 option from the navigation bar or main menu and select the Edit 3518 button to the right of the Menu.

A menu is generally the first thing incoming callers will view or hear when they dial user's ChatCall.Net number or mobile number. System will play user's custom audio message telling callers which key to press. (Press 1 for Customer Service, press 2 for Sales . . . ) or System will present menu for user's selection e.g. tap on presented "Customer Service" menu item or "Sales" menu item. To add a menu user can select the Menus option from the navigation bar or menu 2820 and select the button to "Add a Menu" 3505 or select the button to "Edit a Menu" 3518 or select the button to "Remove a Menu" 3520.

User can add or edit menu including provide or update menu 3532 e.g. 3522 i.e. give menu a nickname to help user identify it when configuring user's Call Handling Rules e.g.

2968/3050/3058/3128/3130/3250/3240/3350/3580/3552/3562/3572 etc., Outgoing message 3515 e.g. 3525 i.e. pre-recorded audio message telling callers which key to press. (Press 1 for Customer Service, press 2 for Sales . . . ) or pre-configured presented menu or menu items or selection options instructing callers which option or menu item(s) to tap or select or click e.g. "Customer Service" menu item and/or "Sales' menu item 3545, Invalid entry voice or text message (not shown in figure) is an audio message that plays or presented when caller makes invalid menu selection. Example recording or presenting: "I'm sorry, that entry is invalid. Please try your option again.", Allow extension dial (not shown in figure), this setting allows callers to enter in an extension number at anytime to bypass the menu and dial that extension directly. User can add 3536 or delete 3538 or update 3540 menu item(s) 3545.

After the initial Menu set up is complete, the next step is to tell the Menu what to do when the caller tap or presses the correlating menu option on their phone's keypad or screen. User is presented with Caller Selection 3547 e.g. 3551/3561/3571, wherein Caller Selection are the menu items or keys on the keypad, and user is also presented with corresponding Action 3548 e.g. 3552/3562/3572, wherein Action describes what happens when the caller tap to select that menu item or option from device screen or presses that option on their keypad. User is enable to tap or click the "Edit" button 3553/3563/3573 to the right of the Caller Selection for creating Menu associate rules 3552/3562/3572/3580 to follow user's rules, based on your initial Outgoing Message. The Call Handling Rules window 3580 will open allowing user to select user's preferred action for this Caller Selection e.g. 3552 or 3562 or 3572 including select user's desired Call Handling Rule 3582/3588. After user's Call Handling Rule is selected, it will display on user's Menu 3552/3562/3572. For example, if the caller dials "1" on their keypad or tap on menu item 1, the call will be forwarded to Kirsten's extension 555. User can continue to make user's Caller Selections for user's Menu. When finished, user can click the "Save Changes" button 3575.

After user's Menu is created, user need to connect it to user's Number 2968 or extension 3058/3128/3130 via e.g. 3032. For connecting user's Menu to user's Number e.g. 2961 user is enable to select the "Numbers" option on the navigation bar or menu 2810 and select the "Edit" button 2930 to the right of the number 2921 to work with and in the "Edit Number" section, select "Edit" 2968 to the right of "Number Action". The Call Handling Rules will open in a new window e.g. 3050 & 3058. In the Call Handling Rules window, select the operation to "Go To Menu" e.g. 3128 or 3596 and Select your desired Menu e.g. 3130 or 3597. When user's selections are made, click or tap the "Save Rule Settings" button e.g. 3072 or 3599. After selecting "Save Rule Settings", user will return to the "Edit Number" page 3960. The "Number Action" will display user's new selection 2969. User can verify user's settings are correct or not and then click or tap the "Save" button 2980. User's number e.g. 2921 will now be set to direct calls to user's Menu e.g. 2969 or 2925.

FIG. 36 illustrates exemplary graphical user interface (GUI) for enabling user to manage one or more Call Types and Call Type specific application(s), web service(s), interface(s), object(s), data or contents, web site(s), web page(s) etc. In an embodiment user is enable to select, customize or pre-configure and associate or attach one or more application(s), web service(s), interface(s), object(s), data or contents, web site(s), web page(s) 3602 with one or more number(s) and/or extension(s) and/or menu(s) and/or incoming or outgoing call 3601 and/or call type(s) 3603 and provide or set or update access rights & privileges, preferences, privacy policies & settings, rules & actions for accessing, customizing, making available i.e. upload, store, download & install, use for calling via particular number(s) or set or list or group(s) of contact(s) or user(s) or roles of user(s) or inbound number(s) or outbound number(s) or extension(s) or menu(s) or use when triggering or identifying or detecting or determining of particular or selected or configured one or more activities, actions, interactions, senses or sensor data, location, check-in place, date & time, one or more fields or values or attributes or data item of user profile or user data or user logs, presence information, status, keywords, transactions & any combination thereof, presenting while acceptance of call by calling and/or called user(s) of one or more application(s), web service(s), interface(s), object(s), data or contents, web site(s), web page(s), digital item(s) associated with one or more number(s) and/or extension(s) and/or menu(s) and/or incoming or outgoing call 3601 and/or call type(s) 3603. In other embodiment user can select or set as default selected application, web service, web site, web page, data, one or more type of media, one or more or set of control(s) or object(s) & any combination thereof before, while or after calling from particular number or before, while & after calling to particular selected contact(s)/user(s) or group(s) of contact(s) or user(s). In other embodiment calling or called user can change or remove or customize or switch or update or ask to present one or more selected or requested one or more application(s), web service(s), interface(s), object(s), data or contents, web site(s), web page(s), digital item(s).

In an various embodiments user is enable to upload, publish, provide updates & upgrades, provide customized as per requirement specifications, remove, register, certify, making searchable for other users, provide access rights, policies, privileges & privacy settings, provide details, payment mode, terms & conditions, help & documentation, enable user to search, match, browse, select, make payment or use as free, download & install, customize, update, upgrade, uninstall or remove, apply preferences, rules & privacy settings for calling and/or called users for presenting, sharing, saving and accessing application(s), web service(s), interface(s), object(s), data or contents, web site(s), web page(s) etc. and associate one or more type(s) of data or media.

In an embodiment end user(s) can add numbers and associate details manually to user's address book or contact lists for making one or more types of call auto add numbers or auto adds, removes, updates & presents one or more or group(s) of numbers to user's address book or contact lists, for auto or manually making one or more types of call, based on user's activities, actions, interactions, events, transactions, senses or sensor data, location(s), check in place(s), status, presence information, user profile, user data, user connections, user's connections of connections e.g. friends of friends, user followers or following users, user selections, user searches or associate keywords, user behavior data, user privacy settings, rules & preferences, user logs, invitation by others and acceptance of invitation by user, user's subscription or registration with one or more types of one or more services, applications, call types, web sites, search engines, social networks, databases, servers & devices.

FIG. 36 illustrates exemplary graphical user interface (GUI) and shows exemplary call types 3603 associate exemplary one or more applications, interfaces, web services, web sites, web pages, set of controls or objects, one or more types of multimedia including text, data, audio, video, photo, image, emoticons, locations, links, object, apps & like 3602 associate with one or more types of one or more numbers, extensions, menus, users, agents, admins, clients, customers, contact(s), group(s) or list(s) or category of contacts, roles, entities, campaigns, projects, leads, cases, tasks, workflows, rules, activities, actions, events, transactions, locations, status, domains, web sites, applications, servers, devices, networks, inbound or outbound or hybrid types of calling 3601. User or admin or authorized user can apply, provide, add, update, remove one or more privacy settings, privacy policies, rules, preferences, create members or agents and assign access rights & privileges 3604 and add, update, remove, customize, attach or associate one or more applications, interfaces, web services, web sites, web pages, set of controls or objects, one or more types of multimedia 3602 & define associate presentation, invocation, access rules for calling and/or called users with one or more numbers, extensions, menus 3601, one or more types of call 3603. User is also enable to search, match, select, add, update & remove one or more numbers, extensions, menus 3601 and/or one or more types of call 3603. In another embodiment call type provided by server 110 and make available for all or authorized or subscribed users with or without one or more applications, interfaces, web services, web sites, web pages, set of controls or objects, one or more types of multimedia, so other users or authorized or subscribed users can search, match, select, purchase, access, download, install, uninstall, customize, provide privacy settings & access rights, associate with one or more numbers, extensions & menus said call types and/or one or more associate applications, interfaces, web services, web sites, web pages, set of controls or objects, one or more types of multimedia so users or contacts of user can access said call type and/or one or more associate applications, interfaces, web services, web sites, web pages, set of controls or objects, one or more types of multimedia before calling, while acceptance of call, during call session & after ending of call.

For example admin user attached or associated or added customized [Chat] application 3606 with number [123456789] 3605 and with [ChatCall] call type 3607 and apply or updates associate rules and privacy settings including present [Chat] application 3606 to both calling and/or called user(s) while acceptance of call by called user(s), allow calling to selected contacts from only number [123456789] 3605 to only particular created or updated or selected agents, allow selected contacts to dial or make call via number [123456789] 3605 to said particular created or updated or selected agents and any combination thereof, allow to accept set maximum number of requests of call, add, update & remove one or more queues with number [123456789] 3605 (discuss in detail in FIG. 37), add, update & remove one or more menus with number [123456789] 3605 (discuss in detail in FIG. 35), allow to access profile data or data of selected contacts e.g. customers or clients or students or users, allow to concurrently or in group manually or auto calling to set maximum number of users or contacts, define associate schedules (discuss in detail in FIG. 38), define or set type of call including inbound call, outbound call & hybrid call, allow to use number [123456789] 3605 for one or more selected clients or customers and/or selected projects or leads or tasks or cases for said selected one or more clients or customers, allow to access said number [123456789] 3605 associate agents to selected supervisors or admins, allow to access particular data, templates, questions, answers, forms, CRM applications, contacts & like, allow selected supervisors to pick up, monitor, barge in, conference, reorder queues, park, promote, record or save, retrieve, view or listen, & transfer calls.

In another example user select [Sharing Call] type 3611 and associate with his personal mobile phone number [9821898140] 3609 and related mobile contacts book and use default application [Share Media by Calling] 3610, so user can select, draft, compose, input, update, record, capture one or more media types and select one or more mobile contacts and or group(s) of contacts and initiate calling to said one or more selected contact(s) and in the event of acceptance of call by said call acceptance user(s) present said selected or shared media and based on privacy settings allow to converse or do not allow to reply.

In another example admin user attached or associated or added customized [Structured Survey] application 3614 with menu [Feedback] 3613 associate with number [123454321] (not shown) and with [Survey/Review] call type 3615 and apply or updates associate rules and privacy settings including present [Structured Survey] application 3614 to called user(s) while acceptance of call by allowed called user(s), allow calling to selected contacts from only number [123454321] to only particular created or updated or selected agents, allow to accept set maximum number of call, add, update & remove one or more queues with number [123454321] (discuss in detail in FIG. 37), add, update & remove one or more menus with number [123454321] 3605 (discuss in detail in FIG. 35), allow to access profile data or data of selected contacts e.g. customers or clients or students or users, allow to concurrently or in group manually or auto calling to set maximum number of users or contacts, define associate schedules (discuss in detail in FIG. 38), define or set type of call including inbound call, outbound call & hybrid call, allow to use number [123454321] and associate [Feedback] menu 3613 for one or more selected clients or customers and/or selected projects or leads or tasks or cases for said selected one or more clients or customers, allow to access said number [123454321] and associate [Feedback] menu 3613 associate agents to selected supervisors or admins, allow to access particular data, templates, questions, answers, survey forms, applications, contacts & like, allow selected supervisors to pick up, monitor, barge in, conference, reorder queues, park, promote, record or save, retrieve, view or listen, & transfer calls.

In another example enabling user or job seekers to post job profile with call number(s) at server 110 and enabling job requirement poster or employer to post and list job requirements with call number(s) at server 110 and server 110 is enabled to match making them and add, update & remove contextual contacts of each other and present or update matched contextual list of contacts or call numbers of employers to each job seekers and job seekers to each employers and enable them to real time call each others via e.g. "Job Call" call type. User can select "Job Call" call type and call to said matched list of or one or more selected employers or job seekers or current or past employees of particular employers or companies and in the event of acceptance of call calling and/or called users can access customized attached or default applications for communicating, sharing & like. In another example admin user to attached or associated or added customized [Insta Job] application 3618 with number [987654321] 3617 and with [Job] call type 3619 and apply or updates associate rules and privacy settings including present [Insta Job] application 3618 to both calling and/or called user(s) while acceptance of call by called user(s) for enabling call acceptance user to view & access application and provide or update job profile, chat or share with matched or contextual employers, conduct conference call, fix meetings & like, allow calling to selected contacts from only number [987654321] 3617 to only particular created or updated or selected employers and/or agents and/or authorized users of recruitment agency, allow selected contacts to dial or make call via number [987654321] 3617 to said particular created or updated or selected agents and any combination thereof, allow to accept set maximum number of requests of call, add, update & remove one or more queues with number [987654321] 3617 (discuss in detail in FIG. 37), add, update & remove one or more menus with number [987654321] 3617 (discuss in detail in FIG. 35), allow to access profile data job profile or data of selected contacts e.g. customers or clients or students or users, allow to concurrently or in group manually or auto calling to set maximum number of users or contacts, define associate schedules (discuss in detail in FIG. 38), define or set type of call including inbound call, outbound call & hybrid call, allow to use number [987654321] 3617 for one or more selected clients or customers and/or selected projects or leads or tasks or cases for said selected one or more clients or customers, allow to access said number [987654321] 3617 associate agents to selected supervisors or admins, allow to access particular data, templates, questions, answers, forms, Job applications, contacts & like, allow selected supervisors to pick up, monitor, barge in, conference, reorder queues, park, promote, record or save, retrieve, view or listen, & transfer calls.

In an another example enterprise users are enable to list one or more products and/or services with details including e-commerce call number(s) and/or associate extensions and/or menu(s) in one or more categories and making them searchable for other users for networks. So other users of networks or end users or customers or prospective customers can search, match, browse directories and can select one or more e-commerce call number(s) and/or associate extensions and/or menu(s) and can save to contacts or bookmarks and/or based on user's privacy settings allow said contact or call number owner to call user with or without disclosing caller id or user's name & identity or call number of user, which presents in user's contacts in separate section of contact lists e.g. 205 or under "E-commerce" section or e-commerce groups of contacts 205. So user can select one or more contacts and can make call or group call or multi call or select "e-commerce" call type 290/295 and select one or more or group(s) of call(s) for communication, make enquiries, share data or profile, book tickets, get appointment, order or add to cart & purchase (make payment via one or more payment modes or methods or systems) products or services. In another embodiment user can follow or allow sellers or advertisers or marketers to call user based on user's one or more preferences including selection of one or more categories, keywords, names of brands or products or services which user's is using or are interested to use or like/bookmarked/searched by user. On other side enterprise user(s) is/are enabled to accept call of said users or call users based on each user's permission. While user search or browse directories and bookmarks or adds seller's numbers and allow sellers to call user, system automatically adds user's number to said seller's list of contacts so seller(s) can call user(s) or user can call seller(s). On the other side medium to large enterprise users can use dedicated numbers, extensions & menus for e-commerce and employ more than one persons to call prospective customers or accept calls of prospective customers for presenting, marketing, selling, advertising, identifying or converting leads, take orders, accept payment, provide answers for one or more products & services. For example enterprise user select "E-commerce" call type 3623 and attach web site [www.realtimeE-com.com] 3622 with server 110 provided number e.g. [555666777] and associate menus [Order], [Book], [Appointment] 3621 for enabling calling user to access menu and select desired option for communicating with related agents or sales persons and sellers. So appointed or authorized person can call authorized list of contact lists of customers or prospective customers or opt-in leads or accept incoming calls based on assigned queues, schedules, menus & extensions.

For example admin user attached or associated or added customized [www.RealtimeEcom.com] website 3622 with menu(s) 3621 associate with number [555666777] and with [E-commerce Call] call type 3623 and apply or updates associate rules and privacy settings including present [www.RealtimeEcom.com] web site 3622 to calling and/or called user(s) while acceptance of call by called user(s), allow calling to selected contacts from only number [555666777] to only particular created or updated or selected agents, allow selected contacts to dial or make call via number [555666777] to said particular created or updated or selected agents and any combination thereof, allow to accept set maximum number of requests of call, add, update & remove one or more queues with menu(s) 3621 number [555666777] (discuss in detail in FIG. 37), add, update & remove one or more menu(s) 3621 with number [555666777] (discuss in detail in FIG. 35), allow to access profile data or data of selected contacts e.g. customers or clients or students or users, allow to concurrently or in group manually or auto calling to set maximum number of users or contacts, define associate schedules (discuss in detail in FIG. 38), define or set type of call including inbound call, outbound call & hybrid call, allow to use number [555666777] or menu(s) 3621 for one or more selected clients or customers and/or selected projects or leads or tasks or cases for said selected one or more clients or customers, allow to access said number [555666777] or menu(s) 3621 associate agents to selected supervisors or admins, allow to access particular data, templates, questions, answers, forms, CRM applications, contacts & like, allow selected supervisors to pick up, monitor, barge in, conference, reorder queues, park, promote, record or save, retrieve, view or listen, & transfer calls.

In other embodiment user is enable to post requirement specifications for receiving bids or quotes and/or buying, bidding, ordering, subscribing of products and/or services. So server 110 can match user's requirement data with listing details or data posted by sellers or listing users and create or update lists of matched sellers for requirement posting users and prospective buyers for listing users or sellers and present to users including prospective sellers or buyers at user's application in separate section of contacts, so user can select one or more numbers or contacts from list(s) and call to them and in the event of acceptance of call user is presented with call type associate application to calling and/or called user(s) for sending quote, negotiation, compression, enquires, queries, sharing data, make order & like.

In another embodiment user can search, match, browse directories and select one or more group deals and offers and participate and/or call one or more selected contacts of user for referring said selected one or more deals and offers and real-time get approval or not approval for participate in group deals or offers.

In an another example 3631 user can participate in one or more types of lottery or free gift schemes and based on various rules when user(s) call(s) to particular number or when user(s) accept call(s) from particular user(s) and/or provide inputs including provide asked information, solve puzzle, provide answer(s) of question(s), select from provided multi selection with question, to-do one or more type(s) of actions(s), activities, transaction(s) as per one or more type(s) of instruction(s) then user is enable to win or lose lottery or receive free gifts or samples.

In an another example in user to user services type of call 3631 user can register with user to user services types of call wherein each user provide and/or consume one or more types of user services to other users including ask question, provide answer, ask for review, provide review, follow users & like. Based on providing of service(s) and associate privacy settings, rules & preferences user receive service(s) specific call(s) from other user(s). When service consumer user select services then based on type of service user is presented with service type specific interface e.g. when user select ask question service then user is presented with related interface so user can search, match, select, input or update question and call to selected or matched users of network who can provide answer service and who is able to provide answers and in the event of acceptance of call by answer service provider user(s) then interface is presented to calling and called user(s), wherein called user i.e. answer service provider user is enable to view asked question(s) and provide answer(s) and calling user i.e. ask question service consumer user is enable to view said question specific answer(s) from said provider user(s). Both user can further ask queries or answers and can end call session.

Figure 49:
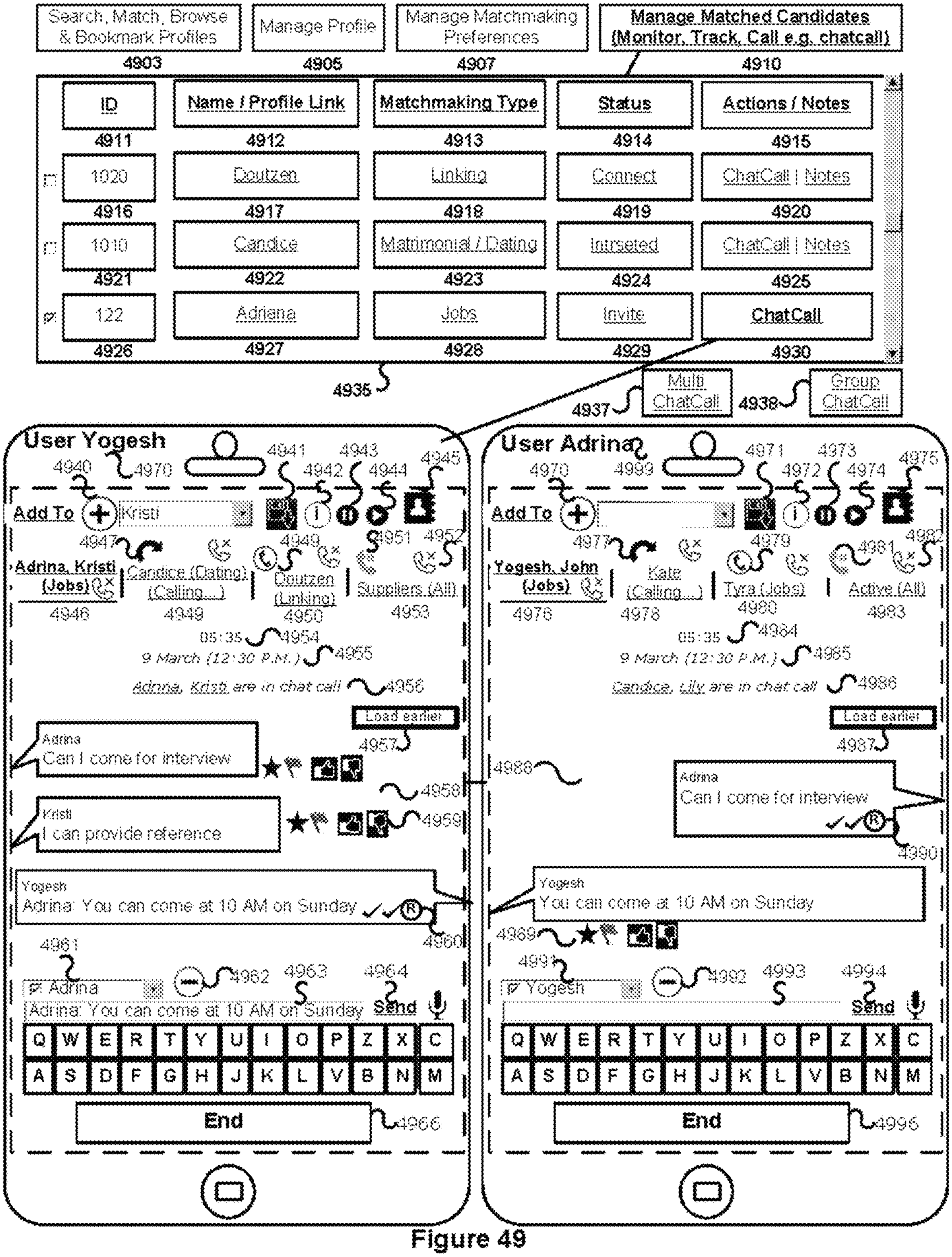

In an another example Link call 3639 which is discuss in detail in FIG. 49.

In an another example in Games Type of Call 3643 user can register or participle with game and real-time call to other matched or contextual users network for inviting them and in the event of acceptance of call particular or preferred game application(s) is/are presented to participating users or members.

In an another example in Presentation Type of Call 3643, wherein presenter can call to selected users who register or opt-in with or are customer or client or guest of particular user(s) or brand(s) or shop(s) or product(s) or services for presenting particular presentation of products or services or entities. In the event of acceptance of call calling and/or called user(s) is/are presented with customize presentation application with shared data or presentation including calling user or presenter can auto present presentation or present slides and explain to call acceptance user(s) or sole queries or book order or subscribe or register user or generate one or more types of leads & like.

In an another example in one or more types of inbound call 3647 e.g. support call, customers can call to particular numbers for receiving support from authorized persons or experts or agents, wherein calling user call to particular number and in the event of acceptance of call both users are presented with customized or selected interface(s) with contextual data.

In an another example in one or more types of outbound call 3651 e.g. marketing, wherein user is presented with opt-in numbers and names with or without details or auto calling to said list of users and in the event of acceptance of calls by said called users, calling user(s) or agent(s) is presented with pre-selected or selected or customized interface(s) for enabling to marketing activities with said called user(s) including present new products or new updates in existing products, explain schemes, book order, subscribe or register user, solve queries & like.

In an another example in one or more types of Advertisement Call 3655 wherein based on user preferences, opt-in permissions or preferences, registrations, privacy settings, locations, check-in place(s), status, updates, profile, user data, user activities, actions, logs, events, transactions, behavior, interactions, senses and rules, advertisers can call to contextual users of network based on advertisement(s) types, bids, location, keywords, presences, content of advertisement and in the event of acceptance of call(s) by user(s), advertising user(s) and/or called user(s) or prospective advertisement viewer(s) is/are presented with selected or pre-selected or customized or contextual or auto matched interface(s) and/or one or more types of data/contents/multimedia and/or application(s) and/or web service(s) and/or one or more or set of control(s). So advertiser can real-time target contextual users and can promote or market or present products or services, book order, subscribe services, gain leads or receive user feedbacks.

In an another example in one or more types of Payment Call 3659 wherein user can call other user to make payment or receive payment. In an embodiment Buyer can make payment via calling to seller and in the event of acceptance of call payment is made to seller. In an embodiment seller can ask for payment via entering amount and calling to buyer at buyer' number and in the event of acceptance of call by buyer, buyer's one or more types of digital money transferred to said calling user or seller's account or digital wallet. Incoming or outgoing call interfaces also present with payment details including amount, type of currency, name, number, identities, purchase details, discounts, receipts or invoice and address & like.

In an another example in one or more types of On-demand Service Call 3659 wherein user can select type of on-demand service e.g. cab service and select number or select cab icon associate number and call to said on-demand service provider(s) and in the event of call acceptance by on-demand service provider(s) or on-demand service consumer(s) or prospective on-demand service consumer(s), they are presented with preferred or presented with selected or pre-selected or customized or contextual or auto matched interface(s) and/or one or more types of data/contents/multimedia and/or application(s) and/or web service(s) and/or one or more or set of control(s) for enabling them to negotiate, ask queries, view status, bid, provide or accept offers, book, subscribe to them & like.

In an another example in one or more types of Communication Call e.g. e-mail call 3659 wherein user can draft email and call to one or more selective users and/or group(s) wherein in the event of acceptance of call by said called users, said called user(s) is/are presented with email, so viewing user can read and reply or forward email or end call to read or access or response it alter. Calling user is notified that user accepts call, spent particular duration on call session, viewed email or calling user is presented with replied email, if called user reply email. Called user is also notified that user viewed replied email. After real-time viewing and/or replying to email within call session calling and/or called user can end call and based on privacy setting they can access or reply or view email(s) later.

User can select the Queues 2828 option from the navigation bar or main menu 2801 for adding or editing queues. FIG. 37 illustrates exemplary Graphical User Interface (GUI) for managing one or more queues. Queues place incoming callers into a waiting area to be answered by the next available member. Queues can useful in various places e.g. sales, support and service departments when there is more than one person accepting calls. In another embodiment Queues are configured with outside phones numbers and can be personalized with custom recordings. User can select "Go to Queue" 3058/3123 and select customized or created or configured queue 3130 in call handling rules. Queues route incoming calls to a specific group of phones & extensions within user's system. To add a new queue, select the Add New Queue button 3705 or Edit New Queue button 3718 for adding or editing new queue 3750. User can give queue a nickname 3752 to help user identify it when configuring user's system. The nickname 3752 will be held internally within user's account and will not be displayed to user's callers. The Queue Announcement is the initial selected message 3753 callers' view or selected audio 3754 callers hear when sent to the queue. In an embodiment Queue Announcement will need to be created before Queue can be created. User can select the drop down menu to select Queue Announcement. To preview greeting, select the Play button 3758 on the player to the right. While ringing to the members of Queue, callers will view selected hold message 3757 or hear selected hold music 3756 rather than ringing. User can select the hold message and/or hold music callers will view and/or hear when waiting to be connected. To preview the hold music, user is enabling to press the Play button 3758 on the player to the right. After a caller has been on hold for this maximum hold time set 3759, they will be forwarded to the message recorder box 3760 user select if no answer from a Member in user's or admin's Queue. User can first select the amount of minutes to leave user's callers on hold. This is the total amount of time the system will ring each Queue Member. User can select the extension to leave a recorded message if no answer from a member on queue. Caller ID to Show Members 3756 setting will determine what number members of this queue will see on their caller ID when a call arrives at their phone from the Queue. Caller's ID will display the callers ID on user's receiving device. Called Number will display the phone number that the caller dialed. Queue Members 3765/3768/3770 are persons who will be assigned to this queue 3752/3722. User can select or enter the call number e.g. chat call number or 10-digit phone number 3781/3782/3783 of user's Queue Member in the field(s) provided. In an embodiment by default, queues use a Round Robin Memory strategy—When a called is received it will ring one member and continue with all others in a circular fashion until it is answered. The next call remembers which member was last and starts with the next. In an another embodiment auto determine available or free members who are ready to accept call and auto forward call to said first available member. To add new members, click the "Add Another Number" button 3773. In an embodiment only 1 phone number per field e.g. 3781/3782/3783 allowed. In an embodiment the Ring Time 3775 to Queue Members will determine how many seconds the system will ring each Member. For example, selecting 5 seconds will ring each Queue Member for this amount of time in a Round Robin fashion. Each Queue Member will ring for 5 seconds for user's entire selected Maximum Hold Time, as described in the Maximum Hold Time section above. To add new members to existing queue 3750/3722, select the Add Another Number button 3773 within the Members of the Queue section. To delete an existing Queue Member, user can select the "Delete" button 3765/3768/3770 to the right of the member to remove. User can cancel 3778 changes or save or update changes 3780.

User can select the Schedules 2825 option from the navigation bar or main menu 2801 for adding or editing Schedules. FIG. 38 illustrates exemplary Graphical User Interface (GUI) for managing one or more Schedules.

Schedules allow user to set user's availability, business hours or custom action hours. Schedules are used when assigning actions to numbers, extensions, menu items and more. Creating a schedule for particular date/time or date and/or time range(s) e.g. Monday-Friday, 8 am—5 pm will give user the option to route calls to one destination during those hours and after those hours calls will be routed to a different destination. User can create a schedule with user's available hours. This schedule will now be available to apply when defining phone number, extension and menu item destinations. Route calls received during user's available hours to one destination and calls received outside of available hours to a different destination (e.g., send callers to call recorder or message recorder or message saver system). To begin creating a schedule, user can select the "Schedules" option from the navigation bar or main menu 2801 and select the button to "Add a Schedule" 3805. In an embodiment user can select a Daily schedule 3852, the times will apply Monday through Sunday (not shown in figure). User can set time (not shown in figure) for Daily schedule 3852. In an another embodiment user can select Weekday-Weekend 3853, when selected, the option to apply user's schedule during Weekdays only or Weekends only is available. User can check the box 3860 and/or 3870 of which day user would like to apply, either Weekdays, Weekends or both. User can set the time 3862 & 3863/3872 & 3873 for Weekday Weekends schedule. In an another embodiment a custom schedule 3855 allows user to enter different hours for one or more or all days of the week (not shown in figure). User can set or select to use the default time zone 3875 for user's schedule. The time zone applied will affect how user's calls are applied using this schedule. If default time zone does not appear correct, modifications can be made within the System Settings. To use a different time zone than user's default account time zone, user can select custom time zone 3875 for this schedule. After creating schedule, user can cancel 3880 changes or update or Save Changes 3885. Advanced settings 3890 allow user to input exceptions to user's schedule, such as during a scheduled meeting, holiday hours, vacation days or anything else user may require. User can select the "Yes" option to use an exception with the schedule. User can select the Start date 3892 by clicking the calendar icon to choose a day to begin user's schedule exception and select the End date 3895 by clicking the calendar icon to choose a day to end user's schedule exception. User can select the time frame or range to apply the schedule exception. For example, during these days, I will be taking an extended lunch break from 12 pm to 3 pm. To add multiple schedule exceptions, user can select the Add button 3895. User can cancel 3880 changes or save or update changes 3885.

Figure 39:
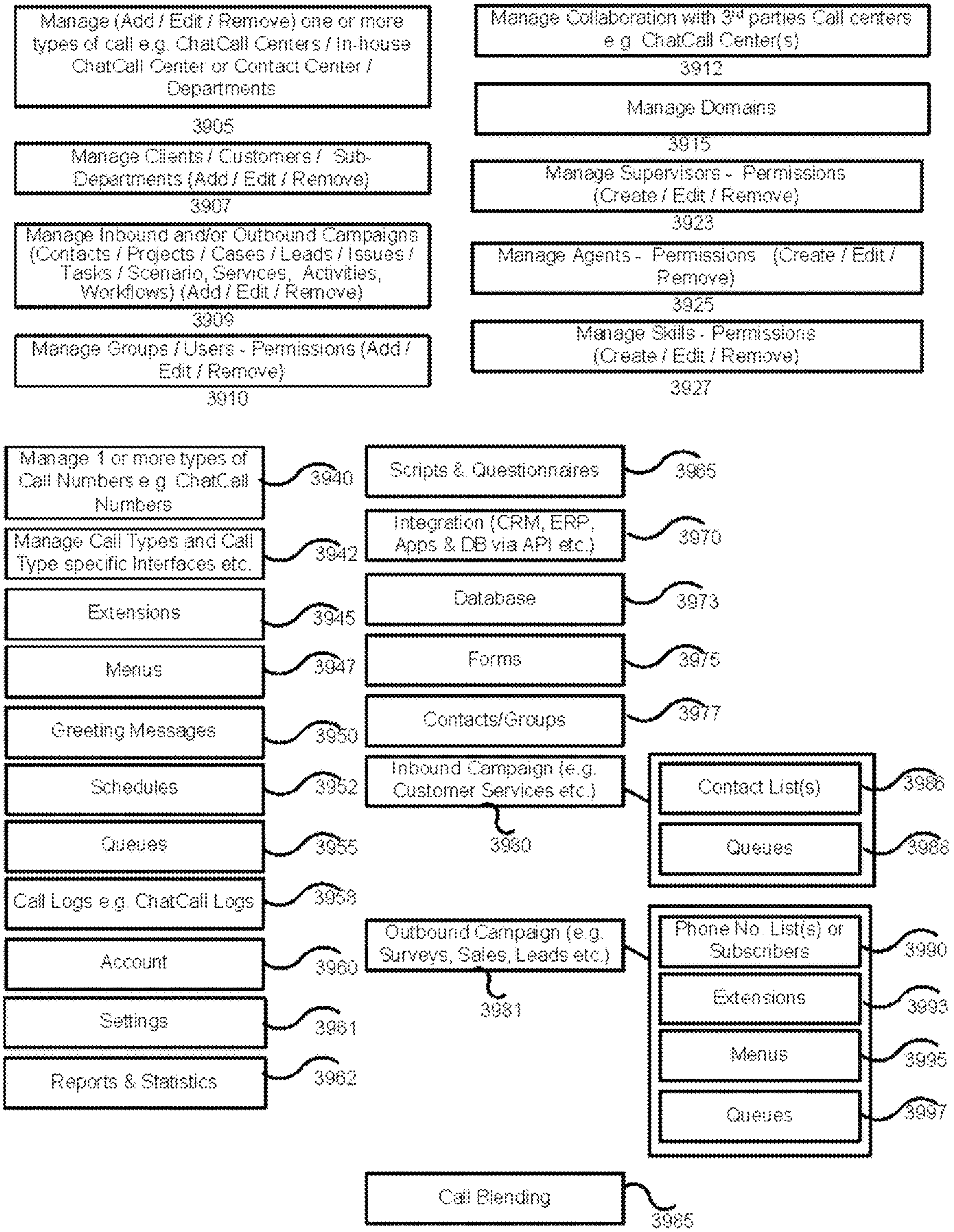

FIG. 39 illustrates exemplary interface including web based or smart client or application for call center for managing one or more types of call in which few of them are discussed in FIG. 36. The one or more types of e.g. ChatCall Cloud Call Center service allow business agents to receive and queue incoming one or more types of calls from a central phone number. The Agent and Supervisor Software Clients allows users to engage with the Call Center service, including login/logout, setting personal status and view detailed call queue reports.

Admin user is enable to add, update or remove one or more call centers or department 3905 for attending or managing one or more types of call (in which few of them are discussed in FIG. 36) for managing one or more inbound and/or outbound campaigns related to one or more contacts, projects, cases, leads, issues, tasks, scenario, services, activities, workflows 3909 of one or more clients, customers, departments or sub-departments 3907.

The call center can hosted on the server 110 and admin user can access it over the network 125 either from the Admin Portal or from a browser.

In an embodiment this software is designed to make campaigns for incoming and outgoing calls. Campaigns assign by client and created by admin to execution of a set of calls. Admin can execute several simultaneous campaigns. These calls allow interaction between operators (agents) and people contacted (subscribers). In an embodiment each queue may have at least one agent and each campaign uses one queue. An Agent can be part of more than one queue.

The administrator user can create or add, update & remove one or more number 3940 (discussed in detail in FIG. 29), extension(s) and call handling rules 3945 (discussed in detail in FIG. 30), menus 3947 (discussed in detail in FIG. 35), call types 3942 (discussed in detail in FIG. 36), agents 3925 (discussed in detail in FIG. 43), supervisors 3923 (discussed in detail in FIG. 44), skills 3927, queues 3955 (discussed in detail in FIG. 37), schedules 3952 (discussed in detail in FIG. 38), create new outbound campaigns (discussed in detail in 42), create new inbound campaigns (discussed in detail in 41), start, stop and configure the predictive dialer.

The creation of users and agents is important for the operation of the call center. For security reasons and control, admin can restrict the access for these users. It is necessary to create a group with restricted access to the interface. (just the agent console see FIG. 41). Admin can create the new group e.g. Administrator, Operator, Extension, Call Center and configure the permission for the new group. Once admin created the group with restricted access, admin can create the users for the agents. Admin can create as many users as agents admin need. Admin can create as many extensions as agents required in a campaign. The call center will transfer all the calls of any campaign to the agent extension. Creating an agent is different from the creation of users. The agents are generated in the call center module. An Operator/Agent, will need a user to login to server 110. Once in the interface, he will need an agent user to login the call center. Admin can create one or more agent(s) including providing agent number, agent name and password.

In an embodiment admin can list, search, match, browse, and select $3^{rd}$ parties call centers 3912 and request for call center services for one or more types of call and campaigns based on one or more types of use or access models or service models or subscriptions models and payment models.

Admin can define domain(s) 3915, Domain enable calls to be handled according to their geographical location. Domains are defined by the leading digits, such as the area code or area code plus a prefix, in the caller ID. The system can generate reports on domains, for example to show how many calls have been received from a particular geographical area.

The Call Center—Agent client (discuss in detail in FIG. 41) is designed to support the needs of Call Center agents in any environment. It supports the full set of call handling functions, Automated Call Distribution (ACD) state management, integration of multiple directories, Outlook integration, and other features required in large call centers.

The Call Center—Supervisor client (discuss in detail in FIG. 40) is designed to support the needs of call center supervisors in any environment. It supports agent monitoring, queue management, real-time and historical reporting, and other features required in large call centers.

Admin or agent or supervisor can log-in to access call center from any device including mobile, PC, tablet or digital devices. Admin or agent or supervisor can sign in to one or more types of Call Center using hot desk functionality, that is, sign in from any available desk configured for that purpose. Upon login, a desk's phone number (provided by server 110 or unique mobile number) is associated with a certain agent and behaves as if it were the permanent phone of the agent for the duration of the login session. This allows agents to use a single login ID to perform their work independently of their location. Admin Portal has a Single Sign-On feature. When admin access the Call Center client from the web portal, admin do not need to provide his/her credentials since admin(s) is/are already logged in to the web portal.

Admin user can sign in from Web Browser. In web browser, admin can enter the Uniform Resource Locator (URL) of the Call Center client for invoking the Call Center Sign-in page. Admin can enter 10-digit Number (provided by server 110) for User ID and enter password.

It checks stay signed in to instruct the client to automatically reconnect and sign in to the server 110 when it detects a network connection. This should generally be enabled to help mitigate intermittent internet connections. When disabled, the client signs out the user when the connection is lost. To configure domain, in the Append Domain text box, admin can enter domain name. When admin enter his/her user ID without a domain, the system appends the configured domain instead of the system-wide default domain. To change the language, from the Language drop-down list, admin can select a new language. Admin can Click Sign In for starting Call Center and now admin user(s) is/are signed in.

In an embodiment user can only have one active Call Center session at a time. When user sign in from a second location, user(s) is/are automatically signed out from the original location with the following message: "You have been signed out as you have signed in from another location."

Admin can dynamically create and update forms 3975 including provide name of form, description of form, add, update and remove one or more fields and select associate data types including text, list, date & time, check box, radio button, combo box, list, currency, numeric, flag etc. Admin can select said one or more forms for one or more campaigns.

Admin can create, update and remove scripts and questionnaires 3965 for one or more campaigns. Admin can select said one or more scripts and questionnaires for one or more campaigns.

Admin can create, update and remove databases 3973 for one or more campaigns. Admin can select said one or more databases for one or more campaigns.

Admin can integrate one or more applications including CRM, ERP etc., services, and databases via API 3970.

Admin can add, update, remove, search, match, select, import, download, upload, create groups or lists of contacts and create lists of contacts for inbound and/or outbound campaigns, provide access rights of selective contacts or group(s) of contacts for agents 3977.

Figure 40:
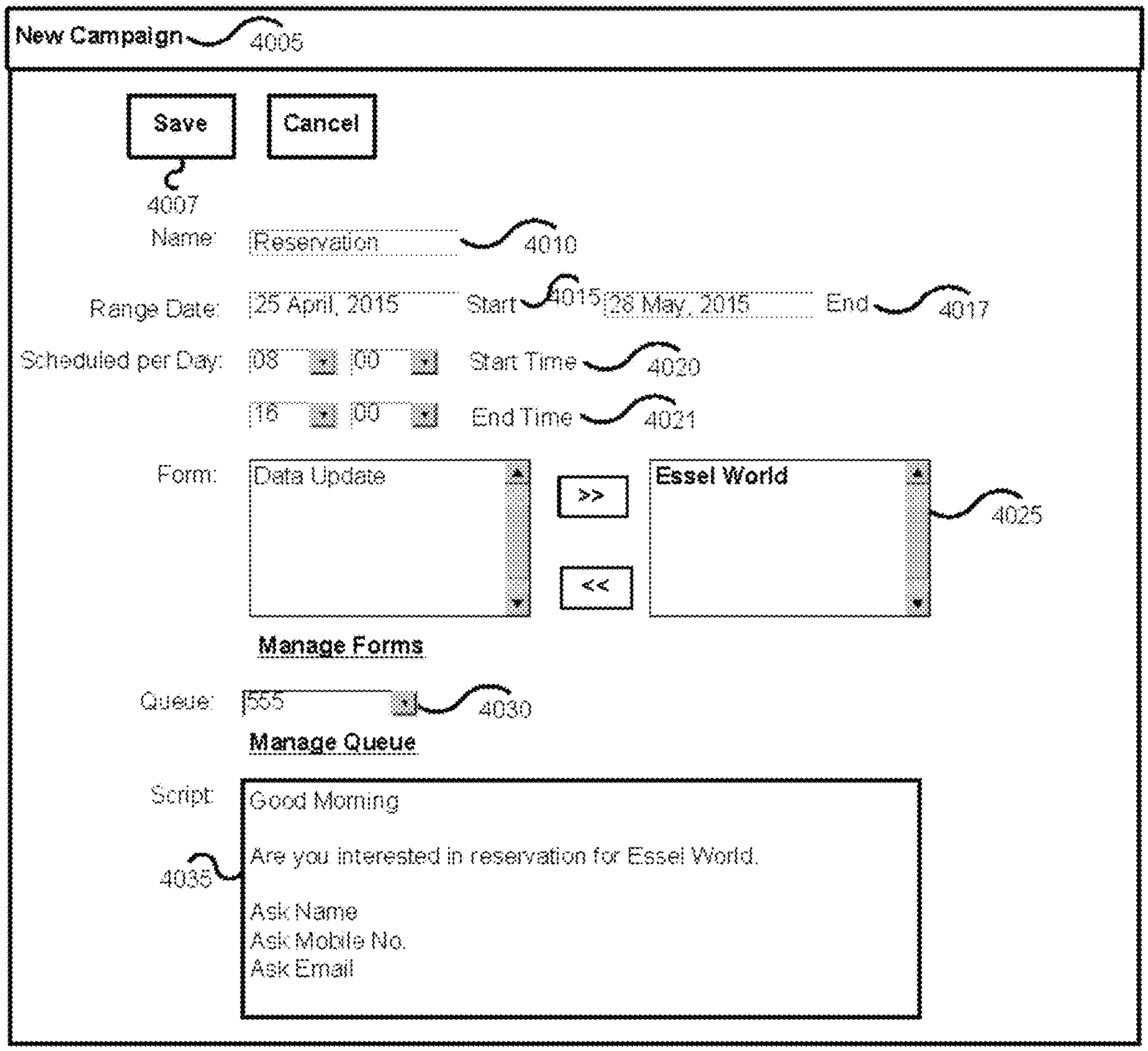

Admin can create one or more inbound campaigns e.g. customer services, supports etc. 3980 and add queue(s) 3988 & add campaign specific contacts 3986 for one or more campaigns (discuss in detail in FIG. 40).

Figure 41:
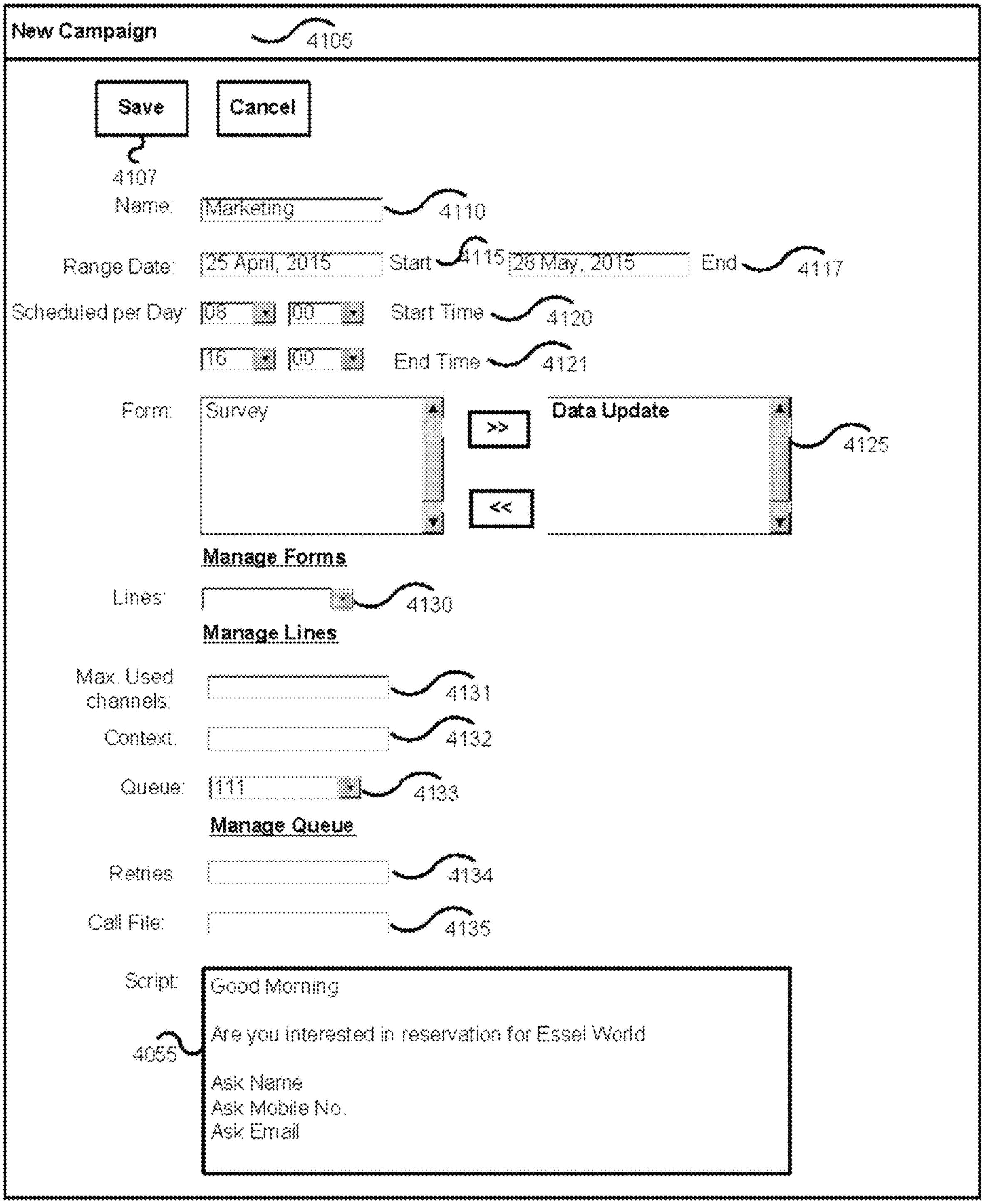

Admin can create one or more outbound campaigns 3981 and add queue(s), add list of numbers 3990, add extensions 3993, add menus 3995 and add queues for one or more campaigns (discuss in detail in FIG. 41).

Admin can create one or more blending campaigns 3985 i.e. inbound as well as outbound campaigns.

FIG. 40 illustrates exemplary interface for managing incoming calls or inbound campaign(s). Admin is enabling to add or create clients and associate incoming calls or inbound campaign(s) 4005 including provide campaign name 4010, campaign start date 4015 and campaign end date 4017, daily schedule stat time 4020 and end time 4021. Admin can add, update, remove, import and load incoming calls or inbound campaign(s) specific contacts (not shown in figure). The module verifies the incoming number with the list and shows the information of the contact to the agent (if it is available). Admin can select a queue 4030, so the module will transfer all the incoming calls to the queue and the queue will distribute them to the agents configured. There can be several queues and admin can activate several ingoing campaigns. A queue can be selected on more than one active campaign. After selecting the queue, it is recommended to load the list of clients to the database. After creating Incoming Call Campaign, admin can select the form 4025 to use and write a Script 4035 for the agent. Once admin created the campaign, it will begin its operation and it will assign calls to all login agents. Admin can define a queue which includes the agents. The predictive dialer is not used in this operation mode. It is required to route the calls from subscribers to the campaign queue. The system registers the agent assigned to a call in a database. This information will be used for reports and consult. Admin can load a list of numbers of clients, with additional information. The agent will see this information available on the console.

FIG. 41 illustrates exemplary interface for managing outgoing calls or outbound campaign(s).

Admin is enabling to add or create clients and associate outgoing calls or outbound campaign(s) 4105 including provide campaign name 4110, campaign start date 4115 and campaign end date 4117, daily schedule stat time 4120 and end time 4121. After creating Outgoing Call Campaign, admin can select the form 4125 to use, write a Script 4155 for the agent, select line(s) 4130, input or enter max used channels 4131 and select queue(s) 4133. Once admin created the campaign, it will begin its operation and it will assign calls to all login agents. Admin can add, update, remove, import and load outgoing calls or outbound campaign(s) specific number list 4135. Admin can create a new outgoing calls or outbound campaign(s). The module allows to have several campaigns working at the same time. Just like ingoing calls, a queue can be assigned to more than one campaign. However if we have a queue on an ingoing campaign, we won't be allowed to use it in an outgoing campaign. Once admin create the campaign, the dialer will begin its operation and it will assign calls to all the logged in agents. The module has a feature that allows agent to enter numbers that must not be called. This functionality allows to enter a specific number. It also allows to load a list of numbers from a file e.g. .csv file. The system uses a list of numbers to call. When admin activate the campaign, the system will dial this numbers, verifying that there are free agents registered in the queue. As many calls as free agents. This method links the queue with the subscriber number. If the call is successful, then it enters the queue and is assigned to the next free agent. The assignment depends on the ring strategy of the queue (e.g. round robin, linear, wrandom . . . etc.). The system registers the agent assigned to a call in a database. This information will be used for reports and consult. At the end of the call, the agent will be placed on standby, and will be available to receive a call. This process continues till the last number on the list. We can configure retry attempts, in this way the module will call all the numbers with unsuccessful calls.

Admin can activate, deactivate, start, pause, stop one or more selected campaigns.

Figure 42:
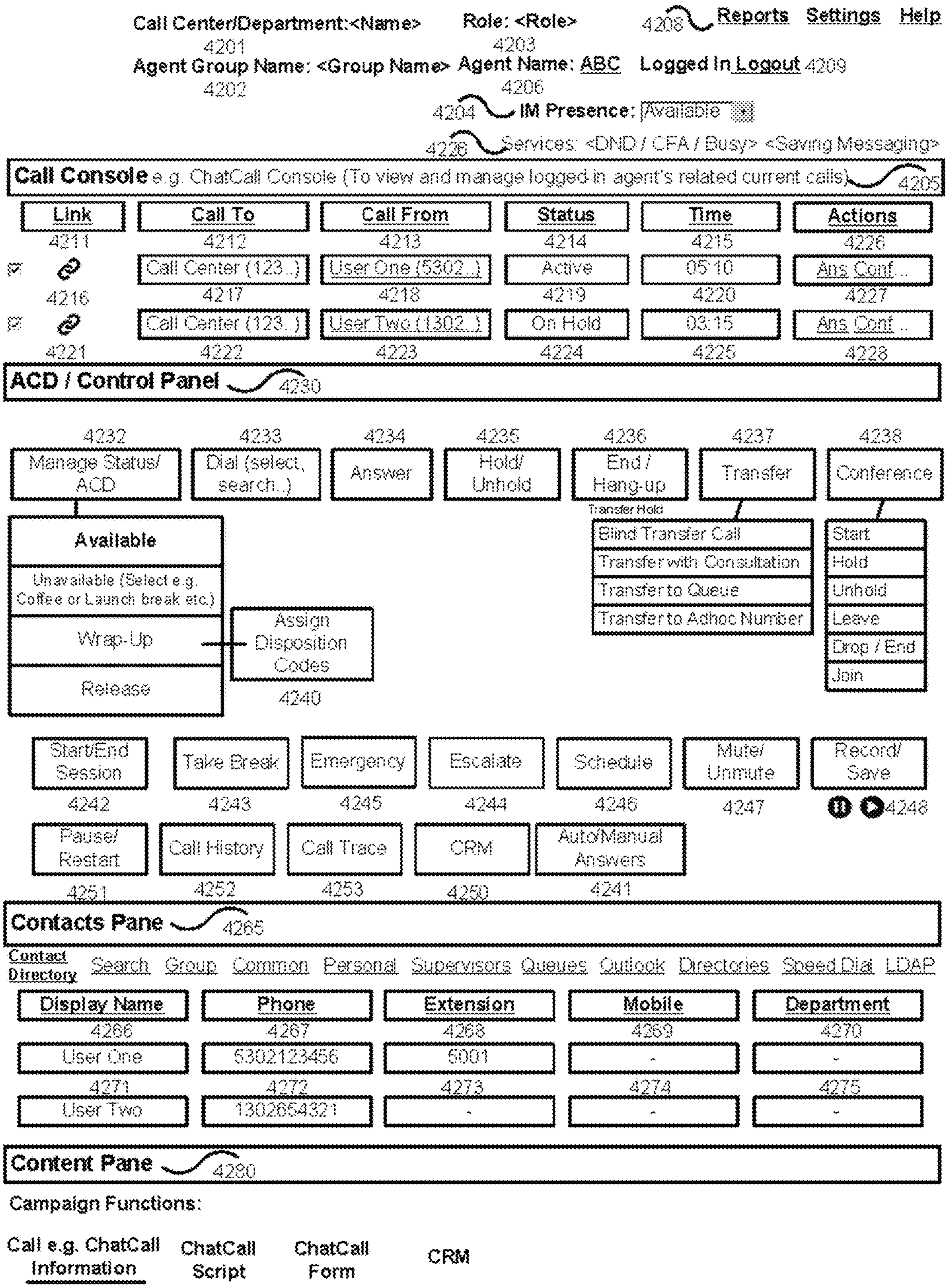

FIG. 42 illustrates exemplary user interface or Agent client (e.g. Call Center Agent Client) for agent which is designed to support the needs of Call Center agents in any environment. It supports the full set of call handling functions, Automated Call Distribution (ACD) state management, and integration of multiple directories, contacts applications e.g. Outlook integration and other features required in small, medium, large enterprise or dedicated call centers.

Agents can Log-In to system to access agent's client or interface, wherein exemplary agent's interface shown or discussed in FIG. 42.

After Log-In agent can view Agent Name 4206, identity, profile, role 4203, department or call center name 4201, group name 4202, IM presence information 4204, enabled or disabled services 4226. Agents can logout via tapping or clicking on 4209.

Call Console e.g. ChatCall Console 4205 enables agent to view and manage agent's related current calls. The Contacts pane 4270 contains agent's contact directories, the list of agent's Supervisors, and the list of the call centers to which agent belong. It allows agent to use agent's related contacts to make and manage agent's calls.

Call Console or Switchboard 4205 enables or allows agent 4210 to manage current calls related to agent.

Agent can set up Call Center when sign in to Call Center for the first time including agent can configure the settings: Configure the queues agent want to join on sign-in, Configure agent's post sign-in and post call ACD states, Configure the supervisors whose call status agent want to monitor and select Supervisors to Monitor.

ACD/Control panel 4230 allows agent to modify agent's availability state (Availability combo-button including Available, Unavailable, and Wrap-Up states) 4232. Here agent(s) can manage calls including Dial, Trace, Answer/Hold, Transfer, Conference, End, Escalate, and Emergency Call buttons etc.)

Agent ACD States 4232 can be one of the following: Available—Agent is/are available to receive calls, Unavailable—Agent are not available to receive calls and Wrap-Up—Agent is/are wrapping-up a call and temporarily unavailable to receive calls.

When agent sign in to Call Center, agent's ACD state is set to the post sign-in ACD state set on the Settings page. To change agent's ACD state, agent can select ACD state from the ACD drop-down list 4232.

Status bar—Located at the bottom of the main interface (not shown) displays agent's phone number (if available), Outbound DNIS button (Premium queues), agent's user ID, agent's status for Do Not Disturb, Call Waiting, Auto Answer (if enabled), and agent's current availability to take calls. Agent can select agent's Outgoing Call Identity Agent can select a new state from the Presence dropdown List 4207. Agent's presence state is updated as soon as agent selects a new value from list 4207.

Agent can enable or disable Services including Call Waiting, Call Forwarding Always, and Do Not Disturb, provided that agent's administrator has assigned the services to agent.

Information 4226 about the enabling or disabling of services and features including Do Not Disturb (DND), Call Forwarding Always (CFA), Busy phone state and Save or Record Messages is/are provided to agent. The information may presented in the form of icons to the left of agent's name in the following format: <DND/CFA/Busy> <Saving Messaging> 4226.

The <DND/CFA/Busy> state is represented by one icon, where Do Not Disturb has precedence over Call Forwarding Always, which has precedence over agent's Busy Phone State. If none of the services is enabled and agent's phone state is Idle, the icon is not displayed. The Message Recorder icon is present only if agent's have outstanding voice messages.

The Contacts pane 4265 contains agent's contact directories, the list of agent's supervisors, and the list of the call centers to which agent belong. It allows agent to use agent's contacts to make and manage agent's calls. The Contacts pane contains agent's contact directories and allows agent to manage agent's contacts and use contacts to make calls or take actions, such as transfer to contact or queue, on existing calls. The Contacts pane 4265 contains logged-in agent's related contact directories, the list of logged-in agent's related supervisors, and the list of the call centers to which logged-in agent's belong. It allows logged-in agent's to use his/her contacts to make and manage logged-in agent's calls.

The Contacts pane 4265 may contains the following panels: List of contact directories, list of contacts related to particular categories or group(s), Search Panel where agent can use the Search panel to look for specific contacts in agent's contacts' directories, Enterprise/Group Panel, Common Panel contains the contacts in group's common phone list configured by agent's administrator, Personal Panel contains the contacts from agent's Personal Phone List. It displays the name/description and phone number of each contact, Agent Panel (visible to Supervisors) used by supervisors to monitor and manage agents under their supervision, Supervisor Panel (visible to Agents) available to agents, contains the list of agent's supervisors. The main purpose of this directory is to allow agent to contact a supervisor quickly, Speed Dial Panel, Queues Panel available to both agents and supervisors and lists the call centers agent are staffing as an agent or monitoring as a supervisor and the associated Dialed Number Identification Service (DNIS) numbers and enable to transfer calls to queues, Custom Directories Panels, Outlook Panel, and Directories Panel.

The contact directories agents have access to depend on agent's system configuration as well as the services assigned to agent. Agent can Show or Hide Directories, when agent click a contact, the entry expands and the contact's information, such as phone numbers and the action buttons for the operations that agent can currently take on that contact appear.

Agent can select an incoming call from call console or switchboard and can answer call manually via tapping or clicking on "Answer" button 4234. In an embodiment based on settings calls can be answered automatically or manually.

Agents are enable to Dial from Directory i.e. select the target directory and tap or click the phone number agent want to call, Dial Ad Hoc Number i.e. tap or click Dial and Select the number from the dial pad, Redial Number i.e. tap or click the right Dial button and from the list, select the number agent want to call, Dial from Search i.e. in the contact or Content panel, select the target directory and In the Search box, type search criteria and tap or click the phone number agent want to dial from search result and Dial from Call History i.e.

from the Menu bar (not shown in figure), select Tools—Call History, Select the call history agent want (Dialed Calls, Received Calls, or Missed Calls) and can tap or click the phone number agent want to call.

Agents can Blind Transfer Call 4237. Calls can be blind transferred while active, held, or ringing (in) on agent's phone, PC, tablets or device. On the Control Panel or Switchboard 4230 agents can, select the call e.g. 4218 to transfer, Dial or select the number to call. The first call is put on hold and before the second call is answered, can select both calls on switchboard and click Transfer. Agents can Transfer Call with Consultation 4237. Calls can be transferred with consultation while active, held, or ringing (in) on agent's phone, tablet, PC or device. On the Switchboard, agents can select the call to transfer. Dial or select the number to call. The first call is put on hold. When the second call is answered, converse to the party. Select both calls on the switchboard and click Transfer. Agent can Transfer to Queue. While on a call, click Transfer and select the destination queue from the list. Agent can also Transfer to Ad-hoc Number. While on a call, click the right Transfer button and enter the number using the number pad.

Agents can select an active call from control panel or Switchboard 4230 and tap or click Hold Call button 4235 for holding selected call. Agents can select a held call from control panel or Switchboard 4230 and tap or click Unhold Call button 4235.

Agents can select the call to end from control panel or Switchboard 4230 and tap or click on End Call button 4236 for ending selected call.

In embodiment agents can View Incoming Call Details. When agents receive a call, a notification window pops up on top of the system tray displaying the name and number of the caller. In addition, it displays: Name of the ACD queue, DNIS name and number, Wait Time of the call, and Number of calls still in queue (Queued Calls).

Agents are enabled to Start Conference. On the control panel or Switchboard 4230, tap or click the Link column e.g. 4216, 4221 etc. of the calls to conference and click Conference and Start 4238. Alternatively, while on a call, agent can dial a number or select a contact; then click Conference and select Start from the list. Agents can Hold Conference. To hold a conference, click Conference 4238 and select Hold. The other parties can continue their conversation. Agents can Unhold Conference. To unhold a held conference, click Conference 4238 and select Unhold. Agents can Leave Conference 4238. To leave a conference 4238, tap or click Conference 4238 and select Leave. Agents can Drop Call from Conference. On the control panel or Switchboard 4230, select the call e.g. 4216 or 4221 agent want to drop and click End. Agents can involve in one or more conference at a time.

Agents can assign disposition code to selected call on control panel or switchboard 4230 from the drop-down list. The code is applied to the call and sent to the server. Agent can assign disposition codes when agents are in the Wrap-Up state by tapping or clicking the right-side of the Wrap-Up button 4240 and select one or more disposition codes from the drop-down list. The codes are applied to the last released call. Disposition codes are additional attributes that can be applied to ACD calls to tag calls with comments, results, and so on. More than one disposition code can be assigned to a call. Agent can assign disposition codes to current ACD calls or to the latest released ACD call while agents are in the Wrap-Up state.

Agent can access Call History Call History dialog box, from the Call Console via the Call History button, allows agent to view past calls. Agent can place a call to a number from Call History and manage call logs. Each call log is displayed on a separate line. Call logs are grouped in three categories including Missed calls, Received calls, and Placed calls. The following information is displayed for each call log: The name or phone number of the remote party and the date and time when the call was initiated. When agents click a call log, the Call Action button appears, allowing agents to place a call to the remote party.

The Call Console 4205 displays agent's current calls, both direct and ACD, and allows agent to take actions on them. Direct calls are calls placed from or received on agent's own phone number, whereas ACD calls are calls routed to you from a call center that agents are staffing as an agent. The following information is displayed for each call: Call State icon—This is a visual representation of the current state of the call, Call States and Actions, Remote CLID—This is the name of the remote party (if available) and the phone number in parenthesis, Call State name—This is the display name of the "call" state the call is currently in and Call duration [Held duration]—This is the duration of the call from the time the call was received and it reflects how long the call has been present in the system. In addition, for held calls, the time a call has been on hold is displayed.

The call entry also displays action buttons for the operations that agent can currently take on that call. The actions agent can perform depend on the state of the call.

Call Center controls e.g. 4230/4226 are designed in a contextual manner, that is, most controls appear only when the action they represent can be taken. For example, when agents enter a number or select a contact, a Dial button appears, allowing agent to place a call. The contextual controls that correspond to call operations such as dialing, transferring calls, or putting calls on hold are called action buttons. They appear on the Dialer, in a call entry, in a directory entry (contact), in a call log, or on a queued call (Supervisors).

Call Action Buttons e.g. 4230/4226 allow agent to perform actions on calls, such as answering or transferring a call, or actions that result in a call being placed, such as dialing a number or contact. They appear on the Dialer, on a call line, in a call history log, in a directory entry, or (for supervisors) in a queued call entry. Call Action buttons are contextual, that is, they appear on a line/entry when the corresponding action can be performed on that entry. For example, when agent tap or click a contact in the Group directory, the contact expands and the Call and Extension buttons appear on the line for that contact, allowing agent to call the contact. Other buttons may appear on the line for a contact, depending on the call state and the contact's configuration.

Agent's current calls are displayed in the Call Console 4205 with the calls currently involved in a conference may displayed in a separate panel called Conference Call (not shown in figure).

When the Call Notification feature is enabled, a Call Notification pop-up window appears on top of the system tray when agent receives an inbound call. For calls to agent's direct number or extension, the following information is displayed: Calling party name and Calling party number.

For calls from a call center, the following information is displayed: Calling party name, Calling party number, Call center name or DNIS name, followed by the time the call has been waiting in queue (wait time) and Number of calls in queue (queued calls).

Call Center allows agent to generate a trace on active, held, released, or missed calls. A call trace contains the following information: The phone number of the user who initiated the trace. When the user does not have a phone number, the group phone number and the extension of the user is provided instead. For intra-group calls, only the caller's extension is used. The date and time the call was received, the identity (name and number) of the caller, if available. Issuing more than one call trace request has no effect. To generate a trace for a selected call agent can tap or click Trace for that call. Agent can generate a trace for the most recently released or missed call.

To generate a trace for the last released or missed call agent can in the Call Console, click or tap Trace. To generate call trace for a current call agent can select an active, held, or conference call on the switchboard or call console 4205 and tap or click the Trace icon 4243. A call trace notification is generated, containing the name and address of the parties, the timestamp of the call, the call ID, and the system ID. To generate a call trace for the last released call agent can tap or click Dial and then click Trace Last Call at the bottom of the Dial Pad, to generate a trace for the last ended call.

Agents can escalate call to supervisor. Agents can Blind Escalate Call. To blind escalate a call to a supervisor: While on the call, agent can tap or click Escalate 4244 to let the system automatically select a supervisor, or click right Escalate and select the supervisor's name from the list and tap or click Transfer, before the call is answered.

Agents can Escalate Call with Conference. To conference a supervisor into a conference: While on the call, agent can tap or click Escalate to let the system automatically select a supervisor, or click right Escalate and select the name of a supervisor from the list. When the call is answered, consult with the supervisor. Tap or click Conference and select Start from the list. To leave the conference, click Conference and select Leave.

Agents can Escalate Call with Consultation. While on a call, agent can tap or click Escalate to let the system automatically select a supervisor, or click right Escalate and select the supervisor's name from the list. When the call is answered, consult with the supervisor. Tap or click Transfer.

Agents can Escalate Call with Hand Over. Agents can use this method to escalate a call to a supervisor through a conference call and then leave the call. While on the call, agent can tap or click Escalate to let the system automatically select a supervisor, or click right Escalate and select the name of a supervisor from the list. When the call is answered, consult with the supervisor. Tap or click Conference and select Start from the list. When the conference is established, click Conference and select Leave.

Agents can Escalate Call with Individual Mid-Conference Hold. While on the call, agent can tap or click Escalate to let the system automatically select a supervisor, or click right Escalate and select the name of a supervisor from the list. When the call is answered, consult with the supervisor. Click Conference and select Start from the list. To put an individual party on hold, select the party from the Switchboard or call console 4205 and click Hold.

Agents can Escalate Call with Mid-Conference-Hold. While on the call, agent can tap or click Escalate to let the system automatically select a supervisor, or click right Escalate and select the name of a supervisor from the list. When the call is answered, consult with the supervisor. Tap or click Conference and select Start from the list. To put the conference on hold, click Conference and select Hold. The other parties continue their conversation.

Agents can Escalate Call with Emergency. While on a call, click Emergency 4245 and select an available supervisor's name from the list. A three-way conference is immediately established. An icon next to the supervisor's name indicates their availability.

Agents can escalate calls to the first available supervisor or to a specific supervisor. Agents can also make an emergency call, which quickly conferences an available supervisor into your call, without placing the remote party on hold. Agents use the Supervisors panel located in the Contacts pane to escalate calls.

Agents can make Emergency Call for escalate a call to a supervisor in an emergency situation. When agents make an emergency call, the caller is not placed on hold; instead, a supervisor is immediately conferenced in to the call. Agent can let Call Center select the supervisor or agent can select the supervisor. To make an emergency call to an available supervisor, agents while on the call can tap or click Emergency 4245.

Agents can record calls manually or have the system automatically record agent's calls. When a call is being recorded, the Recording state message appears on the line for the call.

Agents can Manually Record Call. To manually record calls, agents have to have the Call Recording service assigned and set to "On Demand". To record a call, select the call in the Call Console and tap or click Record 4248.

Agents can Automatically Record Calls. To automatically record calls, agents have to have the Call Recording service assigned and set to "Always".

Agents can Make Outbound Calls. Agents can make calls to an ad hoc number, to a contact from any of agent's contacts' directories, or to a number from Call History. Agent can also specify the calling line identity to use for agent's outbound calls.

Agents can set Outgoing Calling Line Identity. As a Call Center agent, agents can specify whether direct number or a DNIS number assigned to one of agent's call centers should be used as agent's calling line identity when agent's make calls. This allows agent to conduct outbound calling campaigns with an appropriate calling line identity presented to the called party. To set agent's outgoing call identity for the next call, agent can in the Dialer, tap or click the Outbound CLID button and select the number from the dropdown list. The number agent select is displayed as agent's CLID when agents make the next call.

Agents can Dial Ad Hoc Number. Agent can use the Dialer 4233 to place a call to an ad hoc number. To dial an ad hoc number: agent can in the Dialer, enter the phone number and tap or click Dial. The client issues a Click-To-Dial attempt to the specified phone number and the call appears in the Call Console.

Agents can Redial Number. Call Center keeps up to ten most recently dialed numbers, which agent can redial using the Dialer. To redial one of the recently dialed numbers, agent can in the Dialer, place the cursor in the text box and start entering a number. A list of recently called numbers that start with the entered digits appears. Agents can elect the number to dial and tap or click Dial. The client issues a Tap or Click-To-Dial attempt to the selected number. Alternatively, tap or click the Redial button and select the number from the list that appears.

Agents can Dial Contact. Agent can use any directory in the Contacts pane to dial a contact.

To dial a contact, agent can in the Contacts pane, expand the directory from which agent want to dial a contact. Agent can tap or click the target contact to expand it and click Call for that contact. Alternatively, to dial the contact's extension, tap or click Extension or to dial the contact's mobile number. The client issues a Click-To-Dial attempt to the specified phone number and the call appears in the Call Console.

Agents can dial from Search. Agent can use the Search panel in the Contacts pane to search for contacts in agent's contacts' directories. Agents can dial a number from search via searching. Tap or click the target contact to expand it and then tap or click Call.

Agents can dial from History. Agents can dial any number that is available in Call History.

To dial from Call History: agents can in the Call Console, click Call History. The Call History dialog box appears. From the Show drop-down list, agent can select Missed Calls, Received Calls, or Placed Calls. Tap or click the call log from which agent want to dial and then tap or click the Call button.

Agents can take breaks by tapping or clicking on "Take Break" button 4243 must be created previously by the administrator. Take Break: Allows an agent to take a break for a determine activity.

Agents can End session by tapping or clicking on "End session" button 4242, which Ends the session for that agent, on the call center.

Agents can access selected call e.g. 4213 or 4223 and/or selected contact(s) or group(s) of contact(s) specific contents from content pane 4280 including call type specific forms, scripts, information, profile, database, applications, web services & one or more types of media.

Based on permission or authentication from admin agent can set schedule (date & time, date & time ranges) for availability of acceptance of incoming calls via tapping or clicking on "Schedule" button 4246.

Agent is also enabled by admin to pause/restart current calls or pause/restart incoming calls up-to set period of duration via tapping or clicking on "Pause/Restart" button 4251.

Agent is also enabled by admin to mute/unmute current calls or incoming calls for particular number of hours, days, date & time, date & time ranges or up-to set period of time or duration via tapping or clicking on "Mute/Unmute" button 4247.

In an another embodiment user can register for peer to peer or user to user call center service, wherein user can register for one or more types of service providers and/or consumers and can provide or consume said services via calling to or accepting of calls, wherein calling and/or called user(s) can select or presented with service type specific call specific interface(s) and/or application(s) and/or data and/or set of control(s) or object(s) and/or web service(s).

In another embodiment user or customer can schedule call for enabling Callback call which scheduled by the customer.

In another embodiment diverts the incoming call to another number.

In another embodiment reports are generated about logged in agent's activities and performance in the call centers where logged in agent are staffing.

In another embodiment admin can configure various aspects of Call Center.

In another embodiment a code entered by an agent during the wrap-up time in order to provide additional information for evaluating the actions of the call center. In most cases, wrap-up codes provide information for evaluating calls for reporting purposes, including the type of call—requestor complaint; level of required action—urgent, regular, or low; status of the deal—closed, needs recall; and so on FIG. 43 illustrates exemplary user interface for supervisors. The Call Center—Supervisor client is designed to support the needs of call center supervisors in any environment. It supports agent monitoring, queue management, real-time and historical reporting, and other features required in large call centers.

After Logged-In supervisors can access Monitoring or Call Console 4305 to view and manage logged-in supervisor's current calls. Supervisor can view status and statistical information about the agents and queues supervisor manage. Supervisors can monitor agents using monitoring console 4305, which shows real-time status of the agents logged-in supervisor supervise and allows supervisor to change the state of an agent. The call state of an agent can be available to receive a call, on a call/busy, ringing, do not disturb, private, forwarding always, and not available. The ACD state of an agent can be signing-in, available, unavailable, wrap-up, and signed-out. To assign an ACD state to an agent logged-in supervisor can select the agent from the Team or Monitoring console 4305 and tap or click on "Force Agent ACD State" button 4337 and select the ACD state including signing-in, available, unavailable, wrap-up, and signed-out from the drop-down list. In addition, if supervisor selected Unavailable and the use of unavailable codes is required, supervisor can select an unavailable code including Personal Call, Coffee Break, Washroom, Launch, Meeting etc. from the drop-down list.

Supervisor can configure agents that logged-in supervisor want to monitor and can configure queues supervisor want to monitor.

The Call Centers panel 4340 shows the call centers 4312 supervisor are managing. Supervisor can expand a call center by clicking the plus icon 4342. When expanded, the first set number of calls e.g. 25 calls e.g. in the queue appear. The call center Status can be: Night Service, Night Service Override, Holiday Service, Forced Forward, or none of the above.

Various icons indicates various types of status and user actions including e.g. a triangle icon in the Position column indicates a bounced call; an arrow icon indicates a reordered call. A loudspeaker icon in the Wait in Queue column indicates that the caller is being played an announcement.

The Agents panel 4305 is used by supervisors to monitor and manage agents under their supervision.

The Queues panel 4340 is available to both agents and supervisors. It lists the call centers they are staffing as an agent or monitoring as a supervisor and the associated Dialed Number Identification Service (DNIS) numbers. The primary purpose of this panel is to provide with a quick way to transfer calls to queues.

The Queued Calls pane 4340, available only to supervisors, allows supervisors to manage queued calls for selected call centers that supervisors supervise.

Supervisor can select an agent with the status 4312 "Ringing" in the Team area or the Monitoring tab 4305 and can tapping or clicking on Pick Up or Answer or Reject button 4371 for Picking Up or Answering Agent Call and can now speak to the calling party or Rejecting Agent Call.

Supervisor can select an agent who's on call or with the status 4312 "Call" in the Team area or the Monitoring tab 4305 and can tapping or clicking on Silent Monitor button 4373 for Silently Monitor Agent. A monitoring icon is displayed next to the agent's name while they are being monitored. To stop monitoring the call, click the Silent Monitor button 4373 and select Leave Silent Monitoring from the list. To barge-in on the call supervisors are monitoring, supervisors can tap or click the Silent Monitor button 4373, and can select Barge-In 4373.

Supervisor can select an agent who's on call or with the status 4312 "Call" in the Team area or the Monitoring tab 4305 and can tapping or clicking on Barge In button 4374 for Barge-In Agent and a conference call is established. To leave the conference, supervisors can tap or click Conference and select Leave. Alternatively, to drop a party from the conference, supervisors can select the party's name from the Switchboard and click End.

Supervisors can Promote Call in Queue (e.g. Premium queues). In the Call Centers panel 4340, supervisor can select a queue and from the Queue Detail sub-table 4368, supervisors can select the call to promote and tap or click Promote 4379 and from the drop-down list 4368, select the priority 4368 to which supervisors want to promote the call.

Supervisors can Position Call in Queue. In the Call Centers panel 4340 supervisors can select a queue e.g. 4347 and from the Queue Detail sub-table 4368, can select the call to reposition 4388 and can tap or click Reorder 4388 and select a new position for the call.

Supervisors can Retrieve Call from Queue. In the Call Centers panel 4340, Supervisors can select a queue and from the Queue Detail sub-table 4368, can select the call to retrieve and tap or click Retrieve 4380/4389 and Answer the retrieved call.

Supervisors can Retrieve Call from Queue to Number, In the Call Centers panel 4340, Supervisors can select a queue and from the Queue Detail sub-table 4368, select the call to transfer and tap or click Retrieve 4380 and Dial or select the destination number and click Transfer.

Supervisors can Transfer Call to Ad-hoc Number. In the Call Centers panel 4340, Supervisors can select a queue and from the Queue Detail sub-table 4368, select the call to transfer and tap or click the right side of the Queue Transfer button 4390 and enter the destination number on the Dial Pad.

Supervisors can Transfer Call between Queues. In the Call Centers panel 4340, Supervisors can select a queue and from the Queue Detail sub-table 4268, select the call to transfer and from the Queue Transfer list 4390, can select the target queue. The call is transferred to the back of the queue.

Supervisors can Transfer Call to Top of Queue. In the Call Centers panel 4340, select a queue and from the Queue Detail sub-table 4368, Supervisors can select the call to transfer and tap or click Retrieve 4380/4389. The call is now visible on the Switchboard. Supervisors can select the call, tap or click SHIFT Transfer, and select the destination queue from the drop-down list 4390.

Supervisors can Transfer Call from Queue to Agent. In the Call Centers panel 4340, Supervisors can select a queue and from the Queue Detail sub-table 4268, select the call to transfer and from the Queue Transfer list 4390, select the target agent.

Supervisors can Monitor Next Call This allows the supervisor to silently monitor the next call for a selected agent or call center.

Supervisors can Monitor 4373. This allows the supervisor to silently monitor the current call for a selected agent with an active call.

Supervisor can change a selected agent's ACD state 4376.

Supervisors can Barge In 4374. This allows the supervisor to barge in on an agent's call, by establishing a Three-Way Call between the supervisor and the two parties involved in the call.

Supervisor can Answer 4371. This answers an unanswered call for a monitored agent.

Supervisor can promotes a selected call to the next highest priority bucket within the queue.

Supervisor can retrieve a call from the queue to the supervisor's device. When a call is manually retrieved via this action, the call is reported as an Incoming call rather than an ACD call in the reports.

Supervisor can change a call's position in the queue.

In an embodiment the Agents directory, available only to supervisors, contains the list of agents supervisor supervise and allows supervisor to manage them and view their one or more types of calls and ACD state.

Supervisor can use the Agents panel 4305 to view the agents who supervisors are supervising and to perform actions on them. Supervisors can also monitor the call and the ACD state of selected agents.

Supervisors can select Agents to Monitor. Call Center allows supervisors to monitor the call and the ACD state of selected agents, but agents are not automatically monitored. To monitor the state of an agent, supervisors must select the agent. To select agents to monitor, supervisors can tap or click Edit in the Agents panel. The Edit Monitored Agents dialog box appears and supervisors can select the check box next to each agent to monitor. If an agent is staffing multiple call centers, by selecting that agent for monitoring in one call center, supervisors are also selecting them for monitoring under all call centers that they are staffing. After selecting supervisors can tap or click Save. The selected agents have their call and ACD state displayed. The state of agents who are not monitored appears as unknown. The list is saved and is available during subsequent sessions.

Monitored agents have their one or more types of one or more calls and ACD state displayed. A single icon, to the left of the agent's name, represents the agent's combined call and ACD state, which indicates the agent's ability to take calls. In addition, the agent's ACD state is also displayed in text following their name. If the agent's ACD state is set to "Unavailable", the unavailable code is also displayed. Other agents have their state set to "Unknown".

The possible agent's one or more types of call state, ACD states and Description including when Agent's phone is on-hook and the agent is available to take ACD calls then call state will be Idle and ACD state will be Available.

When Agent's phone is ringing and the agent is available to take the call then call state is ringing and ACD state is Available.

When Agent is not available to take ACD calls then call state is Any Unavailable and ACD state is Sign-In, Sign-Out.

When Agent is performing post call work. They may or may not be available to take calls then call state is Idle and ACD state is Ringing Wrap-Up When Agent's phone is off-hook, which means that the agent is on a call. Calls may be delivered to agents depending on their call waiting settings and the call center's call waiting and wrap-up settings. At that time call state is Busy Available and ACD state is Wrap-Up When Agent has enabled the Do Not Disturb service then call state will be Do Not Disturb Any. ACD calls are not delivered to agent in the Do Not Disturb call state. This state is not recommended for Call Center agents. Agents should use the Unavailable ACD state when they need to block new incoming calls temporarily.

When Agent has enabled the Call Forwarding Always service then call state is Call Forwarding and ACD state is Any.

When Agent has enabled phone state privacy then call state is Private and ACD state is Any When Agent is currently not monitored then call state is Unknown and ACD state is Any.

Supervisors can View Agent's Details, Supervisors can tap or click an agent expands the entry to show all queues the agent is assigned to and all the agent's current calls, in order of arrival. For each call, the following information may displayed including Call Type, Call number, Calling name (if available) and calling number (and for direct calls, extension), for example, "James Smith+1234645125", Call length in the following format: "MM:SS" (or "HH:MM:SS" if the call lasts longer than an hour), for example, "10:22"

For each queue, the following information is displayed including Call Center ID, whether the agent has joined the queue, and the agent's skill level in that queue, if applicable.

Supervisors can Change Agent ACD State. Supervisors can force an ACD state change for an agent. This action can only be performed on monitored agents. To change and agent's ACD state, in the Agents panel, supervisors can tap or click the agent and then click the ACD State button and from the drop-down list, select the new state. If supervisor selected Unavailable, supervisor may have to select the reason for their unavailability.

Supervisors can Silently Monitor Agent's Call, The silent monitor function allows supervisor to view monitored agents' calls without being knowing. Supervisors can listen in on agents who supervisor selected for call and ACD state monitoring. Supervisors can silently monitor one agent at a time, and the agent supervisor monitor must have the Call Center—e.g. Premium service assigned. Supervisors can choose to monitor the agent's current call or next incoming call. To monitor the current call, the agent must have exactly one active call. To listen in on an agent's current call silently: Supervisors can in the Contacts pane, expand the Agents panel and tap or click the agent to monitor. The agent must have exactly one active call and can tap or click Monitor for that agent. A new call is created in the Conference Call panel. Supervisors are conferenced in to the call and muted (Silent Monitor).

To listen in on an agent's next call silently: Supervisors can in the Contacts pane, expand the Agents panel and tap or click the target agent and tap or click Monitor Next Call for that agent. A monitoring call is established for the selected agent. When the next call is received and answered by the agent, Supervisors are conferenced in to the call and supervisor call is muted. Both calls appear in the Conference Call panel.

To barge in on a call supervisors are silently monitoring, Supervisors can in the Conference Call panel, click Barge In. Supervisors are conferenced in to the call.

Supervisor Barge-In allows supervisor to barge in on an agent's call. This is useful when supervisor want to enter an already established call between two other people. Supervisors can only barge in on agents who supervisor selected for call and ACD state monitoring.

To barge in on an agent's call: Supervisors can in the Contacts pane, expand the Agents panel and select an agent. The agent must have exactly one active call. Supervisors can tap or click the agent to expand the entry and tap or click Barge In. A Three-Way Conference is established.

Supervisors can Pick Up Agent's Ringing Call. Call Pickup allows supervisor to pick up an unanswered call on behalf of an agent. This is useful when the agent is away or busy.

To pick up an unanswered call for an agent: Supervisors can in the Agents panel, select an agent whose phone is ringing. And tap or move the mouse over the agent and tap or click Answer. Supervisors are now answering the call, and the call appears in the Call Console.

In an embodiment this functionality is only available if supervisor's group has been assigned the Call Pickup service. A call that is retrieved using Call Pickup is treated in the Call Center reports as a direct inbound call to the retrieving party and not as an ACD call, because it was not answered by the agent selected using the ACD process. Supervisor Call Pickup is only supported if the agent and supervisor are in the same group. In an enterprise, this function can be disabled.

To pick up an unanswered call for an agent: Supervisors can in the Agents panel, select an agent whose phone is ringing. Tap or move the mouse over the agent and tap or click Answer. Supervisors are now answering the call, and the call appears in the Call Console.

Call Center allows supervisors to manage queued calls in the selected call centers and to monitor calls in real time. Supervisors use the Queued Calls pane 4340 to manage queued calls under supervisor's supervision.

Supervisors can use the Queued Calls pane 4340 to manage queued calls. The Queued Calls pane 4340 displays the monitored call centers and lists the calls queued in each call center e.g. 4342/4368.

In an embodiment each call center is displayed in a separate panel. The panel's header provides the following information and controls: Call center name—The name of the call center and Call center number—The primary phone number of the call center.

Service Mode button (not shown in figure) shown beside to name of call center identifies the service mode of the supervised call center.

Tapping or clicking the button launches the Edit Queued Calls Favorites dialog box and allows supervisors to activate Night Service Override or Forced Forwarding. The call center can be in one if the following service modes: Night Service—The call center is processing calls according to the Night Service schedule and policy, Night Service Override—The call center has been manually forced to follow the Night Service policy, Holiday Service—The call center is processing calls according to the Holiday Service schedule and policy, Forced Forwarding—All calls to this call center are forwarded to a specified destination, Normal—Call center is in normal mode of operation; none of the above modes is enabled, Message Waiting icon—This icon is displayed if there is one or more outstanding recorded messages left in the call center's Message recorder mailbox. This icon performs the role of a message waiting indicator for the call center, Ratio of visible calls to display limit—This is the number of calls in the queue that are currently displayed against the maximum number of calls that can be displayed for a queue and Ratio of queued calls to queue length—This is the number of calls in queue against the queue length that is displayed.

When supervisor expand the panel for a call center, the list of calls queued in that call center appears. By default, calls are listed according to their position in the queue, with the oldest call first. They can be grouped by the priority bucket. The following information is provided for each call: Call Status icon—A graphic representation of the state of the queued call including Waiting—The call is queued, waiting to be answered, Announcement—An entrance announcement or music is being played to the caller, Reordered—The position of the call in the queue has been changed, Bounced—The call has been bounced, Caller's identity—The name (if available) and the phone number of the calling party, Call time—The total call time, including the time in the current queue (in parentheses). Tapping or clicking a call expands the call to show additional data inkling Priority (Premium Call Center)—The priority bucket of the call, Position—The position of the call in the queue, Destination—The name (if available) and the phone number of the call center (or DNIS, when applicable) that was called and When the call is expanded, the action buttons for actions that can be performed on the call appear.

Supervisor can select Call Centers to Monitor. Supervisor can select up to particular number of call centers to monitor. Supervisor view the monitored call centers in the Queued Calls pane 4340. To select call centers to monitor, in the Queued Calls pane, supervisor can tap or click Options and select the Edit Queue Favorite Dialog option. When the Edit Queue Favorites dialog box appears, supervisor can select the Monitor check boxes in the rows of the call centers to monitor and tap or click to save. To stop monitoring a call center, supervisor can deselect the Monitor check box for the call center in the Edit Queue Favorites dialog box.

Supervisors can Modify Number of Calls to Display. For each Standard call center that supervisors are monitoring, supervisors can modify the maximum number of calls to be displayed and for each Premium call center supervisors can modify the maximum number of calls that can be displayed in each priority bucket. The total number of calls to display for a call center cannot exceed particular number e.g. 50. In the Queued Calls pane 4340, supervisors can tap or click Options and select the Edit Queue Favorite Dialog option. The Edit Queue Favorites dialog box appears. For each Standard call center supervisors are monitoring, supervisors can set the total number of calls to display. For each Premium call center supervisors are monitoring, supervisors can set the number of calls to display in each priority bucket. The total number of call in all priority buckets cannot exceed particular number e.g. 50.

Supervisors can Show or Hide Call Center Panels 4340. Supervisors can show or hide call center panels for monitored queues. This is not the same as selecting queues to be monitored. To show/hide call center panels, in the Queued Calls pane, supervisors can tap or click Options and Select View and then select or unselect the names of the call centers. To show or hide all call centers, select or deselect All. Alternatively to hide a call center, supervisors can tap or click the Close button. The call center is removed from the display but continues to be monitored.

Supervisors can View Queued Calls. Supervisors can selectively expand or collapse call center panels to show or hide calls in the monitored call centers. To view queued calls for a call center:

Supervisors can tap or click the Expand button for that call center. To view call details of a selected call, Supervisors can tap or click that call.

Supervisors can Group Queued Calls. Supervisors can group queued calls by their priority bucket. To group or ungroup queued calls, in the Queued Calls pane, Supervisors can tap or click Options. From the drop-down list, Supervisors can select Group, and then select or deselect Group by Priority. This action applies to all monitored call centers. To ungroup calls, unselect the Group by Priority option.

Supervisors can Order Queued Calls. Queued calls can be ordered according to their total waiting time or their waiting time in the current priority bucket. To order queued calls, in the Queued Calls pane, Supervisors can tap or click Options and can select Sort and then the ordering option supervisors want. This operation applies to all monitored call centers.

Supervisors can Monitor Next Call. Supervisors can silently monitor the next call that is received by a call center.

To monitor the call center's next call, in the Contacts pane, Supervisors can expand the Queues panel and click the target call center to expand it.

Supervisors can tap or click the Monitor Next Call button for that call center. A monitoring call is established for the selected call center. When the next call is received and answered by an agent, Supervisors are conferenced in to the call and your call is muted. Both calls appear in the Conference Call panel.

Supervisors can barge in on a call supervisors are silently monitoring. In the Conference Call panel, Supervisors can tap or click Barge In. Supervisors are conferenced in to the call.

Supervisors can enable Night Service Override or Forced Forwarding (Premium Call Center). Call Center allows supervisors to manually override the current mode of operation and enable the Night Service and/or Forced Forwarding of calls for selected call centers. To enable Night Service Override and/or Forced Forwarding, in the Queued Calls pane, supervisors can tap or click the Service Mode button in the panel for one of the call centers. The Edit Queue Favorites dialog box appears. For each call center for which supervisors want to override the time schedule and manually initiate Night Service, check the Night Service Override check box. For each call center for which supervisors want to divert calls to a specified destination temporarily, check the Force Forwarding box and enter the number to which to forward the calls in the Enter Number box.

Supervisors can Retrieve Call from Queue. Supervisors can retrieve queued calls from the queue to supervisor's device. To retrieve a call from a queue, Supervisors can tap or click the call in the Queued Calls pane and click Retrieve for that call. Once supervisor retrieve a call, the call appears in the Call Console and supervisor treat it as any other call. For example, supervisor can transfer it to an ad hoc number or to another queue.

Supervisors can Promote Call in Queue (Premium Call Center). A priority is attached to an incoming call based on the DNIS number on which it is received. Calls are distributed to the agents staffing the queue based on this priority, with calls of the higher priority being exhausted before calls in the next priority are distributed. Supervisors can manually promote calls from a lower priority bucket to a higher priority bucket. A manually promoted call ends up as the last call in the higher priority bucket with a wait time of zero seconds. To promote a call, that is to change its priority, Supervisors can in the Queued Calls pane, expand a Call Center panel and tap or click the call supervisors want to promote and tap or click Promote for that call. The queued call is promoted to the end of the next highest priority bucket.

Supervisors can Transfer Call to Another Queue. To transfer a queued call to another queue, in the Queued Calls pane, supervisors can select the call to transfer. In the Contacts pane, supervisors can expand the Queues panel and tap or click the target queue and can tap or click Transfer for that queue. The call is transferred and removed from the queue.

Supervisors can Transfer Call from Queue to Agent. To transfer a call from a queue to an agent, in the Queued Calls pane, supervisors can select the call to transfer. In the Contacts pane, supervisors can expand the Agents panel and tap or click the target agent and tap or click Transfer for that agent. The call is transferred and removed from the queue.

Supervisors can Transfer Call to Ad Hoc Number. To transfer a call to an ad hoc number, in the Queued Calls pane, supervisors can select the queued call. In the Dialer, supervisors can enter the destination number and tap or click Transfer.

Supervisors can Ad Hoc Queue Transfer. The call is transferred and removed from the queue.

Supervisors can Change Position of Call in Queue. Supervisors can reorder a queued call in a Standard call center or in the "0" priority bucket in a Premium call center.

Supervisors can change a call's position in a queue, in the Queued Calls pane, Supervisors can tap or click the target call to expand it.

Supervisors can Transfer Call to Top of Queue (Premium Call Center). If administrator has configured the call center with the Transfer to Top feature, follow this procedure to transfer the call to the top of the queue. Supervisors can only transfer a call to the top of the highest priority bucket (bucket with priority "0"). There need to be at least two calls in the target queue. In the Queued Calls pane, Supervisors can tap or click the target call to expand it and tap or click Reorder and select Send to Front from the list that appears.

In an embodiment Call Center provides you with real-time information about supervised agents and queues. This information is displayed in the Dashboard 4308. To access the Dashboard 4308 supervisors can tap or click the Dashboard link 4308 at the top right-hand side of the main interface window. The Dashboard 4308 is launched in a separate window and can be open at the same time as other Call Center windows. The Dashboard is divided into two parts with queue information in the top half and agent information in the bottom half. The information is updated at a configurable refresh rate. The default is e.g. 5 seconds. By default, information about agents is hidden. To view agents staffing a call center: supervisors can check the Show Agents check box in the row for that call center. Some fields are color-coded to provide visual indicators of threshold severity. Threshold values are configured by your administrator. The Dashboard displays each call center queue on a separate line and provides the following information about each queue: Name—This is the name of the call center, Status (Premium call centers)—This identifies the service mode in which the call center currently operates, which can be one of the following: Night Service—The call center is processing calls according to the Night Service schedule and policy, Night Service Override—The call center has been manually forced to follow the Night Service policy, Holiday Service—The call center is processing calls according to the Holiday Service schedule and policy, Forced Forwarding—All calls to this call center are forwarded to a specified destination, Normal—Call center is in normal mode of operation; none of the above modes is enabled, Calls in Queue—This is the number of queued calls expressed as a ratio of the total queue capacity for that call center. For example, "6/10" means that there are six calls in the queue, which can queue a maximum of ten calls, Long Waiting Call—This is the waiting time of the call that has been in the queue the longest, EWT (Expected Waiting Time)—This is the expected waiting time of calls in the queue, AHT (Average Handle Time)—This is the average handling time for calls in the queue, ASA (Average Speed of Answer)—This is the average amount of time a caller spends in the queue before the call is offered to an agent, Staffed (Agents)—This is the number of agents managed by you that are in Sign-In, Available, Unavailable, or Wrap-Up ACD state, as a ratio of all agents managed by you for this call center, Idle (Agents)—This is the number of agents who are in the Available ACD state but presently not on a call, Unavailable—This is the number of agents who are signed in to the call center but not available to take calls, Show Agents—When this check box is selected, the agents who are joined in the call center are displayed in the Agents area of the Dashboard. The fields that provide visual indicators are Calls in Queue, Longest Waiting Time, EWT, AHT, and ASA.

The Dashboard 4308 displays information about the agents for the selected queues. Supervisors can select the queues for which supervisors want to view agents' information by checking the Show Agents box on the lines for the queues in the Queues area of the Dashboard 4308. The following information is provided for each displayed agent: Name—This is the agent's name, Queues (total)—This is the total number of queues to which the agent is assigned. This number is a link, which when clicked, opens a dialog box that lists the agent's queues, Sign-In Time—This is the agent's most recent sign-in time, Sign-In Duration—This is the amount of time that the agent has been signed in, Call State (Time)—This is the call state and time on the current call. The call state can be Idle, Ringing, or On a call. If an agent is in multiple calls, the call time reflects the time of the longest running call. When a call is released, then the call time reflects the time on the remaining calls, Agent State (Time)—This is the agent ACD state and time. If an agent is unavailable, the unavailable code is shown, % Available—This is the time that the agent was available to take calls shown as a percentage of the duration of the current sign-in, Avg Busy In—This is the average time spent by the agent on an incoming ACD call, Avg Busy Out—This is the average time spent by the agent on an outgoing ACD call, Avg Wrap-Up—This is the average time spent by the agent in a post call wrap-up. Fields that provide visual indicators are Call State (Time), On Call, Idle, Agent State (Time), Unavailable, Avg Busy In, Avg Busy Out, and Avg Wrap-Up. The Dashboard is designed to be used together with the Queued Calls pane and the Agents panel in the Contacts pane. The Dashboard provides you with a real-time view of agents and queues, while the Agents panel and Queued Calls pane allow you to take actions on monitored agents and ACD calls.

Call Center provides reporting functions to agents and supervisors. Agents can only generate reports about their own activity whereas supervisors have access to reports on activity and performance of agents and call centers under their supervision.

Contacts pane 4391 contains logged-in supervisor's contact directories and provides logged-in supervisor with real-time call and ACD state of the agents where logged-in supervisor are monitoring. The Contacts pane contains supervisor's contact directories and provides you with real-time call and ACD state of the agents you are monitoring.

Supervisors can View Agents and Queues Statistics. Supervisors can view real-time call and agent statistics, for the Call Centers and agents assigned to supervisors, using the Dashboard tab including the Queue Summary shows key performance indicators for each call center supervisors manage, the Agent Summary shows key performance indicators for the supervised team of agents and the Queue Summary Table shows queue statistics on a per-Call Center basis in a tabular form.

The following reports are available to supervisors including Agent Activity (historical or real-time)—Provides metrics about agents call handling activities for a Call Center, Agent Utilization (historical)—Provides metrics related to agents call performance for a Call Center, Queue Performance Analysis (historical or real time)—Displays metrics related to the performance of a Call Center ACD, Service Level (historical)—Displays metrics related to the speed of answering ACD calls.

Supervisors are enabled to whisper 4385. This lets supervisors to view conversation & communications in on a call and speak so that only the internal party can hear supervisor. Giving suggestions to an employee who is conversing with a customer is one use-case scenario for this feature. Whisper coaching is a great feature for call center supervisors seeking to optimize agent training. Whisper coaching allows supervisors to drop in on a live call to converse with the agent without the caller knowing. Thus, it is extremely helpful for training new agents. Supervisor can view in on the conversations, and utter suggestions to the agents, without being know by the customers Supervisors can Record 4384 the call. Accessed by pushing the red circle, this starts a two-way recording of the call conversation. The recording is saved as a file on a network server, where it can later be retrieved and reviewed.

Conference calling 4375 is a feature that allows dispersed teams to collaborate effectively. Call conferencing allows three or more people (i.e., callers, agents, supervisors, administrators, managers, etc.) to talk with each other. This feature eliminates the hassle of transferring calls to another department when addressing more complex issues.

Supervisors can park 4383 the call i.e. place an answered call On Hold. A supervisor pauses a current conversation, and he or another user, can retrieve the call from any device.

FIG. 44 illustrates exemplary user interface for following one or more types of real-time calls from one or more selected categories and/or sub-categories and/or taxonomy and/or keyword(s) and/or location(s) and/or one or more types of activities or actions or transactions or events and/or type of profile field(s) e.g. gender, age range, income range, hobby or interest, school, college, company, entity etc.

User can search, match, browse & select one or more categories, sub-categories, taxonomy, keywords, locations, types of activities, actions, events, transactions, senses, interactions 4401/4403 for following or receiving real-time one or more types of selected or auto matched calls 4490. Based on said selections of following preferences, system or server or database auto matched calling users including enterprise users who claim for particular categories, subcategories, keywords, brands, entities, locations, activities & like and enable said matched users to call said followers or users.

User can apply one or more types of settings, privacy settings, and preferences for receiving daily maximum number of one or more calls from said following users, accept or do not accept calls from said following users as per schedule including date & time ranges, accept only when user's status is online or available, accept call only when user's location is particular location(s).

Based on selections from 4403 user is presented with contextual one or more types of calls, so user can select one or more types of calls from said presented list 4490.

Figure 45:
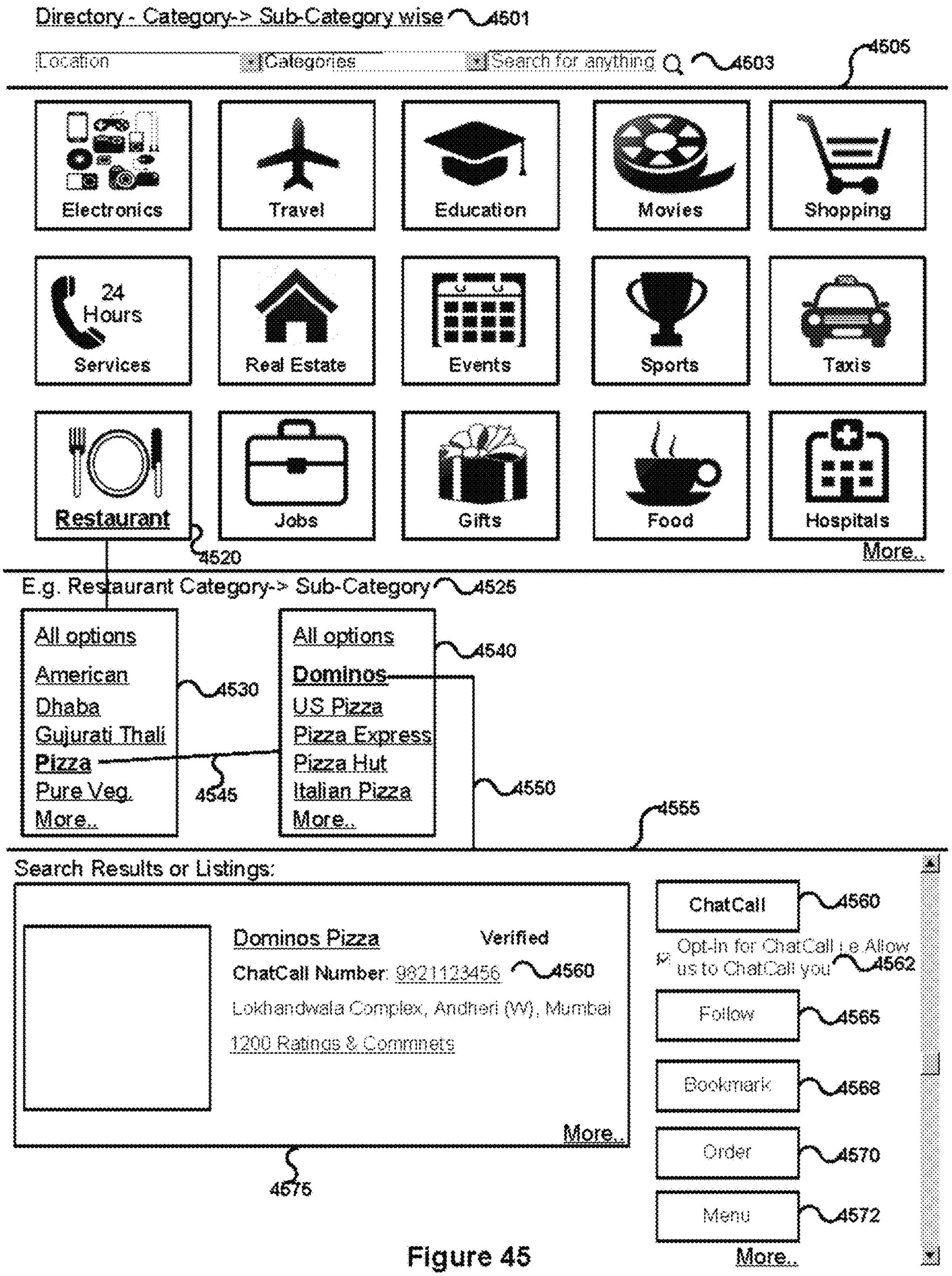
FIG. 45 illustrates exemplary presented graphical user interface (GUI) for enabling user to view, browse, navigate & access one or more types of pre-created or listed directories or categories directories or list, wherein user can search, match & select listed items and bookmark, save contacts and/or initiate or start one or more types of calling with them.

FIG. 45 illustrates exemplary user interface for enabling user to browse directories 4505 and enable to search 4503, match, view and select one or more listing or search results and filter as per categories, sub-categories, locations & sort as per top ranked, date & time, location(s) and/or distance. For example when user selects category (Restaurant) 4520 and selects sub-category (Pizza) 4545 and selects preferred brand (Dominos) 4550 from list 4540, user is presented with listing of (Dominos) 4555, wherein listing includes image or photo, video, brand name, address, contact information, verification status and associate user actions including Chat- Call button which enables user to chat call to provided call number. User can also allow or opt-in for chat call 4562 or follow 4565, so said listing user(s) is/are enable to chat call to user. User can bookmark 4568 listing and/or Chat Call number 4560. User can use or access other dynamically presented user actions including order 4570, menu 4572 & like.

So directory enables prospective customers to search & match, bookmark or save to Chat Call contacts and real-time Chat Calls to said contacts and ask queries & information, book or buy or order products & services, follow and receive new updates etc. Directory may comprise classifieds & listing e.g. buys, sell, job required, job posting, bride or groom etc.

In an another embodiment users of network can also post classifieds or listing e.g. sell used products. So potential buyer can search proffered products from posted listings and can real-time Chat Calls to one or more selling users for one or more types of one or more products via group or multi ChatCalls 220/225 and can buy products, ask queries to actual customers by prospective customers for particular products or services etc.

In an another embodiment enterprise user or users of networks can list Group deals and enable other users of network or searching user to participate in selected group deal(s) and real-time forward selective group deals to contacts or contacts of contacts and confirm participations from said contact users.

FIG. 45 illustrates exemplary directory interface, wherein user enable to search, match, browse, bookmark, select, access and view listings. User can browse categories 4505 and sub-categories 4530 directories and can view selected categories and/or sub-categories specific listings including shops, brands, products, sellers, buyers, services, providers, people, entities & like 4540.

User can search based on one or more keywords, categories, taxonomy, locations, distance, selections. User can filter results as per ratings, most liked or commented, liked or bookmarked, date & time posted, locations, distances, top results & like.

User can bookmark or save to new or existing contacts one or more numbers of one or more types of calls including chat call, sharing call, survey call, job call, e-commerce call etc. (some of which discussed in detail in FIG. 36) e.g. one or more chat call numbers 4568. User can directly tap or click on chat call number 4560 for calling to that chat call number 4560.

Figure 46:
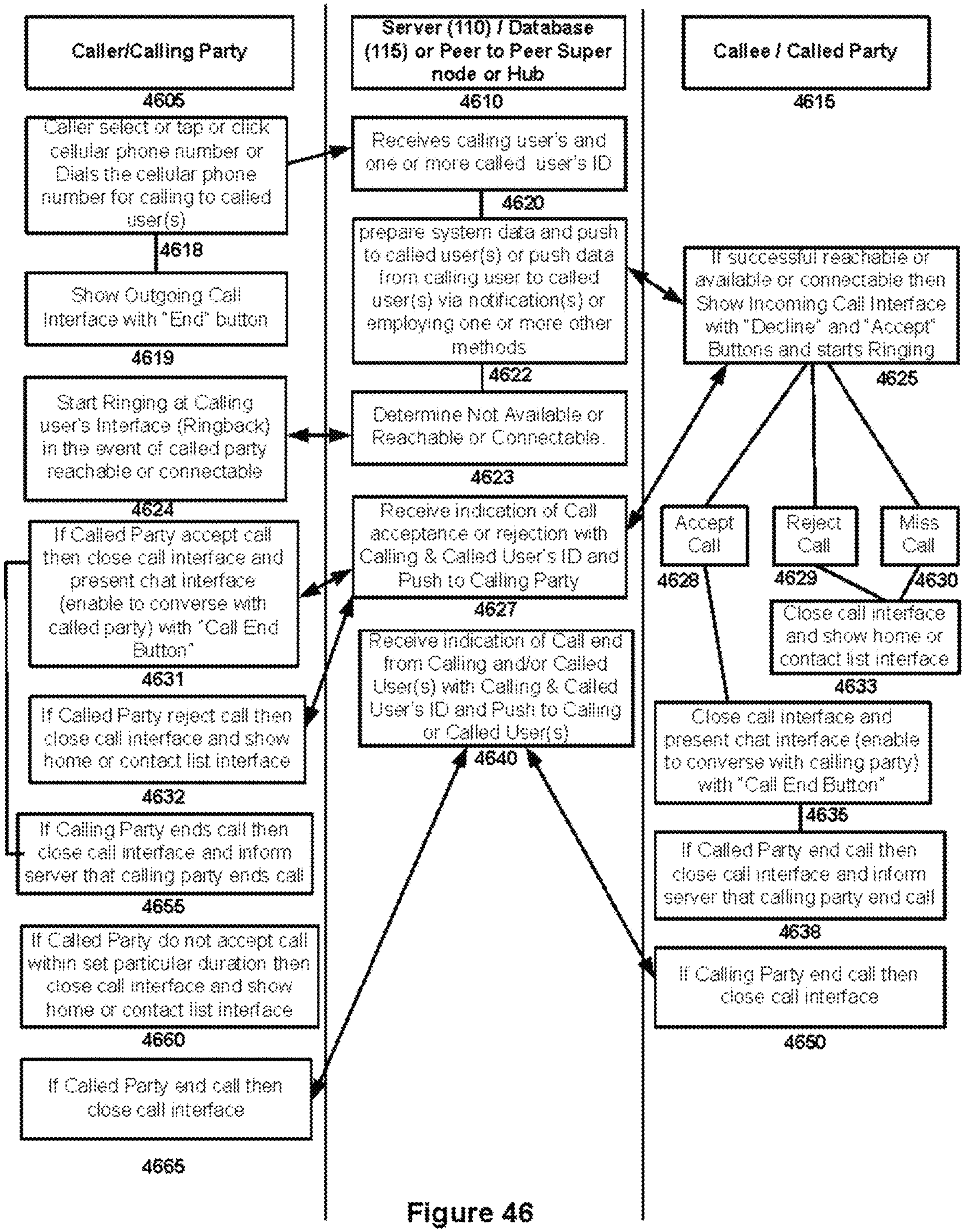
FIG. 46 illustrates exemplary flowcharts for enabling calling by employing one of the available methods.

In an embodiment FIG. 46 illustrates exemplary flowchart describing one of the way to dialing or selecting numbers from list of contacts for conducting one or more types of one or more calls and presenting call type specific interface and enabling to accepting, rejecting and ending call(s).

FIG. 46 shows interaction among Calling Party 4605, Server/Database or Peer to Peer Super node or Hub 4610 and Called Party 4615.

In an embodiment when Caller 4605 selects or click or tap on cellular phone number or Dials the cellular phone number or one or more type of call number e.g. chat call number 4618 for calling to called users then show Outgoing Call Interface, wherein interface contains "End" button 4619 to Caller 4605, wherein "End" button enables caller or calling party 4605 to end said call. Server 110 or database 115 receives said calling user's and one or more called user's identities (IDs) 4620 and search, match, verify, & prepares data for sending to called user(s) and send or push to called user(s) device or device database or prepare and push data including calling user's and one or more called user's identities (IDs) from calling user device or device database to called user(s) device or device database via one or more types of notification(s) or notification service(s) or push data service(s) or employing one or more other available methods 4622. In the event of determination or identification of non-availability or non-reachability or connectability with called user alerting calling user that said called user(s) is/are not reachable or not online or not-available. In the event of determination or identification of availability or reachability or connectability with called user then calling party 4623 is/are notified or alerting that Called Party is reachable and start ringing at Calling user's Interface 4624. If called user successful reachable or available or connectable then called user(s) is/are presented with Incoming Call Interface, wherein interface comprises "Decline" and "Accept" Buttons with Ringing 4625. In the event of call acceptance 4628 or rejection 4629 of call or call missed 4630 (i.e. non-acceptance of call for set period of time) by said called user(s) then server 110 or database 115 receives indication or status of Call acceptance or rejection or missing from called user(s) with Calling & Called User's IDs and prepares data and push said data to said Calling Party device or device database 4627. If Called Party accepts call then close outgoing call interface and calling user or caller is presented with call type specific interface(s) and/or application(s) and/or database(s) and/or contents or media and/or object(s) and/or web site(s) and/or web page or web application(s) and/or set of control(s) e.g. chat interface for chat call type of call (establishing communication session among calling & called user(s) and enable to converse with called party) with "Call End Button" 4631, wherein "end" button on said presented interface enables calling user to end said call.

In the event of Called Party rejects call then close outgoing call interface of calling party and show home or contact list interface 4632 to calling user or caller.

If Calling Party ends call then close outgoing call interface and inform server that calling party ends call 4655, so server not send push notification to called user(s) and terminates call.

In the event of call acceptance by called user(s) 4628, close call interface and called user is presented with call type specific interface(s) and/or application(s) and/or database(s) and/or contents or media and/or object(s) and/or web site(s) and/or web page or web application(s) and/or set of control(s) e.g. chat interface for chat call type of call (establishing communication session among calling & called user(s) and enable to converse with calling party or caller) with "Call End Button" 4631, wherein "end" button on said presented interface enables called user to end said call.

If Called Party ends call then close said call interface and inform server that called party ends call 4638.

In the event of call rejection 4629 by called user or call missing 4630 by called user then close said call interface and inform server that called party ends call 4638

If Called Party does not accept call within set particular duration then close call interface and show home or contact list interface 4660.

In the event of receiving indication of Call end from Calling and/or Called User(s) with Calling & Called User's ID by server 110 or database 115, then server push said data & status to Calling and/or Called User(s) 4640. If Calling Party ends call then close calls interface 4650. If Called Party ends call then close calls interface 4665.

In an embodiment calling user can select one or more types of call and/or selects one or more interface(s) and/or application(s) and/or database(s) and/or contents or media and/or object(s) and/or web site(s) and/or web page or web application(s) and/or set of control(s) (e.g. chat interface for chat call type of call) for one or more types of call before calling.

For example when A calls to B then application initiates push notification from device or device database of A to device or device database of B. When push notification reached to device or device database of B then server or application starts XMPP session or XMPP connection between device or device database of A & device or device database of B. Now communication can established via XMPP connection i.e. session established and when call "ends" by A or B via tapping or clicking "End" button then sending of "end" call status message(s) via XMPP is conducted to device or device database of A & device or device database of B and that ends call (e.g. first removes B when B "ends" and then removes A). In an embodiment or example user device is identified via unique device ID by using GCM key in android devices and APNS key for iOs or Apple devices.

Figure 47:
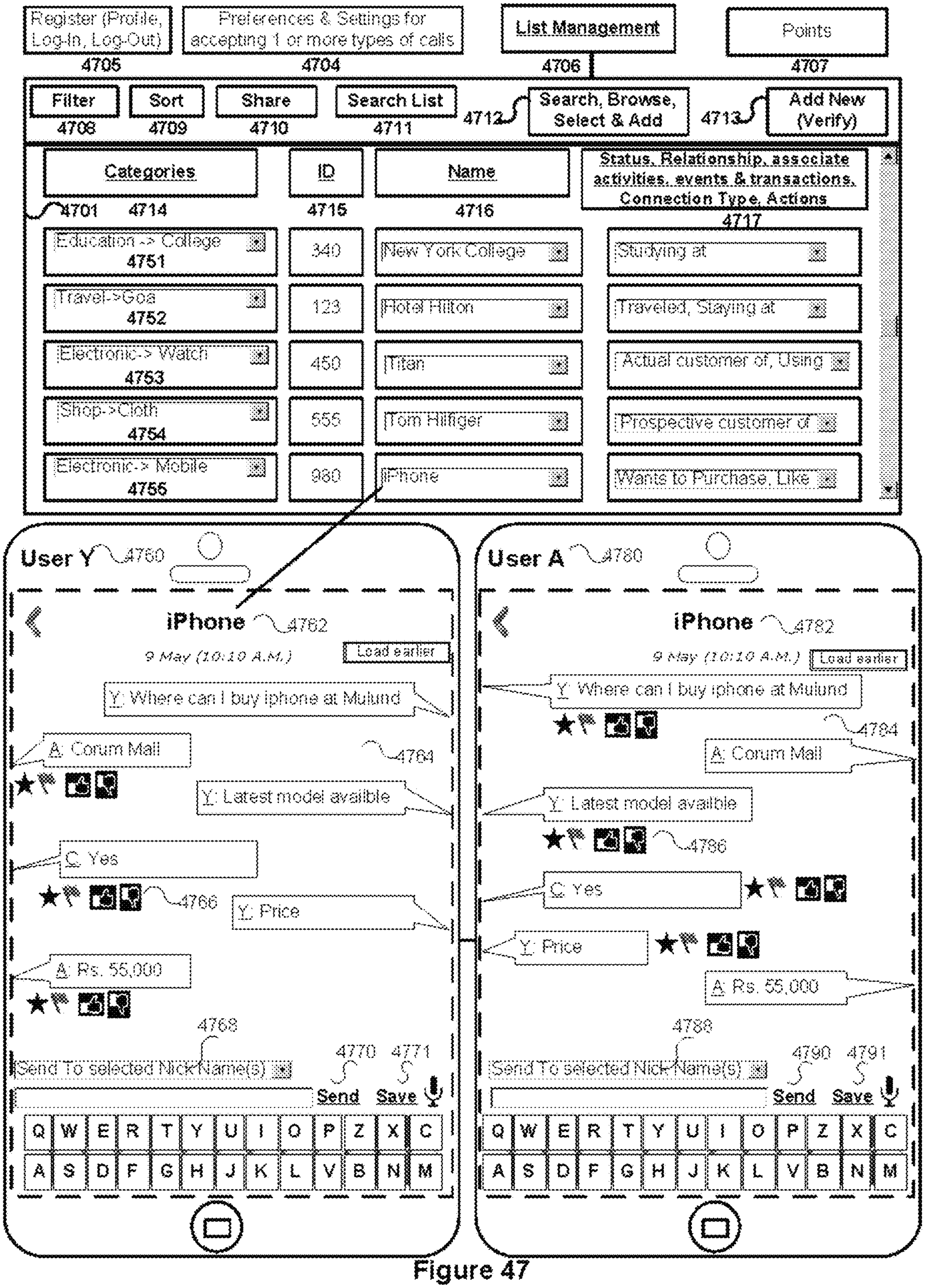
FIG. 47-49 illustrates exemplary presented graphical user interface (GUI) for enabling user to call to selected or auto determined purpose, requirement, option, feature, task, workflow, activities, actions, events, senses, transactions, location(s) or check-in place(s) specific auto matched users or selected users or selected users from auto matched contextual users list(s)

FIG. 47 illustrates one of the exemplary uses of present invention. It describes the real-time platform of actual customers and prospective customers, wherein actual customers of one or more or particular named or branded products and services or related to or transacted with or interacted with or experienced with one or more types of entities can real-time call(s) to and/or accept call(s) from prospective customers or interested users based on one or more pre-selected preferences including brands, entities, categories, keywords & like.

In an embodiment after registering 4705 with platform users are enabled to access one or more features. In an embodiment users are enabled to search, match, browse, select, select from bookmarks, shared by other users, categories lists & search results, search & select from pre-created lists, import, add new 4713, update, save & provide list of products, services 4712, people, and entities which users are using or are interested to use or like or users are searching or related or experienced or have knowledge. In an embodiment server 110 can verify the said posted, submitted or provided list items 4716 and associate categories 4714, and relationships 4717. User can tap or click on add new 4713 and can select or add & verify categories, sub-categories, keywords, taxonomy, ontology 4714 and can select or add & verify name including products, services, brands, company, school, college, people name and one or more types of entities 4716, and can select said name associate user's one or more status, relationship type, activity type, connection type and action 4717. In an embodiment user can also provide list item associate other details, metadata including verified data or documents proving that user is actual using or connected with said list item associate name including product, service, brand, company, school, college, people name and one or more types of entity 4716, location, associate profile, price, subscription fees, quality, quantity, duration, connected users, description, source details, date & time, date & time ranges of using or connected with said name including products, services, brands, company, school, college, people name and one or more types of entities 4716. In an embodiment user can also select list item and allow other users to call (select one or more types of calls and associate one or more menu types) to user for said list item.

In an embodiment user can also provide preferences or set privacy settings for accepting 1 or more types of calls including select types of calls user wants to receive, set maximum times of calls related to one or more or all list items and/or one or more selected types of calls, maximum total calls, maximum total daily duration of calls and Based on said list and associate selections, metadata, preferences and privacy settings, system matches said data with list associate data of other users of network for enabling user to real-time call to one or more auto-matched or selected users from said list of matched users.

For example User [Y] creates list 4701 including list item e.g. iPhone 4755 which comprises associate category e.g. Electronic-> Mobile, item name e.g. iPhone, and relationship e.g. Like, Wants to Purchase and based on said list item data and user data system matches with list data & user data including location, availability, system settings or rules e.g. maximum number of users, ratings, type of user (free, paid, enterprise etc.), preferences & privacy settings of other users of network and finds actual customers who are using iPhone and presents matched Users e.g. User [A] and User [C] to e.g. User [Y], so User [Y] can select list item (e.g. iPhone 4755 and can call to auto matched users or select one or more user(s) from presented matched list, so prospective customer of e.g. iPhone 4760 e.g. User [Y] device 4760 can one or more type(s) of call to actual customers e.g. User [A] device 4780 and User [C] device and converse, communicate, collaborate, workflow, share, conduct one or more activities, actions, events, transactions, ask questions to/with them 4764/4784. In an embodiment user can like, dislike, report (e.g. report as spam) and rate 4766/4786 to one or more messages or shared contents etc. In an embodiment user can send 4770/4790 message or shared contents to selected users only from current participant users 4768/4788. In an embodiment user can save conversations 4771/4791. In an embodiment user can save conversations 4771/4791 only when sender allows user to save conversations.

In an various examples and embodiments buyers can real-time call to matched sellers or affiliates, sellers can call to matched buyers, student can call to subject specific experts, shop owner can call to contextual suppliers, job seekers can call to matched employers, bride lookers can call to matched grooms and grooms can call to matched brides, suppliers can call to prospective contextual buyers for real-time converse with each other in the acceptance of one or more type(s) of call by called user(s).

In an embodiment user can filter 4708 list 4701 based on categories, keywords, status or action or activity or location or relationship or connection type 4717.

In an embodiment user can sort 4709 list e.g. 4701 based on date & time, category, ascending or descending order of name, status or connection or relationship type.

In an embodiment user can share 4710 list 4701 to/with one or more users of network including one or more selected connected or related users.

In an embodiment user can search 4711 list 4701.

In an embodiment particular number of points are deducted from user's points when user calls to other users for particular numbers of times or for particular period of time or duration and particular number of points are added to user's points when user accept calls from other users for particular numbers of times or for particular period of time or duration. User can view, manage, share, purchase, gift, transfer points 4707.

In an embodiment user is enabled to show or hide user's identities including number, name, nick name, status, address, contact details, photo, profile, last seen, updates & location etc.

In an embodiment user can call and communicate to/with individually or in group or one or more users separately or add to or separate from call or communicate with one or more users within group of user(s).

Figure 48:
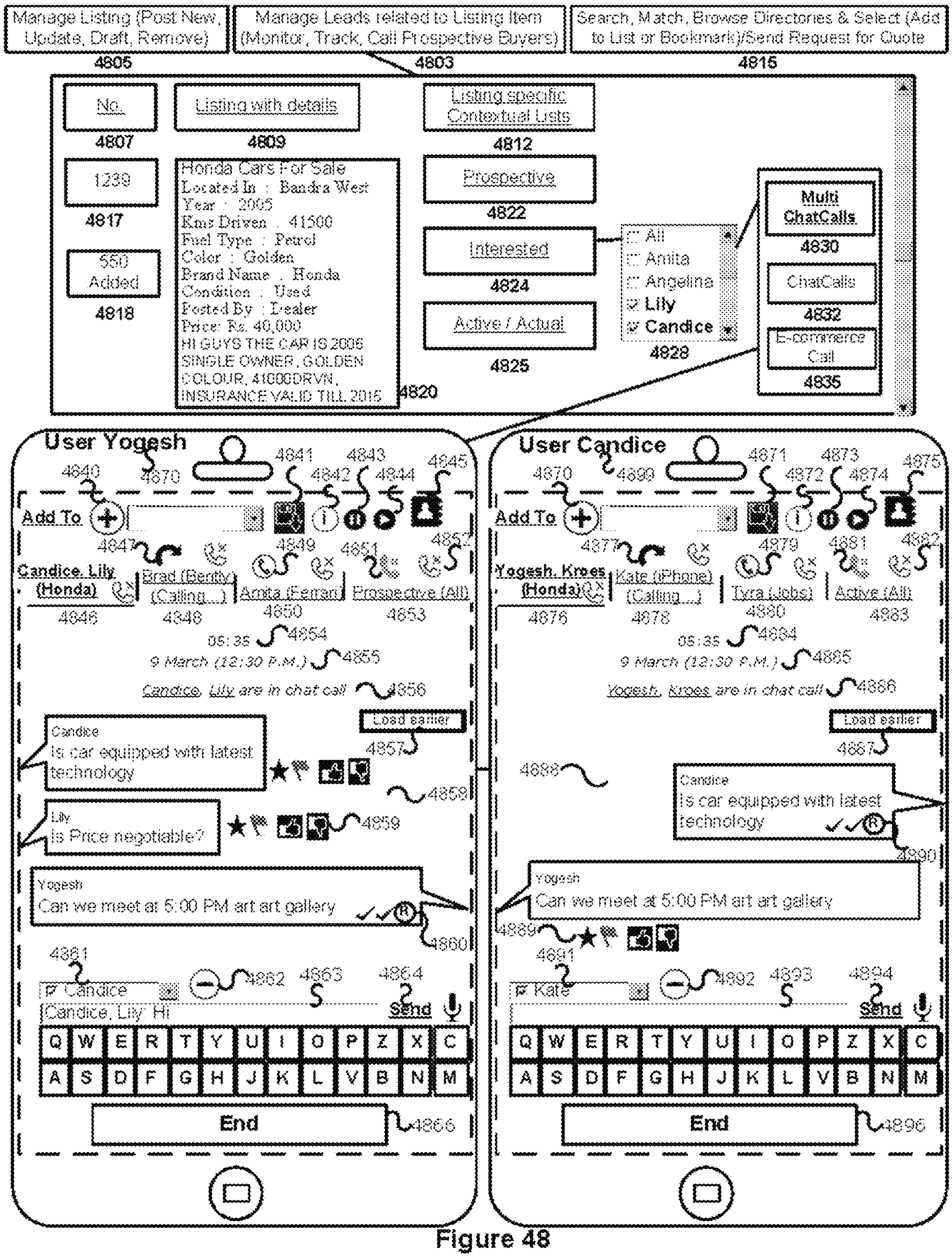

FIG. 48 illustrates exemplary Graphical User Interface (GUI) for enabling buyers to real-time connect with sellers. Sellers or advertisers can post classifieds, advertisements and listings products and services 4805. Buyers can search, match, browse and select or bookmark or add to wish list or interest list one or more listed products or services or suppliers or sellers 4815. Buyers can send requests for quote 4815 and said request will be send to auto matched or selected suppliers for quote. Buyers can one or more types of calling e.g. ChatCall to sellers or suppliers. In an embodiment buyers can allow sellers or suppliers to call prospective buyer or user. For example User [Yogesh] posts classified regarding [Honda Car for Sale] 4820. After submitting post, said post available to users of network. Users can bookmark or add to one or more types of list. Based on that seller lists also updated including interested buyers who added sellers or product or services to their various lists e.g. 4822/4824/4825 including buying interest, bookmark, favorite, wish list, following list & like. System also auto match buyers with sellers and sellers with buyers and present various suggested lists e.g. 4822/4824/4825 of products or services or suppliers or buyers or sellers to users, so they can establish one or more types of call e.g. ChatCall to each other's and real-time conduct one or more activities including chatting, communications, collaborations, sharing, participations, e-commerce, bidding, negotiations, comparing, querying, answering. Users e.g. buyers or sellers can select one or more users from list 4828 and can conduct one or more types of calling e.g. multi ChatCall 4830 or group ChatCall 4832 or e-commerce call 4835. For example user [Yogesh] select listing 4817/4820 and select listing specify list e.g. 4824 and select list associate one or more contacts or users or matched or contextual users or buyers or sellers 4828 and can select one or more actions including e.g. multi ChatCall 4830 or group ChatCall 4832 or e-commerce call 4835. For example when User [Yogesh] select matched interested buyers [Lily] and [Candice] and selects [Multi ChatCalls] 4830 then outgoing call interface is presented to user and in the event of call acceptance by called user(s) e.g. selected matched interested buyers [Lily] and [Candice] 4828, user [Yogesh] device 4870 and e.g. user [Candice] device 4899 are presented with Chat Interface so they can communicate or converse with each other via staying on or selecting current tab 4846/4876. Users can conduct (select contacts and call 4845 or 4875 or add to call one or more incoming or current selected call(s) 4840) or manage including current or active or incoming or outgoing one or more types of calling with one or more or group of users e.g. 4846/4848/4840/4853 or 4876/4878/4880/4883.

In an embodiment user(s) can like, dislike, report (e.g. report as spam) and rate 4859/4889 to one or more messages or shared contents etc. In an embodiment user can send 4863/4893 message or shared contents to selected users only from current participant users 4862/4892. In an embodiment user can save conversations 4845/4871. In an embodiment user can save conversations 4845/4871 only when sender allows user to save conversations. User can view allowed profile(s) of conversed user(s) 4842 or 4872 or 4856/4886. User can pause 4843 or 4873 or re-start 4844 or 4874 conversation or chatting or sharing or communication session. User can end call via clicking or tapping or selecting "end button" 4866 or 4896.

FIG. 49 illustrates exemplary Graphical User Interface (GUI) for enabling users to post, update & manage 4905 one or more types of profiles or requirement specifications e.g. general user profile, professional profile, job profile, matrimonial or dating profile 4905. User is also enable to provide, update and select matchmaking preferences for e.g. job required including salary ranges, location preferences, type or category of job etc., matrimonial e.g. age ranges, income ranges, location preferences etc. Users of network are enabling to search, match, browse and select profiles or auto match and select from suggested list of profiles and bookmarks matched or contextual users e.g. employers or employees or brides or grooms or related or similar professionals or suppliers or sellers & like 4903. User can manage matchmaking type specific or combined one or more lists e.g. list 4935, wherein user can select preferred one or more list item(s) and can conduct one or more types of call e.g. ChatCall 4930 for communicating with matched, selected, suggested & contextual matchmaking type specific users.

For example user [Yogesh] select list item 4926 and tap on ChatCall and can select one or more actions including e.g. multi ChatCall 4937 or group ChatCall 4938. For example when User [Yogesh] select matched user(s) [Adrina] and selects [ChatCalls] 4930 then outgoing call interface is presented to user and in the event of call acceptance by called user(s) e.g. selected matched user(s) [Adrina] 4927, user [Yogesh] device 4970 and e.g. user [Adrina] device 4999 are presented with Chat Interface so they can communicate or converse with each other via staying on or selecting current tab 4946/4976. Users can conduct (select contacts and call 4945 or 4975 or add to call one or more incoming or current selected call(s) 4940) or manage including current or active or incoming or outgoing one or more types of calling with one or more or group of users e.g. 4946/4948/4940/4953 or 4976/4978/4980/4983.

In an embodiment user(s) can like, dislike, report (e.g. report as spam) and rate 4959/4989 to one or more messages or shared contents etc. In an embodiment user can send 4963/4993 message or shared contents to selected users only from current participant users 4962/4992. In an embodiment user can save conversations 4945/4971. In an embodiment user can save conversations 4945/4971 only when sender allows user to save conversations. User can view allowed profile(s) of conversed user(s) 4942 or 4972 or 4956/4986. User can pause 4943 or 4973 or re-start 4944 or 4974 conversation or chatting or sharing or communication session. User can end call via clicking or tapping or selecting "end button" 4966 or 4996.

Figure 50:
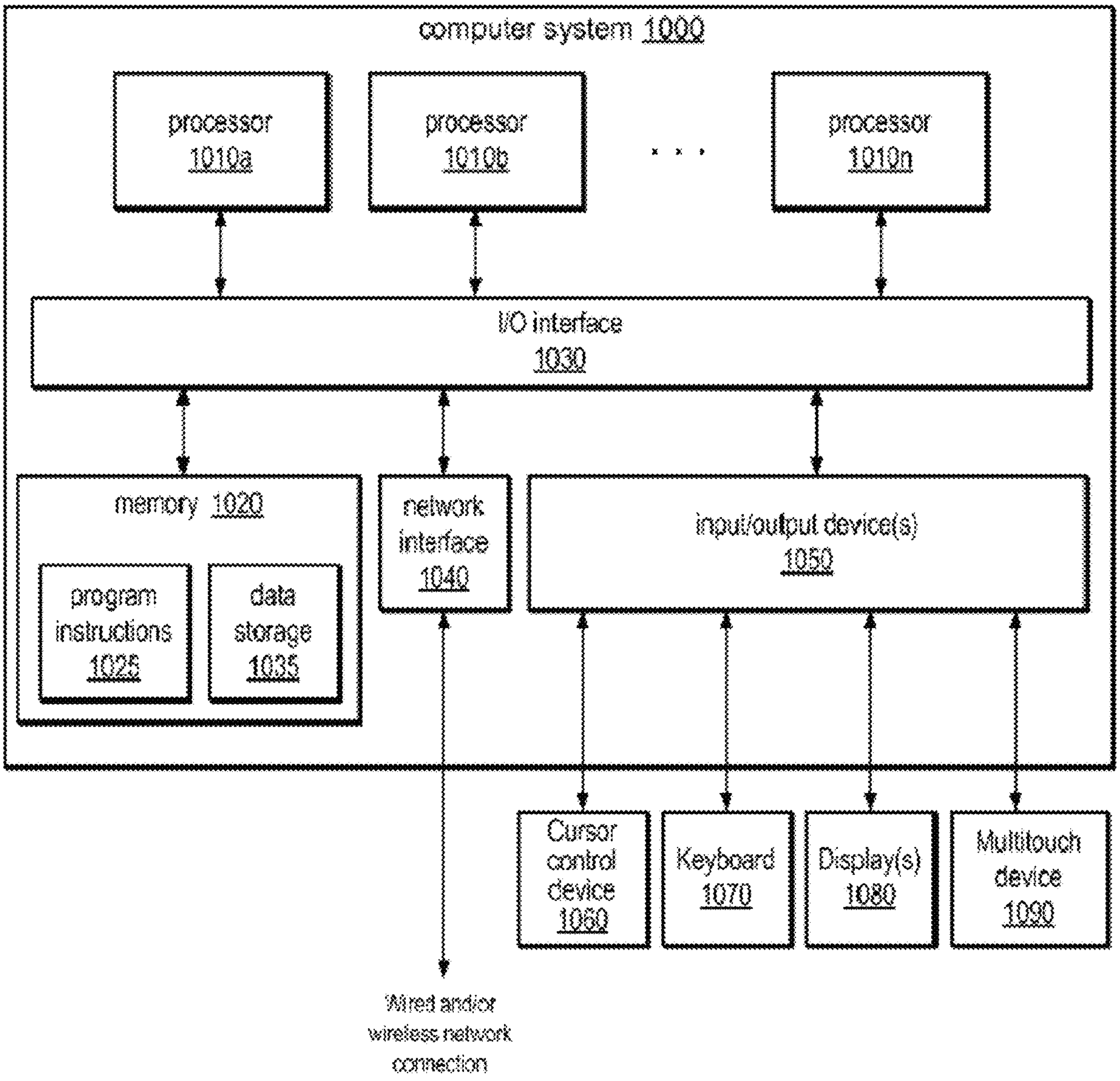
FIG. 50 illustrates an example computer system suitable for implementing various components of the system and method for real time call based system e.g. chat call, according to some embodiments.

Various components of embodiments of methods as illustrated and described in the accompanying description may be executed on one or more computer systems, which may interact with various other devices. One such computer system is illustrated by FIG. 50. In different embodiments, computer system 1000 may be any of various types of devices, including, but not limited to, a personal computer system, desktop computer, laptop, notebook, or notebook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, multitouch device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods as illustrated and described in the accompanying description may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those for methods as illustrated and described in the accompanying description, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired and/or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired and/or wireless connection, such as over network interface 1040.

As shown in FIG. 50, memory 1020 may include program instructions 1025, configured to implement embodiments of methods as illustrated and described in the accompanying description, and data storage 1035, comprising various data accessible by program instructions 1025. In one embodiment, program instruction 1025 may include software elements of methods as illustrated and described in the accompanying description. Data storage 1035 may include data that may be used in embodiments. In other embodiments, other or different software elements and/or data may be included.

Those skilled in the art will appreciate that computer system 1000 is merely illustrative and is not intended to limit the scope of methods as illustrated and described in the accompanying description. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

In an embodiment a program is written as a series of human understandable computer instructions that can be read by a compiler and linker, and translated into machine code so that a computer can understand and run it. A program is a list of instructions written in a programming language that is used to control the behavior of a machine, often a computer (in this case it is known as a computer program). A programming language's surface form is known as its syntax. Most programming languages are purely textual; they use sequences of text including words, numbers, and punctuation, much like written natural languages. On the other hand, there are some programming languages which are more graphical in nature, using visual relationships between symbols to specify a program. In computer science, the syntax of a computer language is the set of rules that defines the combinations of symbols that are considered to be a correctly structured document or fragment in that language. This applies both to programming languages, where the document represents source code, and markup languages, where the document represents data. The syntax of a language defines its surface form. Text-based computer languages are based on sequences of characters, while visual programming languages are based on the spatial layout and connections between symbols (which may be textual or graphical or flowchart(s)). Documents that are syntactically invalid are said to have a syntax error. Syntax—the form—is contrasted with semantics—the meaning. In processing computer languages, semantic processing generally comes after syntactic processing, but in some cases semantic processing is necessary for complete syntactic analysis, and these are done together or concurrently. In a compiler, the syntactic analysis comprises the frontend, while semantic analysis comprises the backend (and middle end, if this phase is distinguished). There are millions of possible combinations, sequences, ordering, permutations & formations of inputs, interpretations, and outputs or outcomes of set of instructions of standardized or specialized or generalized or structured or functional or object oriented programming language(s).

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Furthermore, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. Additionally, although the foregoing embodiments have been described in the context of a social network website, it will apparent to one of ordinary skill in the art that the invention may be used with any social network service, even if it is not provided through a website. Any system that provides social networking functionality can be used in accordance with the present invention even if it relies, for example, on e-mail, instant messaging or any other form of peer-to-peer communications, or any other technique for communicating between users. Systems used to provide social networking functionality include a distributed computing system, client-side code modules or plug-ins, client-server architecture, a peer-to peer communication system or other systems. The invention is thus not limited to any particular type of communication system, network, protocol, format or application.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

What is claimed is:

1. A computer-implemented method, performed by a processor configured by a computer-readable code to perform the method comprising the steps of:

a) receiving by a server from a first user, a selection of a second user from a contact list, a request for initiating a call and a selection of one or more types of one or more applications, interfaces and media including at least a selection of a chat graphical user interface;

b) in the event the second user accepts an initiated call within pre-set duration, start communication session and presenting said selected one or more applications, interfaces, media including the chat graphical user interface to first user and/or second user;

c) enabling the first user and/or the second user in real-time to access said presented application or interface or media including the graphical chat interface;

d) receiving by the server, a termination indication from the first user or the second user, the termination indication indicating the ending of the call and based on the termination indication, terminate the call or terminate said communication session.

2. The method of claim 1 wherein in the event of initiation of call, displaying an outgoing call interface to the first user, wherein said interface enables the first user to terminate said initiated call before acceptance of call by the second user.

3. The method of claim 1 wherein in the event of initiation of call, presenting an incoming call interface to the second user, wherein allowing the second user to respond to the initiated communication within particular period of time or duration or as per rules, the response comprising one of: accept, reject, remind later, or respond with text.

4. The method of claim 1 wherein one or more types of applications, interfaces, forms, web pages, web sites, user controls, user actions, functions, controls, objects and one or more types of media comprises a chat application, an instant messenger application, an e-mail application, a short message service (SMS) interface, MMS interface, a survey or feedback form, a profile form, a wizard, photo viewer, video viewer, content viewer, like button, comment interface, one or more types of media including a photo, a video, a text, a link, emoticons and any combination thereof.

5. The method of claim 1 wherein enabling to select default or enable to pre-select or pre-set or pre-selection of one or more types of one or more applications, interfaces and media.

6. The method of claim 1 wherein select user(s) or contact(s) from list of users or contacts comprises unique identity, unique phone numbers of phone book of device, unique user name, unique identity of social network including Facebook, Twitter and Google identity, email address, group(s), category or set of contacts and list of user(s) or contact(s).

7. The method of claim 1 wherein enabling to initiate or accept one or more types of one or more calls.

8. The method of claim 1 wherein show indication that real-time communication session is active in both first user computing device and the second computing device, wherein indication including typing status, online or offline status or icon, and timer to indicate communication session is not ended.

9. The method of claim 1 wherein before sending request to accept initiated call to the second user, check is made whether do not disturb, block, scheduled and mute applied and in the event of do not disturb, block, scheduled and mute applied, rejecting request.

10. The method of claim 1 wherein enable to and inform about pause or restart of said established communication or call between first and second user to the first and the second user, wherein in the event of pause preventing the first user and the second user to communicate with each other and in the event of restart enabling the first and the second user to communicate with each other.

11. A computer-implemented system for calling in a network environment, the system comprising: at least one processor having a computer-readable program code stored therein that when executed by the at least one processor, causes the at least one processor a) to receive from a first user a selection of a second user from a contact list, a request for initiating a call to a second user, a selection of one or more types of one or more applications or interfaces or media including at least a chat graphical user interface;

b) in the event the second user accepts an initiated call within pre-set duration, start communication session and present said selected one or more applications, interfaces, media including the chat graphical user interface to first user and/or second user;

c) enable the first user and/or the second user in real-time to access said presented application or interface or media including the graphical chat interface;

d) receive by the server, a termination indication from the first user or the- second user, the termination indication indicating the ending of the call and based on the termination indication, terminate the call or terminate said communication session.

12. The system of claim 11 wherein in the event of initiation of call, display an outgoing call interface to the first user, wherein said interface enables the first user to terminate said initiated call before acceptance of call by the second user.

13. The system of claim 11 wherein in the event of initiation of call, present an incoming call interface to the second user, wherein allow the second user to respond to the initiated communication within particular period of time or duration or as per rules, the response comprising one of: accept, reject, remind later, or respond with text.

14. The system of claim 11 wherein one or more types of applications, interfaces, forms, web pages, web sites, user controls, user actions, functions, controls, objects and one or more types of media comprises a chat application, an instant messenger application, an e-mail application, a short message service (SMS) interface, MMS interface, a survey or feedback form, a profile form, a wizard, photo viewer, video viewer, content viewer, like button, comment interface, one or more types of media including a photo, a video, a text, a link, emoticons and any combination thereof.

15. The system of claim 11 wherein enable to select default or enable to pre-select or pre-set or pre-selection of one or more types of one or more applications, interfaces and media.

16. The system of claim 11 wherein select user(s) or contact(s) to initiate call comprises select unique identity(ies), unique phone number(s), unique user name(s), unique identity((ies) of social network including Facebook, Twitter and Google, email address(es), group(s), select one or more categories or set of contacts or list of user(s) or contact(s), one or more types of codes including QRcode(s).

17. The system of claim 11 wherein enable to initiate or accept one or more types of one or more calls.

18. The system of claim 11 wherein show indication that real-time communication session is active in both first user computing device and the second computing device, wherein indication including typing status, online or offline status or icon, and timer to indicate communication session is not ended.

19. The system of claim 11 wherein before sending request to accept initiated call to the second user, check is made whether do not disturb, block, scheduled and mute applied and in the event of do not disturb, block, scheduled and mute applied, reject request.

20. The system of claim 11 wherein enable to and inform about pause or restart of said established communication or call between first and second user to the first and the second user, wherein in the event of pause preventing the first user and the second user to communicate with each other and in the event of restart enabling the first and the second user to communicate with each other.

* * * * *